US012534729B2

(12) United States Patent
Ronai

(10) Patent No.: US 12,534,729 B2
(45) Date of Patent: Jan. 27, 2026

(54) USES OF SYNTHETIC LETHAL PARTNERS FOR TREATMENT OF CANCER

(71) Applicant: Sanford Burnham Prebys Medical Discovery Institute, La Jolla, CA (US)

(72) Inventor: Ze'ev A. Ronai, Escondido, CA (US)

(73) Assignee: SANFORD BURNHAM PREBYS MEDICAL DISCOVERY INSTITUTE, La Jolla, CA (US)

( * ) Notice: Subject to any disclaimer, the term of this patent is extended or adjusted under 35 U.S.C. 154(b) by 1088 days.

(21) Appl. No.: 17/616,126

(22) PCT Filed: May 29, 2020

(86) PCT No.: PCT/US2020/035338
§ 371 (c)(1),
(2) Date: Dec. 2, 2021

(87) PCT Pub. No.: WO2020/247275
PCT Pub. Date: Dec. 10, 2020

(65) Prior Publication Data
US 2022/0307030 A1  Sep. 29, 2022

Related U.S. Application Data

(60) Provisional application No. 62/856,645, filed on Jun. 3, 2019.

(51) Int. Cl.
| A61K 38/50 | (2006.01) |
| A61K 31/00 | (2006.01) |
| A61K 31/4184 | (2006.01) |
| A61K 31/437 | (2006.01) |
| A61K 38/46 | (2006.01) |
| A61K 39/395 | (2006.01) |
| A61K 45/06 | (2006.01) |
| A61P 1/18 | (2006.01) |
| A61P 17/00 | (2006.01) |
| A61P 35/00 | (2006.01) |
| C07K 16/40 | (2006.01) |
| C12N 15/11 | (2006.01) |
| C12N 15/113 | (2010.01) |

(52) U.S. Cl.
CPC ...... *C12N 15/1137* (2013.01); *A61K 31/4184* (2013.01); *A61K 31/437* (2013.01); *A61K 38/465* (2013.01); *A61K 38/50* (2013.01); *A61K 39/3955* (2013.01); *A61K 45/06* (2013.01); *A61P 1/18* (2018.01); *A61P 17/00* (2018.01); *A61P 35/00* (2018.01); *C07K 16/40* (2013.01); *C12N 15/11* (2013.01); *C12N 2310/14* (2013.01); *C12N 2310/20* (2017.05); *C12N 2320/31* (2013.01)

(58) Field of Classification Search
CPC ........ A61K 38/50; A61K 38/17; A61K 45/06; A61P 35/00
See application file for complete search history.

(56) References Cited

U.S. PATENT DOCUMENTS

2009/0311233 A1* 12/2009 Lorenzi .............. C12N 15/1137
435/6.14
2017/0112865 A1* 4/2017 Morrison ............. A61K 31/655

FOREIGN PATENT DOCUMENTS

| EP | 2626066 A1 | 8/2013 |
| WO | WO-2006061712 A2 | 6/2006 |
| WO | WO-2017079399 A1 | 5/2017 |
| WO | WO2020247275 | 12/2020 |

OTHER PUBLICATIONS

. (Nakamura et al., "Inhibition of GCN2 sensitizes ASNS-low cancer cells to asparaginase by disrupting the amino acid response" [published in Proc Nat Acad Sci, Aug. 14, 2018, vol. 115, vol. 115, No. 33 pp. E7776-E7785]) (2018). (Year: 2018).*
Neill et al., Front. Mol. Neurosci., 2023, vol. 16:1112253.*
Chen et al., Scientific Reports, 2017, vol. 7, Article # 7950.*
Ackermann et al. Metastasizing melanoma formation caused by expression of activated N-RasQ61K on an INK4a-deficient background. Cancer Res. 65(10):4005-11 (2005).
Altman et al. From Krebs to clinic: glutamine metabolism to cancer therapy. Nat Rev Cancer 16:749 (2016).
Bachet et al. Asparagine Synthetase Expression and Phase I Study With L-*Asparaginase* Encapsulated in Red Blood Cells in Patients With Pancreatic Adenocarcinoma. Pancreas 44:1141-1147 (2015).
Balasubramanian et al. Asparagine synthetase: regulation by cell stress and involvement in tumor biology. Am J Physiol Endocrinol Metab. 304(8):E789-99 (2013).
Betz et al. KlenTaq polymerase replicates unnatural base pairs by inducing a Watson-Crick geometry. Nat Chem Biol 8:612-614 (2012).
Bilal et al. Improving breast cancer survival analysis through competition-based multidimensional modeling. PLoS Comput Biol 9:e1003047 (2013).
Bramham et al. Tuning Specific Translation in Cancer Metastasis and Synaptic Memory: Control at the MNK-eIF4E Axis. Trends Biochem Sci 41:847-858 (2016).
Broad GDAC Firehose https://gdac.broadinstitute.org/ (2016).
Brown et al. MNK Controls mTORC1: Substrate Association through Regulation of TELO2 Binding with mTORC1. Cell Rep 18:1444-1457 (2017).
Chao et al. A nonrandomized cohort and a randomized study of local control of large hepatocarcinoma by targeting intratumoral lactic acidosis. Elife 5:e15691 (2016).
Chen et al. The general amino acid control pathway regulates mTOR and autophagy during serum/glutamine starvation. J Cell Biol 206:173-182 (2014).

(Continued)

*Primary Examiner* — Xiaozhen Xie
(74) *Attorney, Agent, or Firm* — WILSON SONSINI GOODRICH & ROSATI

(57) ABSTRACT

Described herein are methods and compositions for diagnosing, treating, or ameliorating symptoms of cancer, including pancreatic cancer and melanoma, with Asparagine Synthetase (ASNS) synthetic lethal partners.

11 Claims, 98 Drawing Sheets
Specification includes a Sequence Listing.

(56) References Cited

OTHER PUBLICATIONS

Cheung et al. Systematic investigation of genetic vulnerabilities across cancer cell lines reveals lineage-specific dependencies in ovarian cancer. PNAS USA 108:12372-12377 (2011).
Choi et al. Targeting Glutamine Metabolism for Cancer Treatment. Biomol Ther (Seoul) 26:19-28 (2018).
Cowley et al. Parallel genome-scale loss of function screens in 216 cancer cell lines for the identification of context-specific genetic dependencies. Sci Data 1:140035 (2014).
Dorard et al. RAF proteins exert both specific and compensatory functions during tumour progression of NRAS-driven melanoma. Nat Commun 8:15262 (2017).
Eferl et al. AP-1: a double-edged sword in tumorigenesis. Nat Rev Cancer. 3(11):859-68 (2003).
Falletta et al. Translation reprogramming is an evolutionarily conserved driver of phenotypic plasticity and therapeutic resistance in melanoma. Genes Dev 31:18-33 (2017).
Fernandez et al. ATF4-amino acid circuits: a recipe for resistance in melanoma. EMBO J 37(20):e100600 (2005).
Furic et al. eIF4E phosphorylation promotes tumorigenesis and is associated with prostate cancer progression. PNAS USA 107:14134-14139 (2010).
Gandin et al. Polysome fractionation and analysis of mammalian translatomes on a genome-wide scale. J Vis Exp. (87):51455 (2014).
Garnett et al. Systematic identification of genomic markers of drug sensitivity in cancer cells. Nature 483:570-575 (2012).
Gwinn et al. Oncogenic KRAS Regulates Amino Acid Homeostasis and Asparagine Biosynthesis via ATF4 and Alters Sensitivity to L-*Asparaginase*. Cancer Cell 33(1):91-107 (2018).
Iorio et al. A Landscape of Pharmacogenomic Interactions in Cancer. Cell 166:740-754 (2016).
Kilberg et al. ATF4-dependent transcription mediates signaling of amino acid limitation. Trends Endocrinol Metab 20:436-443 (2017).
Knott et al., Asparagine bioavailability governs metastasis in a model of breast cancer. Nature 554:378-381 (2018).
Krall et al. Asparagine promotes cancer cell proliferation through use as an amino acid exchange factor. Nat Commun 7:11457 (2016).
Le et al. An evaluation of tumor oxygenation and gene expression in patients with early stage non-small cell lung cancers. Clin Cancer Res 12:1507-1514 (2006).
Lee et al. Harnessing synthetic lethality to predict the response to cancer treatment. Nat Commun 9:2546 (2018).
Marcotte et al. Essential gene profiles in breast, pancreatic, and ovarian cancer cell. Cancer Discov 2:172-189 (2017).
Marcotte et al. Functional Genomic Landscape of Human Breast Cancer Drivers, Vulnerabilities, and Resistance. Cell 164:293-309 (2016).
Nakamura et al., Inhibition of GCN2 sensitizes ASNS-low cancer cells to asparaginase by disrupting the amino acid response. Proc Natl Acad Sci U S A. 115(33):E7776-E7785 (2018).
PCT/US2020/035338 International Invitation to Pay Additional Fees dated Apr. 9, 2021.
PCT/US2020/035338 International Search Report and Written Opinion dated Jun. 9, 2021.
Petit et al. C57BL/6 congenic mouse NRAS Q61K melanoma cell lines are highly sensitive to the combination of Mek and Akt inhibitors in vitro and in vivo. Pigment Cell Melanoma Res. 32(6):829-841 (2019).
Pieters et al. L-*Asparaginase* treatment in acute lymphoblastic leukemia: a focus on Erwinia asparaginase. Cancer 117:238-249 (2011).
Prager et al. Asparagine synthetase in asparaginase resistant and susceptible mouse lymphomas. Biochem Biophys Res Commun. 31(1):43-7 (1968).
Primer Bank https://pga.mgh.harvard.edu/primerbank/ (2006).
Ratnikov et al. Glutamate and asparagine cataplerosis underlie glutamine addiction in melanoma. Oncotarget 6:7379-7389 (2015).
Richards et al. Asparagine synthetase chemotherapy. Annu Rev Biochem 75:629-54 (2006).
Roux et al. Signaling Pathways Involved in the Regulation of mRNA Translation. Mol Cell Biol 38(12):e00070 (2018).
Schulte et al. Pharmacological blockade of ASCT2-dependent glutamine transport leads to antitumor efficacy in preclinical models. Nat Med 24:194-202 (2018).
Sears et al. Multiple Ras-dependent phosphorylation pathways regulate Myc protein stability. Genes Dev 14:2501-2514 (2000).
Sidrauski et al. The small molecule ISRIB reverses the effects of eIF2α phosphorylation on translation and stress granule assembly. Elife 4:e05033 (2015).
Stams et al. Asparagine synthetase expression is linked with L-*Asparaginase* resistance in TEL-AML1-negative but not TEL-AML1-positive pediatric acute lymphoblastic leukemia. Blood 105:4223-4225 (2005).
Sun et al. cMyc-mediated activation of serine biosynthesis pathway is critical for cancer progression under nutrient deprivation conditions. Cell Res 25:429-444 (2015).
UCSC Xena browser http://xena.ucsc.edu (2019).
Waskiewicz et al. Mitogen-activated protein kinases activate the serine/threonine kinases Mnk1 and Mnk2. EMBO J 16:1909-1920 (1997).
Webb et al. An internal ribosome entry site in the 5' untranslated region of epidermal growth factor receptor allows hypoxic expression . Oncogenesis 4:e134 (2015).
Wek. Role of eIF2α Kinases in Translational Control and Adaptation to Cellular Stress. Cold Spring Harb Perspect Biol. 10(7):a032870 (2018).
Wethmar et al. Comprehensive translational control of tyrosine kinase expression by upstream open reading frames. Oncogene 35:1736-1742 (2016).
Wise et al. Glutamine addiction: a new therapeutic target in cancer. Trends Biochem Sci 35:427-433 (2010).
Ye et al., The GCN2-ATF4 pathway is critical for tumour cell survival and proliferation in response to nutrient deprivation. EMBO J. 29(12):2082-2096 (2010).
Young et al. Upstream Open Reading Frames Differentially Regulate Gene-specific Translation in the Integrated Stress Response. J Biol Chem 291:16927-16935 (2016).
Zhang et al. Asparagine plays a critical role in regulating cellular adaptation to glutamine depletion. Mol Cell 56:205-218 (2014).
Bollag et al. Vemurafenib: the first drug approved for BRAF-mutant cancer. Nat Rev Drug Discov 11(11):873-886 (2012).
Hashimoto et al. Declined asparagine synthetase mRNA expression and enhanced sensitivity to asparaginase in HL-60 cells committed to monocytic differentiation. Anticancer Res. 29(4):1303-1308 (2009).
Pathria et al. Abstract 1155: Co-Targeting MAPK Signalling and Asparagine Metabolism by MEK Inhibitor +L-*Asparaginase* Combination in Pancreatic Cancer. Gastroenterology 158(6, Supp 1):S231-S232 (2020) Retrieved from the Internet:URL: https://reader.elsevier.com/reader/sd/pii/S001650852031266x?token=C62D3674E6679C4A201B2270572C2A4DA1DCB6DE063021B5D005C0821902F399B73E710A2B034C479848EF3F462C237F&0riginRegion=eu-west—I1éoriginCreation=20221221080114.
Pathria et al., Translational reprogramming marks adaptation to asparagine restriction in cancer. Nat Cell Biol 21:1590-1603 (2019).
Song et al. Asparaginase induces apoptosis and cytoprotective autophagy in chronic myeloid leukemia cells. Oncotarget 6(6):3861-3873 (2015).
Woodrum et al. Comparison of three rapamycin dosing schedules in A/J Tsc2+/− mice and improved survival with angiogenesis inhibitor or asparaginase treatment in mice with subcutaneous tuberous sclerosis related tumors. J Transl Med 8:14 (2010).

\* cited by examiner

| SL Partner | Activity |
|---|---|
| BRAF | MAPK signaling pathway |
| MNK1 | MAPK signaling pathway target, Translational control |
| JAK3 | JAK-STAT pathway, cytokine signaling |
| PDGFRA | Receptor Tyrosine Kinase (RTK) signaling |
| PDGFRB | Receptor Tyrosine Kinase (RTK) signaling |
| VEGFR-2 | Receptor Tyrosine Kinase (RTK) signaling |
| PLK1 | Cell cycle regulation, MAPK signaling |

FIG. 3B

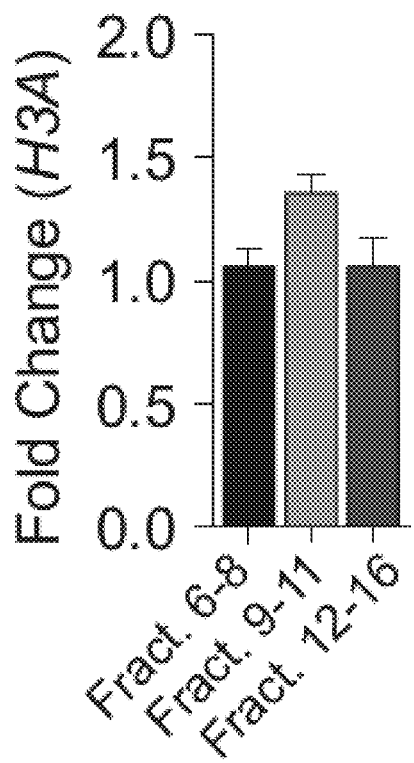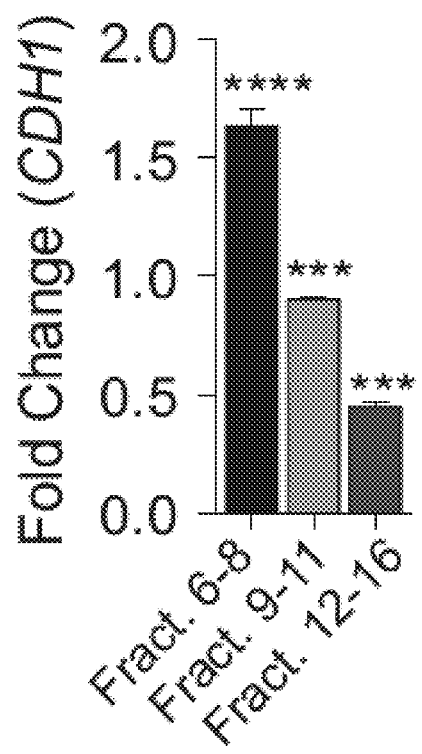
FIG. 10G

USES OF SYNTHETIC LETHAL PARTNERS FOR TREATMENT OF CANCER

CROSS-REFERENCE TO RELATED APPLICATIONS

This application is the U.S. National Stage application of International Application No. PCT/US2020/035338, filed on May 29, 2020, and claims the benefit of U.S. Provisional Application No. 62/856,645, filed on Jun. 3, 2019, all of which are incorporated herein by reference in their entirety.

STATEMENT AS TO FEDERALLY SPONSORED RESEARCH

This invention was made with government support under R35 CA197465 and POT CA128814 awarded by the National Institutes of Health. The government has certain rights in the invention.

FIELD

The disclosed compositions and methods are generally in the field of cancer and cancer treatment and specifically in the area of diagnosis, prognosis, treatment, monitoring treatment, and selection of treatment for cancer.

INCORPORATION BY REFERENCE

All publications, patents, and patent applications mentioned herein are incorporated by reference to the same extent as if each individual publication, patent, or patent application was specifically and individually indicated to be incorporated by reference.

BACKGROUND

The following description includes information that may be useful in understanding the present invention. It is not an admission that any of the information provided herein is prior art or relevant to the presently claimed invention, or that any publication specifically or implicitly referenced is prior art.

Tumor expansion, especially expansion in rapidly proliferating tumors, exhibits increased requirements for macromolecules to meet expanding energetic and biosynthetic needs. However, cancer cells can successfully endure harsh, nutrient-restricted environments, often by rewiring metabolic pathways. Accordingly, studying restriction of nonessential amino acids has revealed enhanced de novo biosynthesis pathways marked by elevated expression of amino acid biosynthetic enzymes, an impediment to durable therapeutic response (Maddocks et al., Cancer Discov 2, 172-189. 2017; Sun et al., Cell Res 25, 429-444.2015). There remains a need for combinatorial therapeutic approaches to efficiently exploit metabolic vulnerabilities of cancer cells that endure amino acid limitation.

SUMMARY OF THE INVENTION

Provided herein are methods and compositions for diagnosing, treatment, monitoring treatment, and selecting treatment of cancer. The disclosed methods and compositions are particularly suited for treatment of melanoma and pancreatic cancer.

In certain aspects, provided herein are methods of suppressing tumor proliferation, comprising (i) contacting a tumor cell with an asparagine restriction agent, and (ii) contacting the tumor cell with a first inhibitory agent, wherein the first inhibitory agent inhibits the expression or activity of a first synthetic lethal (SL) partner of asparagine synthetase (ASNS). In some embodiments, the first SL partner of ASNS is involved in or regulated by the components of the Amino Acid Response (AAR) signaling pathway, the members of the Mitogen-activated Protein Kinases (MAPK; Ras, BRAF, CRAF, MEK1, MEK2, ERK1, ERK2) pathway, or MNK1, component of the translational initiation pathway. In some embodiments, the first SL partner of ASNS is a member of the cellular stress response pathway consisting of ATF4, GCN2, and eIF2a. In some embodiments, the first SL partner of ASNS is a member of the receptor tyrosine kinase (RTK) family (including PDGFRA, PDGFRB, and VEGFR-2). In some embodiments, the first SL partner of ASNS is selected from the group consisting of GCN2, eIF2a, Ras, BRAF, CRAF, PLK1, MEK1, MEK2, ERK1, ERK2, MNK1, PDGFRA, PDGFRB, VEGFR-2, and ATF4. In some embodiments, the first SL partner of ASNS is selected from the group consisting of BRAF, CRAF, MEK1, MEK2, ERK1, ERK2, and MNK. In some embodiments, the first SL partner of ASNS is selected from the group consisting of GCN2, eIF2α, and ATF4. In some embodiments, the first SL partner of ASNS is MEK1 or MEK2. In some embodiments, the first inhibitory agent is a small molecule. In some embodiments, the small molecule is selected from the group consisting of gefitinib, sunitinib, dabrafenib, vemurafenib, trametinib, selumetinib, sorafenib, and Torin 1. In some embodiments, the small molecule is selumetinib. In some embodiments, the first inhibitory agent is a siRNA, wherein the siRNA hybridizes with an mRNA that encodes the first SL partner of ASNS. In some embodiments, the first inhibitory agent is a CRISPR-Cas9 complex comprising a Cas9 protein or a polynucleotide encoding the Cas9 protein, and a guide RNA or a polynucleotide encoding the guide RNA, wherein the guide RNA hybridizes with a nucleic acid, wherein the nucleic acid encodes the first SL partner of ASNS. In some embodiments, the first inhibitory agent is a Transcription Activator-like Effector Nuclease (TALEN) or a polynucleotide encoding the TALEN. In some embodiments, the first inhibitory agent is encoded by a vector. In some embodiments, the vector is an AAV vector, a lentivirus vector, an adenovirus vector, a retrovirus vector, or a herpes simplex virus (HSV-1) vector.

In additional aspects, provided herein are methods of suppressing tumor proliferation, comprising (i) contacting a tumor cell with an asparagine restriction agent, and (ii) contacting the tumor cell with a first inhibitory agent, wherein the first inhibitory agent inhibits the expression or activity of a first synthetic lethal (SL) partner of asparagine synthetase (ASNS), and (iii) contacting the tumor cell with a second inhibitory agent, wherein the second inhibitory agent inhibits the expression or activity of a second SL partner of ASNS. In some embodiments, the second SL partner of ASNS is involved in or regulated by the AAR signaling pathway, the MAPK pathway, or the STAT pathway. In some embodiments, the second SL partner of ASNS is an RTK. In some embodiments, the second SL partner of ASNS is selected from the group consisting of GCN2, eIF2a, Ras, BRAF, CRAF, PLK1, MEK1, MEK2, ERK1, ERK2, MNK1, PDGFRA, PDGFRB, VEGFR-2, and ATF4. In some embodiments, the second SL partner of ASNS is selected from the group consisting of BRAF, CRAF, MEK1, MEK2, ERK1, ERK2, and MNK. In some embodiments, the second SL partner of ASNS is selected from the group consisting of GCN2, eIF2a, and ATF4. In some embodiments, the second SL partner of ASNS is BRAF. In some embodiments, the second inhibitory agent is a small molecule. In some embodiments, the small molecule is selected from the group consisting of gefitinib, sunitinib, dabrafenib, vemurafenib, trametinib, selumetinib, sorafenib, and Torin 1. In some embodiments, the small molecule is vemurafenib. In some embodiments, the second inhibitory agent is a siRNA, wherein the siRNA hybridizes with an mRNA that encodes the second SL partner of ASNS. In some embodiments, the second inhibitory agent is a CRISPR-Cas9 complex comprising a Cas9 protein or a polynucleotide encoding the Cas9 protein, and a guide RNA or a polynucleotide encoding the guide RNA, wherein the guide RNA hybridizes with a nucleic acid, wherein the nucleic acid encodes the second SL partner of ASNS. In some embodiments, the second inhibitory agent is a TALEN or a polynucleotide encoding the TALEN. In some embodiments, the second inhibitory agent is encoded by a vector. In some embodiments, the vector is an AAV vector, a lentivirus vector, an adenovirus vector, a retrovirus vector, or a herpes simplex virus (HSV-1) vector. In some embodiments, the tumor cell is contacted with an asparagine restriction agent. In some embodiments, the asparagine restriction agent is a small molecule. In some embodiments, the asparagine restriction agent is a siRNA. In some embodiments, asparagine restriction agent is a CRISPR-Cas9 complex comprising a Cas9 protein or a polynucleotide encoding the Cas9 protein, and a single guide RNA or a polynucleotide encoding the single guide RNA. In some embodiments, the asparagine restriction agent is a Transcription Activator-like Effector Nuclease (TALEN) or a polynucleotide encoding the TALEN. In some embodiments, the asparagine restriction agent is encoded by a vector. In some embodiments, the vector is an AAV vector, a lentivirus vector, an adenovirus vector, a retrovirus vector, or a herpes simplex virus (HSV-1) vector. In some embodiments, the asparagine restriction agent is L-asparaginase. In some embodiments, the tumor cell undergoes apoptosis. In some embodiments, the tumor cell is within a tumor tissue. In some embodiments, the tumor tissue is reduced by at least 15%, at least 30%, at least 50%, at least 75%, at least 90%, or at least 100% in size. In some embodiments, the tumor tissue is reduced by at least 30% in size. In some embodiments, the tumor cell is a solid tumor cell. In some embodiments, the tumor cell is a melanoma cell. In some embodiments, the tumor cell is a pancreatic cancer cell. In some embodiments, the tumor cell is within a subject.

In additional aspects, provided herein are pharmaceutical compositions for tumor suppression comprising (i) a therapeutically effective amount of an asparagine restriction agent, and (ii) a therapeutically effective amount of a first inhibitory agent, wherein the first inhibitory agent inhibits the expression or activity of a first synthetic lethal (SL) partner of asparagine synthetase (ASNS). In some embodiments, the first SL partner of ASNS is involved in or regulated by the Amino Acid Response (AAR) signaling pathway, Mitogen-activated Protein Kinases (MAPK) pathway, or the Signal Transducer and Activator of Transcription proteins (STAT) pathway. In some embodiments, the first SL partner of ASNS is an receptor tyrosine kinase (RTK). In some embodiments, the first SL partner of ASNS is selected from the group consisting of GCN2, eIF2α, Ras, BRAF, CRAF, PLK1, MEK1, MEK2, ERK1, ERK2, MNK1, PDGFRA, PDGFRB, VEGFR-2, and ATF4. In some embodiments, the first SL partner of ASNS is selected from the group consisting of BRAF, CRAF, MEK1, MEK2, ERK1, ERK2, and MNK. In some embodiments, the first SL partner of ASNS is selected from the group consisting of GCN2, eIF2α, and ATF4. In certain embodiments, the first SL partner of ASNS is MEK1 or MEK2. In certain embodiments, the first inhibitory agent is a small molecule. In particular embodiments, the small molecule is selected from the group consisting of gefitinib, sunitinib, dabrafenib, vemurafenib, trametinib, selumetinib, sorafenib, and Torin 1. In further particular embodiments, the small molecule is selumetinib.

In some embodiments, the first inhibitory agent is a siRNA, wherein the siRNA hybridizes with an mRNA that encodes the first SL partner of ASNS. In some embodiments, the first inhibitory agent is a CRISPR-Cas9 complex comprising a Cas9 protein or a polynucleotide encoding the Cas9 protein, and a guide RNA or a polynucleotide encoding the single guide RNA, wherein the guide RNA hybridizes with a nucleic acid, wherein the nucleic acid encodes the first SL partner of ASNS. In some embodiments, the first inhibitory agent is a Transcription Activator-like Effector Nuclease (TALEN) or a polynucleotide encoding the TALEN. In some embodiments, the first inhibitory agent is encoded by a vector. In some embodiments, the vector is an AAV vector, a lentivirus vector, an adenovirus vector, a retrovirus vector, or a herpes simplex virus (HSV-1) vector.

In certain embodiments, the pharmaceutical composition disclosed herein further comprises a therapeutically effective amount of a second inhibitory agent that inhibits the expression or activity of a second SL partner of ASNS. In some embodiments, the second SL partner of ASNS is involved in or regulated by the AAR signaling pathway, the MAPK pathway, or the STAT pathway. In some embodiments, the second SL partner of ASNS is an RTK. In some embodiments, the second SL partner of ASNS is selected from the group consisting of GCN2, eIF2a, Ras, BRAF, CRAF, PLK1, MEK1, MEK2, ERK1, ERK2, MNK1, PDGFRA, PDGFRB, VEGFR-2, and ATF4. In some embodiments, the second SL partner of ASNS is selected from the group consisting of BRAF, CRAF, MEK1, MEK2, ERK1, ERK2, and MNK. In some embodiments, the second SL partner of ASNS is selected from the group consisting of GCN2, eIF2a, and ATF4. In some embodiments, the second SL partner of ASNS is BRAF. In some embodiments, the second inhibitory agent is a small molecule. In some embodiments, the small molecule is selected from the group consisting of gefitinib, sunitinib, dabrafenib, vemurafenib, trametinib, selumetinib, sorafenib, and Torin 1. In some embodiments, the small molecule is vemrafenib. In some embodiments, the second inhibitory agent is a siRNA, wherein the siRNA hybridizes with an mRNA that encodes the second SL partner of ASNS. In some embodiments, the second inhibitory agent is a CRISPR-Cas9 complex comprising a Cas9 protein or a polynucleotide encoding the Cas9 protein, and a guide RNA or a polynucleotide encoding the guide RNA, wherein the guide RNA hybridizes with a nucleic acid, wherein the nucleic acid encodes the second SL partner of ASNS. In some embodiments, the second inhibitory agent is a Transcription Activator-like Effector Nuclease (TALEN) or a polynucleotide encoding the TALEN. In some embodiments, the second inhibitory agent is encoded by a vector. In some embodiments, the vector is an AAV vector, a lentivirus vector, an adenovirus vector, a retrovirus vector, or a herpes simplex virus (HSV-1) vector. In some embodiments, comprising a therapeutically effective amount of an ASNS inhibitor. In some embodiments, the ASNS inhibitor is a small molecule. In some embodiments, the ASNS inhibitor is a siRNA. In some embodiments, the ASNS inhibitor is a CRISPR-Cas9 complex comprising a Cas9 protein or a polynucleotide encoding the Cas9 protein, and a single guide RNA or a polynucleotide encoding the single guide RNA. In some embodiments, the ASNS inhibitor is a Transcription Activator-like Effector Nuclease (TALEN) or a polynucleotide encoding the TALEN. In some embodiments, the ASNS inhibitor is an anti-ASNS antibody. In some embodiments, the asparagine restriction agent is L-asparaginase. In some embodiments, the composition further comprises a pharmaceutically acceptable carrier. in some embodiments, the pharmaceutically acceptable carrier comprises a nanoparticle, a liposome, or a carbon nanotube.

Further provided herein are methods for treating tumor, comprising administering the pharmaceutical composition of any of the pharmaceutical composition as described herein to a subject in need thereof, wherein the subject comprises a tumor. In some embodiments, the composition is administered orally, intravenously, intrathecally, subcutaneously, intramuscularly, sublingually, rectally, cutaneously, or transdermally. In some embodiments, the method further encompasses treating the subject with a protein depleted diet. In some embodiments, the subject has a solid tumor. In some embodiments, the tumor is a pancreas tumor. In some embodiments, the tumor is a melanoma. In some embodiments, the tumor is reduced by at least 15%, at least 30%, at least 50%, at least 75%, at least 90%, or at least 100% in size after administration. In some embodiments, the tumor is reduced by at least 30% in size after administration.

BRIEF DESCRIPTION OF THE DRAWINGS

The novel features of the compositions and methods described herein are set forth with particularity in the appended claims. A better understanding of the features and advantages of the present disclosure will be obtained by reference to the following detailed description that sets forth illustrative embodiments, in which the principles of the disclosed methods are utilized, and the accompanying drawings of which:

FIG. 1 depicts ATF4 activity impeding growth suppression in response to asparagine limitation.

FIG. 2 depicts ASNS suppression inducing the Amino Acid Response (AAR) pathway.

FIG. 3 depicts in-Silico pan-tumor analysis prediction of RTKs, BRAF, and MNK1 as ASNS synthetic lethal partners. (FIG. 3B) List of genes predicted as synthetic lethal partners of ASNS.

(FIG. 4A) Sensitivity to the PLK inhibitor GW843682X of pan-tumor cell lines segregated based on high (ASNShi) and low (ASNSlo) ASNS expression. P-value calculated by Wilcoxon rank sum test. (FIG. 4B) Conditional essentiality of PLK1, JAK3 and ATF4 in ASNSlo and ASNShi cell lines (n=67, each group. Wilcoxon rank sum P-values are denoted for each gene knockdown.

FIG. 5 depicts the role of MAPK in ATF4 Upregulation upon asparagine limitation.

FIG. 6 depicts MAPK Signaling is Critical for ATF4 Induction upon Asparagine Limitation.

FIG. 7 depicts the MAPK-mTORC1-eIF4E signaling axis involved in ATF4 induction following ASNS suppression.

FIG. 8 depicts the MAPK-mTORC1-eIF4E Axis is Essential for ATF4 Induction Following Asparagine Limitation. FIGS. 5D and 8C show parts of the same experiment and share the loading control (HSP90).

FIG. 9 depicts the role of MNK1 for ATF4 induction in response to asparagine limitation.

FIG. 10 depicts the critical role of MNK1 Critical for ASNS Suppression-Associated ATF4 Induction. (FIG. 10G) qRT-PCR analysis of H3A and CDH1 mRNA levels in subpolysomal, light, and heavy polysomal fractions of A375 cells treated with si-ASNS relative to mock treatment.

FIG. 11 depicts ASNS suppression upregulating RTKs to induce MAPK signaling.

FIG. 12 depicts RTK Expression increased by Asparagine limitation. (FIG. 12A) qRT-PCR analysis of EGFR transcripts in melanoma lines 48 hr after treatment with si-ASNS. (FIG. 12B-D) Immunoblotting of EGFR in melanoma lines 72 hr after treatment either individually or as a combination with si-ASNS and torin 1 (FIG. 12B), si-ASNS and si-eIF4E (FIG. 12C), or si-ASNS and si-MNK1 (FIG. 12D). (FIG. 12E) qRT-PCR analysis of VEGFR-2 transcript levels in melanoma lines 48 hr after treatment with si-ASNS #2 or #3. Data are presented as the mean±SEM. Statistical significance (**$p<0.01$; ns, not significant) was calculated using unpaired t-test.

FIG. 13 depicts combined L-Asparaginase and MEK inhibition that suppresses pancreatic and melanoma tumor growth.

FIG. 14 depicts suppression of growth in melanoma and pancreatic cancer cell lines by combined L-Asparaginase and MEK Inhibition.

DETAILED DESCRIPTION OF THE INVENTION

Figure 1A:
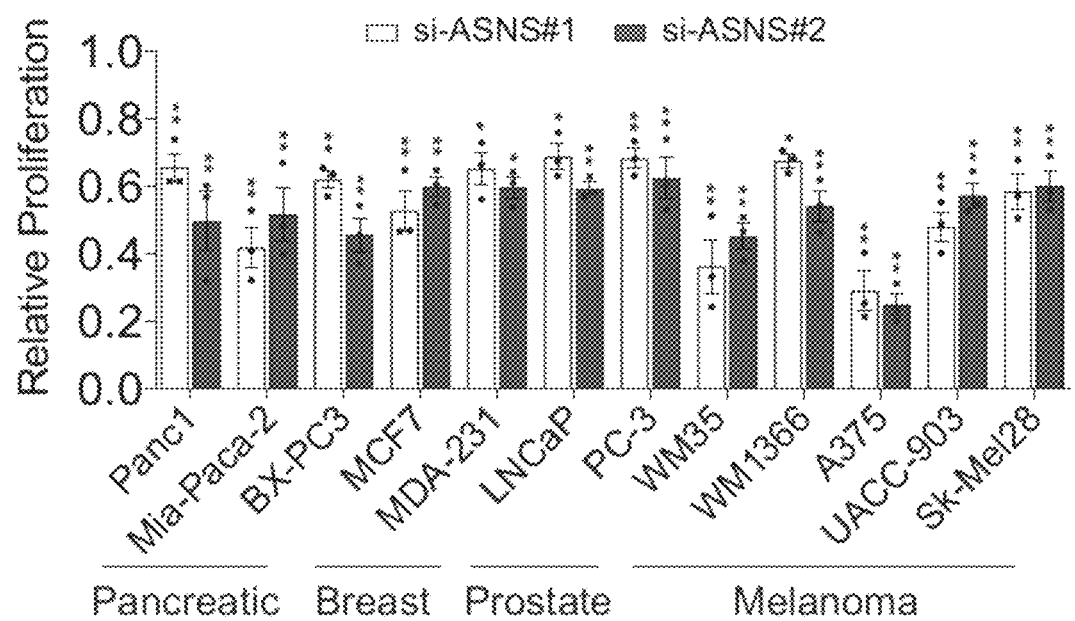
(FIG. 1A, B) Proliferation of indicated cancer lines 48 hr after transfection with si-ASNS #1 or si-ASNS #2 relative to nontargeting (NT)-siRNA transfected cells (value set to 1.0)).

Certain specific details of this description are set forth in order to provide a thorough understanding of various embodiments. However, one skilled in the art will understand that the present disclosure may be practiced without these details. In other instances, well-known structures and/or methods have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed disclosure.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All references cited herein are incorporated by reference in their entirety as though fully set forth. Singleton et al., Dictionary of Microbiology and Molecular Biology 3rd ed., J. Wiley & Sons (New York, NY 2001); March, Advanced Organic Chemistry Reactions, Mechanisms and Structure 5th ed., J. Wiley & Sons (New York, NY 2001); and Sambrook and Russel, Molecular Cloning: A Laboratory Manual 3rd ed., Cold Spring Harbor Laboratory Press (Cold Spring Harbor, NY 2001), provide one skilled in the art with a general guide to many of the terms used in the present application.

Definitions

When indicating the number of substituents, the term "one or more" refers to the range from one substituent to the highest possible number of substitution, e.g. replacement of one hydrogen up to replacement of all hydrogens by substituents.

The term "optional" or "optionally" denotes that a subsequently described event or circumstance can but need not occur, and that the description includes instances where the event or circumstance occurs and instances in which it does not.

The term "nucleic acid" as used herein generally refers to one or more nucleobases, nucleosides, or nucleotides, and the term includes polynucleobases, polynucleosides, and polynucleotides.

The term "polynucleotide", as used herein generally refers to a molecule comprising two or more linked nucleic acid subunits, e.g., nucleotides, and can be used interchangeably with "oligonucleotide". For example, a polynucleotide may include one or more nucleotides selected from adenosine (A), cytosine (C), guanine (G), thymine (T) and uracil (U), or variants thereof. A nucleotide generally includes a nucleoside and at least 1, 2, 3, 4, 5, 6, 7, 8, 9, 10, or more phosphate ($PO_3$) groups. A nucleotide can include a nucleobase, a five-carbon sugar (either ribose or deoxyribose), and one or more phosphate groups. Ribonucleotides include nucleotides in which the sugar is ribose. Deoxyribonucleotides include nucleotides in which the sugar is deoxyribose. A nucleotide can be a nucleoside monophosphate, nucleoside diphosphate, nucleoside triphosphate or a nucleoside polyphosphate. For example, a nucleotide can be a deoxyribonucleoside polyphosphate, such as a deoxyribonucleoside triphosphate (dNTP), Exemplary dNTPs include deoxyadenosine triphosphate (dATP), deoxycytidine triphosphate (dCTP), deoxyguanosine triphosphate (dGTP), uridine triphosphate (dUTP) and deoxythymidine triphosphate (dTTP). dNTPs can also include detectable tags, such as luminescent tags or markers (e.g., fluorophores). For example, a nucleotide can be a purine (e.g., A or G, or variant thereof) or a pyrimidine (e.g., C, T or U, or variant thereof). In some examples, a polynucleotide is deoxyribonucleic acid (DNA), ribonucleic acid (RNA), or derivatives or variants thereof. Exemplary polynucleotides include, but are not limited to, short interfering RNA (siRNA), a microRNA (miRNA), a plasmid DNA (pDNA), a short hairpin RNA (shRNA), small nuclear RNA (snRNA), messenger RNA (mRNA), precursor mRNA (pre-mRNA), antisense RNA (asRNA), and heteronuclear RNA (hnRNA), and encompasses both the nucleotide sequence and any structural embodiments thereof, such as single-stranded, double-stranded, triple-stranded, helical, hairpin, stem loop, bulge, etc. In some cases, a polynucleotide is circular. A polynucleotide can have various lengths. For example, a polynucleotide can have a length of at least about 7 bases, 8 bases, 9 bases, 10 bases, 20 bases, 30 bases, 40 bases, 50 bases, 100 bases, 200 bases, 300 bases, 400 bases, 500 bases, 1 kilobase (kb), 2 kb, 3, kb, 4 kb, 5 kb, 10 kb, 50 kb, or more. A polynucleotide can be isolated from a cell or a tissue. For example, polynucleotide sequences may comprise isolated and purified DNA/RNA molecules, synthetic DNA/RNA molecules, and/or synthetic DNA/RNA analogs.

Polynucleotides may include one or more nucleotide variants, including nonstandard nucleotide(s), non-natural nucleotide(s), nucleotide analog(s) and/or modified nucleotides. Examples of modified nucleotides include, but are not limited to diaminopurine, 5-fluorouracil, 5-bromouracil, 5-chlorouracil, 5-iodouracil, hypoxanthine, xantine, 4-acetylcytosine, 5-(carboxyhydroxylmethyl)uracil, 5-carboxymethylaminomethyl-2-thiouridine, 5-carboxymethylaminomethyluracil, dihydrouracil, beta-D-galactosylqueosine, inosine, N6-isopentenyladenine, 1-methylguanine, 1-methylinosine, 2,2-dimethylguanine, 2-methyladenine, 2-methylguanine, 3-methylcytosine, 5-methylcytosine, N6-adenine, 7-methylguanine, 5-methylaminomethyluracil, 5-methoxyaminomethyl-2-thiouracil, beta-D-mannosylqueosine, 5'-methoxycarboxymethyluracil, 5-methoxyuracil, 2-methylthio-N6-isopentenyladenine, uracil-5-oxyacetic acid (v), wybutoxosine, pseudouracil, queosine, 2-thiocytosine, 5-methyl-2-thiouracil, 2-thiouracil, 4-thiouracil, 5-methyluracil, uracil-5-oxyacetic acid methylester, 5-methyl-2-thiouracil, 3-(3-amino-3-N-2-carboxypropyl) uracil, (acp3)w, 2,6-diaminopurine and the like. In some cases, nucleotides may include modifications in their phosphate moieties, including modifications to a triphosphate moiety. Non-limiting examples of such modifications include phosphate chains of greater length (e.g., a phosphate chain having, 4, 5, 6, 7, 8, 9, 10 or more phosphate moieties) and modifications with thiol moieties (e.g., alpha-thiotriphosphate and beta-thiotriphosphates). Nucleic acid molecules may also be modified at the base moiety (e.g., at one or more atoms that typically are available to form a hydrogen bond with a complementary nucleotide and/or at one or more atoms that are not typically capable of forming a hydrogen bond with a complementary nucleotide), sugar moiety or phosphate backbone. Nucleic acid molecules may also contain amine-modified groups, such as amino ally 1-dUTP (aa-dUTP) and aminohexhylacrylamide-dCTP (aha-dCTP) to allow covalent attachment of amine reactive moieties, such as N-hydroxysuccinimide esters (NHS). Alternatives to standard DNA base pairs or RNA base pairs in the oligonucleotides of the present disclosure can provide higher density in bits per cubic mm, higher safety (resistant to accidental or purposeful synthesis of natural toxins), easier discrimination in photo-programmed polymerases, or lower secondary structure. Such alternative base pairs compatible with natural and mutant polymerases for de novo and/or amplification synthesis are described in Betz K, Malyshev DA, Lavergne T, Welte W, Diederichs K, Dwyer TJ, Ordoukhanian P, Romesberg FE, Marx A. Nat. Chem. Biol. 2012 July; 8(7):612-4, which is herein incorporated by reference for all purposes.

As used herein, the terms "polypeptide", "protein" and "peptide" are used interchangeably and refer to a polymer of amino acid residues linked via peptide bonds and which may be composed of two or more polypeptide chains. The terms "polypeptide", "protein" and "peptide" refer to a polymer of at least two amino acid monomers joined together through amide bonds. An amino acid may be the L-optical isomer or the D-optical isomer. More specifically, the terms "polypeptide", "protein" and "peptide" refer to a molecule composed of two or more amino acids in a specific order; for example, the order as determined by the base sequence of nucleotides in the gene or RNA coding for the protein. Proteins are essential for the structure, function, and regulation of the body's cells, tissues, and organs, and each protein has unique functions. Examples are hormones, enzymes, antibodies, and any fragments thereof. In some cases, a protein can be a portion of the protein, for example, a domain, a subdomain, or a motif of the protein. In some cases, a protein can be a variant (or mutation) of the protein, wherein one or more amino acid residues are inserted into, deleted from, and/or substituted into the naturally occurring (or at least a known) amino acid sequence of the protein. A protein or a variant thereof can be naturally occurring or recombinant.

As used herein, the term "biological sample" means any biological material from which polynucleotides, polypeptides, biomarkers, and/or metabolites can be prepared and examined. Non-limiting examples encompasses whole blood, plasma, saliva, cheek swab, fecal specimen, urine specimen, cell mass, or any other bodily fluid or tissue.

The terms "administer," "administering", "administration," and the like, as used herein, refer to the methods that may be used to enable delivery of compounds or compositions to the desired site of biological action. These methods include, but are not limited to oral routes (p.o.), intraduodenal routes (i.d.), parenteral injection (including intravenous (i.v.), subcutaneous (s.c.), intraperitoneal (i.p.), intramuscular (i.m.), intravascular or infusion (inf.)), topical (top.) and rectal (p.r.) administration. Those of skill in the art are familiar with administration techniques that can be employed with the compounds and methods described herein. In some embodiments, the compounds and compositions described herein are administered orally.

The terms "co-administration" or the like, as used herein, are meant to encompass administration of the selected therapeutic agents to a single patient, and are intended to include treatment regimens in which the agents are administered by the same or different route of administration or at the same or different time.

The terms "effective amount" or "therapeutically effective amount," as used herein, refer to a sufficient amount of an agent or a compound being administered which will relieve to some extent one or more of the symptoms of the disease or condition being treated; for example a reduction and/or alleviation of one or more signs, symptoms, or causes of a disease, or any other desired alteration of a biological system. For example, an "effective amount" for therapeutic uses can be an amount of an agent that provides a clinically significant decrease in one or more disease symptoms. An appropriate "effective" amount may be determined using techniques, such as a dose escalation study, in individual cases.

The terms "enhance" or "enhancing," as used herein, means to increase or prolong either in amount, potency or duration a desired effect. For example, in regard to enhancing expression of a gene, the term "enhancing" can refer to the ability to increase the level of mRNA or protein encoded by the gene.

The terms "inhibitor" or "inhibitory agent" as used herein encompass compositions, agents, and compounds that inhibit expression or activity of a gene or protein. "Inhibit," "inhibiting," and "inhibition" and like terms include decreasing an activity, response, condition, disease, or other biological parameter. This can include but is not limited to the complete ablation of the expression, activity, response, condition, or disease. This may include, for example, a 10% reduction in the expression, activity, response, condition, or disease as compared to the native or control level. Thus, the reduction can be a 10, 20, 30, 40, 50, 60, 70, 80, 90, 100%, or any amount of reduction in between as compared to native or control levels.

The term "subject" or "patient" encompasses mammals. Examples of mammals include, but are not limited to, any member of the mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. In one aspect, the mammal is a human. The term "animal" as used herein comprises human beings and non-human animals. In one embodiment, a "non-human animal" is a mammal, for example a rodent such as rat or a mouse. In one embodiment, a non-human animal is a mouse.

The terms "treat," "treating" or "treatment," as used herein, include alleviating, abating or ameliorating at least one symptom of a disease or condition, preventing additional symptoms, inhibiting the disease or condition, e.g., arresting the development of the disease or condition, relieving the disease or condition, causing regression of the disease or condition, relieving a condition caused by the disease or condition, or stopping the symptoms of the disease or condition either prophylactically and/or therapeutically.

The term "preventing" or "prevention" of a disease state denotes causing the clinical symptoms of the disease state not to develop in a subject that can be exposed to or predisposed to the disease state, but does not yet experience or display symptoms of the disease state.

The terms "pharmaceutical composition" and "pharmaceutical formulation" (or "formulation") are used interchangeably and denote a mixture or solution comprising a therapeutically effective amount of an active pharmaceutical ingredient together with one or more pharmaceutically acceptable excipients to be administered to a subject, e.g., a human in need thereof.

The term "pharmaceutical combination" as used herein, means a product that results from mixing or combining more than one active ingredient and includes both fixed and non-fixed combinations of the active ingredients. The term "fixed combination" means that the active ingredients, e.g., a compound described herein and a co-agent, are both administered to a patient simultaneously in the form of a single entity or dosage. The term "non-fixed combination" means that the active ingredients, e.g. a compound described herein and a co-agent, are administered to a patient as separate entities either simultaneously, concurrently or sequentially with no specific intervening time limits, wherein such administration provides effective levels of the two compounds in the body of the patient. The latter also applies to cocktail therapy, e.g., administration of three or more active ingredients.

The term "pharmaceutically acceptable" denotes an attribute of a material which is useful in preparing a pharmaceutical composition that is generally safe, non-toxic, and neither biologically nor otherwise undesirable and is acceptable for veterinary as well as human pharmaceutical use. "Pharmaceutically acceptable" can refer a material, such as a carrier or diluent, which does not abrogate the biological activity or properties of the compound, and is relatively nontoxic, e.g., the material may be administered to an individual without causing undesirable biological effects or interacting in a deleterious manner with any of the components of the composition in which it is contained.

The terms "pharmaceutically acceptable excipient", "pharmaceutically acceptable carrier", "pharmaceutically acceptable vehicle" and "therapeutically inert excipient" can be used interchangeably and denote any pharmaceutically acceptable ingredient in a pharmaceutical composition having no therapeutic activity and being non-toxic to the subject administered, such as disintegrators, binders, fillers, solvents, buffers, tonicity agents, stabilizers, antioxidants, surfactants, carriers, diluents, excipients, preservatives or lubricants used in formulating pharmaceutical products The term "pharmaceutically acceptable salts" denotes salts which are not biologically or otherwise undesirable. Pharmaceutically acceptable salts include both acid and base addition salts. A "pharmaceutically acceptable salt" can refer to a formulation of a compound or agent that does not cause significant irritation to an organism to which it is administered and/or does not abrogate the biological activity and properties of the compound or agent.

Methods for detection and/or measurement of polypeptides in biological material are well known in the art and include, but are not limited to, Western-blotting, flow cytometry, ELISAs, RIAs, and various proteomics techniques. An exemplary method to measure or detect a polypeptide is an immunoassay, such as an ELISA. This type of protein quantitation can be based on an antibody capable of capturing a specific antigen, and a second antibody capable of detecting the captured antigen. Exemplary assays for detection and/or measurement of polypeptides are described in Harlow, E. and Lane, D. Antibodies: A Laboratory Manual, (1988), Cold Spring Harbor Laboratory Press.

Methods for detection and/or measurement of RNA in biological material are well known in the art and include, but are not limited to, Northern-blotting, RNA protection assay, RT PCR. Suitable methods are described in Molecular Cloning: A Laboratory Manual (Fourth Edition) By Michael R. Green, Joseph Sambrook, Peter MacCallum 2012, 2,028 pp, ISBN 978-1-936113-42-2.

A ribonucleoprotein (RNP) refers to a nucleoprotein that contains RNA. A RNP can be a complex of a ribonucleic acid and an RNA-binding protein. Such a combination can also be referred to as a protein-RNA complex. These complexes can function in a number of biological functions that include, but are not limited to, DNA replication, gene expression, metabolism of RNA, and pre-mRNA splicing. Examples of RNPs include the ribosome, the enzyme telomerase, vault ribonucleoproteins, RNase P, heterogeneous nuclear RNPs (hnRNPs) and small nuclear RNPs (snRNPs).

As used herein, the term "biomarker" or "marker" are used interchangeably to refer to any biochemical marker, serological marker, genetic marker, or other clinical or echographic characteristic that can be used to classify a sample from a patient as being associated with a tumor condition, including pancreatic cancer and melanoma. The recitation of specific examples of markers associated with tumor conditions is not intended to exclude other markers as known in the art and suitable for use in the present invention.

As used herein, the term "antibody" includes but is not limited to a population of immunoglobulin molecules, which can be polyclonal or monoclonal and of any class and isotype, or a fragment of an immunoglobulin molecule. There are five major classes of immunoglobulins: IgA, IgD, IgE, IgG, and IgM, and several of these may be further divided into subclasses (isotypes), e.g., IgG1, IgG2, IgG3, IgG4, IgA1 (human), IgA2 (human), IgAa (canine), IgAb (canine), IgAc (canine), and IgAd (canine). Such fragment generally comprises the portion of the antibody molecule that specifically binds an antigen. For example, a fragment of an immunoglobulin molecule known in the art as Fab, Fab' or F(ab')2 is included within the meaning of the term antibody.

As used herein, the term "neutralizing antibody" includes antibodies which are capable of specifically binding to an epitope on a protein and neutralizing the protein. Neutralizing antibodies also include antibodies which are capable of binding to an epitope on a protein and rendering the protein inactive. Neutralizing antibodies also include antibodies which are capable of inhibiting binding of a protein to its receptor. In some embodiments, the neutralizing antibodies are capable of binding to and neutralizing an ASNS protein. In some embodiments, the neutralizing antibodies are capable of binding to and neutralizing an ASNS synthetic lethal (SL) partner. Examples of ASNS SL partners include, but are not limited to, a MEK1 protein, a BRAF1 protein, or a MNK protein. In some embodiments, the neutralizing antibodies include recombinant and chimeric antibodies. In some embodiments, the neutralizing antibodies include human antibodies. In some embodiments, the neutralizing antibodies include a human variable region. In some embodiments, the neutralizing antibodies include a human light chain constant region. In some embodiments, the neutralizing antibodies include a human heavy chain constant region.

As used herein, the term "endogenous antibodies" refers to antibodies made by or originating from a subject, which can be isolated from the patient's blood or tissue. Typically, endogenous antibodies are generated in response to a foreign antigen, for example in response to a bacterial antigen, as part of the body's natural defense against infection. In certain cases, however, the patient may generate endogenous antibodies against the body's own proteins, such endogenous antibodies being referred to herein as "autoantibodies".

The term "label," as used herein, refers to a detectable compound, composition, or solid support, which can be conjugated directly or indirectly (e.g., via covalent or non-covalent means, alone or encapsulated) to a monoclonal antibody or a protein. The label may be detectable by itself (e.g., radioisotope labels, chemiluminescent dye, electrochemical labels, metal chelates, latex particles, or fluorescent labels) or, in the case of an enzymatic label, may catalyze chemical alteration of a substrate compound or composition which is detectable (e.g., enzymes such as horseradish peroxidase, alkaline phosphatase, and the like). The label employed in the current invention could be, but is not limited to alkaline phosphatase; glucose-6-phosphate dehydrogenase ("G6PDH"); horseradish peroxidase (HRP); chemiluminescers such as isoluminol, fluorescers such as fluorescein and rhodamine compounds; ribozymes; and dyes. The label may also be a specific binding molecule which itself may be detectable (e.g., biotin, avidin, streptavidin, digioxigenin, maltose, oligohistidine, e.g., hex-histidine, 2, 4-dinitrobenzene, phenylarsenate, ssDNA, dsDNA, and the like). The utilization of a label produces a signal that may be detected by means such as detection of electromagnetic radiation or direct visualization, and that can optionally be measured.

A monoclonal antibody can be linked to a label using methods well known to those skilled in the art, e.g., Immunochemical Protocols; Methods in Molecular Biology, Vol. 295, edited by R. Burns (2005)). For example, a detectable monoclonal antibody conjugate may be used in any known diagnostic test format like ELISA or a competitive assay format to generate a signal that is related to the presence or amount of an IBD-associated antibody in a test sample.

"Substantial binding" or "substantially binding" refer to an amount of specific binding or recognizing between molecules in an assay mixture under particular assay conditions. In its broadest aspect, substantial binding relates to the difference between a first molecule's incapability of binding or recognizing a second molecule, and the first molecules capability of binding or recognizing a third molecule, such that the difference is sufficient to allow a meaningful assay to be conducted to distinguish specific binding under a particular set of assay conditions, which includes the relative concentrations of the molecules, and the time and temperature of an incubation. In another aspect, one molecule is substantially incapable of binding or recognizing another molecule in a cross-reactivity sense where the first molecule exhibits a reactivity for a second molecule that is less than 25%, e.g. less than 10%, e.g., less than 5% of the reactivity exhibited toward a third molecule under a particular set of assay conditions, which includes the relative concentration and incubation of the molecules. Specific binding can be tested using a number of widely known methods, e.g, an immunohistochemical assay, an enzyme-linked immunosorbent assay (ELISA), a radioimmunoassay (RIA), or a western blot assay.

As used herein, the term "substantially the same amino acid sequence" includes an amino acid sequence that is similar, but not identical to, the naturally-occurring amino acid sequence. For example, an amino acid sequence, e.g., polypeptide, that has substantially the same amino acid sequence as a ASNS protein can have one or more modifications such as amino acid additions, deletions, or substitutions relative to the amino acid sequence of the naturally-occurring flagellin protein, provided that the modified polypeptide retains substantially at least one biological activity of flagellin such as immunoreactivity. The "percentage similarity" between two sequences is a function of the number of positions that contain matching residues or conservative residues shared by the two sequences divided by the number of compared positions times 100. In this regard, conservative residues in a sequence is a residue that is physically or functionally similar to the corresponding reference residue, e.g., that has a similar size, shape, electric charge, chemical properties, including the ability to form covalent or hydrogen bonds, or the like.

The term "heterologous" refers to any two or more nucleic acid or polypeptide sequences that are not normally found in the same relationship to each other in nature. For instance, a heterologous nucleic acid is typically recombinantly produced, having two or more sequences, e.g., from unrelated genes arranged to make a new functional nucleic acid, e.g., a promoter from one source and a coding region from another source. Similarly, a heterologous polypeptide will often refer to two or more subsequences that are not found in the same relationship to each other in nature (e.g., a fusion protein).

As used herein, the term "fragment" includes a peptide, polypeptide or protein segment of amino acids of the full-length protein, provided that the fragment retains reactivity with at least one antibody in sera of disease patients.

An "epitope" is the antigenic determinant on a polypeptide that is recognized for binding by a paratope on antibodies specific to the polypeptide, for example, an ASNS-associated antibody.

The term "prognosis" includes a prediction of the probable course and outcome of IBD or the likelihood of recovery from the disease. In some embodiments, the use of statistical algorithms provides a prognosis of IBD in a patient. For example, the prognosis can be surgery, development of a clinical subtype of IBD, development of one or more clinical factors, development of intestinal cancer, or recovery from the disease.

Provided herein are compositions, methods, and compounds for diagnosis, treatment, determining, monitoring, and selecting treatment of cancer, and preferably of pancreatic cancer and melanoma. In particular aspects, provided herein are compositions and methods for treatment of cancer characterized with the MAPK (BRAF-MEK-ERK) signaling pathway that confers synthetic vulnerability to asparagine depletion. Without being bound by theory, it is generally understood that altered transcriptional programs, often associated with phenotypic switching, underlie cancer cells' ability to endure amino acid paucity and defines their ability to invade and metastasize (Falletta et al., Genes Dev 31, 18-33.2017; Le et al., Clin Cancer Res 12, 15071514.2006). Unlike non-transformed cells, which predominantly rely on glucose as the major energetic and biosynthetic fuel, transformed cells also exhibit a proclivity for utilizing glutamine (Wise and Thompson, Trends Biochem Sci 35, 427-433. 2010). While supporting tumor cells' enhanced requirement for protein synthesis and anti-oxidant defense through glutathione biosynthesis, glutamine anaplerotically fuels the tricarboxylic acid (TCA) cycle, providing reductive potential for ATP generation and precursors for nucleotide, amino acid, and lipid biosynthesis (Altman et al., Nat Rev Cancer 16, 749. 2016). Glutamine restriction has therefore shown promise as an anti-cancer strategy, with approaches targeting glutamine uptake and assimilation currently under preclinical and clinical evaluation, respectively (Choi and Park, Biomol Ther (Seoul) 26, 19-28. 2018; Schulte et al., Nat Med 24, 194-202.2018).

Despite glutamine's requirement in key biosynthetic pathways, cancer cells can sustain glutamine-dependent processes in the absence of exogenous glutamine through de novo glutamine biosynthesis, with the notable exception of asparagine biosynthesis (Pavlova et al., Cancer 117, 238-249. 2018). Indeed, supplementation with asparagine rescues growth defects associated with glutamine restriction (Zhang et al., Mol Cell 56, 205-218. 2014). Since the inability to maintain cellular asparagine levels appears to underlie tumor growth suppression seen upon glutamine restriction, curtailing cellular asparagine levels is an appealing alternative to limit tumor growth. Indeed, recent studies demonstrate growth- and metastasis-retarding effects of asparagine restriction (Gwinn et al., Cancer Cell 33, 91-107 e1062018; Knott et al., Nature 554, 378-381. 2018). A deficiency of asparagine synthesizing enzyme asparagine synthetase (ASNS) in acute lymphoblastic leukemia (ALL) renders them sensitive to asparagine restriction (Pieters et al., Cancer 117, 238-249. 2011). However, even in ASNS deficient solid tumors cancer cells are often capable of meeting their asparagine needs by upregulating expression of asparagine synthetase (ASNS), rendering asparagine restriction treatments ineffective (Stams et al., Blood 105, 4223-4225. 2005). Thus, there remains a need for combinatorial therapeutic approaches to efficiently exploit metabolic vulnerabilities of cancer cells that endure amino acid limitation.

Asparagine Synthetase

Asparagine synthetase (or aspartate-ammonia ligase, ASNS) is a cytoplasmic enzyme that generates asparagine from aspartate. In mammals, ASNS expression has been found to be linked to cell growth, and its mRNA content is linked to changes in the cell cycle. The expression of ASNS is markedly down-regulated in certain types of cancers, for example, in primary acute lymphoblastic leukemia (ALL) as compared to that of normal cells. Thus, asparagine depletion is an effective treatment method to restrict tumor cells' nutritional need. L-asparaginase is used as a chemotherapy drug in treatment of ALL and lymphomas. Depletion of serum asparagine by ASNS leads to a subsequent rapid efflux of cellular asparagine, which is acted upon and depleted by the L-asparaginase as well. Asparagine depletion thus significantly inhibits tumor growth, while normal somatic cells express sufficient basal amounts of asparagine synthetase to counteract this asparagine starvation and survive the effects of L-asparaginase. Balasubramanian et al., (2013) American Journal of Physiology. Endocrinology and Metabolism. 304 (8): E789-99; Prager et al. (1968) Biochemical and Biophysical Research Communications. 31 (1): 43-7; Richards et al. (2006) Annual Review of Biochemistry 75: 629-54; Bachet et al. (2015) Pancreas 44, 1141-1147. However, in amino acid restriction resistant tumors, cancer cells are able to compensate asparagine depletion by overexpression of ASNS, effectively nullifying the effect of L-asparaginase. Amino acid restriction induces eIF2a phosphorylation, which leads to translational reprogramming, whereby mRNAs which contain uORF and encode proteins implicated in stress response including ATF4 are translationally upregulated (Young and Wek (2016) J Biol Chem 291, 16927-16935). Cancer cells can upregulate the expression of amino acid transporters in an ATF4-dependent manner, in response to limiting amino acid levels, resulting in sustained or even increased mTORC1 activity (Chen et al. (2014) J Cell Biol 206, 173-182; Pathria et al. (2018) EMBO J 37; Young and Wek, (2016) J Biol Chem 291, 16927-16935). Although acute asparagine deprivation, due to suppression in the uptake of serine, arginine, and histidine has been shown to suppress mTORC1 activity (Krall et al., (2016) Nat Commun 7, 11457), mTORC1 and/or ATF4 activity has not been previously demonstrated under conditions of prolonged ASNS depletion.

Accordingly, disclosed herein are compositions and methods for amino acid restriction treatment targeting at amino acid depletion and the concerted action of activated signaling pathways induced in response to limitation of specific amino acids in tumor cells. In some aspects, provided herein are compositions and methods of amino acid restriction treatment targeting at ASNS depletion as well as concerted action of activated MAPK signaling pathway induced in response to asparagine restriction, thereby offsetting compensative overexpression of ASNS in cancer cells. In some embodiments, the therapeutic compositions provided herein include ASNS restricting agents, for example, ASNS inhibitors. In some embodiments, the therapeutic compositions provided herein further include MAPK signaling pathway inhibitors. For example, MAPK signaling may be blocked through inhibition of post-translational (mTORC1 activation) and/or translational (MNK1 synthesis, eIF4E synthesis) events. In preferred embodiments, the therapeutic compositions and methods for cancer treatment as described herein are more effective than treatments with asparagine restriction alone. In additional preferred embodiments, ATF4 induction in tumor cells in response to asparagine restriction is attenuated with MAPK signaling inhibitors.

Amino Acid Restriction Treatment

Cancer cells have specific nutrient(s) auxotrophy and have a much higher nutrient demand compared to normal tissues. Therefore, amino acid restriction treatment with metabolic inhibitors or nutrient-depleting enzymes may be used for their anti-cancer activities. Glutamine, asparagine, and arginine starvation treatments have been tested with different types of cancer cells. For example, glutamine starvation by glutaminase inhibitor, transporter inhibitor, or glutamine depletion has shown to have significant anti-cancer effect in pre-clinical studies. Arginine depletion has lower toxicity profile and can effectively reduce the level of pro-cancer biochemicals. Low expression of asparagine synthetase (ASNS) has been observed in certain types of cancer cells, such as in acute lymphoblastic leukemia (ALL). Thus, ASNS may be a target to generate sensitivity to asparagine restriction (Pieters et al., Cancer 117, 238-249 (2011)). However, asparagine restriction approaches in solid tumors that show ASNS deficiency may be offset by the ability of cancer cells to meet their asparagine needs by upregulating expression of asparagine synthetase (ASNS) (Stams et al., Blood 105, 4223-4225 (2005)).

Accordingly, provided herein are methods and compositions for combinatorial treatment of tumors. In certain aspects, provided herein are methods for treatment of tumor with at least one ASNS inhibitor and at least one inhibitor of an ASNS synthetic lethal (SL) partner with an amino acid restriction treatment. In certain embodiments, the amino acid restriction treatment comprises asparagine depletion. In some embodiments, the method encompasses administering an asparagine restriction agent to a subject in need thereof. In preferred embodiments, the method further encompasses administering a combination of an asparagine restriction agent and at least one inhibitor of an ASNS SL partner to the subject thereof. In further preferred embodiments, the combinatorial treatment is more effective in treating cancer compared to asparagine depletion treatment alone. In certain embodiments, the combinatorial treatment results in reduction of tumor size. In preferred embodiments, the combinatorial treatment results in reduction of tumor size at least 10%, at least 15%, at least 30%, at least 50%, at least 75%, at least 90%, or at least 100% in size. In further preferred embodiments, the combinatorial treatment results in reduction of tumor size of at least 10%, at least 15%, at least 30%, at least 50%, at least 75%, at least 90%, or at least 100% more compared to asparagine depletion alone.

Disclosed herein are methods of diagnosing, predicting susceptibility, protection against, prognosing, treating, ameliorating symptoms of a tumor in a subject in need thereof. Non-limiting examples of tumors that may be treated with methods and compositions disclosed herein include acute lymphoblastic leukemia (adult), acute lymphoblastic leukemia (childhood), acute myeloid leukemia (adult), acute myeloid leukemia (childhood), adrenocortical carcinoma, adrenocortical carcinoma (childhood), AIDS-related cancers, AIDS-related lymphoma, anal cancer, astrocytoma (childhood cerebellar), astrocytoma (childhood cerebral), basal cell carcinoma, bile duct cancer (extrahepatic), bladder cancer, bladder cancer (childhood), bone cancer (osteosarcoma/malignant fibrous histiocytoma), brain stem glioma (childhood), brain tumor (adult), brain tumor-brain stem glioma (childhood), brain tumor-cerebellar astrocytoma (childhood), brain tumor-cerebral astrocytoma/malignant glioma (childhood), brain tumor-ependymoma (childhood), brain tumor-medulloblastoma (childhood), brain tumor-supratentorial primitive neuroectodermal tumors (childhood), brain tumor-visual pathway and hypothalamic glioma (childhood), breast cancer (female, male, childhood), bronchial adenomas/carcinoids (childhood), Burkitt's lymphoma, carcinoid tumor (childhood), carcinoid tumor (gastrointestinal), carcinoma of unknown primary site (adult and childhood), central nervous system lymphoma (primary), cerebellar astrocytoma (childhood), cerebral astrocytoma/malignant glioma (childhood), cervical cancer, chronic lymphocytic leukemia, chronic myelogenous leukemia, chronic myeloproliferative disorders, colon cancer, colorectal cancer (childhood), cutaneous t-cell lymphoma, endometrial cancer, ependymoma (childhood), esophageal cancer, esophageal cancer (childhood), Ewing's family of tumors, extracranial germ cell tumor (childhood), extragonadal germ cell tumor, extrahepatic bile duct cancer, eye cancer (intraocular melanoma and retinoblastoma), gallbladder cancer, gastric (stomach) cancer, gastric (stomach) cancer (childhood), gastrointestinal carcinoid tumor, gastrointestinal stromal tumor (gist), germ cell tumor (extracranial (childhood), extragonadal, ovarian), gestational trophoblastic tumor, glioma (adult), glioma (childhood: brain stem, cerebral astrocytoma, visual pathway and hypothalamic), hairy cell leukemia, head and neck cancer, hepatocellular (liver) cancer (adult primary and childhood primary), Hodgkin's lymphoma (adult and childhood), Hodgkin's lymphoma during pregnancy, hypopharyngeal cancer, hypothalamic and visual pathway glioma (childhood), intraocular melanoma, islet cell carcinoma (endocrine pancreas), Kaposi's sarcoma, kidney (renal cell) cancer, kidney cancer (childhood), laryngeal cancer, laryngeal cancer (childhood), leukemia-acute lymphoblastic (adult and childhood), leukemia, acute myeloid (adult and childhood), leukemia-chronic lymphocytic, leukemia-chronic myelogenous, leukemia-hairy cell, lip and oral cavity cancer, liver cancer (adult primary and childhood primary), lung cancer-non-small cell, lung cancer-small cell, lymphoma-AIDS-related, lymphoma-Burkitt's, lymphoma-cutaneous t-cell, lymphoma-Hodgkin's (adult, childhood and during pregnancy), lymphoma-non-Hodgkin's (adult, childhood and during pregnancy), lymphoma-primary central nervous system, macroglobulinemia-Waldenstrom's, malignant fibrous histiocytoma of bone/osteosarcoma, medulloblastoma (childhood), melanoma, melanoma-intraocular (eye), Merkel cell carcinoma, mesothelioma (adult) malignant, mesothelioma (childhood), metastatic squamous neck cancer with occult primary, multiple endocrine neoplasia syndrome (childhood), multiple myeloma/plasma cell neoplasm, mycosis fungoides, myelodysplastic syndromes, myelodysplastic/myeloproliferative diseases, myelogenous leukemia, chronic, myeloid leukemia (adult and childhood) acute, myeloma-multiple, myeloproliferative disorders-chronic, nasal cavity and paranasal sinus cancer, nasopharyngeal cancer, nasopharyngeal cancer (childhood), neuroblastoma, non-small cell lung cancer, oral cancer (childhood), oral cavity and lip cancer, oropharyngeal cancer, osteosarcoma/malignant fibrous histiocytoma of bone, ovarian cancer (childhood), ovarian epithelial cancer, ovarian germ cell tumor, ovarian low malignant potential tumor, pancreatic cancer, pancreatic cancer (childhood), pancreatic cancer-islet cell, paranasal sinus and nasal cavity cancer, parathyroid cancer, penile cancer, pheochromocytoma, pineoblastoma and supratentorial primitive neuroectodermal tumors (childhood), pituitary tumor, plasma cell neoplasm/multiple myeloma, pleuropulmonary blastoma, pregnancy and breast cancer, primary central nervous system lymphoma, prostate cancer, rectal cancer, renal cell (kidney) cancer, renal cell (kidney) cancer (childhood), renal pelvis and ureter-transitional cell cancer, retinoblastoma, rhabdomyosarcoma (childhood), salivary gland cancer, salivary gland cancer (childhood), sarcoma-Ewing's family of tumors, sarcoma-Kaposi's, sarcoma-soft tissue (adult and childhood), sarcoma-uterine, Sezary syndrome, skin cancer (non-melanoma), skin cancer (childhood), skin cancer (melanoma), skin carcinoma-Merkel cell, small cell lung cancer, small intestine cancer, soft tissue sarcoma (adult and childhood), squamous cell carcinoma, squamous neck cancer with occult primary-metastatic, stomach (gastric) cancer, stomach (gastric) cancer (childhood), supratentorial primitive neuroectodermal tumors (childhood), testicular cancer, thymoma (childhood), thymoma and thymic carcinoma, thyroid cancer, thyroid cancer (childhood), transitional cell cancer of the renal pelvis and ureter, trophoblastic tumor, gestational, ureter and renal pelvis-transitional cell cancer, urethral cancer, uterine cancer-endometrial, uterine sarcoma, vaginal cancer, visual pathway and hypothalamic glioma (childhood), vulvar cancer, Waldenstrom's macroglobulinemia, Wilms' tumor. In certain embodiments, methods and compositions provided herein may be used to treat pancreatic cancer.

In an aspect, the invention provides methods for treating, ameliorating symptoms of, or inhibit progression of a cancer comprising administering to a subject in need thereof a therapeutically effective amount of at least one inhibitory agent, wherein the inhibitory agent inhibits the expression and/or activity of an ASNS protein. In another aspect, the invention provides methods for treating, ameliorating symptoms of, or inhibit progression of a cancer comprising administering to a subject in need thereof a therapeutically effective amount of at least two inhibitory agent, wherein a first inhibitory agent inhibits the expression and/or activity of an ASNS protein, and wherein a second inhibitory agent inhibits the expression and/or activity of an ASNS SL partner. Non-liming examples of ASNS SL partners include GCN2, eIF2α, JAK3, Ras, BRAF, CRAF, PLK1, MEK1, MEK2, ERK1, ERK2, MNK1, mTORC1, PDGFRA, PDGFRB, VEGFR-2, ATF4, or any combination thereof.

Synthetic Lethal (SL) Partners

Synthetic lethality occurs when a combination of two or more events, for example, deficiencies in expression of two or more genes lead to organism or cell death, while a deficiency in only one of the two or more genes does not. Events that lead to synthetic lethality may include, for example, mutations, epigenetic modifications, inhibition or suppression of one or more of the genes. As used herein, "synthetic lethal partners" or "synthetic lethal pairs" encompass genes or groups of genes that have synthetic lethal relationship with each other.

Disclosed herein are synthetic lethal partners for diagnosis, treatment, monitoring and determining treatment of cancers. In particular aspects, the synthetic lethal partners disclosed herein are suitable for treatment of pancreatic cancer and melanoma. For example, RTKs (VEGFR-2, PDGFR-A, and PDGFR-B), BRAF, and MNK1 may be used as synthetic lethal partners of ASNS. Asparagine restriction in cancer cells leads to translational reprogramming, resulting in upregulation of RTKs, MAPK and mTORC1 hyperactivation, and induction of ATF4, which serves metabolic adaptations required for tumor cell survival. MAPK signaling inhibition attenuates mTORC1 activity, translational reprogramming, and consequent ATF4 and ASNS upregulation, which limits in vivo growth of melanoma and pancreatic cancer following asparagine limitation. Accordingly, provided herein are methods and compositions for treatment of cancers that allow for suppression of asparagine levels with L-asparaginase. Also provided herein are methods and compositions for treatment of cancers that allow for combined inhibition or suppression of ASNS and one or more of ASNS synthetic lethal partners. ASNS inhibitors and synthetic lethal partner inhibitors may be administered to subjects in need thereof through routes known in the art. In preferred embodiments, tumor cells in a subject exhibits low ASNS expression and/or low MAPK signaling activity. In further preferred embodiments, inhibitors of ASNS and inhibitors of one or more of ASNS synthetic lethal partners are administered in combination with amino acid restriction treatment, such as asparagine restriction treatment.

Inhibitory Agents

Inhibitors or inhibitory agents may be used to inhibit gene expression or protein function and activity. The inhibition may be complete inhibition or partial inhibition. Inhibition can be a result of direct or indirect inhibition meaning the inhibitors acts directly on the target (protein or gene to be inhibited) or the inhibitor can act indirectly via a different protein or gene upstream of the target. An inhibitor may be a small molecule, a compound, a protein, a nucleic acid, a vector, or a nucleic acid-protein complex. Useful inhibitors for use in the disclosed methods include but not limited to, for example, ASNS inhibitors, RTK inhibitors, GCN2 inhibitors, eIF2α inhibitors, JAK3 inhibitors, Ras inhibitors, BRAF inhibitors, CRAF inhibitors, PLK1 inhibitors, MEK1 inhibitors, MEK2 inhibitors, ERK1 inhibitors, ERK2 inhibitors, MNK1 inhibitors, PDGFRA inhibitors, PDGFRB inhibitors, VEGFR-2 inhibitors, ATF4 inhibitors, or any combination thereof.

The expression and/or activity of ASNS and ASNS synthetic lethal partners may be determined by methods known to those skilled in the art. Gene or protein expression and activity may be accessed and described by any suitable metric. For example, the expression of ATF4 may be described by the number of cells expressing ATF4, the number of cells expressing ATF4 at a certain level, the fraction of cells expressing ATF4 at a certain level, the level of ATF4 in certain cells, or any combination thereof. Methods of determining gene expression and protein levels are known to those skilled in the art.

Provided herein are methods and compositions for treatment and inhibition of progression of cancer comprising administering to a subject in need thereof a therapeutically effective amount of an asparagine restriction agent and/or an inhibitory agent of an ASNS SL partner. In some embodiments, L-asparaginase is used in combination with a MEK inhibitor to suppress vascular L-asparagine levels. In some embodiments, siRNA is used for direct blockade of ASNS activity. In certain aspects, methods as disclosed herein encompass administering to a subject in need thereof a therapeutically effective amount of a combination of an ASNS inhibitory agent and at least one inhibitory agent of an ASNS SL partner. In some embodiments, the inhibitory agent comprises a protein comprising a nucleotide recognition domain, e.g. a DNA recognition domain. In some embodiments, the inhibitory agent comprises a protein comprising a nucleotide recognition domain, e.g. a DNA recognition domain, and an effector domain. In some embodiments, the effector domain is a transcriptional activator domain, transcriptional repressor domain, DNA methyl transferase domain, DNA demethylase domain, histone acetyltransferase domain, histone deacetylase domain, and combinations thereof. In some embodiments, the nucleotide recognition domain is derived from, or homologous to, a transcription activator like effector (TALE) DNA recognition domain. In some embodiments, the nucleotide recognition domain is derived from, or homologous to a zinc finger DNA recognition domain. In some embodiments, the nucleotide recognition domain is derived from, or homologous to a helix-turn-helix domain, a leucine zipper domain, a winged helix domain, a CRISPR/Cas protein DNA binding domain, a Wor3 domain, a HMG box, a OB fold domain, or any combination thereof. In some embodiments, the nucleotide recognition domain recognizes and binds to a sequence in a polynucleotide that encodes a ASNS protein in a cell. In some embodiments, the nucleotide recognition domain recognizes and binds to a sequence in a polynucleotide that encodes an ASNS SL partner protein. In some embodiments, the polynucleotide is a DNA. In some embodiments, the nucleotide recognition domain recognizes and binds to a sequence in a polynucleotide that encodes a receptor tyrosine kinase (RTK) in a cell. In some embodiments, the nucleotide recognition domain recognizes and binds to a sequence in a polynucleotide that encodes a MAPK signaling pathway protein. In some embodiments, the nucleotide recognition domain recognizes and binds to a sequence in a polynucleotide that encodes an amino acid response (AAR) signaling pathway protein. In some embodiments, the nucleotide recognition domain recognizes and binds to a sequence in a polynucleotide that encodes a Signal Transducer and Activator of Transcription proteins (STAT) signaling pathway protein.

In some embodiments, the decrease in expression of ASNS comprises a decrease of 1.1-fold, 1.2-fold, 1.3-fold, 1.4-fold, 1.5 fold, 1.6-fold, 1.7-fold, 1.8-fold, 1.9-fold, 2.0-fold, 2.1-fold, 2.2-fold, 2.3-fold, 2.4-fold, 2.5-fold, 2.6-fold, 2.7-fold, 2.8-fold, 2.0-fold, 3.0-fold, 3.1-fold, 3.2-fold, 3.3-fold, 3.4-fold, 3.5-fold, 4-fold, 5-fold, 10-fold, 20-fold, 30-fold, 40-fold, 50-fold, or more in a treated with the method and composition described herein compared to expression of ASNS in a control cell. In some embodiments, the decrease in expression of ASNS comprises a decrease of about 20% to about 100%, about 50% to about 100%, about 20% to about 50%, at least about 20%, at least about 50%, compared to expression of ASNS in a control cell.

In some embodiments, the decrease in expression of an ASNS SL partner comprises a decrease of 1.1-fold, 1.2-fold, 1.3-fold, 1.4-fold, 1.5 fold, 1.6-fold, 1.7-fold, 1.8-fold, 1.9-fold, 2.0-fold, 2.1-fold, 2.2-fold, 2.3-fold, 2.4-fold, 2.5-fold, 2.6-fold, 2.7-fold, 2.8-fold, 2.0-fold, 3.0-fold, 3.1-fold, 3.2-fold, 3.3-fold, 3.4-fold, 3.5-fold, 4-fold, 5-fold, 10-fold, 20-fold, 30-fold, 40-fold, 50-fold, or more in a treated with the method and composition described herein compared to expression of the ASNS SL partner in a control cell. In some embodiments, the decrease in expression of the ASNS SL partner comprises a decrease of about 20% to about 100%, about 50% to about 100%, about 20% to about 50%, at least about 20%, at least about 50%, compared to expression of ASNS SL partner in a control cell.

Provided herein are methods and compositions for treatment and inhibition of progression of cancer, comprising administering to a subject in need thereof a therapeutically effective amount of at least one, at least two, at least three, at least four, at least five, at least six, at least seven, at least eight, at least nine, or at least ten inhibitory agents. In some embodiments, one or more inhibitory agents comprise a protein comprising a nucleotide recognition domain, e.g. a DNA recognition domain. In some embodiments, one or more inhibitory agents comprise a protein comprising a nucleotide recognition domain, e.g. a DNA recognition domain, and an effector domain. In some embodiments, the effector domain is a transcriptional activator domain, DNA demethylase domain, histone deacetylase domain, and combinations thereof. In some embodiments, the nucleotide recognition domain is derived from, or homologous to, a transcription activator like effector (TALE) DNA recognition domain. In some embodiments, the nucleotide recognition domain is derived from, or homologous to a zinc finger DNA recognition domain. In some embodiments, the nucleotide recognition domain is derived from, or homologous to a helix-turn-helix domain, a leucine zipper domain, a winged helix domain, a Wor3 domain, a HMG box, an OB fold domain, or any combination thereof.

The inhibitory agents provided herein inhibit the expression and/or activity of ASNS and ASNS SL partners. In some embodiments, one or more inhibitory agents inhibit the expression and/or activity of an ASNS protein. In some embodiments, In some embodiments, one or more inhibitory agents inhibit the expression and/or activity of a protein selected from the group consisting of GCN2, eIF2α, JAK3, Ras, BRAF, CRAF, PLK1, MEK1, MEK2, ERK1, ERK2, MNK1, PDGFRA, PDGFRB, VEGFR-2, and ATF4. In some embodiments, one or more inhibitory agents inhibit the expression and/or activity of an MNK1 protein. In some embodiments, one or more inhibitory agents inhibit the expression and/or activity of an BRAF protein. In some embodiments, one or more inhibitory agents inhibit the expression and/or activity of a MEK protein. In some embodiments, one or more inhibitory agents inhibit the expression and/or activity of a RTK protein. In some embodiments, In some embodiments, one or more inhibitory agents inhibit the expression and/or activity of a protein selected from the group consisting of VEGFR-2, PDGFR-A, and PDGFR-B.

In some embodiments, the increase in expression of MEK1 comprises a decrease of 1.1-fold, 1.2-fold, 1.3-fold, 1.4-fold, 1.5 fold, 1.6-fold, 1.7-fold, 1.8-fold, 1.9-fold, 2.0-fold, 2.1-fold, 2.2-fold, 2.3-fold, 2.4-fold, 2.5-fold, 2.6-fold, 2.7-fold, 2.8-fold, 2.0-fold, 3.0-fold, 3.1-fold, 3.2-fold, 3.3-fold, 3.4-fold, 3.5-fold, 4-fold, 5-fold, 10-fold, 20-fold, 30-fold, 40-fold, 50-fold, or more in a treated with the method and composition described herein compared to expression of MEK1 in a control cell. In some embodiments, the decrease in expression of MEK1 comprises a decrease of about 20% to about 100%, about 50% to about 100%, about 100% to about 100%, about 150% to about 100%, about 20% to about 50%, about 20% to about 100%, about 50% to about 100%, at least about 20%, at least about 30%, at least about 40%, at least about 50%, at least about 60%, at least about 70%, at least about 80%, at least about 90%, or at least about 100% compared to expression of MEK1 in a control cell. In some embodiments, the increase in expression of BRAF comprises a decrease of 1.1-fold, 1.2-fold, 1.3-fold, 1.4-fold, 1.5 fold, 1.6-fold, 1.7-fold, 1.8-fold, 1.9-fold, 2.0-fold, 2.1-fold, 2.2-fold, 2.3-fold, 2.4-fold, 2.5-fold, 2.6-fold, 2.7-fold, 2.8-fold, 2.0-fold, 3.0-fold, 3.1-fold, 3.2-fold, 3.3-fold, 3.4-fold, 3.5-fold, 4-fold, 5-fold, 10-fold, 20-fold, 30-fold, 40-fold, 50-fold, or more in a treated with the method and composition described herein compared to expression of BRAF in a control cell. In some embodiments, the decrease in expression of BRAF comprises a decrease of about 20% to about 100%, about 50% to about 100%, about 100% to about 100%, about 150% to about 100%, about 20% to about 50%, about 20% to about 100%, about 50% to about 100%, at least about 20%, at least about 30%, at least about 40%, at least about 50%, at least about 60%, at least about 70%, at least about 80%, at least about 90%, or at least about 100% compared to expression of BRAF in a control cell.

Therapeutic approaches based on siRNAs and microRNAs are available using methods well known to those skilled in the art. For example, a synthetic siRNA can be introduced into the target cells to elicit RNA interference (RNAi), thereby inhibiting the expression of a specific messenger RNA (mRNA) to produce a gene silencing effect. For example, single stranded RNAs acting as microRNA antagonists (also known as antagomirs or anti-miRs) can be introduced to inhibit the action of the endogenous miRNAs. In the replacement approach, synthetic miRNAs (also known as miRNA mimics) can be introduced to mimic the function of the endogenous miRNAs.

In some embodiments, the inhibitory agent comprises a protein. In some embodiments, the inhibitory agent comprises a protease that catalyzes cleavage of a ASNS protein. In some embodiments, the inhibitory agent comprises a protease that catalyzes cleavage of a ASNS SL partner protein.

In some embodiments, the inhibitory agent comprises a nuclease that catalyzes cleavage of a polynucleotide. In some embodiments, the inhibitory agent comprises a nuclease that catalyzes cleavage of a polynucleotide that encodes a ASNS protein or an ASNS SL partner protein in a cell. In some embodiments, the inhibitory agent comprises a nuclease that catalyzes cleavage of a polynucleotide in a cell that does not involve insertion, deletion, substitution, frameshifting, or other genome editing events in the genome of the cell. Non-limiting examples of nucleases include zinc finger nuclease, fokI nuclease, TALEN nucleases, meganuclease, Cas proteins. In some embodiments, the nuclease is a Cas9 nuclease. In some embodiments, the nuclease is a C2c2 nuclease.

In some embodiments, the inhibitory agent comprises a nucleic acid-guided protein complexed with a guide nucleic acid that recognize specific polynucleotide sequences in a cell. In some embodiments, the nucleic acid is a guide RNA. In some embodiments, the inhibitory agent comprises a RNA-guided CRISPR/Cas protein. In some embodiments, the CRISPR/Cas protein is type II CRISPR/Cas protein, a type V CRISPR/Cas protein, a type VII CRISPR/Cas protein, Cas9, CasX, CasY, Cpf1, C2c1, C2c2, or C2c3, or other CRISPR/Cas proteins. In some embodiments, the polynucleotide comprises a RNA sequence that is reverse complementary to a polynucleotide that encodes a ASNS protein or an ASNS SL partner protein in a cell. In some embodiments, the guide RNA comprises a RNA sequence that is reverse complementary to a polynucleotide that encodes a ASNS protein or an ASNS SL partner protein in a cell. In a preferred embodiment, the CRISPR/Cas protein is C2c2.

In some embodiments, the inhibitory agent comprises a nucleic acid-guided protein complexed with a guide RNA that recognizes specific polynucleotide sequences in a cell. In some embodiments, the nucleic acid is a guide RNA. In some embodiments, the inhibitory agent comprises a RNA-guided CRISPR/Cas protein. In some embodiments, the CRISPR/Cas protein is type II CRISPR/Cas protein, a type V CRISPR/Cas protein, a type VII CRISPR/Cas protein, Cas9, CasX, CasY, Cpf1, C2c1, C2c2, or C2c3, or other CRISPR/Cas proteins. In some embodiments, the polynucleotide comprises a RNA sequence that is reverse complementary to a DNA that encodes a ASNS protein or an ASNS SL partner protein in a cell. In some embodiments, the guide RNA comprises a RNA sequence that is reverse complementary to a DNA that encodes a ASNS protein or an ASNS SL partner protein in a cell. In some embodiments, the CRISPR/Cas protein comprises a mutation in the nuclease domain. In some embodiments, the CRISPR/Cas protein comprises a mutation in the nuclease domain that reduces or abolishes the catalytic activity of the nuclease domain. In some embodiments, the CRISPR/Cas protein comprises a mutation in the nuclease domain that renders the nuclease domain a nickase domain. In some embodiments, the CRISPR/Cas protein is a Cas9 protein comprising mutations D10A and/or H840A compared to the wild type spCas9 protein. In some embodiments, the CRISPR/Cas protein lacks the HNH nuclease domain. In some embodiments, the CRISPR/Cas protein further comprises an effector domain. In certain embodiments, the effector domain is a transcriptional repressor domain, DNA methyl transferase domain, histone acetyltransferase domain, histone deacetylase domain, and combinations thereof.

A guide nucleic acid (e.g., guide RNA) can bind to a Cas protein and target the Cas protein to a specific location within a target polynucleotide. A guide nucleic acid can comprise a nucleic acid-targeting segment and a Cas protein binding segment.

A guide nucleic acid can refer to a nucleic acid that can hybridize to another nucleic acid, for example, the target polynucleotide in the genome of a cell. A guide nucleic acid can be RNA, for example, a guide RNA. A guide nucleic acid can be DNA. A guide nucleic acid can comprise DNA and RNA. A guide nucleic acid can be single stranded. A guide nucleic acid can be double-stranded. A guide nucleic acid can comprise a nucleotide analog. A guide nucleic acid can comprise a modified nucleotide. The guide nucleic acid can be programmed or designed to bind to a sequence of nucleic acid site-specifically.

A guide nucleic acid can comprise one or more modifications to provide the nucleic acid with a new or enhanced feature. A guide nucleic acid can comprise a nucleic acid affinity tag. A guide nucleic acid can comprise synthetic nucleotide, synthetic nucleotide analog, nucleotide derivatives, and/or modified nucleotides.

The guide nucleic acid can comprise a nucleic acid-targeting region (e.g., a spacer region), for example, at or near the 5' end or 3' end, that is complementary to a protospacer sequence in a target polynucleotide. The spacer of a guide nucleic acid can interact with a protospacer in a sequence-specific manner via hybridization (base pairing). The protospacer sequence can be located 5' or 3' of protospacer adjacent motif (PAM) in the target polynucleotide. The nucleotide sequence of a spacer region can vary and determines the location within the target nucleic acid with which the guide nucleic acid can interact. The spacer region of a guide nucleic acid can be designed or modified to hybridize to any desired sequence within a target nucleic acid.

A guide nucleic acid can comprise two separate nucleic acid molecules, which can be referred to as a double guide nucleic acid. A guide nucleic acid can comprise a single nucleic acid molecule, which can be referred to as a single guide nucleic acid (e.g., sgRNA). In some embodiments, the guide nucleic acid is a single guide nucleic acid comprising a fused CRISPR RNA (crRNA) and a transactivating crRNA (tracrRNA). In some embodiments, the guide nucleic acid is a single guide nucleic acid comprising a crRNA. In some embodiments, the guide nucleic acid is a single guide nucleic acid comprising a crRNA but lacking a tracRNA. In some embodiments, the guide nucleic acid is a double guide nucleic acid comprising non-fused crRNA and tracrRNA. An exemplary double guide nucleic acid can comprise a crRNA-like molecule and a tracrRNA-like molecule. An exemplary single guide nucleic acid can comprise a crRNA-like molecule. An exemplary single guide nucleic acid can comprise a fused crRNA-like and tracrRNA-like molecules.

A crRNA can comprise the nucleic acid-targeting segment (e.g., spacer region) of the guide nucleic acid and a stretch of nucleotides that can form one half of a double-stranded duplex of the Cas protein-binding segment of the guide nucleic acid.

A tracrRNA can comprise a stretch of nucleotides that forms the other half of the double-stranded duplex of the Cas protein-binding segment of the gRNA. A stretch of nucleotides of a crRNA can be complementary to and hybridize with a stretch of nucleotides of a tracrRNA to form the double-stranded duplex of the Cas protein-binding domain of the guide nucleic acid.

The crRNA and tracrRNA can hybridize to form a guide nucleic acid. The crRNA can also provide a single-stranded nucleic acid targeting segment (e.g., a spacer region) that hybridizes to a target nucleic acid recognition sequence (e.g., protospacer). The sequence of a crRNA, including spacer region, or tracrRNA molecule can be designed to be specific to the species in which the guide nucleic acid is to target.

In some embodiments, the inhibitory agent comprises a RNA molecule. In some embodiments, the inhibitory agent comprises a non-coding RNA molecule. In some embodiments, the non-coding RNA molecule comprises a microRNA, an siRNA, an anti-sense RNA, or any combination thereof. In some embodiments, the polynucleotide comprises a RNA sequence that is reverse complementary to a DNA that encodes a ASNS protein or an ASNS SL partner protein in a cell. In some embodiments, the non-coding RNA comprises a siRNA that targets mRNA that encodes an ASNS protein. In some embodiments, the non-coding RNA comprises a siRNA that targets mRNA that encodes a MNK1 protein, a MEK protein, or a BRAF protein. In some embodiments, the non-coding RNA comprises a microRNA that targets mRNA that encodes an ASNS protein. In some embodiments, the non-coding RNA comprises a microRNA that targets mRNA that encodes a MNK1 protein, a MEK protein, or a BRAF protein.

Therapeutic Approaches

In some embodiments, the compositions described herein are formulated into pharmaceutical compositions. Pharmaceutical compositions are formulated in a conventional manner using one or more pharmaceutically acceptable inactive ingredients that facilitate processing of the active compounds into preparations that can be used pharmaceutically. Proper formulation is dependent upon the route of administration chosen. A summary of pharmaceutical compositions described herein can be found, for example, in Remington: The Science and Practice of Pharmacy, Nineteenth Ed (Easton, Pa.: Mack Publishing Company, 1995); Hoover, John E., Remington's Pharmaceutical Sciences, Mack Publishing Co., Easton, Pennsylvania 1975; Liberman, H. A. and Lachman, L., Eds., Pharmaceutical Dosage Forms, Marcel Decker, New York, N.Y., 1980; and Pharmaceutical Dosage Forms and Drug Delivery Systems, Seventh Ed. (Lippincott Williams & Wilkins 1999), herein incorporated by reference for such disclosure.

A pharmaceutical composition can be a mixture of a composition or inhibitory agent described herein with one or more other chemical components (e.g. pharmaceutically acceptable ingredients), such as carriers, excipients, binders, filling agents, suspending agents, flavoring agents, sweetening agents, disintegrating agents, dispersing agents, surfactants, lubricants, colorants, diluents, solubilizers, moistening agents, plasticizers, stabilizers, penetration enhancers, wetting agents, anti-foaming agents, antioxidants, preservatives, or one or more combination thereof. The pharmaceutical composition facilitates administration of the compound to an organism.

The compositions described herein can be administered to the subject in a variety of ways, including intra-tumorally, parenterally, intramuscularly, colonically, rectally, intraperitoneally, intradermally, subcutaneously, intraperitoneally, or intravenously. In some embodiments, composition describe herein encompasses a small molecule. In some embodiments, the small molecule is an inhibitory agent or an inhibitor. Non-limiting examples of small molecules provided herein include gefitinib, sunitinib, dabrafenib, vemurafenib, trametinib, selumetinib, sorafenib, and Torin 1. The small molecule inhibitory agent or a pharmaceutically acceptable salt thereof may be administered by intratumoral intraperitoneal injection, intramuscular injection, subcutaneous injection, or intravenous injection of the subject. In some embodiments, the pharmaceutical compositions can be administered parenterally, intravenously, intramuscularly or orally. The oral agents comprising a small molecule inhibitory agent can be in any suitable form for oral administration, such as liquid, tablets, capsules, or the like. The oral formulations can be further coated or treated to prevent or reduce dissolution in stomach. The compositions of the present invention can be administered to a subject using any suitable methods known in the art. Suitable formulations for use in the present invention and methods of delivery are generally known in the art. For example, the small molecule inhibitory agent described herein can be formulated as pharmaceutical compositions with a pharmaceutically acceptable diluent, carrier or excipient. The compositions may contain pharmaceutically acceptable auxiliary substances as required to approximate physiological conditions including pH adjusting and buffering agents, tonicity adjusting agents, wetting agents and the like, such as, for example, sodium acetate, sodium lactate, sodium chloride, potassium chloride, calcium chloride, sorbitan monolaurate, triethanolamine oleate, etc.

Pharmaceutical formulations described herein can be administrable to a subject in a variety of ways by multiple administration routes, including but not limited to, oral, parenteral (e.g., intravenous, subcutaneous, intramuscular, intramedullary injections, intrathecal, direct intraventricular, intraperitoneal, intralymphatic, intranasal injections), intranasal, buccal, topical or transdermal administration routes. The pharmaceutical formulations described herein include, but are not limited to, aqueous liquid dispersions, self-emulsifying dispersions, solid solutions, liposomal dispersions, aerosols, solid dosage forms, powders, immediate release formulations, controlled release formulations, fast melt formulations, tablets, capsules, pills, delayed release formulations, extended release formulations, pulsatile release formulations, multiparticulate formulations, and mixed immediate and controlled release formulations.

In some embodiments, the pharmaceutical formulation is in the form of a tablet. In other embodiments, pharmaceutical formulations containing an composition or inhibitory agent described herein are in the form of a capsule. In one aspect, liquid formulation dosage forms for oral administration are in the form of aqueous suspensions or solutions selected from the group including, but not limited to, aqueous oral dispersions, emulsions, solutions, elixirs, gels, and syrups.

For administration by inhalation, a composition or inhibitory agent described herein can be formulated for use as an aerosol, a mist or a powder. For buccal or sublingual administration, the compositions may take the form of tablets, lozenges, or gels formulated in a conventional manner. In some embodiments, a composition or inhibitory agent described herein can be prepared as transdermal dosage forms. In some embodiments, a composition or inhibitory agent described herein can be formulated into a pharmaceutical composition suitable for intramuscular, subcutaneous, or intravenous injection. In some embodiments, a composition or inhibitory agent described herein can be administered topically and can be formulated into a variety of topically administrable compositions, such as solutions, suspensions, lotions, gels, pastes, medicated sticks, balms, creams or ointments. In some embodiments, a composition or inhibitory agent described herein can be formulated in rectal compositions such as enemas, rectal gels, rectal foams, rectal aerosols, suppositories, jelly suppositories, or retention enemas.

Biological Samples

A sample, e.g., a biological sample can be taken from a subject and examined to determine whether, for example, the subject produces an mRNA or a protein subject to regulation by the compositions provided herein and/or whether the subject produces a biomarker of tumor. A biological sample can comprise a plurality of biological samples. The plurality of biological samples can contain two or more biological samples; for examples, about 2-1000, 2-500, 2-250, 2-100, 2-75, 2-50, 2-25, 2-10, 10-1000, 10-500, 10-250, 10-100, 10-75, 10-50, 10-25, 25-1000, 25-500, 25-250, 25-100, 25-75, 25-50, 50-1000, 50-500, 50-250, 50-100, 50-75, 60-70, 100-1000, 100-500, 100-250, 250-1000, 250-500, 500-1000, 2, 3, 4, 5, 6, 7, 8, 9, 10, 11, 12, 13, 14, 15, 16, 17, 18, 19, 20, 21, 22, 23, 24, 25, 30, 35, 40, 45, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 90, 95, 100, 110, 120, 130, 140, 150, 160, 170, 180, 190, 200, 210, 220, 230, 240, 250, 275, 300, 325, 350, 375, 400, 425, 450, 475, 500, 550, 600, 650, 700, 750, 800, 850, 900, 950, 1000, or more biological samples. The biological samples can be obtained from a plurality of subjects, giving a plurality of sets of a plurality of samples. The biological samples can be obtained from about 2 to about 1000 subjects, or more; for example, about 2-1000, 2-500, 2-250, 2-100, 2-50, 2-25, 2-20, 2-10, 10-1000, 10-500, 10-250, 10-100, 10-50, 10-25, 10-20, 15-20, 25-1000, 25-500, 25-250, 25-100, 25-50, 50-1000, 50-500, 50-250, 50-100, 100-1000, 100-500, 100-250, 250-1000, 250-500, 500-1000, or at least 2, 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 68, 70, 75, 80, 85, 90, 95, 100, 110, 120, 130, 140, 150, 160, 170, 180, 190, 200, 210, 220, 230, 240, 250, 275, 300, 325, 350, 375, 400, 425, 450, 475, 500, 550, 600, 650, 700, 750, 800, 850, 900, 950, or 1000 or more subjects.

The biological samples can be obtained from human subjects. The biological samples can be obtained from human subjects at different ages. The human subject can be prenatal (e.g., a fetus), a child (e.g., a neonate, an infant, a toddler, a preadolescent), an adolescent, a pubescent, or an adult (e.g., an early adult, a middle aged adult, a senior citizen). The human subject can be between about 0 months and about 120 years old, or older. The human subject can be between about 0 and about 12 months old; for example, about 1, 2, 3, 4, 5, 6, 7, 8, 9, 10, 11, or 12 months old. The human subject can be between about 0 and 12 years old; for example, between about 0 and 30 days old; between about 1 month and 12 months old; between about 1 year and 3 years old; between about 4 years and 5 years old; between about 4 years and 12 years old; about 1, 2, 3, 4, 5, 6, 7, 8, 9, 10, 11, or 12 years old. The human subject can be between about 13 years and 19 years old; for example, about 13, 14, 15, 16, 17, 18, or 19 years old. The human subject can be between about 20 and about 39 year old; for example, about 20, 21, 22, 23, 24, 25, 26, 27, 28, 29, 30, 31, 32, 33, 34, 35, 36, 37, 38, or 39 years old. The human subject can be between about 40 to about 59 years old; for example, about 40, 41, 42, 43, 44, 45, 46, 47, 48, 49, 50, 51, 52, 53, 54, 55, 56, 57, 58, or 59 years old. The human subject can be greater than 59 years old; for example, about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 years old. The human subjects can include living subjects or deceased subjects. The human subjects can include male subjects and/or female subjects.

Biological samples can be obtained from any suitable source that allows determination of expression levels of genes, e.g., from cells, tissues, bodily fluids or secretions, or a gene expression product derived therefrom (e.g., nucleic acids, such as DNA or RNA; polypeptides, such as protein or protein fragments). The nature of the biological sample can depend upon the nature of the subject. If a biological sample is from a subject that is a unicellular organism or a multicellular organism with undifferentiated tissue, the biological sample can comprise cells, such as a sample of a cell culture, an excision of the organism, or the entire organism. If a biological sample is from a multicellular organism, the biological sample can be a tissue sample, a fluid sample, or a secretion.

The biological samples can be obtained from different tissues. The term tissue is meant to include ensembles of cells that are of a common developmental origin and have similar or identical function. The term tissue is also meant to encompass organs, which can be a functional grouping and organization of cells that can have different origins. The biological sample can be obtained from any tissue.

The biological samples can be obtained from different tissue samples from one or more humans or non-human animals. Suitable tissues can include connective tissues, muscle tissues, nervous tissues, epithelial tissues or a portion or combination thereof. Suitable tissues can also include all or a portion of a lung, a heart, a blood vessel (e.g., artery, vein, capillary), a salivary gland, a esophagus, a stomach, a liver, a gallbladder, a pancreas, a colon, a rectum, an anus, a hypothalamus, a pituitary gland, a pineal gland, a thyroid, a parathyroid, an adrenal gland, a kidney, a ureter, a bladder, a urethra, a lymph node, a tonsil, an adenoid, a thymus, a spleen, skin, muscle, a brain, a spinal cord, a nerve, an ovary, a fallopian tube, a uterus, vaginal tissue, a mammary gland, a testicle, a vas deferens, a seminal vesicle, a prostate, penile tissue, a pharynx, a larynx, a trachea, a bronchi, a diaphragm, bone marrow, a hair follicle, or a combination thereof. A biological sample from a human or non-human animal can also include a bodily fluid, secretion, or excretion; for example, a biological sample can be a sample of aqueous humour, vitreous humour, bile, blood, blood serum, breast milk, cerebrospinal fluid, endolymph, perilymph, female ejaculate, amniotic fluid, gastric juice, menses, mucus, peritoneal fluid, pleural fluid, saliva, sebum, semen, sweat, tears, vaginal secretion, vomit, urine, feces, or a combination thereof. The biological sample can be from healthy tissue, diseased tissue, tissue suspected of being diseased, or a combination thereof.

In some embodiments, the biological sample is a fluid sample, for example a sample of blood, serum, sputum, urine, semen, or other biological fluid. In certain embodiments the sample is a blood sample. In some embodiments the biological sample is a tissue sample, such as a tissue sample taken to determine the presence or absence of disease in the tissue. In certain embodiments the sample is a sample of thyroid tissue.

The biological samples can be obtained from subjects in different stages of disease progression or different conditions. Different stages of disease progression or different conditions can include healthy, at the onset of primary symptom, at the onset of secondary symptom, at the onset of tertiary symptom, during the course of primary symptom, during the course of secondary symptom, during the course of tertiary symptom, at the end of the primary symptom, at the end of the secondary symptom, at the end of tertiary symptom, after the end of the primary symptom, after the end of the secondary symptom, after the end of the tertiary symptom, or a combination thereof. Different stages of disease progression can be a period of time after being diagnosed or suspected to have a disease; for example, at least about, or at least, 1, 2, 3, 4, 5, 6, 7, 8, 9, 10, 11, 12, 13, 14, 15, 16, 17, 18, 19, 20, 21, 22, 23 or 24 hours; 1, 2, 3, 4, 5, 6, 7, 8, 9, 10, 11, 12, 13, 14, 15, 16, 17, 18, 19, 20, 21, 22, 23, 24, 25, 26, 27 or 28 days; 1, 2, 3, 4, 5, 6, 7, 8, 9, 10, 11, 12, 13, 14, 15, 16, 17, 18, 19 or 20 weeks; 1, 2, 3, 4, 5, 6, 7, 8, 9, 10, 11 or 12 months; 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 years after being diagnosed or suspected to have a disease. Different stages of disease progression or different conditions can include before, during or after an action or state; for example, treatment with drugs, treatment with a surgery, treatment with a procedure, performance of a standard of care procedure, resting, sleeping, eating, fasting, walking, running, performing a cognitive task, sexual activity, thinking, jumping, urinating, relaxing, being immobilized, being emotionally traumatized, being shock, and the like.

The methods of the present disclosure provide for analysis of a biological sample from a subject or a set of subjects. The subject(s) may be, e.g., any animal (e.g., a mammal), including but not limited to humans, non-human primates, rodents, dogs, cats, pigs, fish, and the like. The present methods and compositions can apply to biological samples from humans, as described herein.

A biological sample can be obtained by methods known in the art such as the biopsy methods provided herein, swabbing, scraping, phlebotomy, or any other suitable method. The biological sample can be obtained, stored, or transported using components of a kit of the present disclosure. In some cases, multiple biological samples, such as multiple thyroid samples, can be obtained for analysis, characterization, or diagnosis according to the methods of the present disclosure. In some cases, multiple biological samples, such as one or more samples from one tissue type (e.g., thyroid) and one or more samples from another tissue type (e.g., buccal) can be obtained for diagnosis or characterization by the methods of the present disclosure. In some cases, multiple samples, such as one or more samples from one tissue type (e.g., thyroid) and one or more samples from another tissue (e.g., buccal) can be obtained at the same or different times. In some cases, the samples obtained at different times are stored and/or analyzed by different methods. For example, a sample can be obtained and analyzed by cytological analysis (e.g., using routine staining). In some cases, a further sample can be obtained from a subject based on the results of a cytological analysis. The diagnosis of an immnodisorder can include examination of a subject by a physician, nurse or other medical professional. The examination can be part of a routine examination, or the examination can be due to a specific complaint including, but not limited to, one of the following: pain, illness, anticipation of illness, presence of a suspicious lump or mass, a disease, or a condition. The subject may or may not be aware of the disease or condition. The medical professional can obtain a biological sample for testing. In some cases the medical professional can refer the subject to a testing center or laboratory for submission of the biological sample. The methods of obtaining provided herein include methods of biopsy including fine needle aspiration, core needle biopsy, vacuum assisted biopsy, incisional biopsy, excisional biopsy, punch biopsy, shave biopsy or skin biopsy. In some cases, the methods and compositions provided herein are applied to data only from biological samples obtained by FNA. In some cases, the methods and compositions provided herein are applied to data only from biological samples obtained by FNA or surgical biopsy. In some cases, the methods and compositions provided herein are applied to data only from biological samples obtained by surgical biopsy. A biological sample can be obtained by non-invasive methods, such methods including, but not limited to: scraping of the skin or cervix, swabbing of the cheek, saliva collection, urine collection, feces collection, collection of menses, tears, or semen. The biological sample can be obtained by an invasive procedure, such procedures including, but not limited to: biopsy, alveolar or pulmonary lavage, needle aspiration, or phlebotomy. The method of biopsy can further include incisional biopsy, excisional biopsy, punch biopsy, shave biopsy, or skin biopsy. The method of needle aspiration can further include fine needle aspiration, core needle biopsy, vacuum assisted biopsy, or large core biopsy. Multiple biological samples can be obtained by the methods herein to ensure a sufficient amount of biological material. Generic methods for obtaining biological samples are also known in the art and further described in for example Ramzy, Ibrahim Clinical Cytopathology and Aspiration Biopsy 2001 which is herein incorporated by reference in its entirety. The biological sample can be a fine needle aspirate of a thyroid nodule or a suspected thyroid tumor. The fine needle aspirate sampling procedure can be guided by the use of an ultrasound, X-ray, or other imaging device.

In some cases, the subject can be referred to a specialist such as an oncologist, surgeon, or endocrinologist for further diagnosis. The specialist can likewise obtain a biological sample for testing or refer the individual to a testing center or laboratory for submission of the biological sample. In any case, the biological sample can be obtained by a physician, nurse, or other medical professional such as a medical technician, endocrinologist, cytologist, phlebotomist, radiologist, or a pulmonologist. The medical professional can indicate the appropriate test or assay to perform on the sample, or the molecular profiling business of the present disclosure can consult on which assays or tests are most appropriately indicated. The molecular profiling business can bill the individual or medical or insurance provider thereof for consulting work, for sample acquisition and or storage, for materials, or for all products and services rendered.

A medical professional need not be involved in the initial diagnosis or sample acquisition. An individual can alternatively obtain a sample through the use of an over the counter kit. The kit can contain a means for obtaining said sample as described herein, a means for storing the sample for inspection, and instructions for proper use of the kit. In some cases, molecular profiling services are included in the price for purchase of the kit. In other cases, the molecular profiling services are billed separately.

A biological sample suitable for use by the molecular profiling business can be any material containing tissues, cells, nucleic acids, genes, gene fragments, expression products, gene expression products, and/or gene expression product fragments of an individual to be tested. Methods for determining sample suitability and/or adequacy are provided. The biological sample can include, but is not limited to, tissue, cells, and/or biological material from cells or derived from cells of an individual. The sample can be a heterogeneous or homogeneous population of cells or tissues. The biological sample can be obtained using any method known to the art that can provide a sample suitable for the analytical methods described herein.

Obtaining a biological sample can be aided by the use of a kit. A kit can be provided containing materials for obtaining, storing, and/or shipping biological samples. The kit can contain, for example, materials and/or instruments for the collection of the biological sample (e.g., sterile swabs, sterile cotton, disinfectant, needles, syringes, scalpels, anesthetic swabs, knives, curette blade, liquid nitrogen, etc.). The kit can contain, for example, materials and/or instruments for the storage and/or preservation of biological samples (e.g., containers; materials for temperature control such as ice, ice packs, cold packs, dry ice, liquid nitrogen; chemical preservatives or buffers such as formaldehyde, formalin, paraformaldehyde, glutaraldehyde, alcohols such as ethanol or methanol, acetone, acetic acid, HOPE fixative (Hepes-glutamic acid buffer-mediated organic solvent protection effect), heparin, saline, phosphate buffered saline, TAPS, bicine, Tris, tricine, TAPSO, HEPES, TES, MOPS, PIPES, cadodylate, SSC, MES, phosphate buffer; protease inhibitors such as aprotinin, bestatin, calpain inhibitor I and II, chymostatin, E-64, leupeptin, alpha-2-macroglobulin, pefabloc SC, pepstatin, phenylmethanesufonyl fluoride, trypsin inhibitors; DNAse inhibitors such as 2-mercaptoethanol, 2-nitro-5-thicyanobenzoic acid, calcium, EGTA, EDTA, sodium dodecyl sulfate, iodoacetate, etc.; RNAse inhibitors such as ribonuclease inhibitor protein; double-distilled water; DEPC (diethyprocarbonate) treated water, etc.). The kit can contain instructions for use. The kit can be provided as, or contain, a suitable container for shipping. The shipping container can be an insulated container. The shipping container can be self-addressed to a collection agent (e.g., laboratory, medical center, genetic testing company, etc.). The kit can be provided to a subject for home use or use by a medical professional. Alternatively, the kit can be provided directly to a medical professional.

One or more biological samples can be obtained from a given subject. In some cases, between about 1 and about 50 biological samples are obtained from the given subject; for example, about 1-50, 1-40, 1-30, 1-25, 1-20, 1-15, 1-10, 1-7, 1-5, 5-50, 5-40, 5-30, 5-25, 5-15, 5-10, 10-50, 10-40, 10-25, 10-20, 25-50, 25-40, or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 biological samples can be obtained from the given subject. Multiple biological samples from the given subject can be obtained from the same source (e.g., the same tissue), e.g., multiple blood samples, or multiple tissue samples, or from multiple sources (e.g., multiple tissues). Multiple biological samples from the given subject can be obtained at the same time or at different times. Multiple biological samples from the given subject can be obtained at the same condition or different condition. Multiple biological samples from the given subject can be obtained at the same disease progression or different disease progression of the subject. If multiple biological samples are collected from the same source (e.g., the same tissue) from the particular subject, the samples can be combined into a single sample. Combining samples in this way can ensure that enough material is obtained for testing and/or analysis.

Methods of Administering

Pharmaceutical formulations described herein can be administrable to a subject in a variety of ways by multiple administration routes, including but not limited to, oral, parenteral (e.g., intravenous, subcutaneous, intramuscular, intramedullary injections, intrathecal, direct intraventricular, intraperitoneal, intralymphatic, intranasal injections), intranasal, buccal, topical or transdermal administration routes. The pharmaceutical formulations described herein include, but are not limited to, aqueous liquid dispersions, self-emulsifying dispersions, solid solutions, liposomal dispersions, aerosols, solid dosage forms, powders, immediate release formulations, controlled release formulations, fast melt formulations, tablets, capsules, pills, delayed release formulations, extended release formulations, pulsatile release formulations, multiparticulate formulations, and mixed immediate and controlled release formulations.

In some embodiments, the pharmaceutical compositions described herein are administered orally. In some embodiments, the pharmaceutical compositions described herein are administered topically. In such embodiments, the pharmaceutical compositions described herein are formulated into a variety of topically administrable compositions, such as solutions, suspensions, lotions, gels, pastes, shampoos, scrubs, rubs, smears, medicated sticks, medicated bandages, balms, creams or ointments. In some embodiments, the pharmaceutical compositions described herein are administered topically to the skin. In some embodiments, the pharmaceutical compositions described herein are administered by inhalation. In some embodiments, the pharmaceutical compositions described herein are formulated for intranasal administration. Such formulations include nasal sprays, nasal mists, and the like. In some embodiments, the pharmaceutical compositions described herein are formulated as eye drops. In some embodiments, the pharmaceutical compositions described herein are: (a) systemically administered to the mammal; and/or (b) administered orally to the mammal; and/or (c) intravenously administered to the mammal; and/or (d) administered by inhalation to the mammal; and/or (e) administered by nasal administration to the mammal; or and/or (f) administered by injection to the mammal; and/or (g) administered topically to the mammal; and/or (h) administered by ophthalmic administration; and/or (i) administered rectally to the mammal; and/or j) administered non-systemically or locally to the mammal. In some embodiments, the pharmaceutical compositions described herein are administered orally to the mammal. In certain embodiments, a composition described herein is administered in a local rather than systemic manner. In some embodiments, a composition described herein is administered with intraperitoneal injection. In some embodiments, a composition described herein is administered topically. In some embodiments, a composition described herein is administered systemically.

Oral compositions generally include an inert diluent or an edible carrier. They can be enclosed in gelatin capsules or compressed into tablets. For the purpose of oral therapeutic administration, the active compound can be incorporated with excipients and used in the form of tablets, troches, or capsules. Pharmaceutically compatible binding agents, and/or adjuvant materials can be included as part of the composition. The tablets, pills, capsules, troches and the like can contain any of the following ingredients, or compounds of a similar nature: a binder such as microcrystalline cellulose, gum tragacanth or gelatin; an excipient such as starch or lactose, a disintegrating agent such as alginic acid, Primogel, or corn starch; a lubricant such as magnesium stearate or Sterotes; a glidant such as colloidal silicon dioxide; a sweetening agent such as sucrose or saccharin; or a flavoring agent such as peppermint, methyl salicylate, or orange flavoring.

For administration by inhalation, the compounds are delivered in the form of an aerosol spray from pressured container or dispenser that contains a suitable propellant, e.g., a gas such as carbon dioxide, or a nebulizer.

Systemic administration can also be by transmucosal or transdermal means. For transmucosal or transdermal administration, penetrants appropriate to the barrier to be permeated are used in the formulation. Such penetrants are generally known in the art, and include, for example, for transmucosal administration, detergents, bile salts, and fusidic acid derivatives. Transmucosal administration can be accomplished through the use of nasal sprays or suppositories. For transdermal administration, the active compounds are formulated into ointments, salves, gels, or creams as generally known in the art.

Injection can be conducted using sterile aqueous solutions (where water soluble) or dispersions and sterile powders for the extemporaneous preparation of sterile injectable solutions or dispersion. For intravenous administration, suitable carriers include physiological saline, bacteriostatic water, Cremophor EL™ (BASF, Parsippany, NJ) or phosphate buffered saline (PBS). In all cases, the composition must be sterile and should be fluid to the extent that easy syringability exists. It must be stable under the conditions of manufacture and storage and must be preserved against contamination from microorganisms such as bacteria and fungi. The carrier can be a solvent or dispersion medium containing, for example, water, ethanol, polyol (for example, glycerol, propylene glycol, and liquid polyethylene glycol, and the like), and suitable mixtures thereof. The proper fluidity can be maintained, for example, by the use of a coating such as lecithin, by the maintenance of the required particle size in the case of dispersion and by the use of surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, polyalcohols such as manitol, sorbitol, sodium chloride in the composition.

EXAMPLES

The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means or reactants without the exercise of inventive capacity and without departing from the scope of the invention.

Example 1. General Methods

Cell culture and reagents: Cancer cell lines (pancreatic, Mia-Paca-2, Panc-1 and BX-PC3; breast, MDA-231 and MCF7; prostate, PC-3 and LNCaP; and melanoma, WM-35, WM1366, A375, UACC-903, and Sk-Mel28) were cultured in Dulbecco's modified Eagle's medium (DMEM; GE Healthcare Life Sciences, IL, USA), supplemented with 5% fetal bovine serum and penicillin-streptomycin. MaNRAS1 (1007) mouse melanoma cell lines were established in culture from C57BL/6 Tyr::NRASQ61K male and female transgenic animals, respectively ((Ackermann et al., 2005); Petit et al., in preparation). Cells were maintained in Ham's F12 medium (Gibco) supplemented with 10% decomplemented fetal bovine serum Sigma-Aldrich (St. Louis, MO), 5 mM L-glutamine, 100 U/mL penicillin and 100 µg/mL streptomycin. All cells were grown at 37° C. in a humidified atmosphere containing 5% carbon dioxide. All cells were incubated at 37° C. L-Glutamine-13C5, D-Glucose-13C6, and L-asparagine was purchased from Sigma-Aldrich. PLX-4032, GDC-0879, CI-1040, SCH-772984, Torin 1, rapamycin, gefitinib, sunitinib (Selleckchem, Houston, TX), PD-325901 (LC laboratories, Woburn, MA), ISRIB (Tocris, Minneapolis, MN), eFT508 (Effector Therapeutics, San Diego, CA). L-asparaginase was purchased from Prospec Protein Specialists (Rehevot, Israel).

Antibodies: The following antibodies were used: ATF4 (D4B8) (dilution, 1:1,000), MNK1 (C4C1) (dilution, 1:1000), phospho-MNK1 (Thr197/202), phospho-eIF4E (S209) (dilution, 1:1,000), eIF4E (dilution, 1:1,000), EGFR (D38B1) (dilution, 1:1,000), SLC1A5 (ASCT2, V501) (dilution, 1:1,000), phospho(Ser240/244)-S6 Ribosomal Protein (D68F8) (dilution, 1:1,000), S6 Ribosomal Protein (54D2) (dilution, 1:1,000), phospho(Thr37/46)-4EBP1 (236B4) (dilution, 1:1,000), 4EBP1 (dilution, 1:1,000), GCN2 (dilution, 1:1,000), phospho(Ser51)-eIF2α (dilution, 1:1,000), phospho-p44/42 Erk1/2 (Thr202/Tyr204) (dilution, 1:1,000), p44/42 Erk1/2 (dilution, 1:1,000), phospho-MEK1/2 (Ser217/221) (dilution, 1:1,000), MEK1/2 (dilution, 1:1,000), VEGFR-2 (dilution, 1:1,000), PDGFR-A (dilution, 1:1,000), PDGFR-B (1:1,000), and HRP-conjugated anti-Mouse (dilution 1:10,000) and anti-Rabbit (dilution, 1:10,000) antibodies from Cell Signaling Technology (MA, USA). PSAT1 (dilution, 1:1,000) from Thermofisher Scientific (CA, USA). GPT2 (G-7) (dilution, 1:250), ASNS (G-10) (dilution, 1:250), c-Myc (NE10) (1:250), HSP90 (F-8) (dilution, 1:5,000) from Santa Cruz Biotechnology, (TX, USA).

siRNA Transfection: 1×10^5 cells were seeded overnight (O/N) per well in 6-well plates. Negative control (NT-siRNA) or si-RNA targeting the transcript of interest was transfected utilizing jetPRIME® transfection reagent, as per manufacturer's instructions (Polyplus, NY, USA). Following siRNAs were used: si-ASNS #1 (SASI_Hs02_00332309), si-ASNS #2 (SASI_Hs01_00116721), si-ASNS #3 (SASI_Hs01_00116722), si-ATF4 (SASI_Hs02_00332313), si-eIF4E (SASI_Hs01_00216117), si-BRAF (SASI_Hs01_00107705), si-GCN2 (SASI_Hs01_00097888), si-MNK #1 (SASI_Hs01_00228422), si-MNK1 #2 (SASI_Hs01_00228423), si-MNK1 #3 (SASI_Hs01_00228424), and the negative control si-RNA (NT-siRNA; SIC001) were purchased from Sigma-Aldrich.

Immunoblotting: Total protein was extracted in Laemmli buffer, fractionated by SDS polyacrylamide gels and transferred to PVDF membranes (Millipore Sigma, MA, USA). After blocking with 5% non-fat dry milk (BD Biosciences, CA, USA), the membranes were incubated with primary antibodies overnight at 4° C. Afterwards, 2 hr incubation with HRP-conjugated secondary antibodies was performed. Following chemiluminescence reaction, the protein signal was visualized using the ChemiDoc imaging system (Bio-Rad, Hercules, CA) according to the manufacturer's instructions.

Cell Proliferation: For cell proliferation, 0.3-0.5×105 cells were seeded O/N in triplicate in 6-well plate. Following treatment for the specified duration, cells were trypsinized and the cell count was determined with Neubauer hemocytometer (Celeromics, Cambridge, UK).

qPCR Analysis: 1×10^5 cells were seeded O/N per well in 6-well plates. Following treatment for 48 hr, total RNA was extracted using RNeasy Mini Kit (Qiagen, Hilden, Germany). cDNA was synthesized using oligo(dT) and random primers (AB Bioscience, MA, USA), and qPCR analysis was performed with SYBR Green (Roche, NJ, USA). Primers were designed using the PrimerQuest tool (Integrated DNA Technologies, CA, USA) and Primer Bank Actin was used as an internal control.

Sequences of the primers used are listed in Table 1 and Table 2.

TABLE 1

Human Primers

| Name | Gene Primer Sequence | SEQ ID No. |
|---|---|---|
| Human SLC1A5-F | CAGCCTTTCGCTCATACTCTA | 2 |
| Human SLC1A5-R | GTAAACCCACATCCTCCATCTC | 3 |
| Human SLC7A5-F | GTGTCTGCCTTTCTTGTCTCT | 5 |
| Human ASNS-F | GTTCGTGCTTCAGTAGGTATGT | 6 |
| Human ASNS-R | GGTGGCAGAGACAAGTAATAGG | 7 |
| Human GPT2-F | AGAAACTCCCAACTGTCCTTAC | 8 |
| Human GPT2-R | CCTCCTAGACTAGCTGACCTTAT | 9 |
| Human cMYC-F | GCTGTAGTAATTCCAGCGAGAG | 10 |
| Human cMYC-R | GAGTCGTAGTCGAGGTCATAGT | 11 |
| Human ATF4-F | GTATGAGCCCAGAGTCCTATCT | 12 |
| Human ATF4-R | CACATTGACGCTCCTGACTATC | 13 |
| Human PSATI-F | CAGGAAGGTGTGCTGACTATG | 14 |
| Human PSATI-R | CCCATGACGTAGATGCTGAAA | 15 |
| Human SHMTI-F | TGTCGCCACTTGGTCATAATC | 16 |
| Human SHMTI-R | GGAGGCCATTTCTACACCATAC | 17 |
| Human PHGDH-F | GTCGCGGAGAGTTTGAGTATTT | 18 |
| Human PHGDH-R | GGTGGCAGAGCGAACAATAA | 19 |
| Human PSPH-F | GAGGACGCGGTGTCAGAAAT | 20 |
| Human PSPH-R | GGTTGCTCTGCTATGAGTCTCT | 21 |
| Human VEGFA-F | AGGGCAGAATCATCACGAAGT | 22 |

TABLE 1-continued

Human Primers

| Name | Gene Primer Sequence | SEQ ID No. |
|---|---|---|
| Human VEGFA-R | AGGGTCTCGATTGGATGGCA | 23 |
| Human PDGFR-A-F | TGGCAGTACCCCATGTCTGAA | 24 |
| Human PDGFR-A-R | CCAAGACCGTCACAAAAAGGC | 25 |
| Human PDGFR-B-F | AGCACCTTCGTTCTGACCTG | 26 |
| Human PDGFR-B-R | TATTCTCCCGTGTCTAGCCCA | 27 |
| Human VEGFR-2-F | GGCCCAATAATCAGAGTGGCA | 28 |
| Human VEGFR2-R | CCAGTGTCATTTCCGATCACTTT | 29 |
| Human EGFR-F | AGGCACGAGTAACAAGCTCAC | 30 |
| Human EGFR-R | ATGAGGACATAACCAGCCACC | 31 |
| Human MNK1-F | AGATGGGCAGTAGCGAACC | 32 |
| Human MNK1-R | AGCAATTCAGAGGTCAGCTTG | 33 |
| Human EIF4E-F | GGACTTCTGGGCGCTATACAG | 34 |
| Human EIF4E-R | CTTGAAGAGGGCGTAGTCACA | 35 |
| Human MTHFD-2-F | CTGCGACTTCTCTAATGTCTGC | 36 |
| Human MTHFD-2-R | CTCGCCAACCAGGATCACA | 37 |
| Human CCND1-F | GCTGCGAAGTGGAAACCATC | 38 |
| Human CCND1-R | CCTCCTTCTGCACACATTTGAA | 39 |
| Human FRA-1-F | CAGGCGGAGACTGACAAACTG | 40 |
| Human FRA-1-R | TCCTTCCGGGATTTTGCAGAT | 41 |
| Human MMP-9-F | TGTACCGCTATGGTTACACTCG | 42 |
| Human MMP-9-R | GGCAGGGACAGTTGCTTCT | 43 |
| Human H3A-F | ACTGCTCGGAAGTCTACTGGT | 44 |
| Human H3A-R | GCGCTGGAAAGGTAGTTTACGA | 45 |
| Human CDH1-F | CGAGAGCTACACGTTCACGG | 46 |
| Human CDH1-R | GGGTGTCGAGGGAAAAATAGG | 47 |
| Human Beta-Actin-F | CATGTACGTTGCTATCCAGGC | 48 |
| Human Beta-Actin-R | CTCCTTAATGTCACGCACGAT | 49 |

TABLE 2

| Mouse Primers | Gene Primer Sequence | SEQ ID No. |
|---|---|---|
| Mouse PSAT1-F | CAGTGGAGCGCCAGAATAGAA | 53 |
| Mouse PSAT1-R | CCTGTGCCCCTTCAAGGAG | 51 |
| Mouse GPT2-F | CAGCCACGGTCAACAACTC | 52 |
| Mouse GPT2-R | CTTCTTTACGGATAGCAACCGAG | 53 |
| Mouse ASNS-F | TTCCGTGCAGTGTCTGAGTG | 54 |
| Mouse ASNS-R | GCAGCAGTTGGTGTATCCATTG | 55 |
| Mouse MTHFD2-F | AGTGCGAAATGAAGCCGTTG | 56 |

TABLE 2-continued

| Mouse Primers | Gene Primer Sequence | SEQ ID No. |
|---|---|---|
| Mouse MTHFD2-R | GACTGGCGGGATTGTCACC | 57 |
| Mouse SLC1A5-F | CATCAACGACTCTGTTGTAGACC | 58 |
| Mouse SLC1A5-R | CTGGATACAGGATTGCGGTATTT | 59 |
| Mouse VEGFA-F | GCACATAGAGAGAATGAGCTTCC | 60 |
| Mouse VEGFA-R | CTCCGCTCTGAACAAGGCT | 61 |
| Mouse beta-Actin-F | GTGACGTTGACATCCGTAAAGA | 62 |
| Mouse beta-Actin-R | GCCGGACTCATCGTACTCC | 63 |

Intracellular Metabolite Quantification: Cell extraction and GC-MS analysis for metabolite quantification was performed as described in (Ratnikov et al., 2015). Intracellular metabolite amounts are expressed in nmol per cell sample (cells from one well of six-well plates; approximately $0.5 \times 10^6$-$1.0 \times 10^6$ cells). Glucose (Glc), lactate, and glutamine (Gln) in culture medium samples were measured using YSI 2950 analyzer (YSI OH, USA).

Conditional Gene Essentiality: Three large-scale shRNA single gene knockout screens (Cheung et al., 2011; Cowley et al., 2014; Marcotte et al., 2012; Marcotte et al., 2016) were analyzed. The essentiality of the genes of interest in ASNShi vs. ASNSlo cell lines (partitioned by median gene expression value) was assessed using Wilcoxon rank sum test.

TCGA Data Analysis: Pan-cancer TCGA tumor samples were analyzed with gene expression, SCNA, patient survival and clinical covariates downloaded from Broad GDAC Firehose that covers 8,749 samples in 28 cancer types.

Differential Gene Expression Analysis: For the comparison to healthy tissues, data from UCSC Xena browser was used, where they normalized the TCGA samples with the 4,723 GTEx healthy tissue samples with exactly same platform which enables proper comparison. The expression of ASNS in these cancer vs. healthy tissue samples were compared using Wilcoxon rank sum test.

Patient Survival Analysis: Melanoma cohort treated with BRAF-i or BRAF-i+MEKi (n=15, 8 patients treated with dabrafenib (BRAF inhibitor), 3 patients treated with vemurafenib (BRAF inhibitor), and 4 patients treated with dabtrafenib+trametinib (MEK inhibitor) was analyzed (Kakavand et al., 2017). Response was determined based on RECIST tumor reduction (responder>30% reduction, non-responder<30% reduction). Effect size was determined by the difference in the median ASNS expression of responders vs. non-responders. ROC analysis was performed to evaluate the performance of ASNS expression in predicting the responders.

Synthetic Lethal Interaction Identification (ISLE): ISLE was used to identify the synthetic lethal (SL) partners of ASNS in patients' tumor, with a slight modification to prioritize those candidates that have evidence in pharmacological functional screens. ISLE proceeds in three steps: (1) ISLE first identifies putative cell-line specific SL gene partners of these down-regulated genes by mining both large-scale in vitro gene knock-down (Cheung et al., 2011; Cowley et al., 2014; Marcotte et al., 2012; Marcotte et al., 2016) and single drug response datasets (Garnett et al., 2012; Iorio et al., 2016). The hypothesis that the pharmacological inhibition of a truly causal SL gene will selectively inhibit the growth of cells lines where its partnered gene is down-regulated underlied the analyses performed. Drug response datasets consisting of the efficacies of 223 drugs across 1,133 cancer cell lines (Garnett et al., 2012; Iorio et al., 2016) were used to tease out such dependencies between genes and their SL partner inhibitors (drug). (2) It then utilizes patients' mRNA expression (RNA-seq) and somatic copy number alterations (SCNA) data from, which covers 8,749 patient samples across 28 cancer types and integrates clinical data. It identifies, among the candidate pairs emerging from the first step, those interactions that are clinically relevant; Specifically, it identifies candidate SL pairs whose co-inactivation, inferred from tumor-specific genomic and transcriptomic data, is underrepresented among the tumors due to negative selection. It then further filters the emerging candidate SL pairs by prioritizing those whose co-inactivation is associated with better prognosis in patients. Stratified Cox proportional hazard model was used to check this association, while controlling for various confounding factors including cancer types, genomic instability (Bilal et al., PLoS Comput Biol 9, e1003047. 2013), sex, age, and race:

$$h_g(t,\text{patient}) \sim h_{0g}(t)\exp(\beta_1 I(A,B) + \beta_2 \text{age} + \beta_3 GII) \quad (1)$$

where g is an indicator variable over all possible combinations of patients' stratifications based on cancer-type, race, and sex. $h_g$ is the hazard function (defined as the risk of death of patients per unit time), and $h_{0g}(t)$ is the baseline-hazard function at time t of the $g^{th}$ stratification. The model contains four covariates: (i) I(A,B): indicator variable if LDHA and the gene of interest both down-regulated in the patient's tumor, (ii) age: age of the patient, (iii) GII: genomic instability index. GII measures the relative amplification or deletion of genes in a tumor based on the SCNA. Given si be the absolute of log ratio of SCNA of gene i in a sample relative to normal control, GII of the sample is given as in Bilal et al. (Bilal et al., PLoS Comput Biol 9, e1003047. 2013):

$$GII = 1/N \Sigma_i^N I(s_i > 1). \quad (2)$$

The βs are the regression coefficient parameters of the covariates, which quantify the effect of covariates on the survival. All covariates are normalized to N(0,1). The βs are determined by standard likelihood maximization of the model (Therneau and Grambsch, Modeling survival data: extending the Cox model. (New York: Springer 2000) using the R-package "Survival".

Polysome Profiling: Polysome profiling was performed as described previously (Gandin et al., 2014). A375 cells were seeded at 30% confluency in a 15-cm Petri dish and transfected with NT-siRNA, si-ASNS, si-MNK1 (#1), or si-ASNS+si-MNK1 for 16 hr, using JetPrime transfection reagent (Polyplus) as per manufacturer's instruction. Post-transfection, cells were replenished with fresh media containing vehicle (DMSO) or 500 nM PLX-4032 (Selleck-chem) for 48 hr treatment. Cells were harvested at 80% confluency, washed twice with ice cold PBS containing 100 µg/mL cycloheximide and then lysed in hypotonic lysis buffer (5 mM Tris HCl pH 7.5, 2.5 mM MgCl2, 1.5 mM KCl, 100 µg/ml cycloheximide, 2 mM dithiothreitol (DTT), 0.5% Triton, 0.5% sodium deoxycholate). Optical density values at 260 nm (OD260) were measured in each lysate and OD260 of ~5 were then loaded in 5-50% sucrose gradients generated using Gradient Master (Biocomp, Fredericton, NB). 10% of lysates were saved as input samples for total RNA extraction. Sucrose gradients were subjected to ultra-centrifugation (SW41 Ti 11E1698 rotor; Beckman 39,000 RPM for 2 hr at 4° C.) and fractionated by displacement using 60% sucrose/0.01% bromophenol blue, on ISCO Foxy fraction collector (35 sec for each fraction ~750 μL per fraction) equipped with an ultraviolet lamp for continuous absorbance monitoring at 254 nm. After fractionation, Trizol LS (Thermofisher) was immediately added to all fractions and stored at −80° C. Following RNA extraction from each fraction, RNA samples from subpolysomal fractions 6-8 (Pool 1), light fractions 9-11 (Pool 2), and heavy fractions 12-16 (Pool 3) were pooled. cDNA was synthesized using oligo(dT) and random primers (AB Bioscience), and qPCR analysis was performed with SYBR Green (Roche, NJ, USA). Relative change in the transcript levels in different pools was determined by the 2-ΔΔCT method, and shown as fold-change relative to mock-treated cells. β-Actin was used as an internal control.

In Vivo Studies: All animal studies were conducted in the SBP Medical Discovery Institute Animal Facility in accordance with the Institutional Animal Care and Use Committee guidelines. 8-week-old males C57BL/6 mice were purchased from Jackson laboratories (Bar Harbor, ME) and allowed to acclimatize for 1 week. $KRAS^{LSLG12D/+}$. $p53^{R172H/+}$; $PDX^{Cretg/+}$ (KPC/B6) pancreatic cancer cells (1×10^6, suspended in 30 μl sterile PBS) were orthotopically injected into head of the pancreas. After one week, mice were randomized and sorted into treatment groups (n=8 animal/group). L-A'ase (60 IU/animal) was administered daily for five times a week for 3 weeks intraperitoneally. MEK inhibitor PD-325901 (4 mg/kg) in 0.5% (w/v) hydroxy-propyl-methylcellulose, 0.2% (v/v) Tween 80 (Sigma) was administered by oral gavage twice a week for 3 weeks. For in vivo melanoma study, 8-week-old male C57BL/6 mice were injected subcutaneously in the flank with 2×10^5 MaNRAS1 (1007) cells. When tumors reached ~250 mm³, mice were randomized and sorted into treatment groups (n=8 animal/group). L-A'ase and PD-3259011 were administered as above for the pancreatic tumor study for the duration indicated in FIG. 7H.

Mice were maintained in a pathogen-free environment with free access to food. Tumor volume was measured blinded twice a week. Tumor volume was measured with linear calipers and calculated using the formula: ([length in millimeters x (width in millimeters)2]/2). After the mice were sacrificed, tumors were frozen or fixed in Z-Fix (Anatech, Battle Creek, MI) and embedded in paraffin for immunohistochemistry. Snap frozen tumors were utilized for protein and RNA extraction for further analysis.

Immunohistochemistry: 5 mm sections were cut in a Leica Microsystems cryostat and transferred onto Superfrost-Plus slides (Fisher Scientific), followed by staining with hematoxylin and eosin (H&E). For immunohistochemistry, the sections were deparaffinized and rehydrated, and antigen was retrieved using Dako target retrieval solution (Dako, Santa Clara, CA). To quench endogenous peroxidase activity incubation with 3% hydrogen peroxide for 30 min was performed. Specimens were incubated with cleaved caspase-3 antibody (Cell Signaling Technology), diluted in Dako antibody diluent overnight at 4° C., followed by 3 washes with PBS/0.03% Tween-20 and incubation with Dako Labeled Polymer-HRP for 1 hr at room temperature. Following three washes with PBS containing 0.03% Tween-20, the sections were incubated with DAB chromogen and counterstained with hematoxylin.

Statistical Analysis: Statistical significance between two groups was assessed by the unpaired Student's t-test. Ordinary one-way ANOVA was used to analyze more than two groups. Two-way ANOVA was utilized to analyze cell proliferation at multiple time points. GraphPad Prism 5 software (Graphpad, La Jolla, CA) was used for to perform all statistical calculations.

Figure 1B:
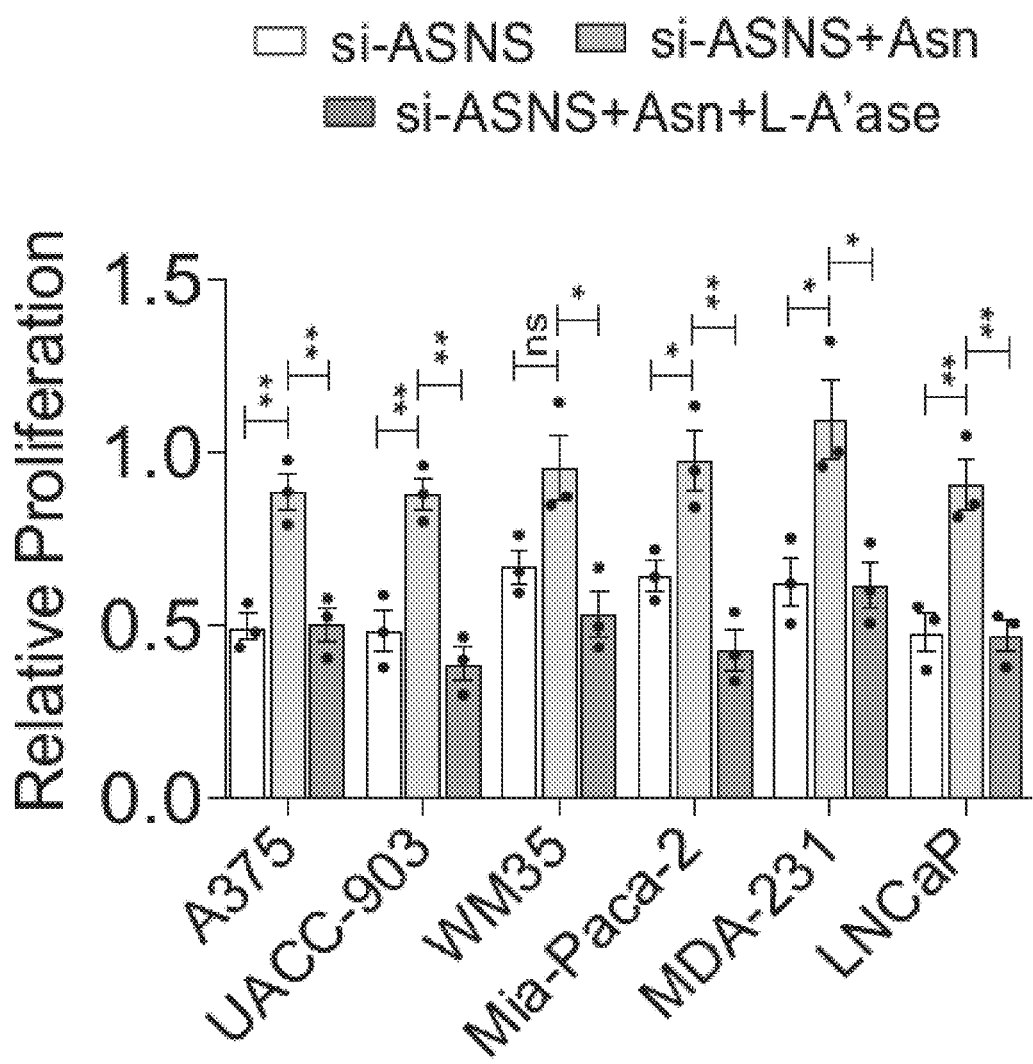
(FIG. 1B) Proliferation of cancer lines 72 hr after indicated treatment. L-asparagine (0.3 mM) and L-Asparaginase (L-A'ase, 1 U/ml). Data are shown relative to mock (NT-siRNA+dH20)-treated cells.
Figure 2A:
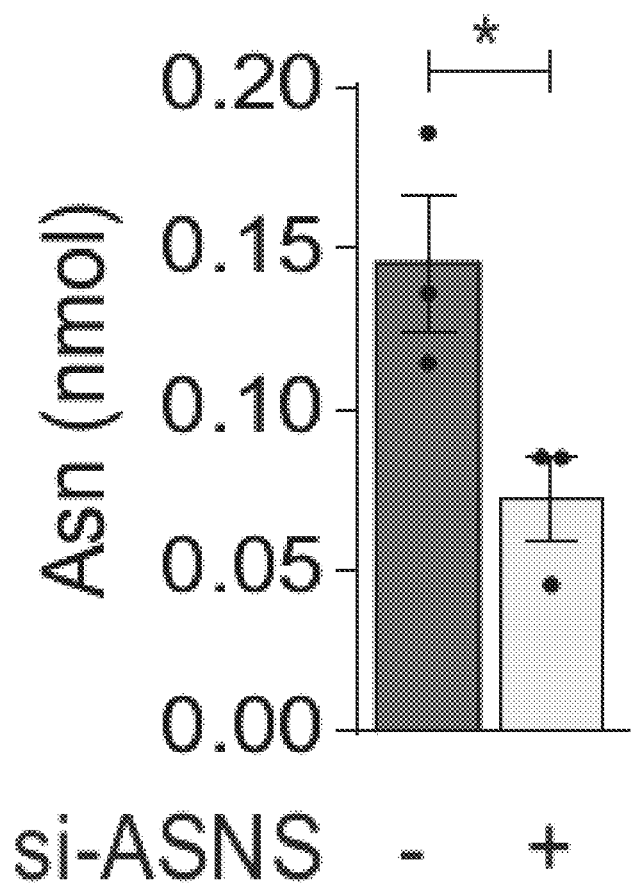
(FIG. 2A) GC-MS-based estimation of intracellular asparagine levels in UACC-903 cells 72 hr after treatment with si-ASNS.
Figure 2B:
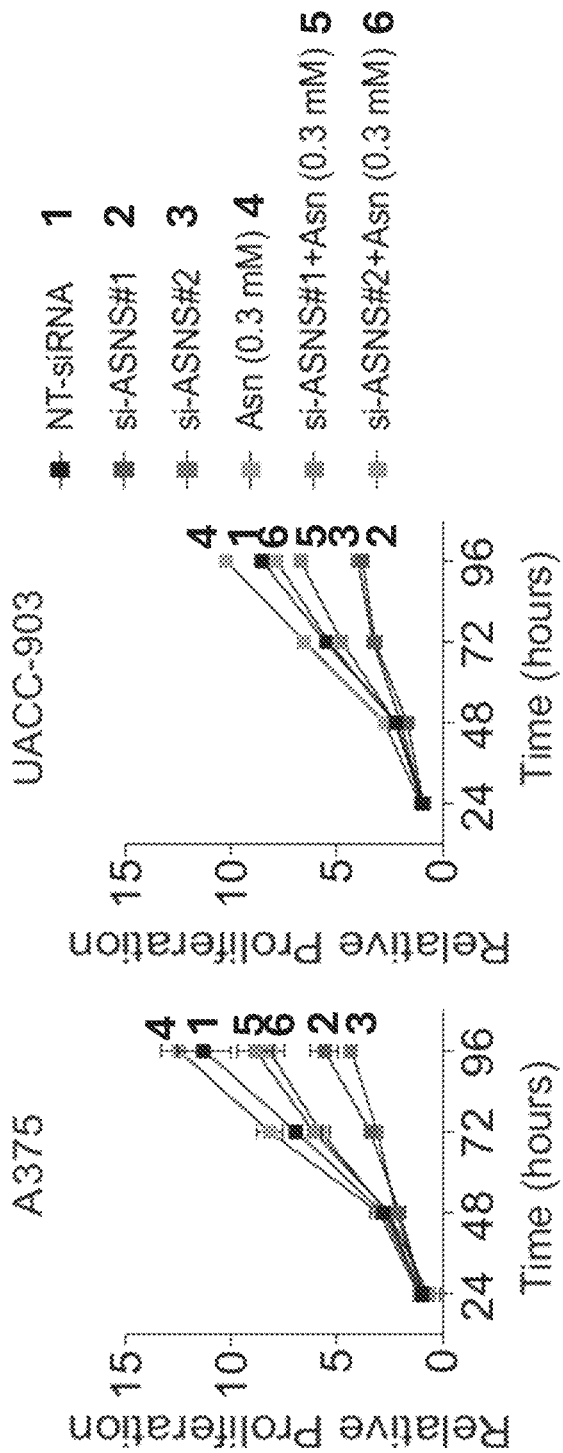
(FIG. 2B) Relative proliferation of A375 and UACC-903 cells treated with si-ASNS #1 or si-ASNS #2, with or without supplementation with L-asparagine (0.3 mM), over the indicated time course.

Example 2. ATF4 Signaling Impedes Growth-Suppression Due to Asparagine Limitation To understand how asparagine levels modulate cancer cell growth, the effect of RNAi-mediated depletion of ASNS was evaluated, utilizing two independent siRNA (si-ASNS #1 and #2) in a panel of cancer lines (pancreatic, Mia-Paca-2, Panc-1 and BX-PC3; breast, MDA-231 and MCF7; prostate, PC-3 and LNCaP; and melanoma, WM-35, WM1366, A375, UACC-903, and Sk-Mel28). ASNS knockdown suppressed proliferation in all cell lines tested relative to those transduced with non-targeting (NT)-siRNA (FIG. 1A). Gas chromatography-mass spectrometric (GC-MS) analysis of intracellular amino acid pools in UACC-903 melanoma cells showed suppression in intracellular asparagine levels upon ASNS depletion (FIG. 2A; Knott et al., Nature 554, 378-381(2018)). Asparagine is a non-essential amino acid synthesized from aspartate and glutamine; thus in the absence of de novo biosynthesis, cells meet metabolic needs through asparagine uptake (Pavlova et al., Cancer 117, 238-249 (2018)). Accordingly, ASNS knockdown had significantly lower impact on proliferation of pancreatic cancer and melanoma cells cultured in the presence of asparagine, relative to cells cultured in asparagine-free medium (FIGS. 1B, FIG. 2B). However, si-ASNS-treated cells grown in the presence of asparagine-containing medium together with the asparagine-hydrolyzing enzyme L-Asparaginase (L-A'ase) showed decreased proliferation (FIG. 1B). Thus, curtailing both de novo biosynthesis and exogenous asparagine availability is required to effectively suppress cancer cell proliferation.

Figure 1C:
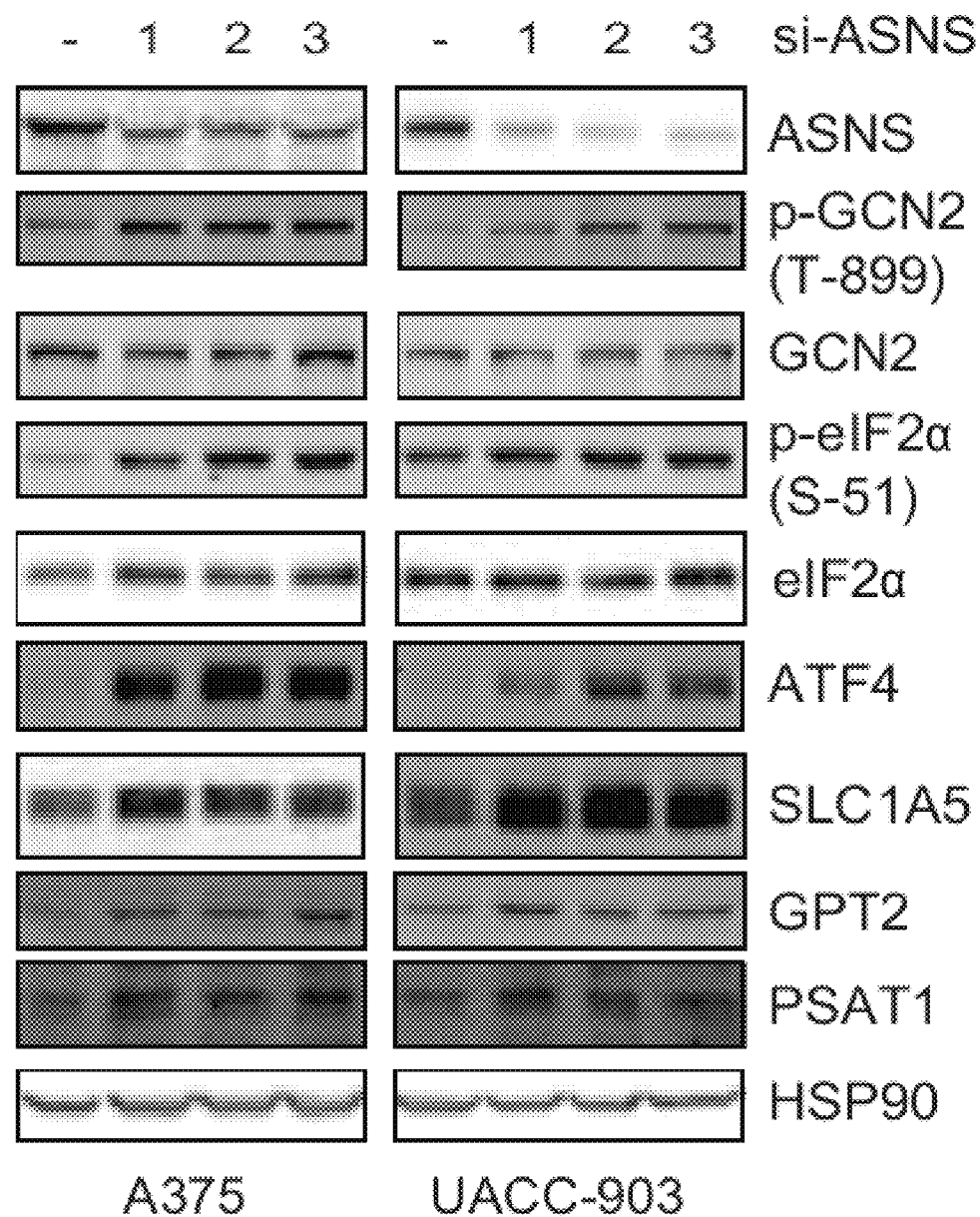
(FIG. 1C) Immunoblotting of amino acid response (AAR) pathway proteins in A375 and UACC-903 cells 72 hours after treatment with si-ASNS #1, #2, or #3.
Figure 1D:
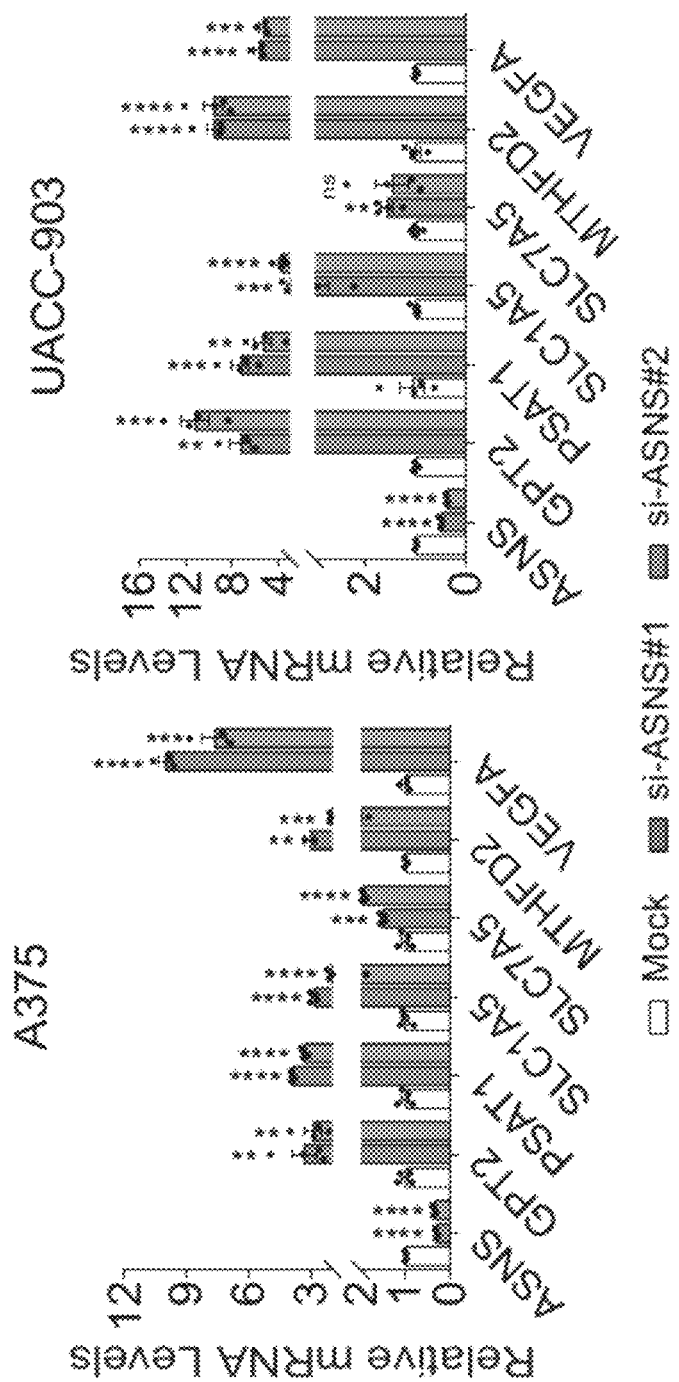
(FIG. 1D) qRT-PCR of transcripts encoding ATF4 targets in A375 and UACC-903 cells 48 hr after treatment with si-ASNS #1 or #2.
Figure 1E:
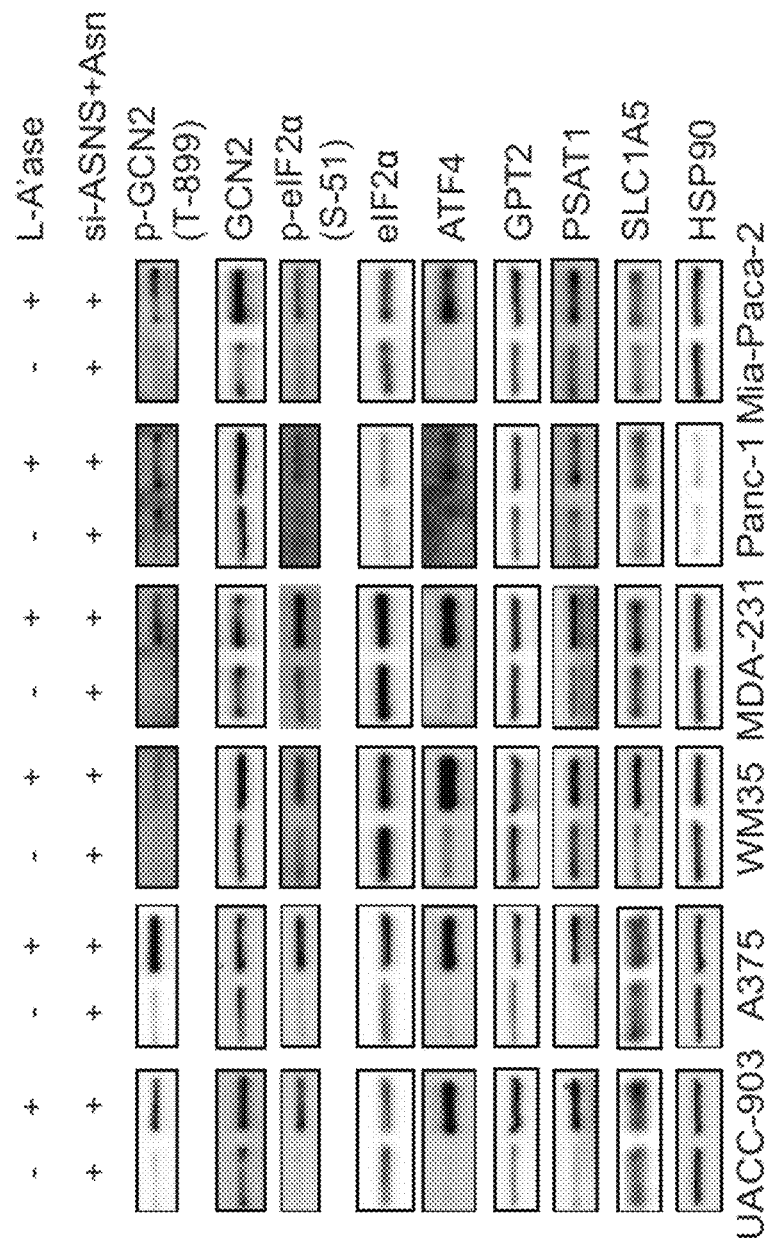
(FIG. 1E) Immunoblotting of AAR pathway proteins in indicated cancer lines 72 hr after combined treatment with si-ASNS and L-asparagine (0.3 mM), with or without L-A'ase.
Figure 2C:
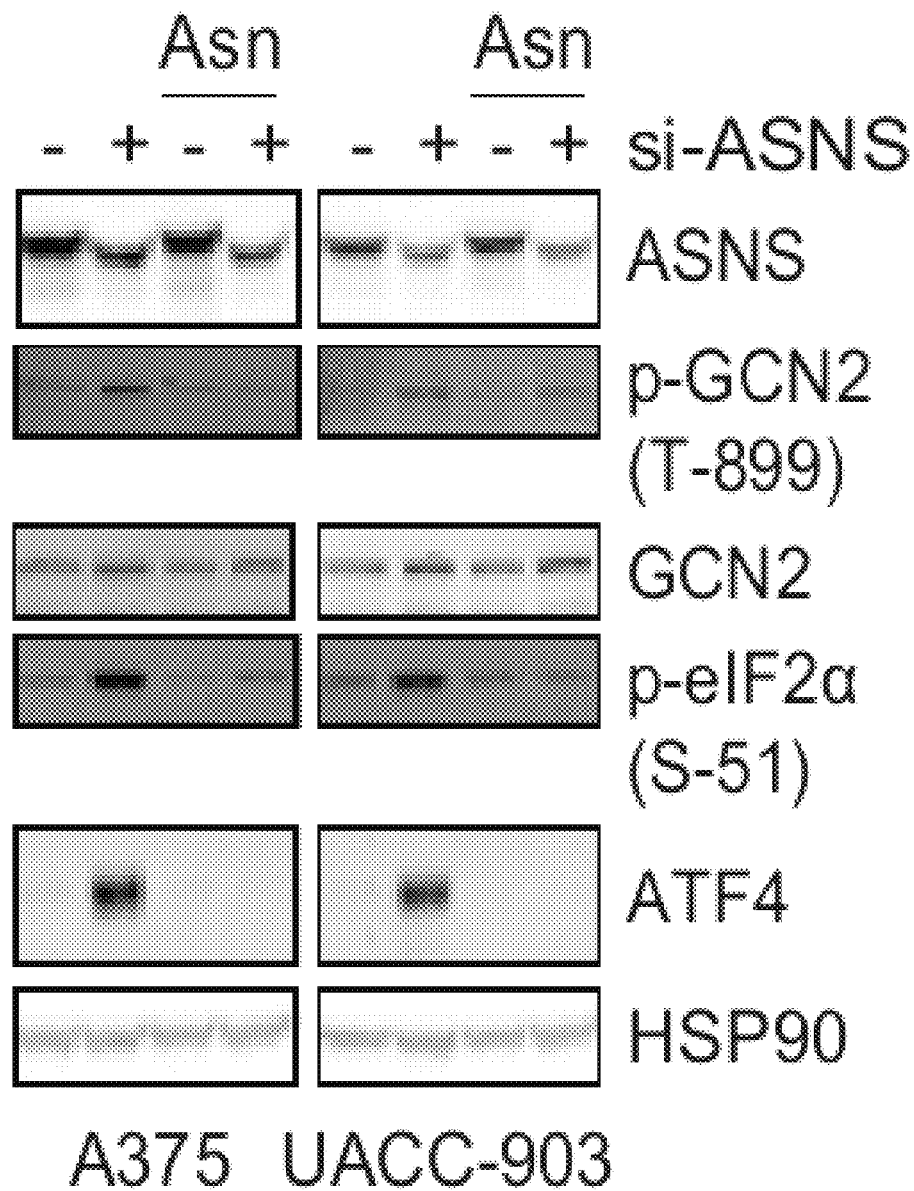
(FIG. 2C) Immunoblotting of ASNS, ATF4, phosphorylated and total GCN2, and phosphorylated eIF2α in melanoma lines 72 hr after treatment with si-ASNS, L-asparagine (0.3 mM), or both.

Decrease in intracellular amino acid levels activates GCN2 kinase, which leads to eIF2a phosphorylation and inhibition of recycling of the ternary complex (TC) comprised of eIF2a, GTP and initiator tRNA (Wek, 2018). This results in reduction in overall protein synthesis, while leading to translational activation of a subset of mRNAs which harbor specific 5'UTR elements (e.g. inhibitory upstream open reading frames (uORFs)) including EGFR and ATF4 mRNA (Fernandez et al., 2005). ASNS depletion in A375 and UACC-903 cells revealed activation of GCN2, which was accompanied by increased eIF2a phosphorylation compared to control cells (FIG. 1C). GCN2 induction and eIF2a phosphorylation in ASNS depleted cells were paralleled by increase in ATF4 protein levels and elevated expression of ATF4 target genes, including glutamic pyruvate transaminase (GPT2), phosphoserine aminotransferase (PSAT1), solute carrier family 1 member 5 (SLC1A5), solute carrier family 7 member 5 (SLC7A5), pyrimidine biosynthetic enzyme methylene tetrahydrofolate dehydrogenase 2 (MTHFD2), and vascular endothelial growth factor A (VEGFA) (FIGS. 1C and 1D). Overall, these changes reflect activation of the Amino Acid Response (AAR) pathway (Kilberg et al., 2009). Importantly, activation of the GCN2-ATF4 axis following ASNS knockdown was abrogated by the addition of L-asparagine to the medium (FIG. 2C). To activate the GCN2-ATF4 axis it was necessary to inhibit both endogenous ASNS activity (with si-ASNS) and exogenous asparagine (with L-A'ase; FIG. 1E).

Figure 1F:
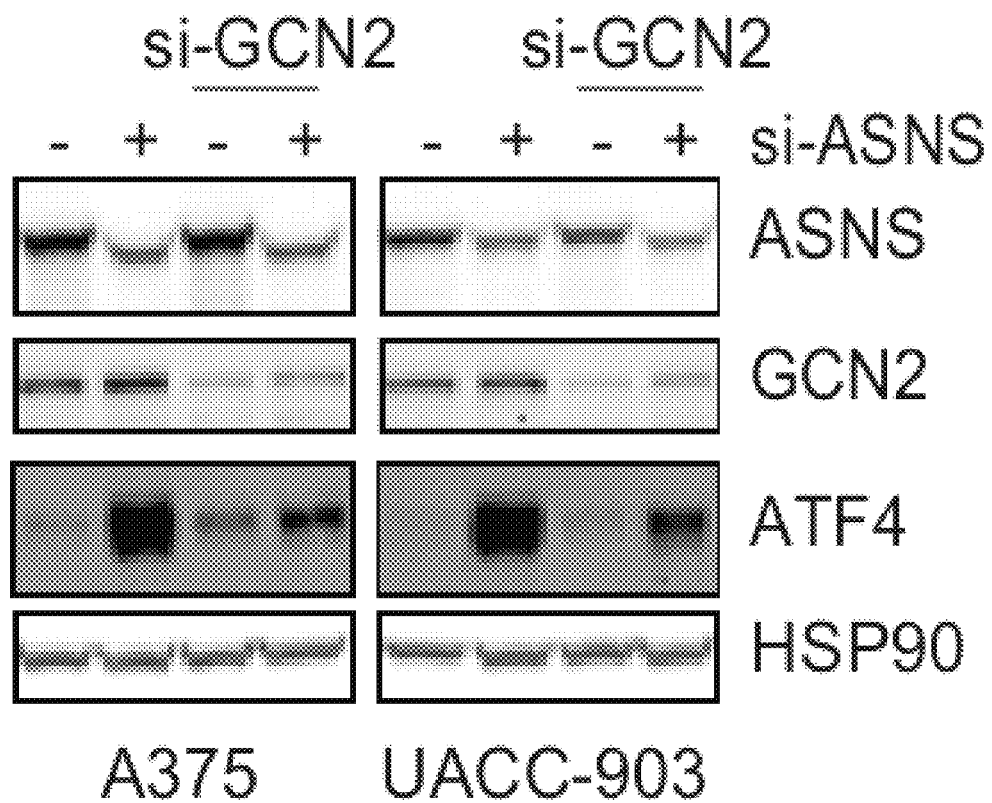
(FIG. 1F) Immunoblotting of ASNS, GCN2, and ATF4 in A375 and UACC-903 cells 72 hours after treatment with si-ASNS, si-GCN2, or both.
Figure 1G:
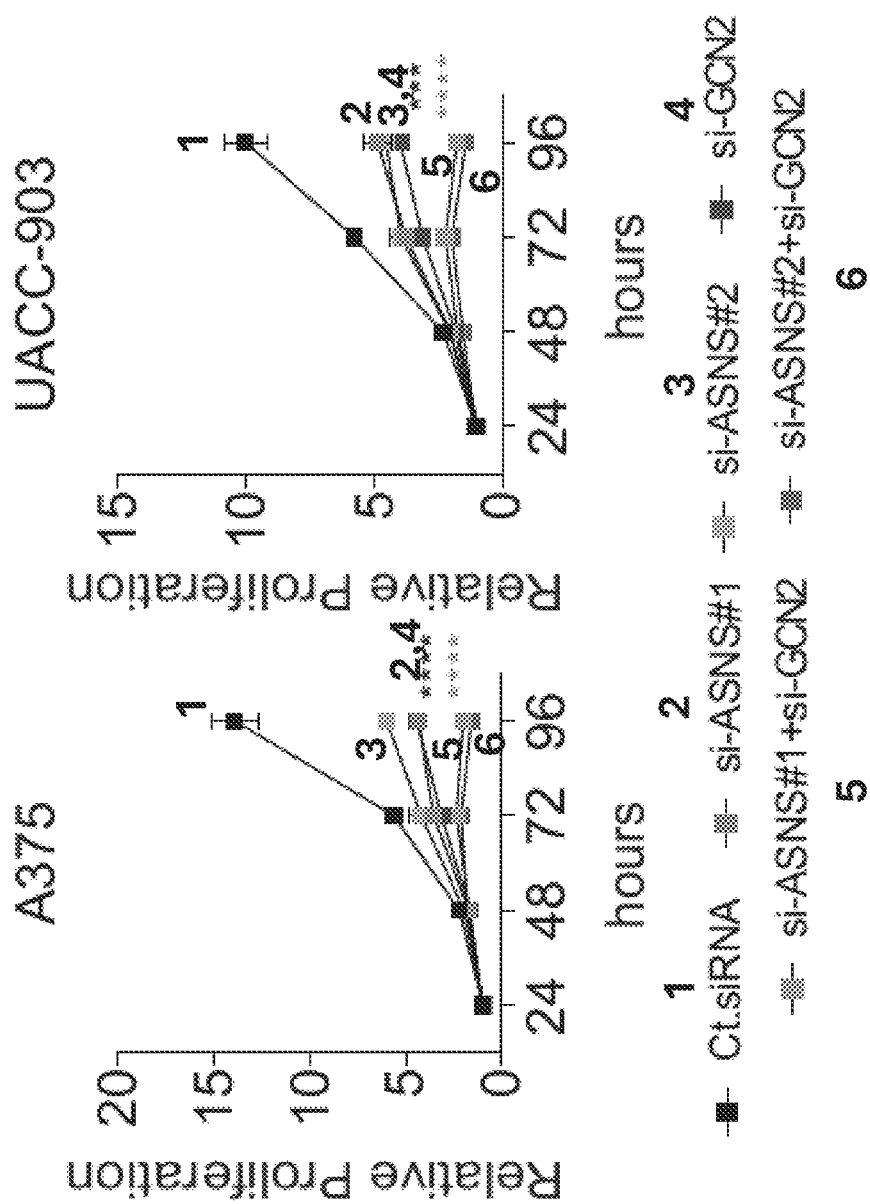
(FIG. 1G) Proliferation of melanoma cell lines over indicated times following treatment with si-ASNS, si-GCN2, or both.
Figure 1H:
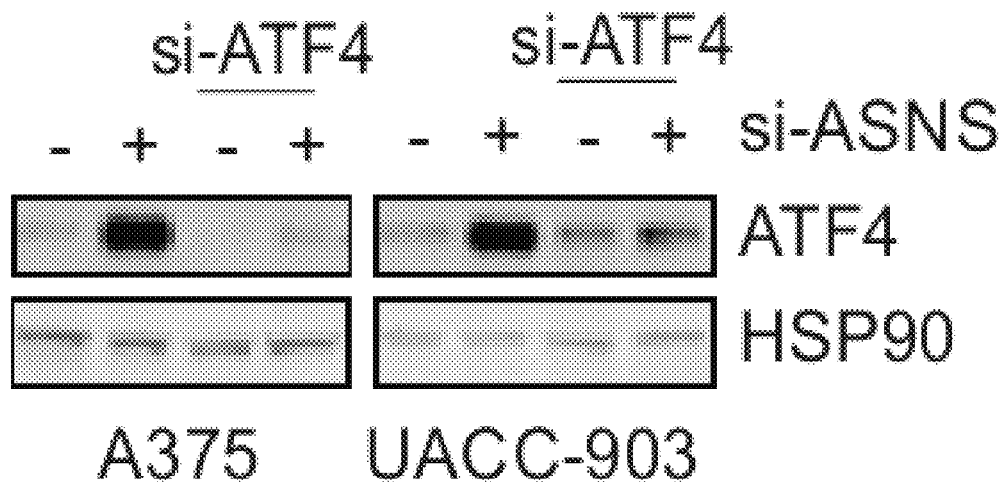
(FIG. 1H) Immunoblotting of ATF4 in melanoma cell lines 72 hours after treatment with si-ASNS, si-ATF4, or both.
Figure 1I:
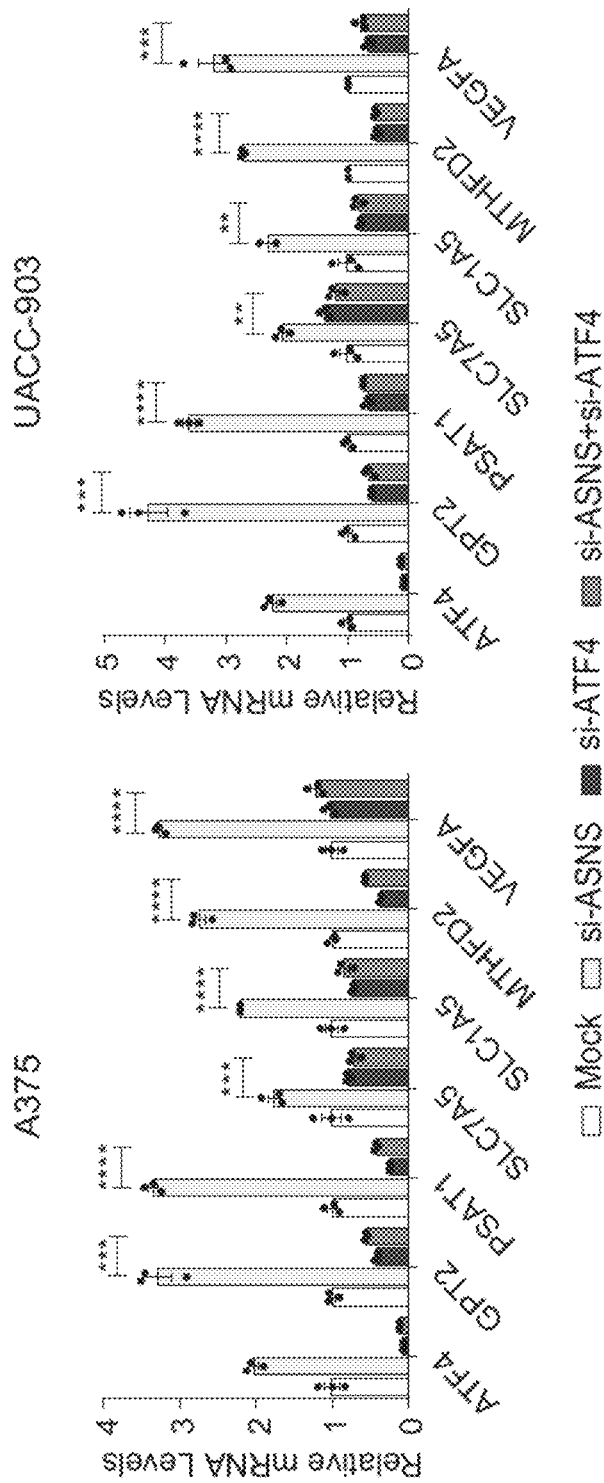
(FIG. 1I) qRT-PCR of transcripts encoding ATF4 targets in A375 and UACC-903 cells treated as in (H) for 48 hr.
Figure 1J:
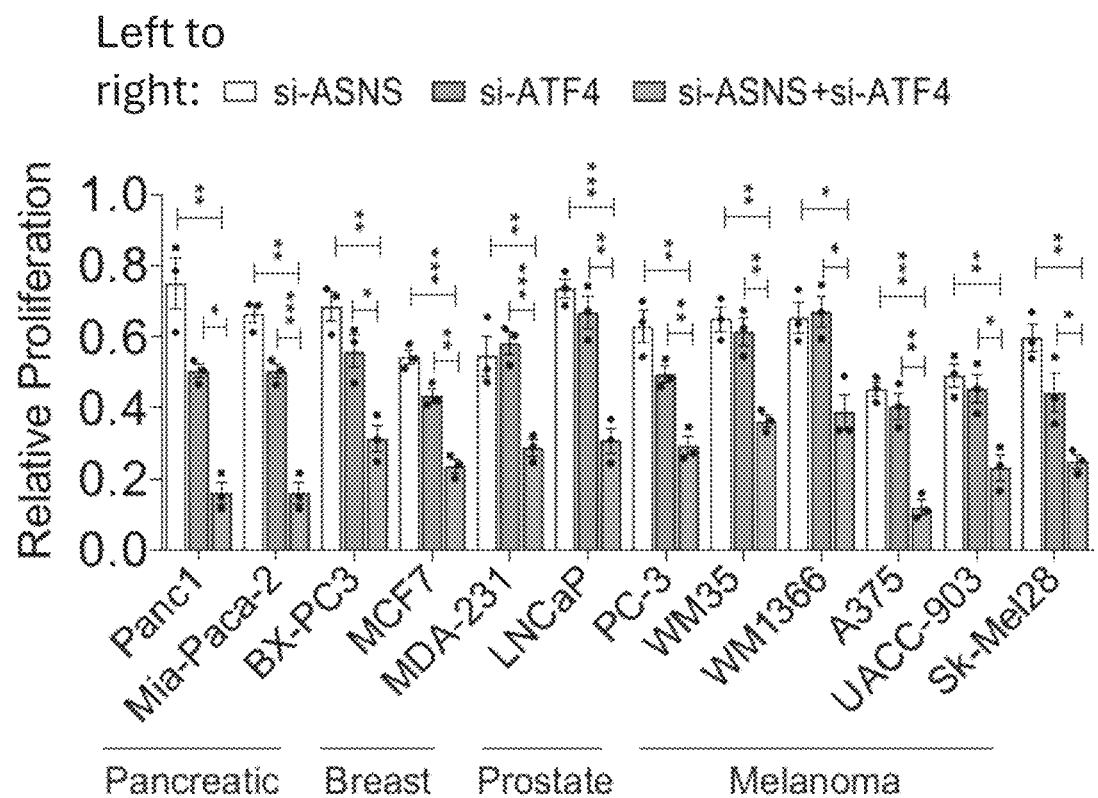
(FIG. 1J) Proliferation of cancer lines treated as in (H) for 48 hr.
Figure 1K:
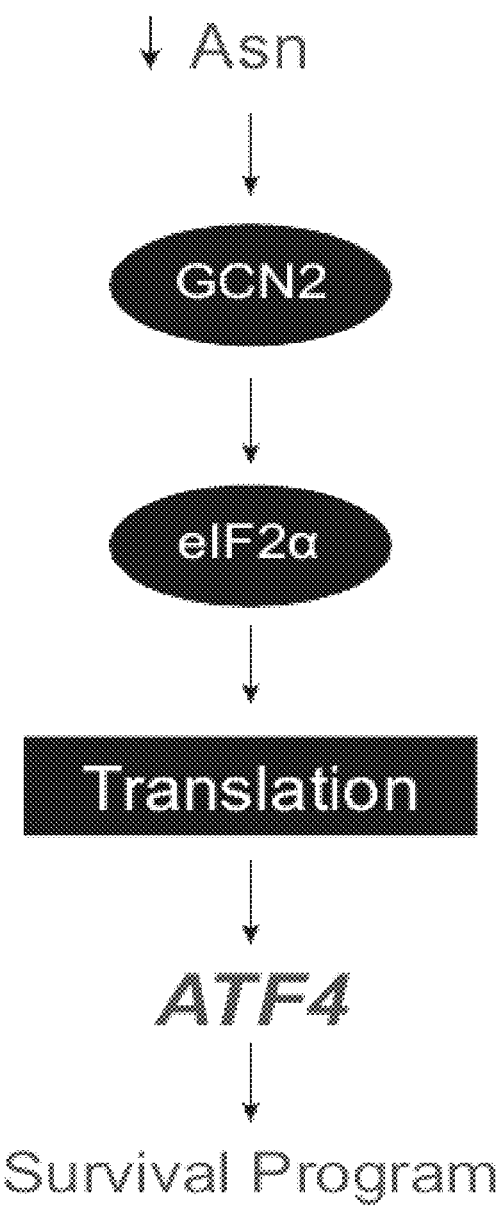
(FIG. 1K) Model depicting pathway of ATF4 induction following ASNS suppression. Data are presented as the mean±SEM. Statistical significance (**p<0.0001; *p<0.001; **p<0.01; *p<0.05; ns, not significant) was calculated using unpaired t-test except in (FIG. 1G), where two-way Anova was used. In (FIG. 1G) black and orange stars correspond to the comparison between si-ASNS #1 and si-ASNS #1+si-GCN2 and si-ASNS #2 and si-ASNS #2+si-GCN2 respectively.
Figure 2D:
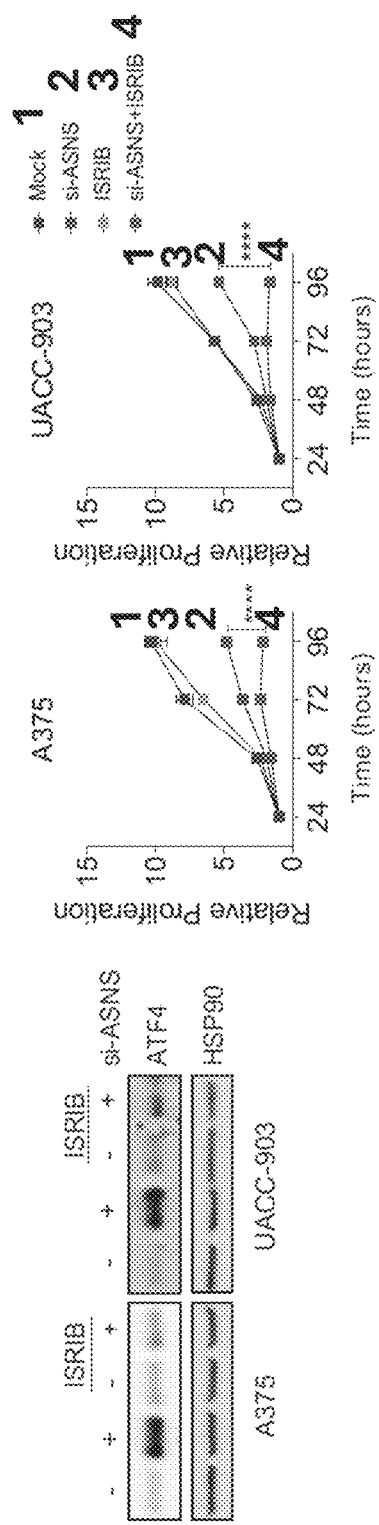
(FIG. 2D) Immunoblotting of ATF4 in melanoma lines 72 hr after treatment with si-ASNS, ISRIB (200 nM), or both (left). Relative proliferation of melanoma lines treated as in (left) for indicated time course (right). Data are presented as the mean±SEM. Statistical significance (****p<0.0001; *p<0.05) was calculated using unpaired t-test for (FIG. 2A) and two-way Anova for (FIG. 2D).

GCN2-ATF4 pathway activation serves as a therapeutic roadblock (Nakamura et al., Proc Natl Acad Sci USA 115, E7776-E7785 (2018)). Thus, disruption of this axis may potentiate the effects of ASNS inhibition. To test this, both GCN2 and ASNS were silenced in melanoma cells. While both si-GCN2 and si-ASNS suppressed cell proliferation, GCN2 silencing blocked si-ASNS-associated ATF4 induction and further inhibited cell proliferation in combination with si-ASNS (FIGS. 1F and 1G). Additionally, depletion of ATF4 by RNAi abrogated transcriptional upregulation of genes induced by si-ASNS, while simultaneous depletion of ASNS and ATF4 more effectively attenuated proliferation of all tested cancer cell lines relative to si-ASNS alone (FIGS. 1H-1J). Finally, suppression of ATF4 induction by ISRIB, which disrupts translational induction of ATF4 by facilitating TC recycling despite eIF2α hyperphosphorylation (Sidrauski et al., 2015), potentiated anti-proliferative effects of ASNS depletion in melanoma cells (FIG. 2D). Together, these data demonstrate the importance of co-targeting the GCN2-ATF4 axis for effective suppression of cancer cell proliferation in response to asparagine limitation (FIG. 1K).

Figure 3A:
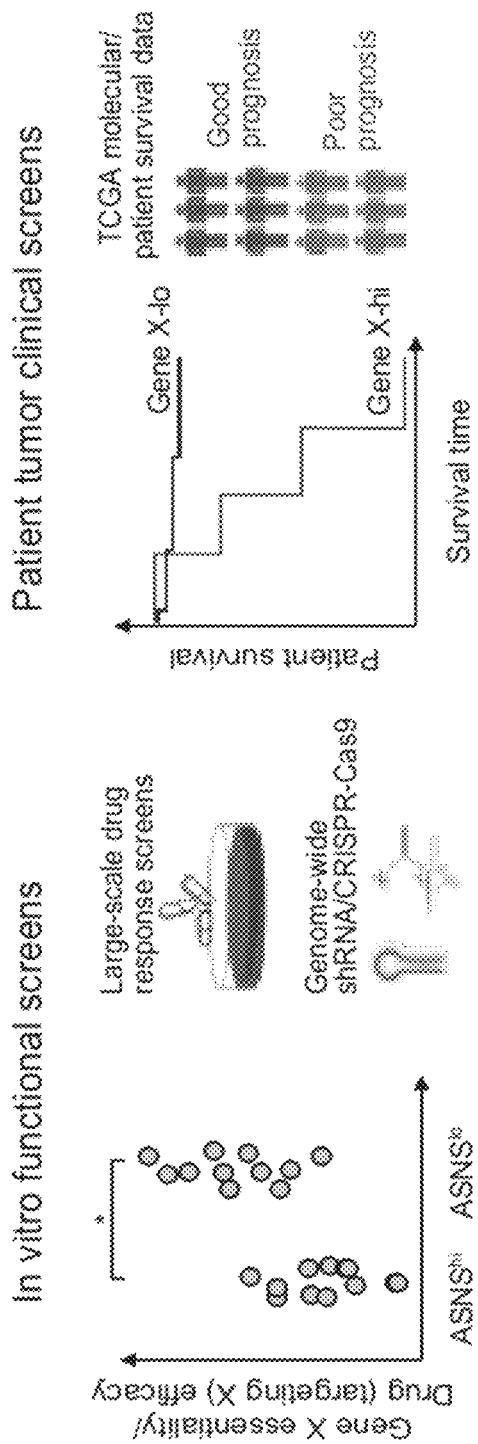
(FIG. 3A) pipeline comprising functional in vitro and patient tumor clinical screens, to identify synthetic lethal partners of ASNS.
Figure 3C:
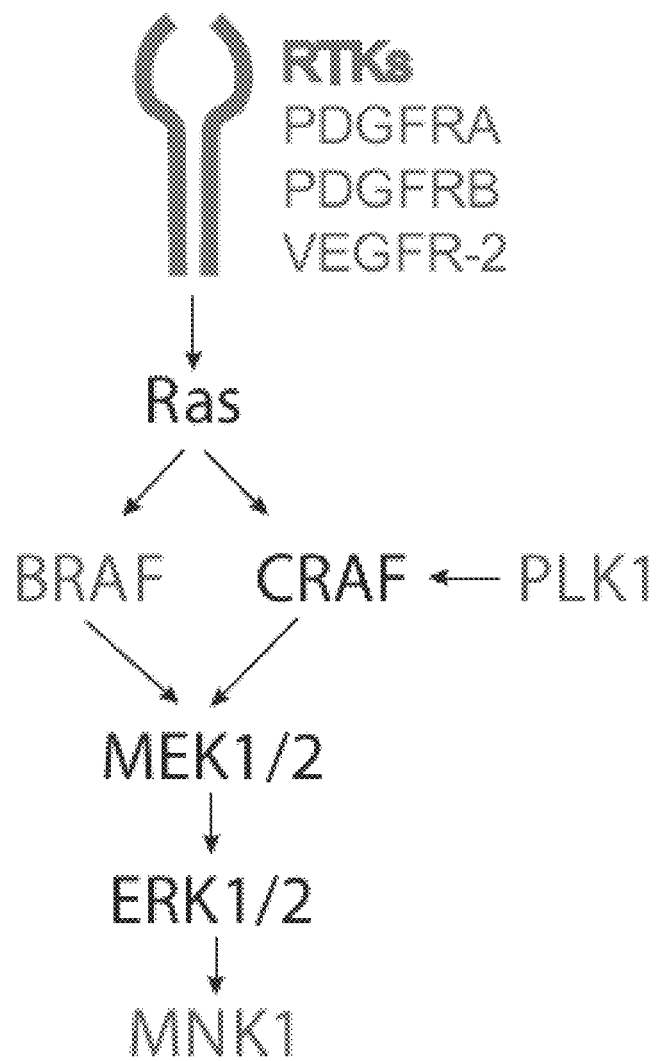
(FIG. 3C) Schematic representation of ASNS synthetic lethal partners in the context of the MAPK signaling pathway.

Example 3. Bioinformatics Pipeline Identifies MAPK as a Druggable Candidate Synthetic Lethal Signaling Pathway with ASNS To define cellular mechanisms underlying tumor cell responses to asparagine limitation, a recently established bioinformatic pipeline that identifies clinically relevant Synthetic Lethal Interactions (ISLE; (Lee et al., Nat Commun 9, 2546 (2018)) was used. ISLE, which mines large cellular screens and the TCGA compendium (FIG. 2A) enabled the identification of putative synthetic lethal partners of ASNS. Seven candidate genes were identified as synthetic lethal (SL) partners of ASNS (FIG. 3B), including three RTKs (VEGFR-2, PDGFR-A, and PDGFR-B), Mitogen-Activated Protein Kinase Kinase Kinase (MAP3K; BRAF) and MAP kinase-interacting serine/threonine protein kinase (MKNK1 or MNK1), an effector of MAPK signaling. Also identified was Polo-like Kinase 1, a Ser/Thr kinase that activates MAPK signaling through CRAF phosphorylation (Wu et al., Elife 5. (2016)). Identification of multiple candidates that are either direct components or modulators of MAPK signaling suggested that this signaling pathway may provide synthetic vulnerability for ASNSlo tumors (FIG. 3C).

Figure 3D:
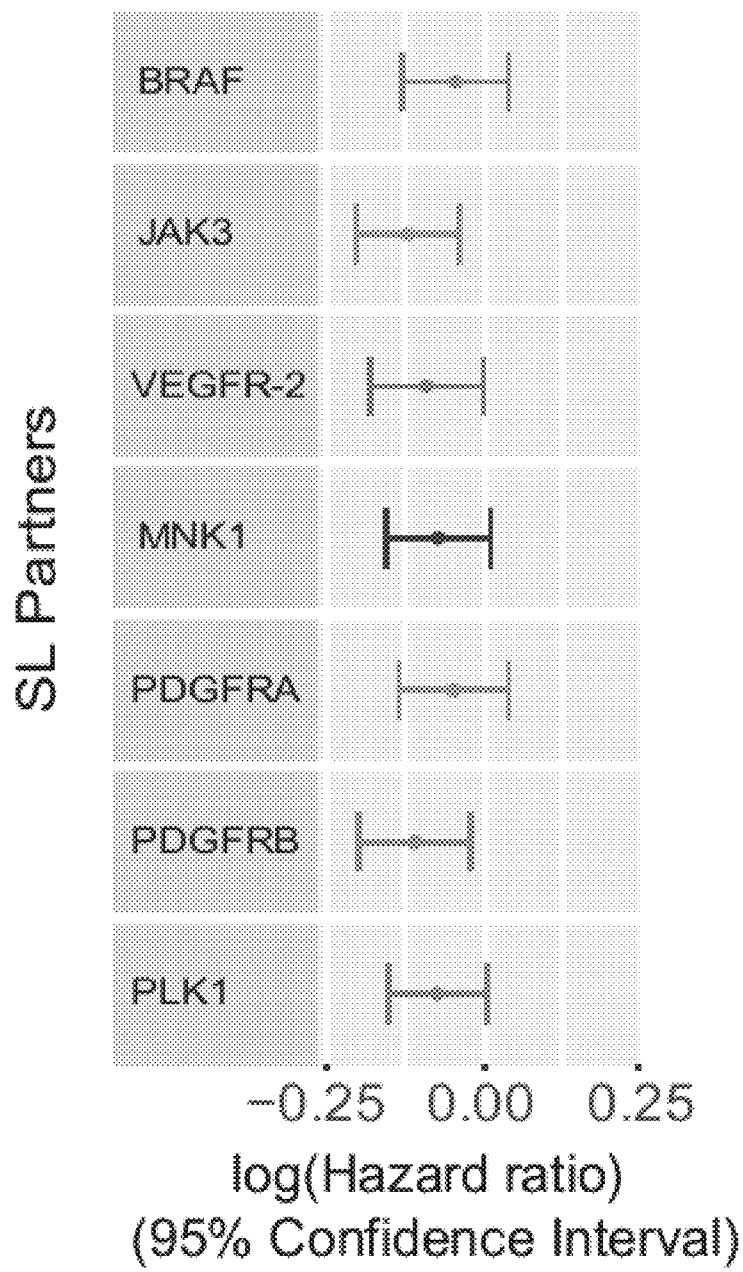
(FIG. 3D) Forest plot depicting the reduction in cancer-related death risk when the identified SL partners are underexpressed together with ASNS. x-axis shows the hazard ratio in logarithmic scale, and y-axis shows the identified SL partners. The dots denote the hazard ratios, and error bars denote their confidence interval.
Figure 3E:
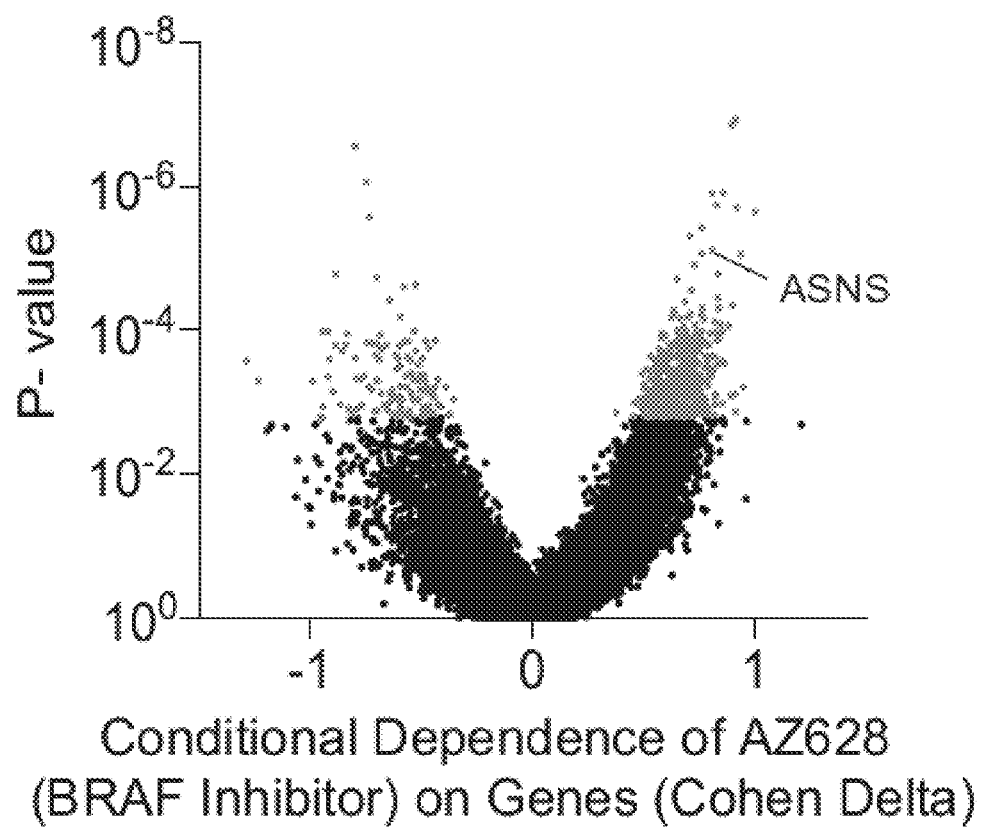
(FIG. 3E) Volcano plot depicting sensitivity to BRAF inhibitor AZ628 as a function of gene expression for pan-genes. Significance was evaluated using Wilcoxon rank sum test comparing the sensitivity of AZ628 in cell lines with high vs. low expression of each gene partitioned by its median expression, and the effect size was quantified with Cohen's D. Low ASNS expression is one of the top predictors of sensitivity to BRAF inhibitor.
Figure 3F:
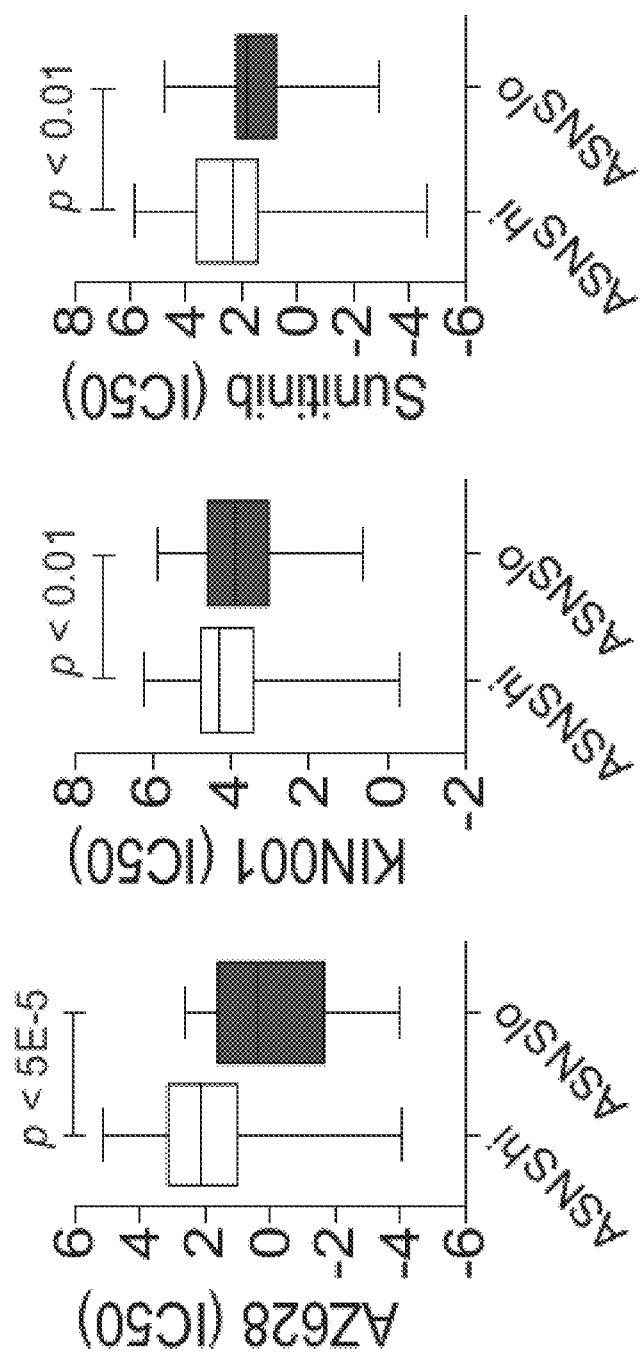
(FIG. 3F) Sensitivity to the BRAF inhibitor AZ268, MNK1 inhibitor KIN001-266, and pan-RTK inhibitor sunitinib of pan-cancer cell lines segregated based on high (ASNShi) and low (ASNSlo) ASNS expression. Wilcoxon rank sum P-values are denoted for each drug.
Figure 3G:
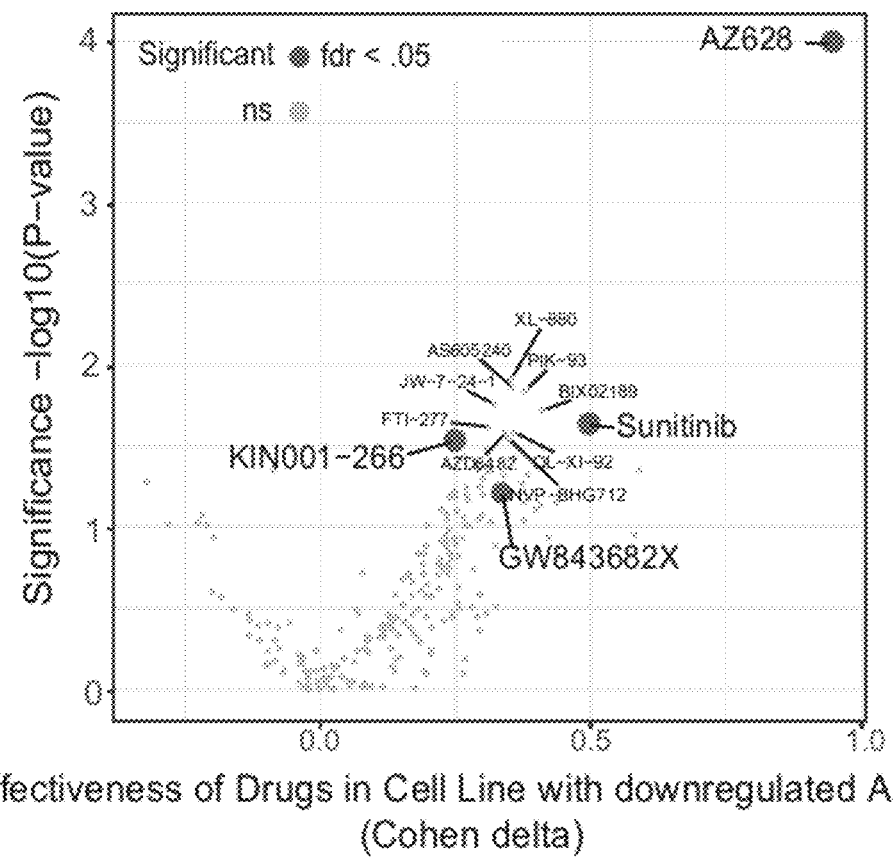
(FIG. 3G) Volcano plot showing drugs with the highest effectiveness in cell lines with low ASNS expression. Drugs inhibiting the identified ASNS synthetic lethal partners are shown in blue.
Figure 3H:
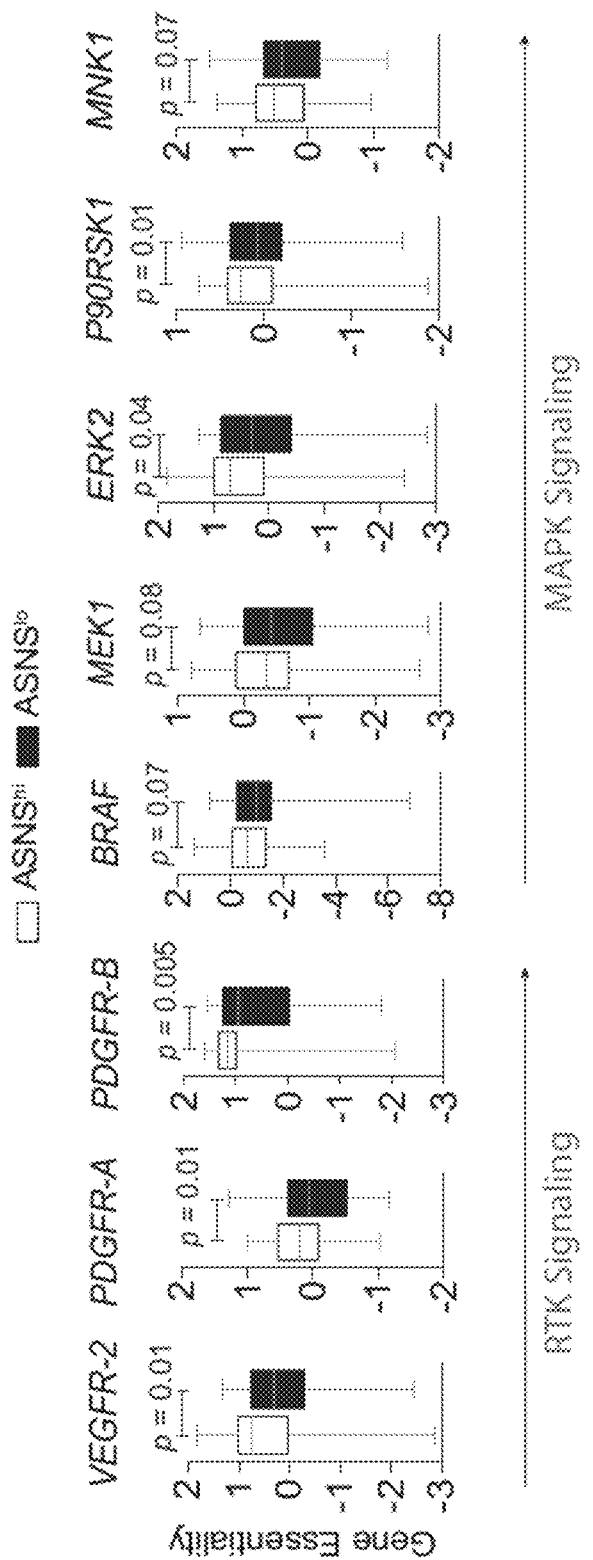
(FIG. 3H) Conditional essentiality of RTKs (VEGFR-2, PDGFR-A, and PDGFR-B) and MAPK signaling pathway genes (BRAF, MEK1, ERK2, P90RSK1, and MNK1) in ASNSlo and ASNShi cell lines (n=67, each group). Wilcoxon rank sum P-values are denoted for each gene knockdown.
Figure 4:
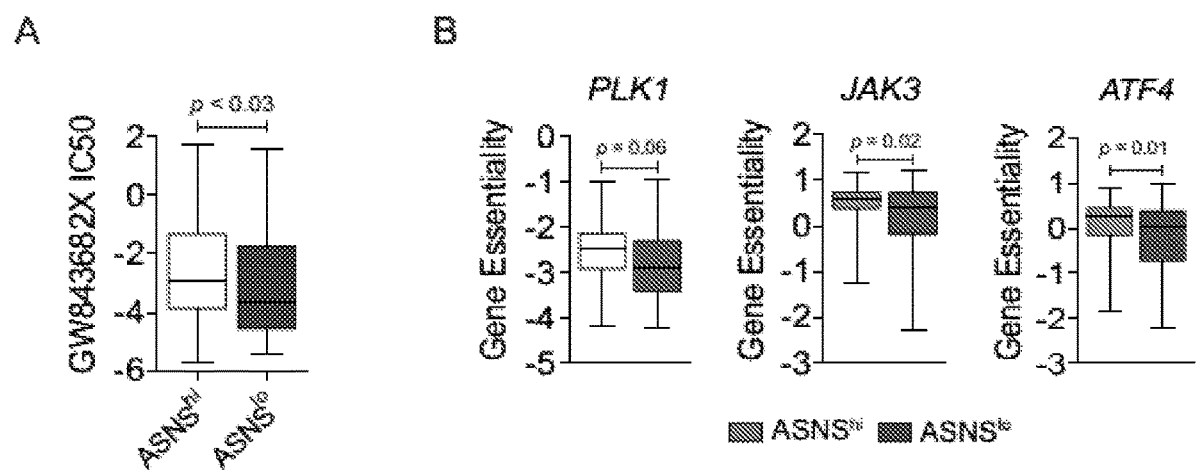
FIG. 4 depicts in-Silico Pan-Tumor Analysis Predicts Synthetic Lethal Partners of ASNS.

Notably, all identified SL partners significantly reduce the risk of cancer-related death when inactivated together with ASNS (FIG. 3D). Further, SL analyses revealed ASNS expression as one of the strongest predictors of response to the BRAF inhibitor AZ628 (FIG. 3E). Cancer lines segregated based on high or low ASNS expression showed greater sensitivity to the pharmacological inhibitors of the predicted SL partners in the subset with low ASNS expression (FIGS. 3F, 3G, 4A; note lower IC50 values in ASNSlo subset in 3F and 4A; (Garnett et al., Nature 483, 570-575 (2012); Iorio et al., Cell 166, 740-754 (2016)). Mining of genome-wide shRNA screens showed heightened requirement (gene essentiality) of ASNS SL partner genes in cell lines with lower ASNS expression, and also showed greater essentiality for other key components of the MAPK pathway (MEK1, ERK2, and p90 Ribosomal S6 Kinase (P90RSK1)) (FIGS. 3H and 4B; note lower IC50 for shRNA in ASNSlo subset; (Cheung et al., Proc Natl Acad Sci USA 108, 12372-12377 (2011); Cowley et al., Sci Data 1, 140035 (2014); Marcotte et al., Cancer Discov 2, 172-189 (2012); Marcotte et al., Cell 164, 293-309 (2016)), together substantiating the synthetic lethal relationship between ASNS and MAPK signaling. ATF4, shown to impede the anti-proliferative efficacy of asparagine restriction (FIG. 1J), expectedly, exhibited higher essentiality in low ASNS expressing tumors (FIG. 4B).

Figure 5A:
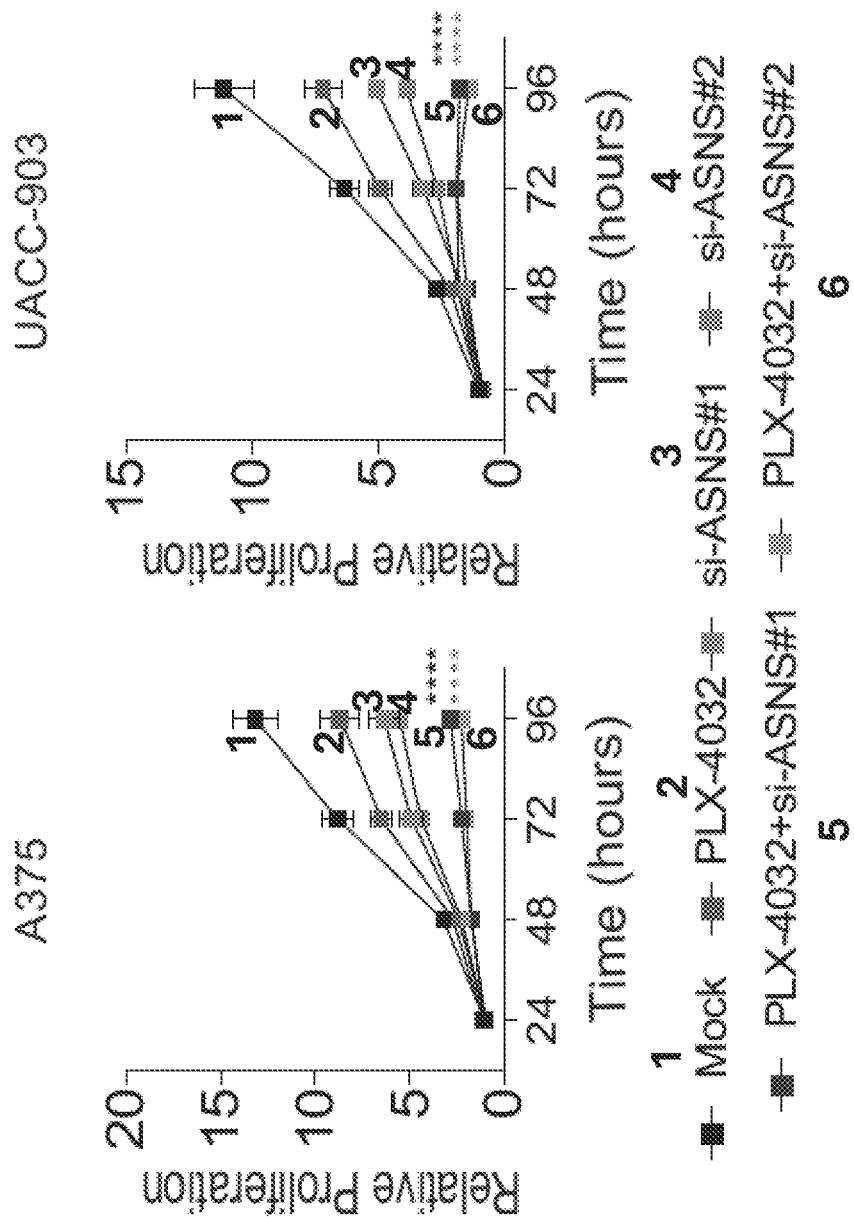
(FIG. 5A) Proliferation of A375 and UACC-903 cells over indicated times following treatment with si-ASNS, BRAF-i (PLX-4032, 250 nM), or both relative to mock (NT-siRNA+DMSO).
Figure 5B:
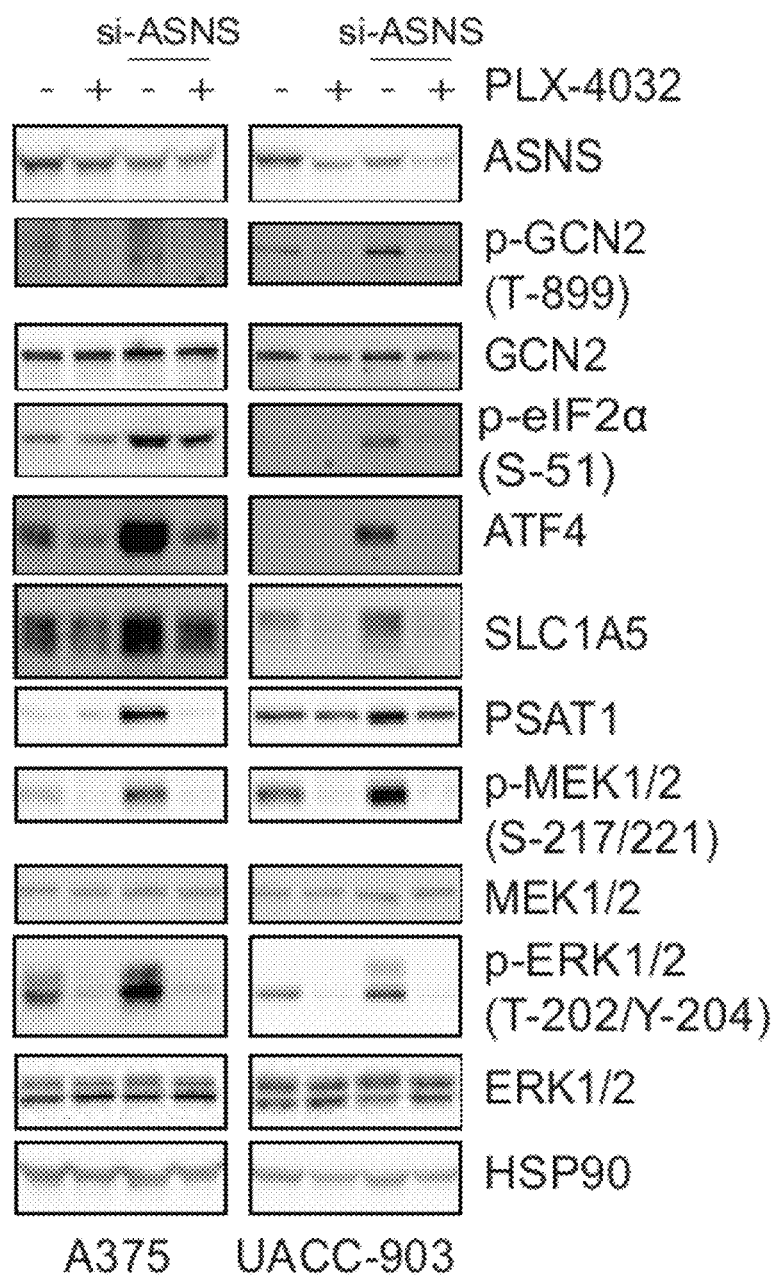
(FIG. 5B) Immunoblotting for AAR pathway and MAPK signaling components (phospo and total MEK1/2 and ERK1/2) in A375 and UACC-903 cells 72 hr after treatment with si-ASNS, PLX-4032, or both.
Figure 5C:
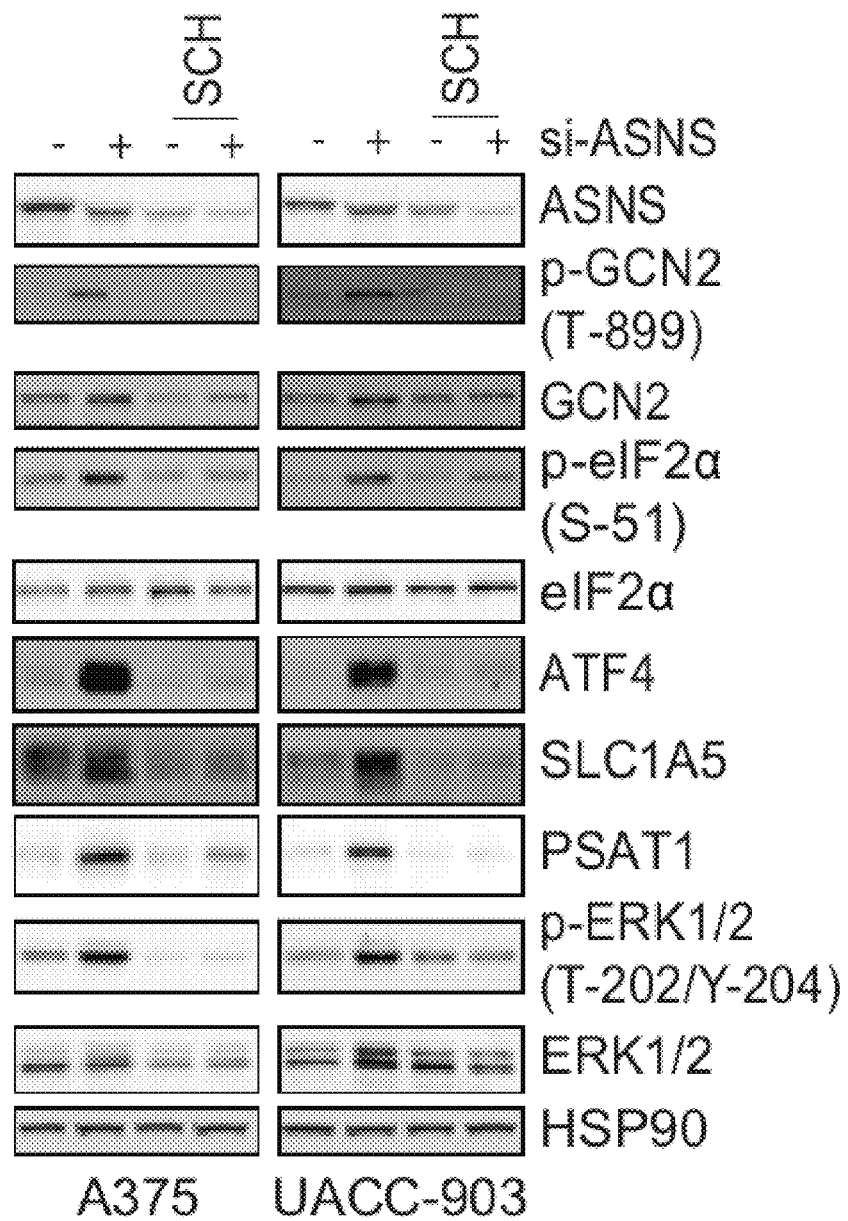
(FIG. 5C) Immunoblotting of ASNS, AAR pathway proteins, and phosphorylated and total ERK1/2 in A375 and UACC-903 cells 72 hr after treatment with si-ASNS, an ERK inhibitor (SCH-772984 (SCH), 250 nM), or both.
Figure 5D:
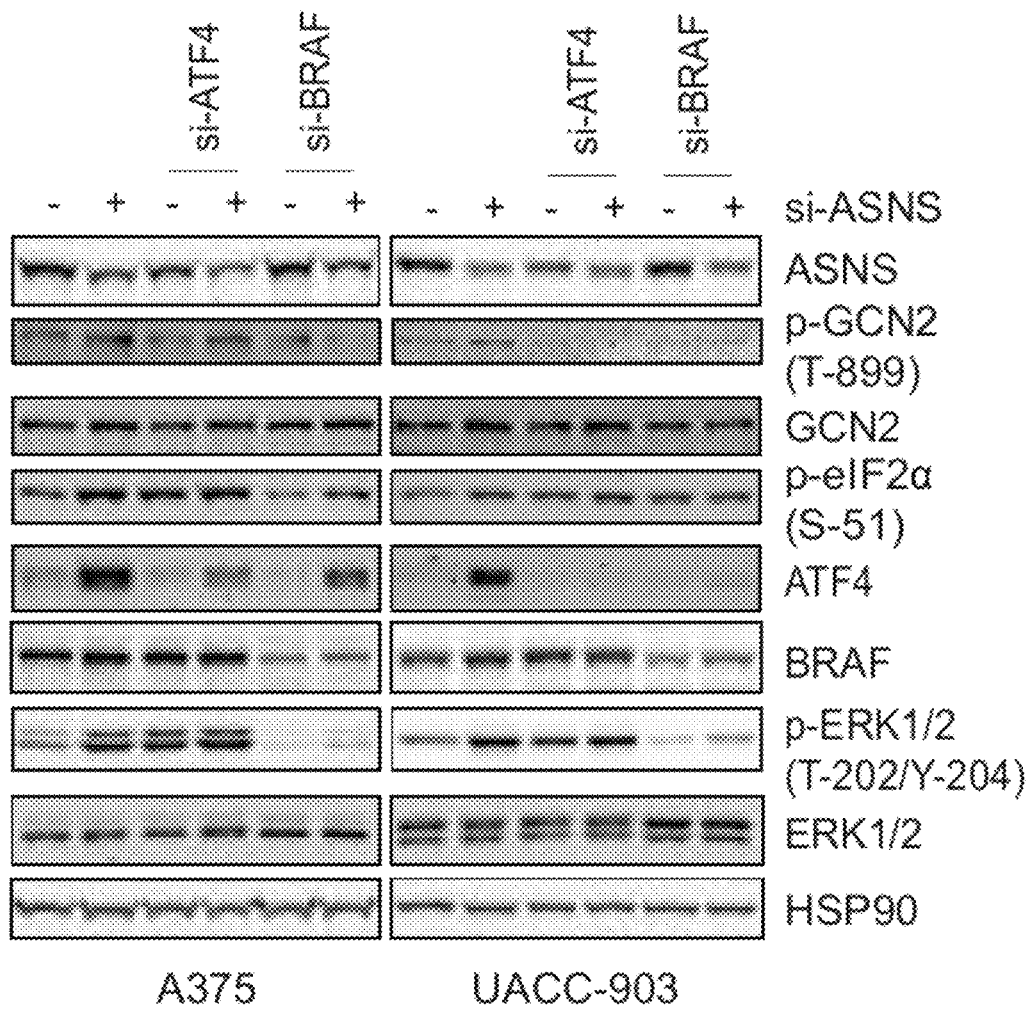
(FIG. 5D) Immunoblotting of AAR pathway proteins, phosphorylated and total ERK1/2, and BRAF in melanoma cell lines 72 hr after treatment with si-ASNS, si-ATF4, si-BRAF, or indicated combinations.
Figure 6A:
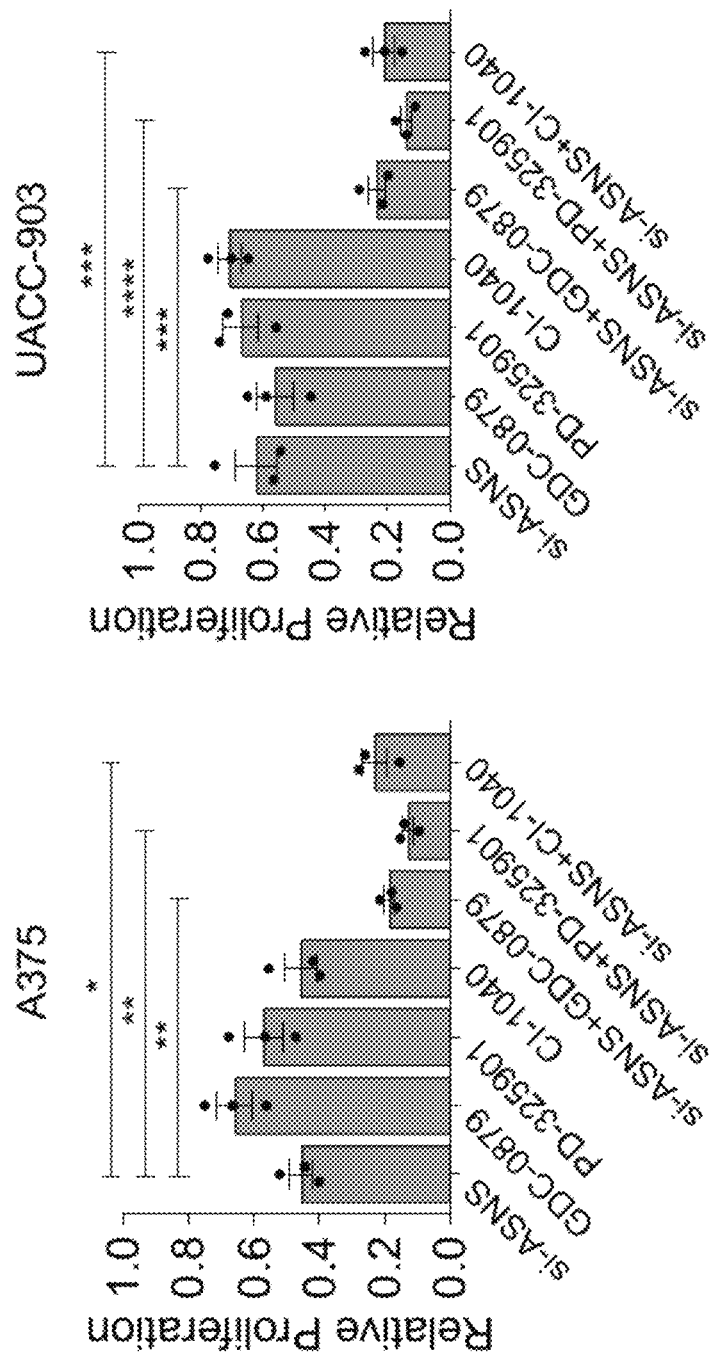
(FIG. 6A) Proliferation of A375 and UACC-903 cells as measured 72 hr after treatment with si-ASNS, MEK inhibitors (CI-1040, 500 nM or PD-325901, 250 nM), a BRAF inhibitor (GDC-0879, 250 nM), or indicated combinations. Proliferation is shown relative to mock (NT-siRNA and DMSO)-treated cells, set to 1.0.
Figure 6B:
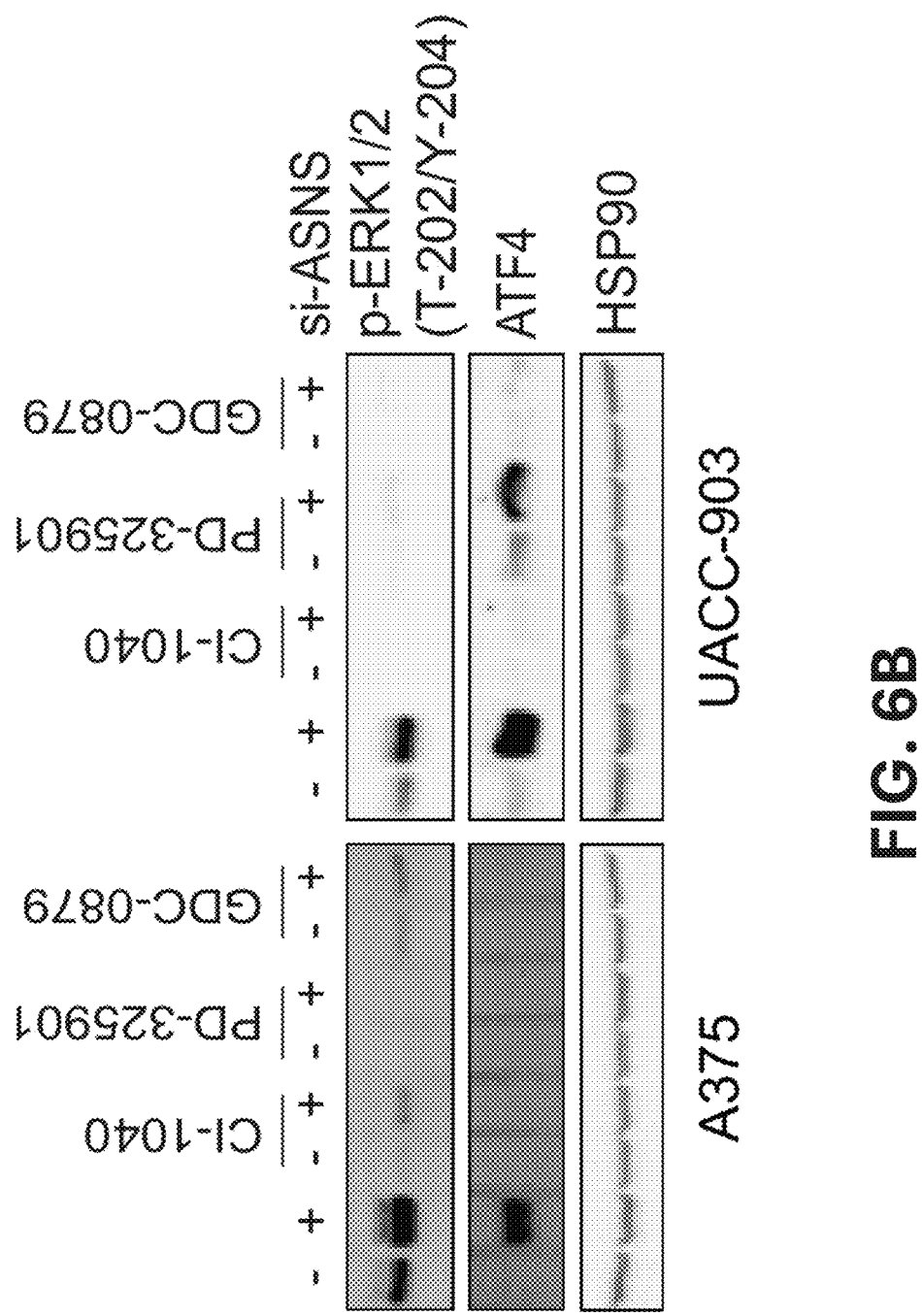
(FIG. 6B) Immunoblotting of indicated proteins in A375 cells 72 hr after treatment with si-ASNS, CI-1040, PD-325901, GDC-0879, or indicated combinations.

To validate the results of SL analyses, the proliferation of the BRAF mutant melanoma lines was assessed following their treatment with PLX-4032, a small-molecule inhibitor targeting activated BRAF (BRAFV600E), alone or in combination with ASNS depletion. While BRAF inhibition alone attenuated melanoma cell proliferation, a more effective inhibition was seen upon its combination with ASNS knockdown (FIG. 5A). To confirm this and rule out potential non-specific PLX-4032 effects, other inhibitors of mutated BRAF (GDC-0879) or the BRAF effector MEK (MAP Kinase Kinase; PD-325901 and CI-1040) were tested. In all cases, drug concentrations that inhibited melanoma cell proliferation by 40-60% were found to be more effective (>80% inhibition) when combined with ASNS knockdown (FIG. 6A). These findings confirm the synthetic lethality between MAPK signaling and ASNS predicted by ISLE.

Figure 5E:
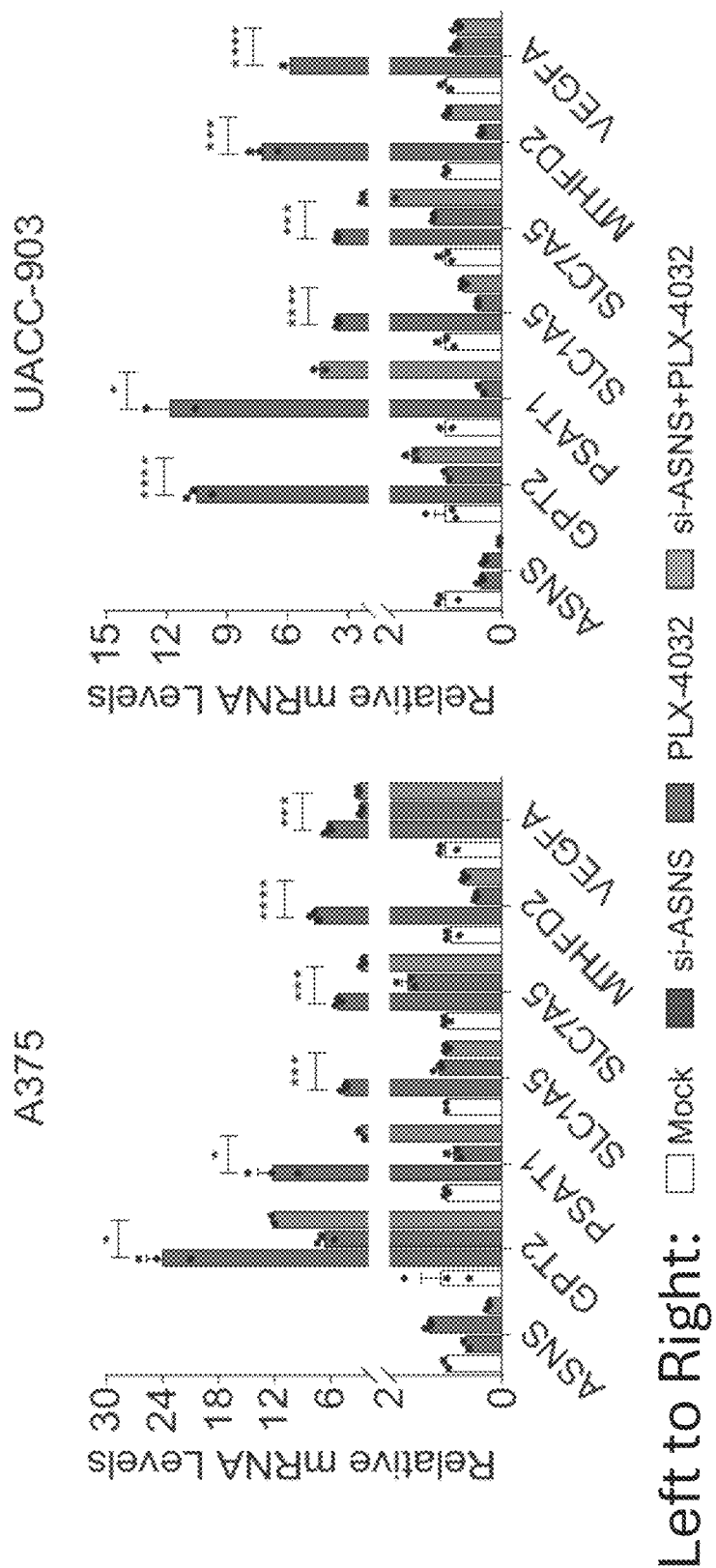
(FIG. 5E) qRT-PCR analysis for transcripts encoding ATF4 targets in A375 and UACC-903 cells 48 hr after treatment with si-ASNS, PLX-4032, or both.

As activation of the GCN2-ATF4 axis is a major impediment to the efficacy of asparagine restriction ((Nakamura et al., 2018); FIG. 1), whether inhibiting MAPK signaling would exert its synthetic lethal effects via altering the degree of GCN2-ATF4 activation in response to ASNS knockdown was accessed. To this end, melanoma cells were treated with pharmacological inhibitors for BRAF, MEK or ERK, or subjected to genetic inactivation of BRAF by RNAi. In all cases, MAPK signaling inhibition attenuated the induction of the GCN2-ATF4 axis and the downstream targets, as demonstrated by suppression of phospho-GCN2, phospho-eIF2α, ATF4, SLC1A5, and PSAT1 levels (FIGS. 5B-5D and 6B). Consistently, BRAF inhibition in A375 and UACC-903 lines antagonized transcriptional induction of ATF4 targets seen following ASNS knockdown (FIG. 5E), similar to ATF4 loss (FIG. 1I). These observations establish that MAPK signaling is crucial for the induction of ATF4 in response to ASNS suppression.

Figure 6C:
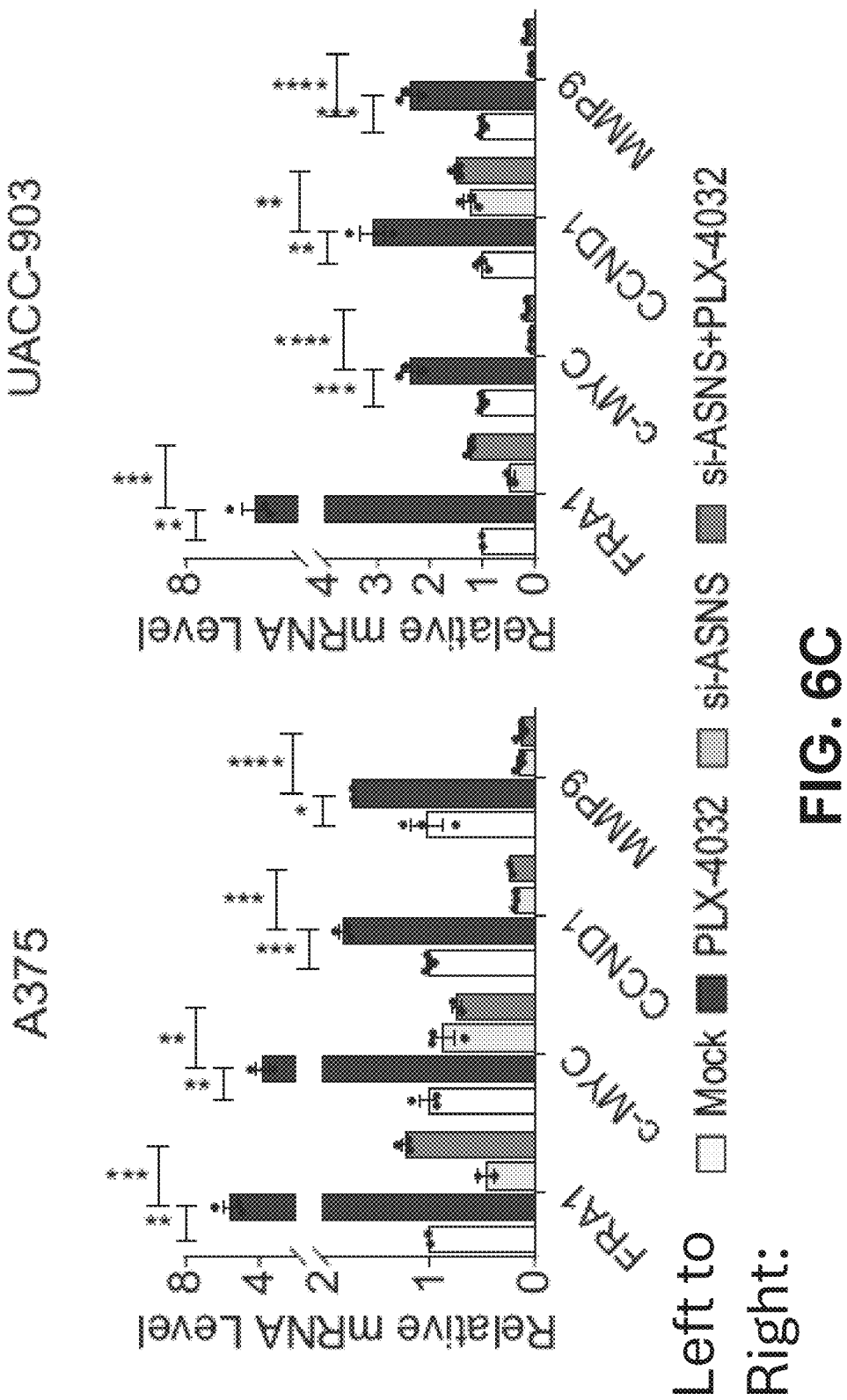
(FIG. 6C) qRT-PCR analysis of FRA-1, c-MYC, CCND1, and MMP9 transcripts in melanoma lines 48 hr after treatment with si-ASNS, PLX-4032, or both.

Remarkably, not only was MAPK signaling crucial for the induction of ATF4 in response to ASNS silencing, ASNS suppression alone was sufficient to increase MEK and ERK phosphorylation, indicative of an undisclosed feed-forward mechanism (FIGS. 5B-5D and 6B). Accordingly, ASNS knockdown in melanoma cells increased levels of FRA1, c-MYC, CCND1, and MMP9, transcripts, whose expression is positively regulated by MAPK signaling (Eferl and Wagner, 2003), and indeed, BRAF inhibition prevented the upregulation of these transcripts when ASNS was knocked down (FIG. 6C).

Figure 6D:
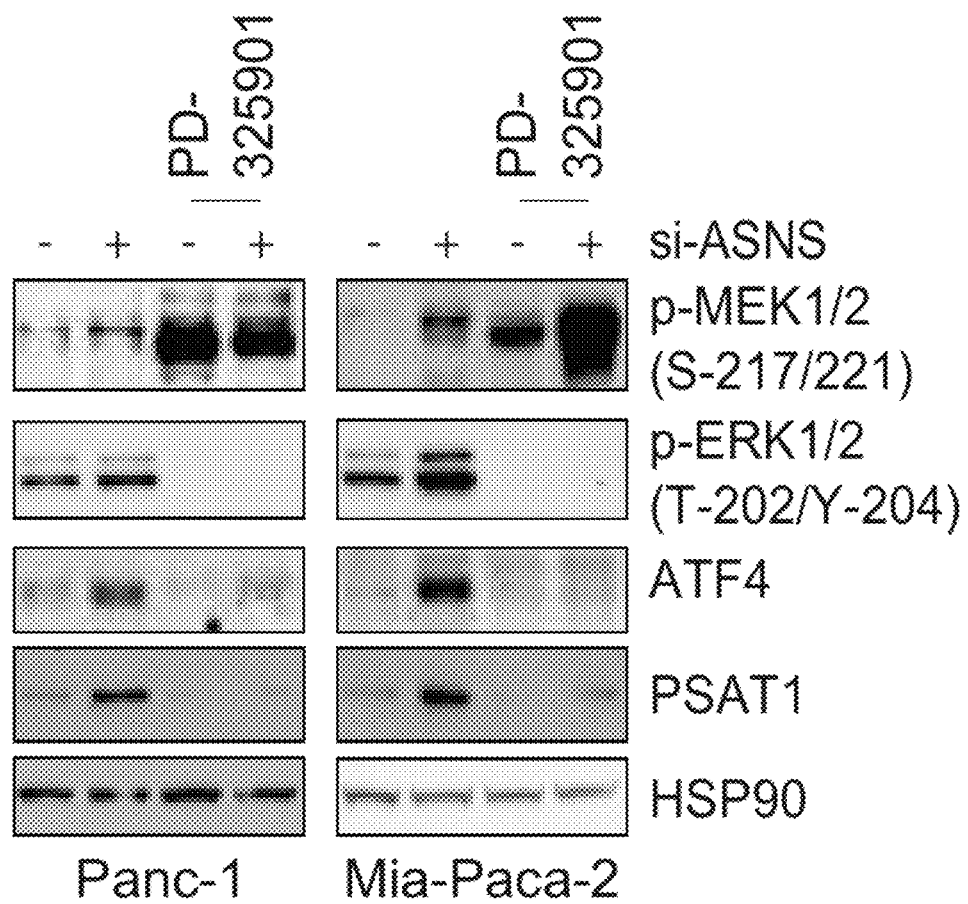
(FIG. 6D) Immunoblotting for ATF4, PSAT1, and phosphorylated total ERK1/2 and MEK1 in Panc-1 and Mia-Paca-2 cells 72 hr after treatment with si-ASNS, PD-325901 or both.
Figure 6E:
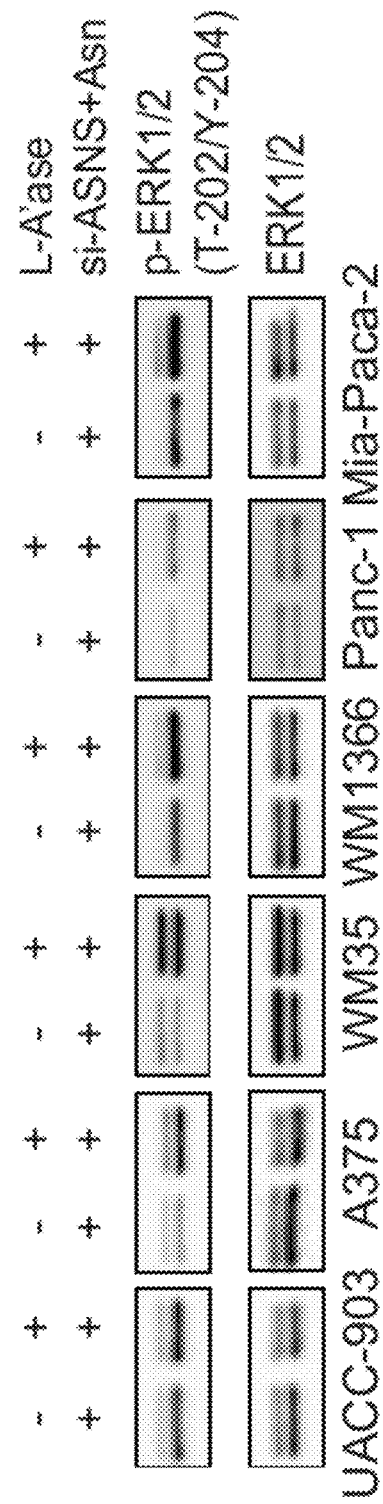
(FIG. 6E) Immunoblotting of phosphorylated and total ERK1/2 protein in indicated cancer lines 72 hr after combined treatment with si-ASNS and L-asparagine, with or without L-A'ase.
Figure 6F:
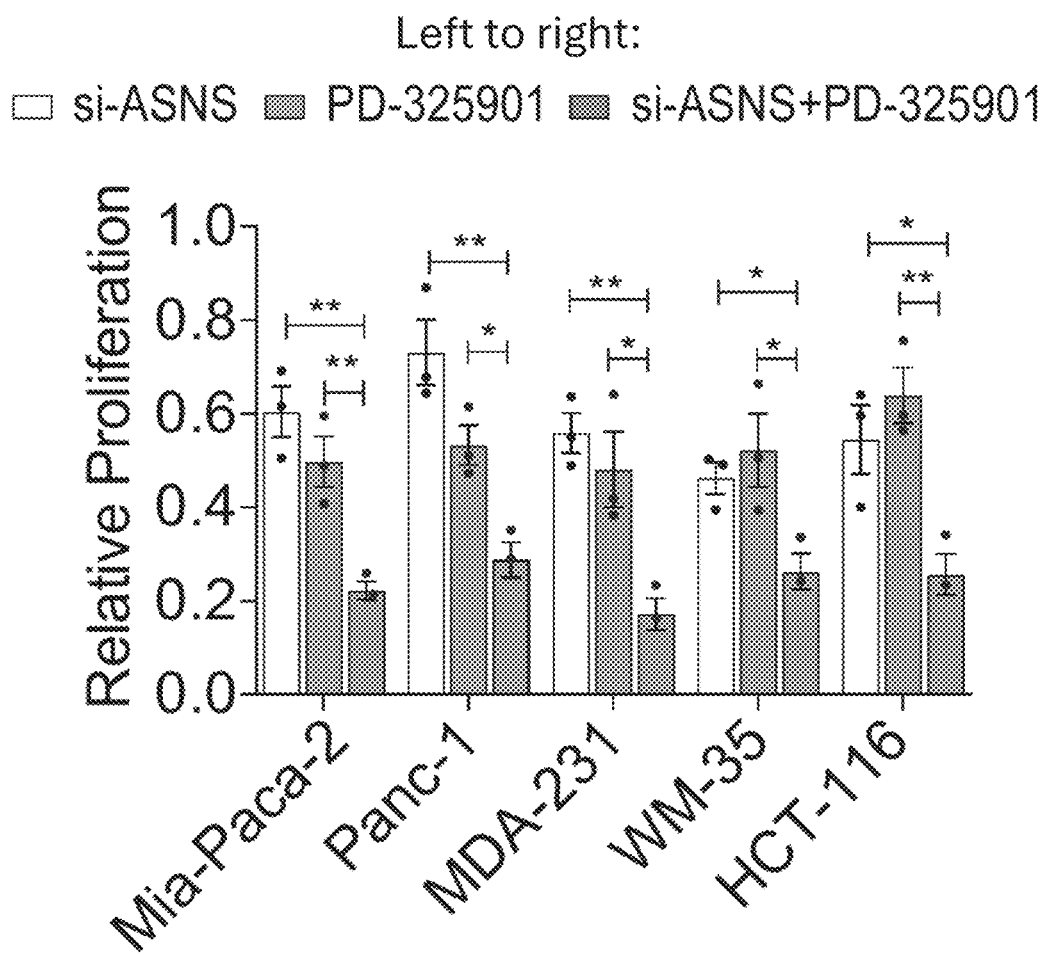
(FIG. 6F) Proliferation of cancer lines measured 72 hr after treatment with si-ASNS, PD-325901, or both relative to mock.

Similar to changes observed in melanoma cells, ASNS knockdown in the pancreatic cancer lines Mia-Paca-2 and Panc-1, which harbor activating KRAS mutation (KRASG12D), enhanced MAPK signaling (FIG. 6D). Likewise, induction of ATF4 and its target PSAT1 in response to ASNS depletion was relieved by concomitant MEK inhibition (Figure S3D). Moreover, depletion of asparagine in the medium by L-A'ase enhanced ERK1/2 phosphorylation in ASNS depleted cancer cells (FIG. 6E). Lastly, ASNS knockdown in mutant RAS cancer lines (Mia-Paca-2, KRASG12C; Panc-1, KRASG12D; MDA-231, KRASG13D; WM-1366, KRASQ61L; HCT-116, KRASG13D) had greater anti-proliferative activity when combined with MEK inhibition (FIG. 6F).

Figure 5F:
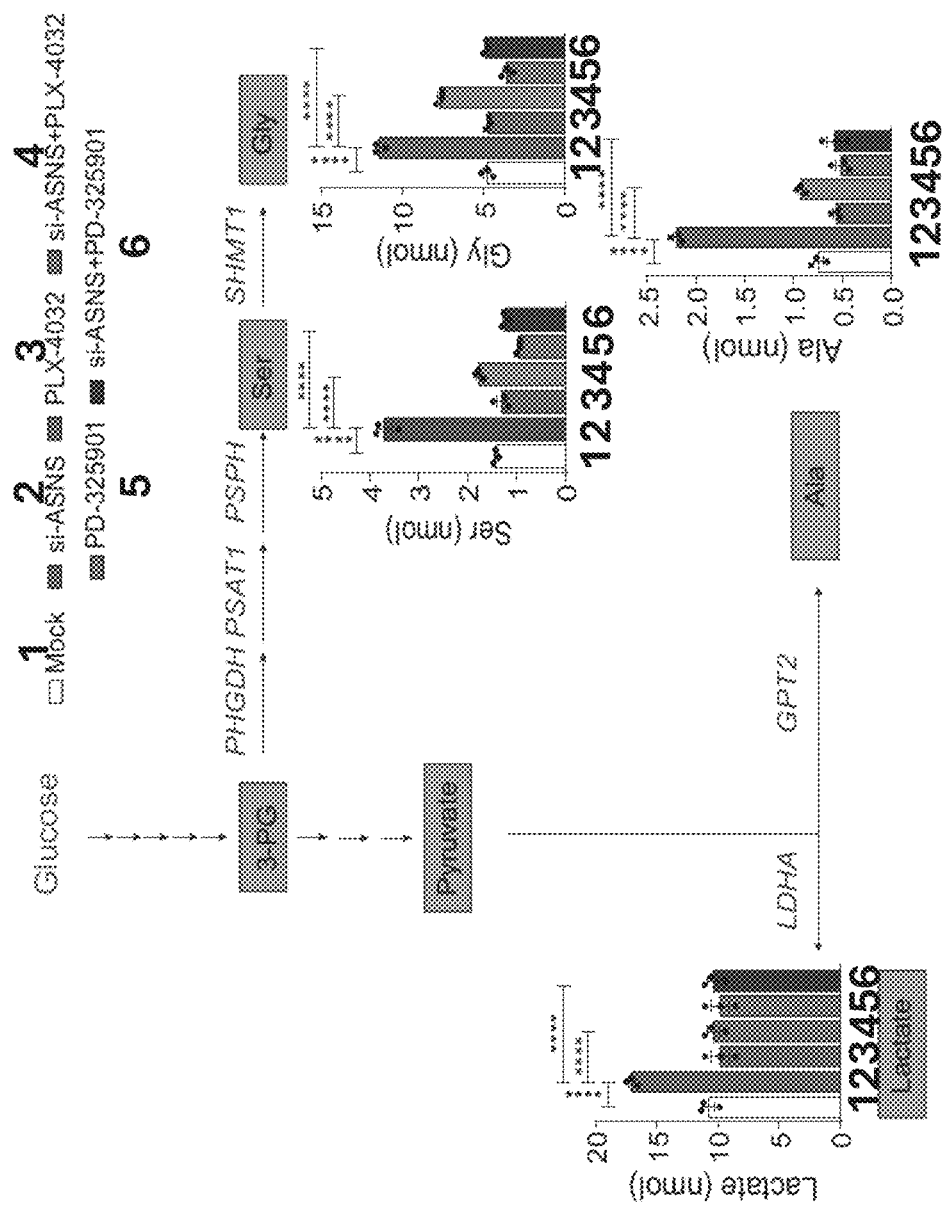
(FIG. 5F) GC-MS-based estimation of intracellular Ser, Gly, Ala, and lactate levels in UACC-903 cells 72 hr after treatment with si-ASNS, PLX-4032, a MEK-i (PD-325901, 250 nM), or indicated combinations. Scheme depicts relative location of the metabolites in the metabolic cascade and the corresponding enzymes involved.
Figure 5G:
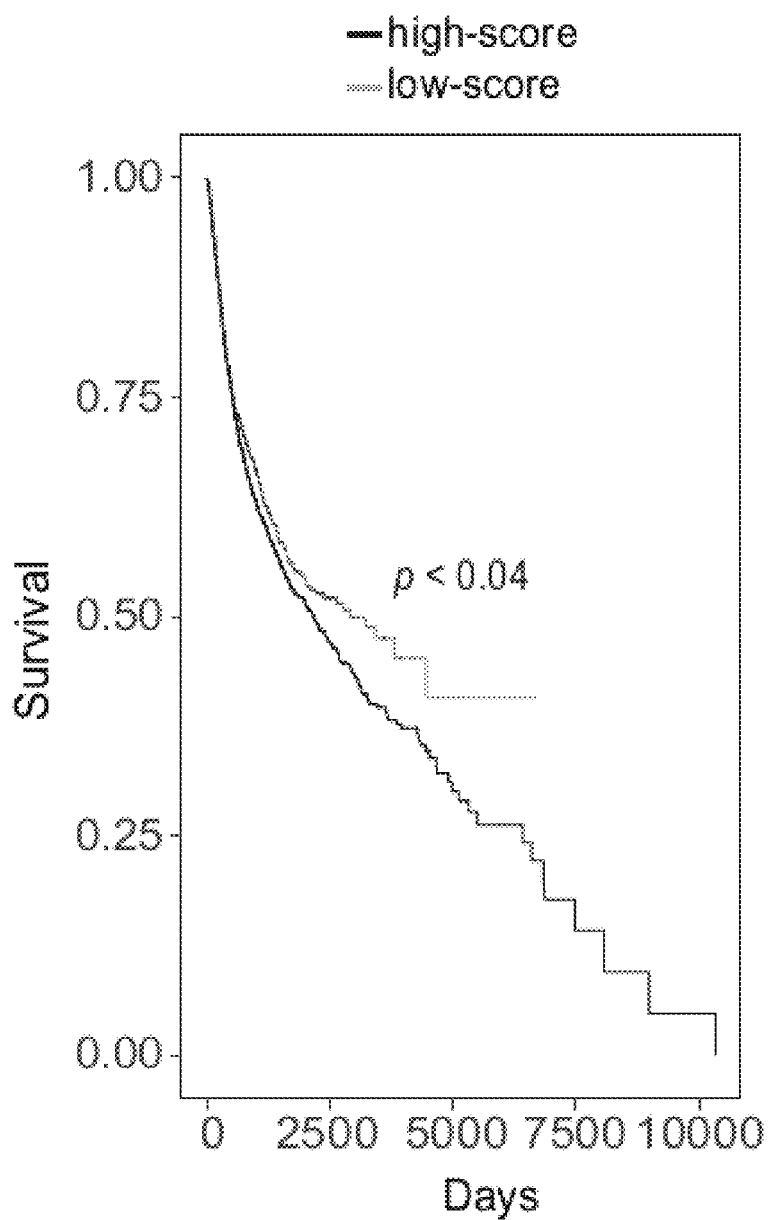
(FIG. 5G) The Kaplan-Meier plot shows the patients with co-inactivation of ASNS and BRAF exhibit better prognosis (grey) compared to the rest of the patients (black; logrank P<0.04, AUC=0.15) in pan-cancer analysis. A gene was denoted to be inactive if its expression determined by RNAseq data is below bottom tertile in each cancer type.
Figure 5H:
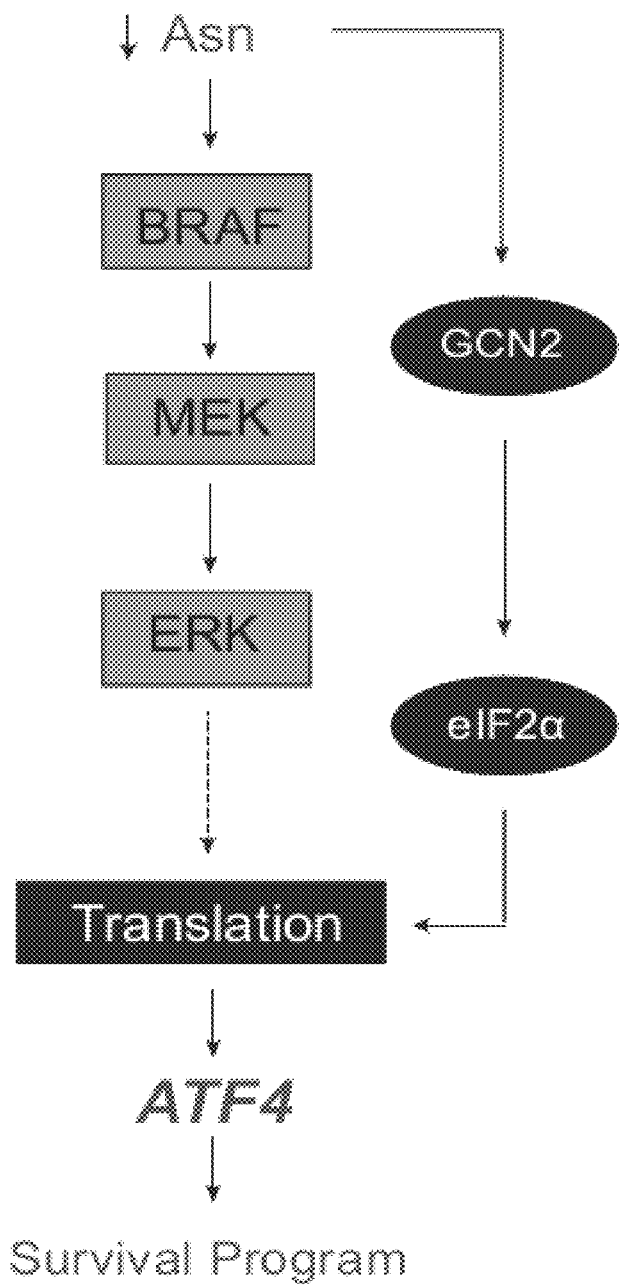
(FIG. 5H) Schematic showing regulation of ATF4 induction by MAPK signaling following asparagine suppression. Data are presented as the mean±SEM. Statistical significance (**p<0.0001; *p<0.001; **p<0.01; *p<0.05; ns, not significant) was calculated using two-way Anova for (FIG. 5A), unpaired t-test except for (FIG. 5E), and one-way Anova for (FIG. 5F). In (FIG. 5A) black and orange stars correspond to the comparison between si-ASNS #1 and si-ASNS #1+PLX-4032 and si-ASNS #2 and si-ASNS #2+PLX-4032 respectively.
Figure 6G:
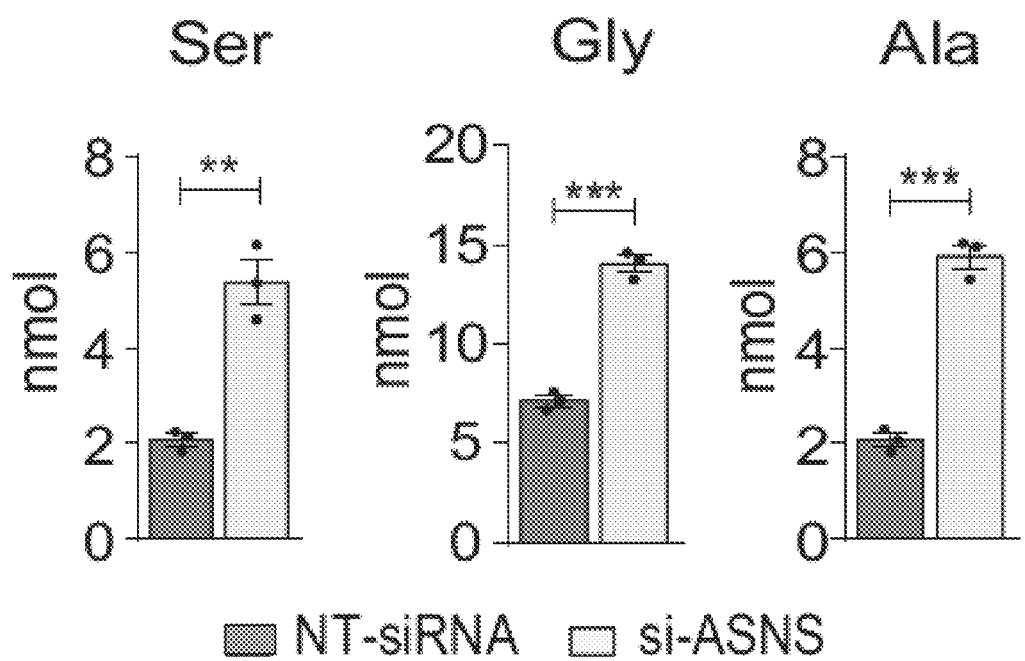
(FIG. 6G) GC-MS-based estimation of intracellular Ser, Gly, and Ala levels in UACC-903 cells 72 hr after treatment with si-ASNS.
Figure 6H:
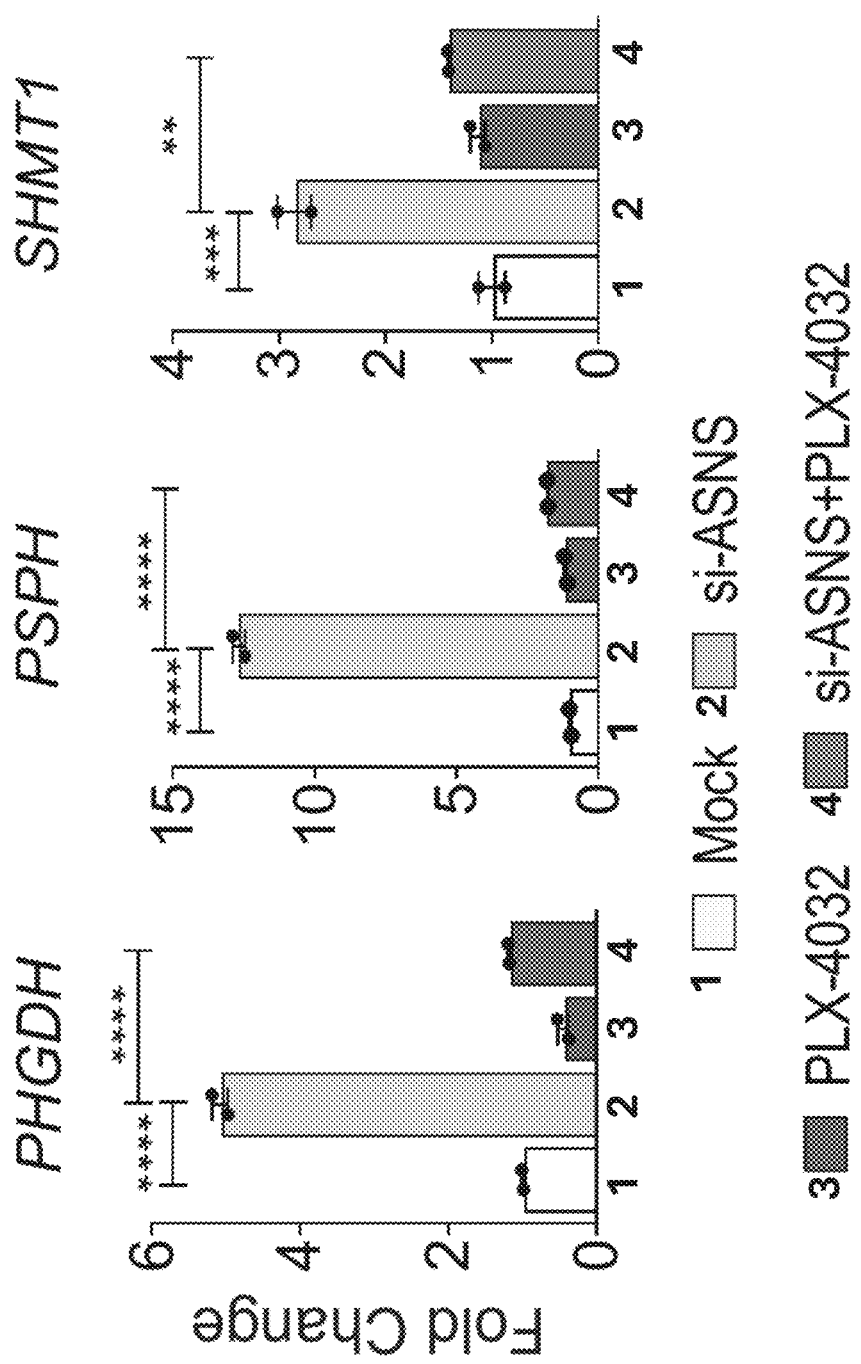
(FIG. 6H) qRT-PCR analysis of PHGDH, PSPH, and SHMT1 transcripts in UACC-903 cells 48 hr after treatment with si-ASNS, PLX-4032, or both.
Figure 6I:
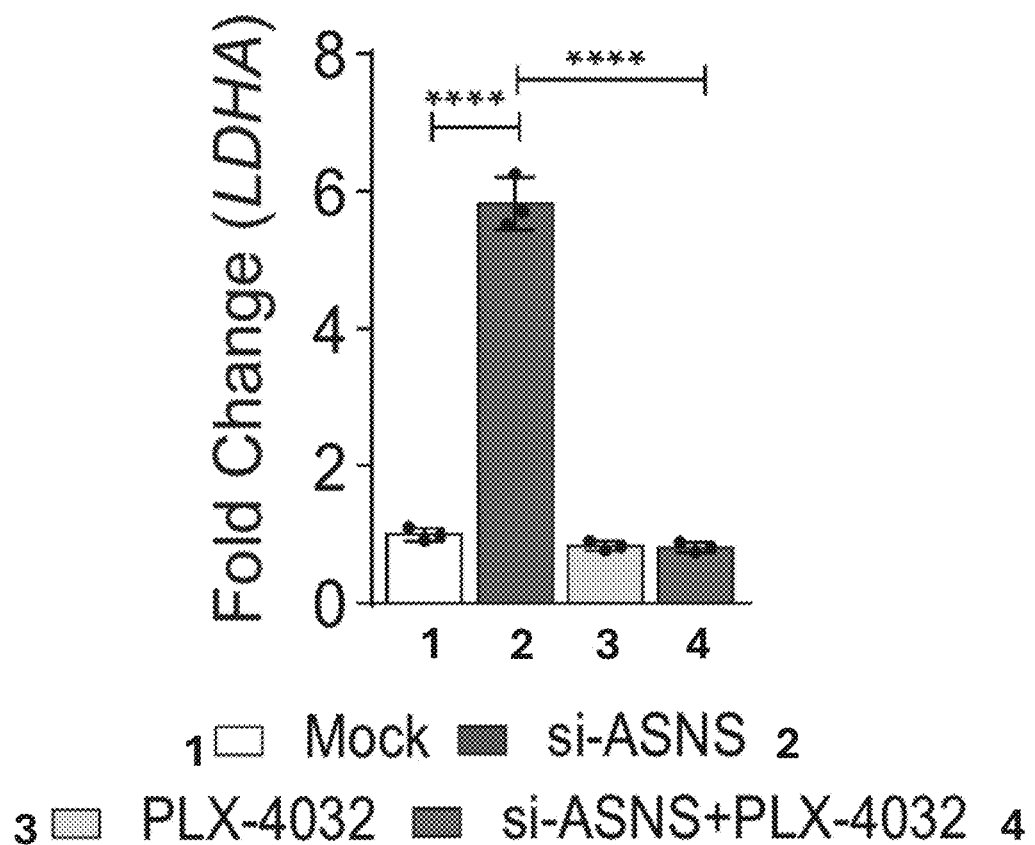
(FIG. 6I) qRT-PCR analysis of LDHA transcript in UACC-903 cells 48 hr after treatment with si-ASNS, PLX-4032, or both. Data are presented as the mean±SEM. Statistical significance (**p<0.0001; *p<0.001; **p<0.01; *p<0.05; ns, not significant) was calculated using unpaired t-test, except for (FIG. 6A) where ordinary one-way Anova was used.

ATF4 target genes that encode serine/glycine (PSAT1) and alanine (GPT2) biosynthesis enzymes were induced following ASNS downregulation (FIGS. 1D and 1I). Thus, the levels of corresponding amino acids was determined in ASNS depleted vs. non-depleted UACC-903 cells. Consistent with upregulation of PSAT1 and GPT2 expression, ASNS depletion was accompanied by increased cellular levels of serine, glycine and alanine (FIG. 6G). In addition to the induction of serine, glycine, and the one-carbon (SGOC) metabolic network enzyme PSAT1 (FIGS. 1 and 5), ASNS knockdown in UACC-903 cells also induced expression of other enzymes in this network (i.e., Phosphoglycerate Dehydrogenase (PHGDH), Phosphoserine Phosphatase (PSPH), and Serine Hydroxymethyltransferase 1 (SHMT1), an effect largely abolished upon BRAF inhibition (FIG. 6H). In agreement, GC-MS-based analysis of the ASNS-silenced UACC-903 cells showed elevated intracellular levels of serine, glycine, and alanine, changes reversed by BRAF or MEK inhibition (FIG. 5F). Intriguingly, intracellular lactate levels also increased in UACC-903 cells following ASNS knockdown, effect that was rescued by BRAF or MEK inhibition (FIG. 5F). MAPK signaling also regulates c-MYC ((Sears et al., 2000); FIG. 6C), a transcriptional activator of lactate dehydrogenase A (LDHA), a lactate-generating enzyme. Consistent with upregulation of c-MYC (Figure S3C), ASNS knockdown in UACC-903 cells increased LDHA expression, an effect that was blocked upon treatment with a BRAF inhibitor (FIG. 6 I).

If two genes are synthetic lethal then inactivation of one renders the other critical for cell survival. Therefore, a concomitant downregulation of an SL pair should result in loss of viability, an outcome expected to result in tumor impairment. Along these lines, patient tumors (pan-tumor analysis) exhibiting simultaneously downregulated expression of ASNS and BRAF (a proxy for low MAPK signaling activity) correlated with better prognosis (FIG. 5G). Collectively, these findings suggest that MAPK signaling regulates ATF4 and associated phenotypic and metabolic changes following ASNS suppression (FIG. 5H).

Figure 7A:
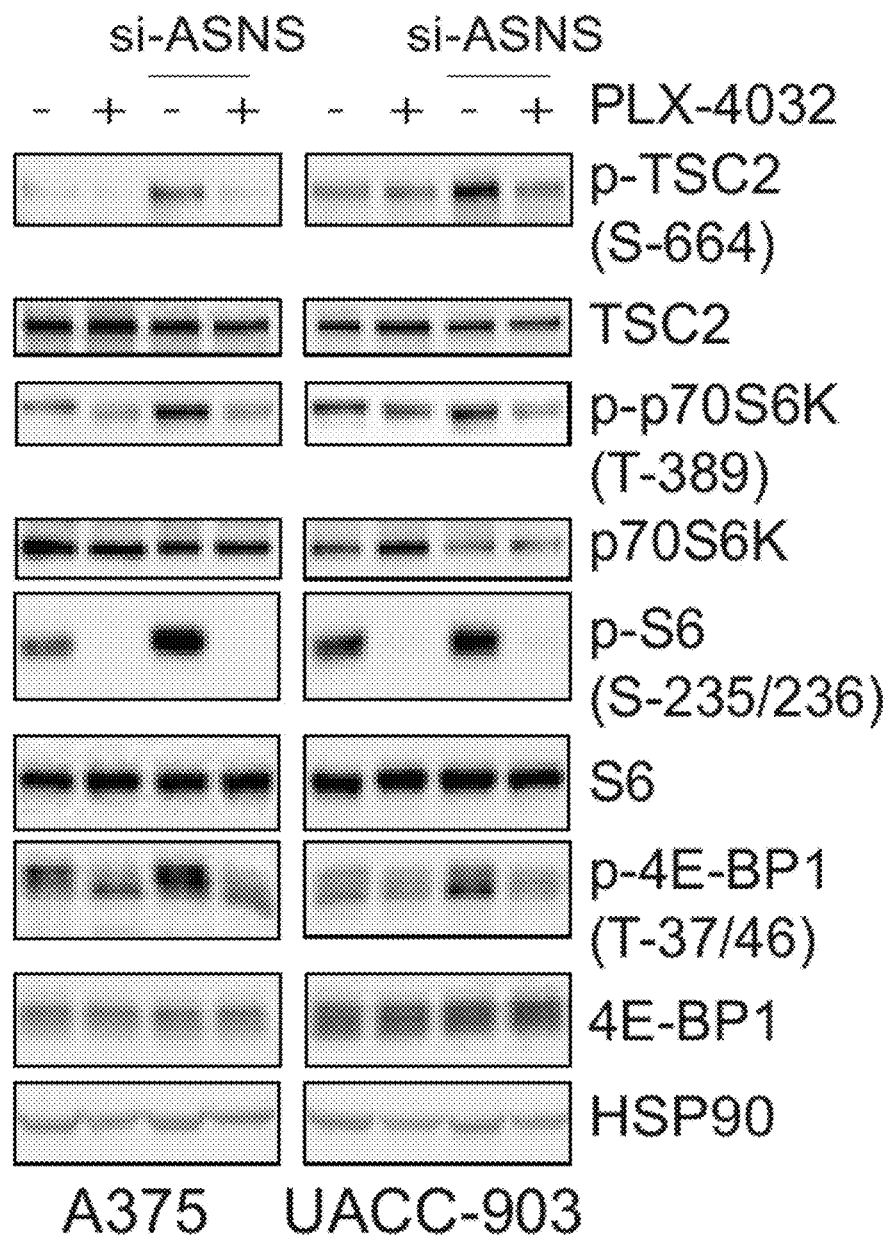
(FIG. 7A) Immunoblotting of phospho and total levels of TSC2, p70S6K, ribosomal S6 protein (S6), and 4E-BP1 in A375 and UACC-903 cells 72 hr after treatment with si-ASNS, PLX-4032, or both.
Figure 7B:
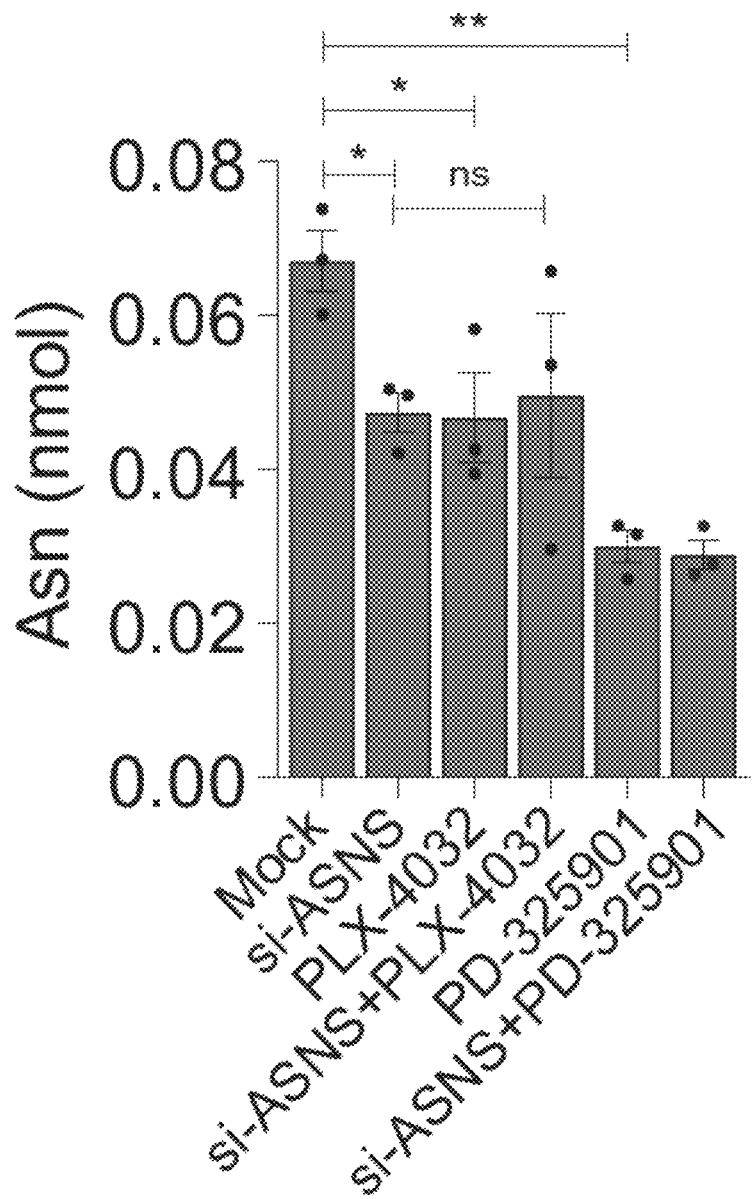
(FIG. 7B) GC-MS-based estimation of intracellular asparagine levels in UACC-903 cells treated for 72 hr with si-ASNS, PLX-4032, PD-325901, a combination of si-ASNS and PLX-4032, or si-ASNS and PD-325901.
Figure 7C:
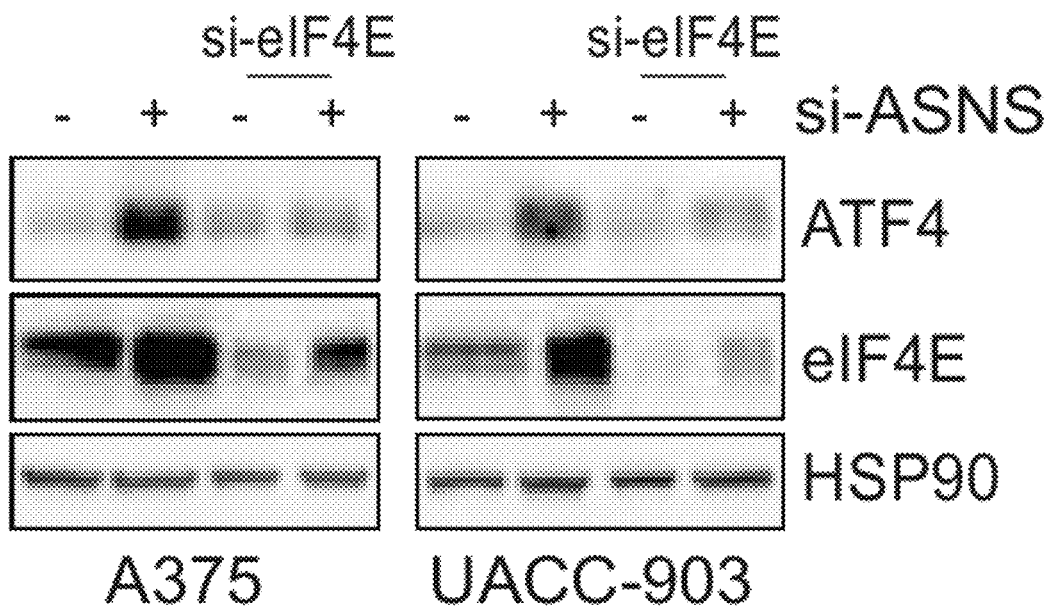
(FIG. 7C) Immunoblotting of ATF4 and eIF4E in melanoma lines treated 72 hr with si-ASNS, si-eIF4E, or both.
Figure 7D:
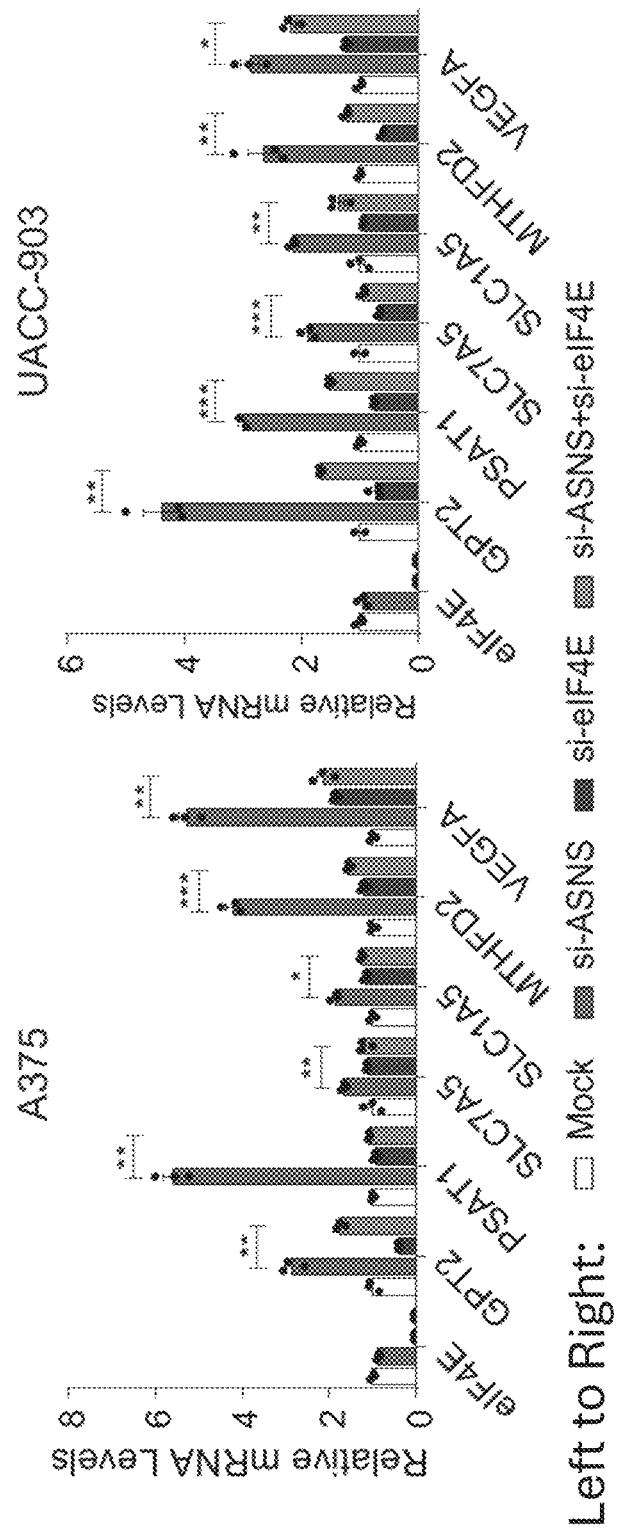
(FIG. 7D) qRT-PCR analysis of transcripts encoding ATF4 targets in melanoma lines 48 hr after treatment with si-ASNS, si-eIF4E, or both.
Figure 7E:
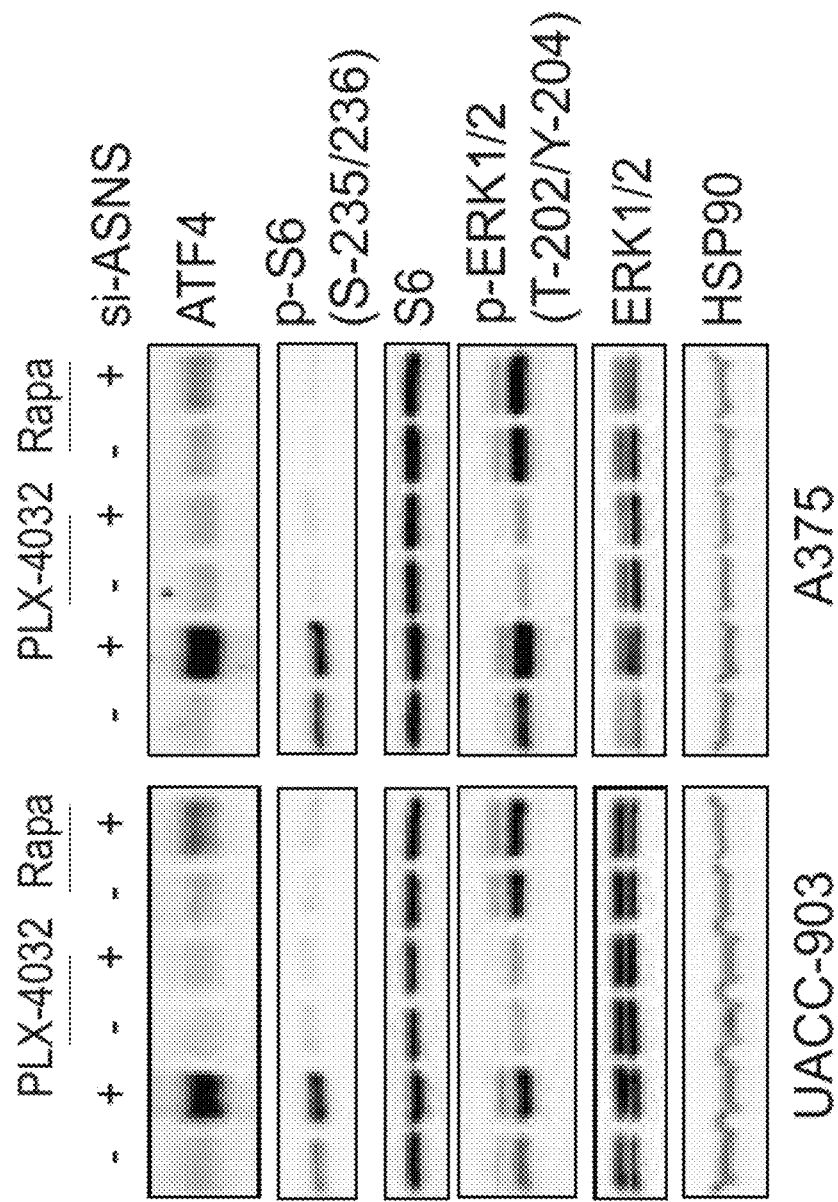
(FIG. 7E) Immunoblotting of ATF4 and phosphorylated and total S6 and ERK1/2 in melanoma cell lines treated 72 hr with si-ASNS, PLX-4032, rapamycin (Rapa; 100 nM), or a combination of si-ASNS and PLX-4032 or si-ASNS and rapamycin.
Figure 7F:
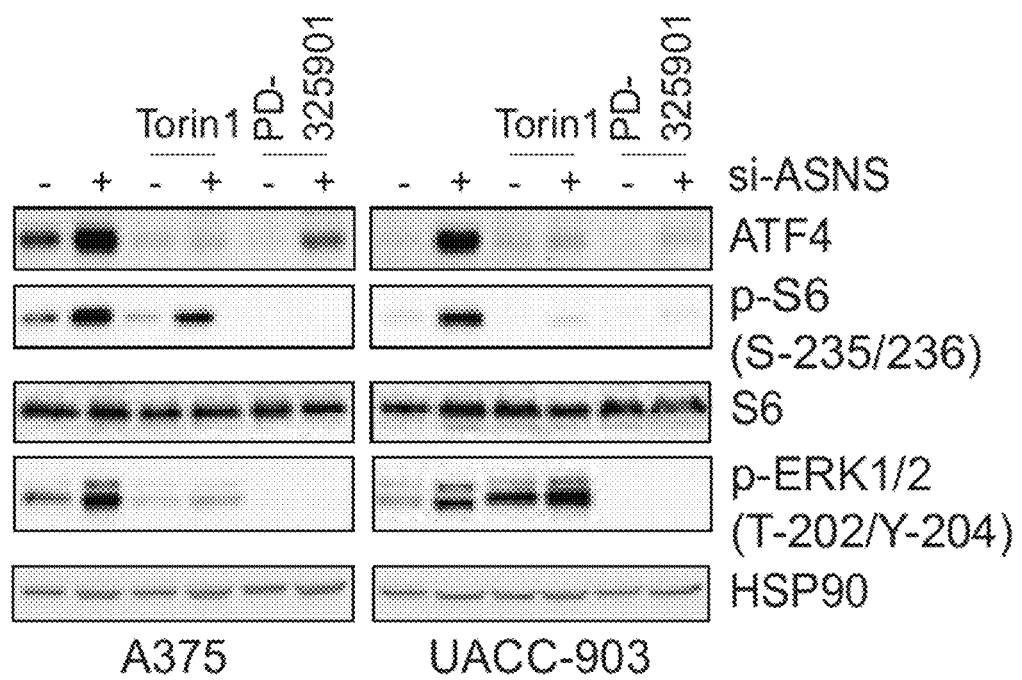
(FIG. 7F) Immunoblotting of ATF4 and phosphorylated and total S6 and phospho-ERK1/2 in melanoma lines 72 hr after treatment with si-ASNS, PD-325901, Torin 1 (100 nM), or a combination of si-ASNS and PD-325901 or si-ASNS and Torin 1.
Figure 7G:
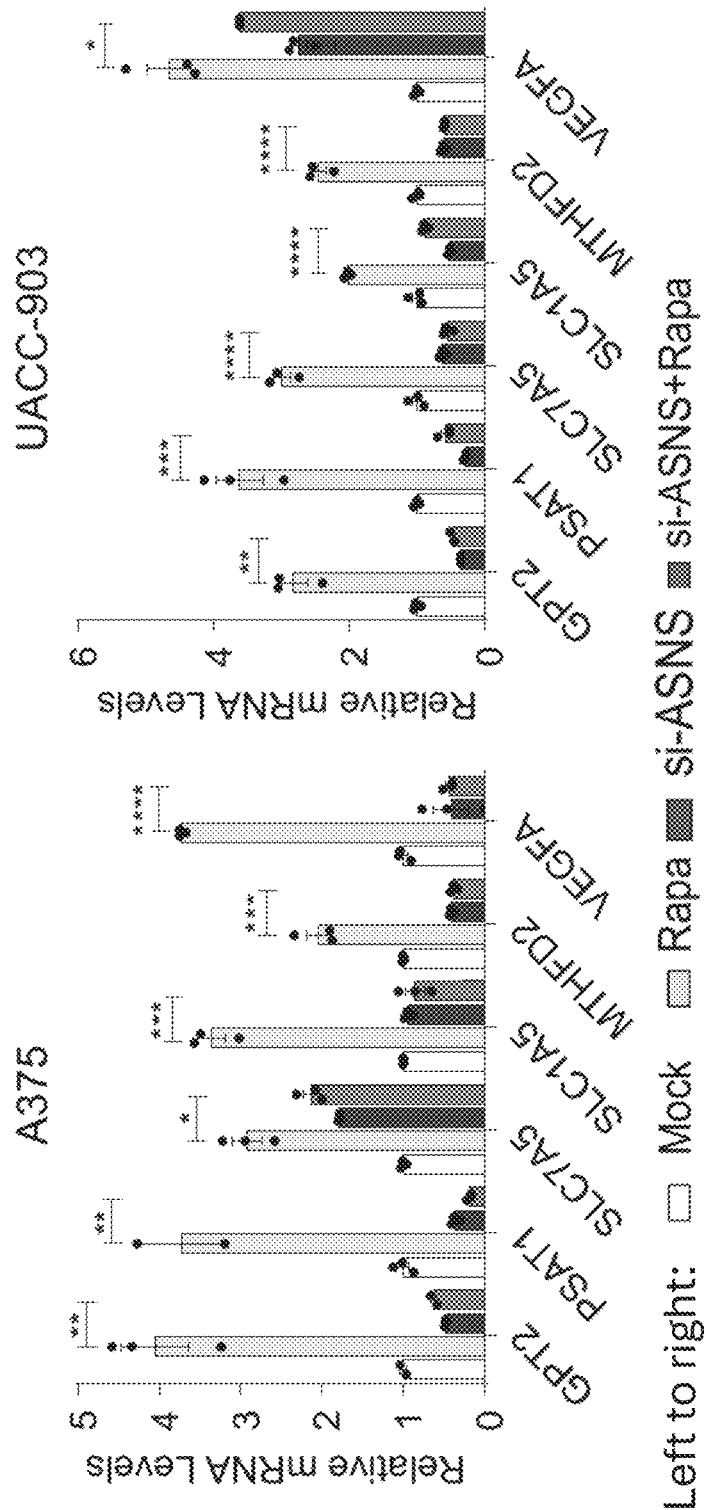
(FIG. 7G) qRT-PCR analysis of transcripts encoding ATF4 targets in melanoma lines 48 hr after treatment with si-ASNS, rapamycin, or both.

Example 4. MAPK Signaling and MNK1 Regulate Translation to Promote ATF4 Induction The identification of MNK1 as a synthetic lethal partner of ASNS led to assessment of the importance of translational control in ASNS inhibition-dependent synthetic vulnerability. ERK1/2 promotes mTORC1 activity by suppressing Tuberous Sclerosis 2 (TSC2), which limits mTORC1 function (Balgi et al., PLoS Comput Biol 9, e1003047 (2011). ASNS depletion in A375 and UACC-903 lines enhanced ERK-specific TSC2 inhibitory phosphorylation on Ser-664 which was paralleled by mTORC1 activation (FIG. 7A). Notably, phosphorylation of both TSC2 and mTORC1 substrates, including eIF4E Binding Protein (4E-BP1), p70 Ribosomal S6 Kinase (p70S6K), and its substrate ribosomal S6 protein (rpS6/S6) was abrogated by BRAF inhibitor (FIG. 7A). Inhibition of MAPK signaling also attenuated mTORC1 activation and concomitant phosphorylation of p70S6K, S6 and 4E-BP1 in response to ASNS inhibition in A375, UACC-903, and Panc-1 cells (FIGS. 7A and 8A-C). Altogether, these results confirmed that MAPK links ASNS and mTORC1 activity. This observation suggested that blocking MAPK signaling may increase intracellular levels of free amino acids, by decreasing their incorporation into proteins via suppression of mTORC1 and subsequent downregulation of protein synthesis. However, opposite to this tenet, BRAF or MEK inhibition not only failed to rescue asparagine levels in ASNS depleted cells but rather decreased asparagine levels (FIG. 7B), arguing against relief of ATF4 induction by restoration of free cellular asparagine.

mTORC1 stimulates protein synthesis, in part, via phosphorylation and inactivation of 4E-BPs which suppress mRNA translation by sequestering the mRNA 5' cap-binding protein eIF4E (Roux and Topisirovic, Mol Cell Biol 38 (2018). Thus, the role of eIF4E in adaptation to ASNS depletion in A375 and UACC-903 lines was accessed. eIF4E depletion potently blocked ATF4 induction and transcriptional activation of its target genes caused by ASNS depletion (FIGS. 7C and 7D).

Similar to blocking MAPK signaling, pharmacological mTORC1 inactivation using either rapamycin or torin 1 blocked both ATF4 induction and upregulation of ATF4 targets seen following ASNS knockdown in melanoma and pancreatic cancer cell lines (FIGS. 7E-G, 8D and 8E). Importantly, neither MAPK signaling nor mTORC1 inhibition suppressed expression of S6, 4E-BP1, or ERK1/2, pointing to differential requirement of mTORC1 activity for asparagine limitation-associated ATF4 translation (FIGS. 7E, 7F, and 8A-E).

Figure 7H:
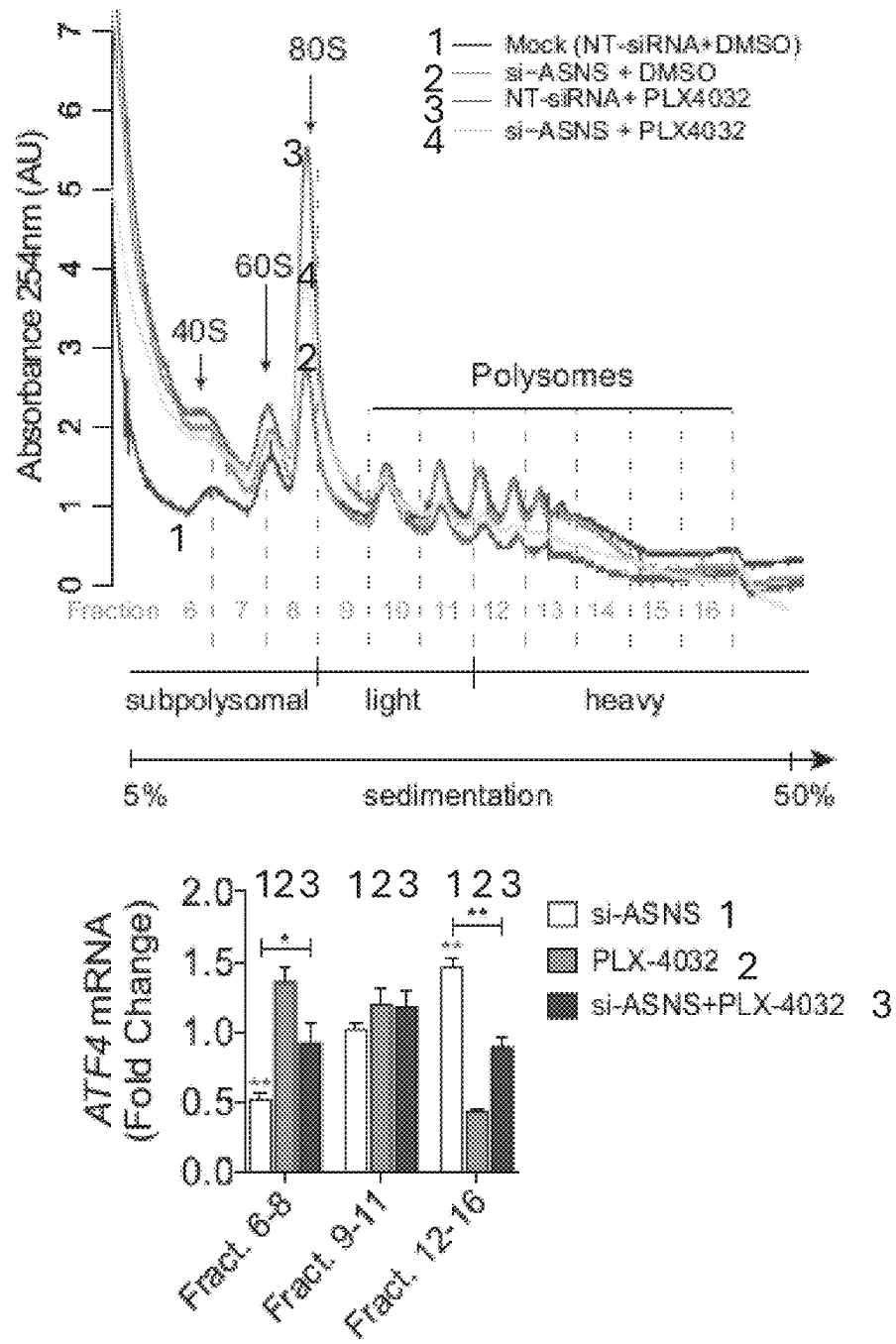
(FIG. 7H) Absorbance profiles at 254 nm of A375 cells treated with si-ASNS, PLX-4032, or both for 48 hr (top), and qRT-PCR analysis of ATF4 mRNA levels in subpolysomal (fraction 6-8, corresponding to pre-monosomal fractions), light (fraction 9-11, representing monosome to 3 ribosomes), and heavy (fraction 12-16 representing >3 ribosomes) polysomal fractions of A375 cells treated with si-ASNS, PLX-4032, or both (bottom). Levels of mRNA are shown as fold-change relative to mock (NT-siRNA+DMSO); value set to 1.0.
Figure 7I:
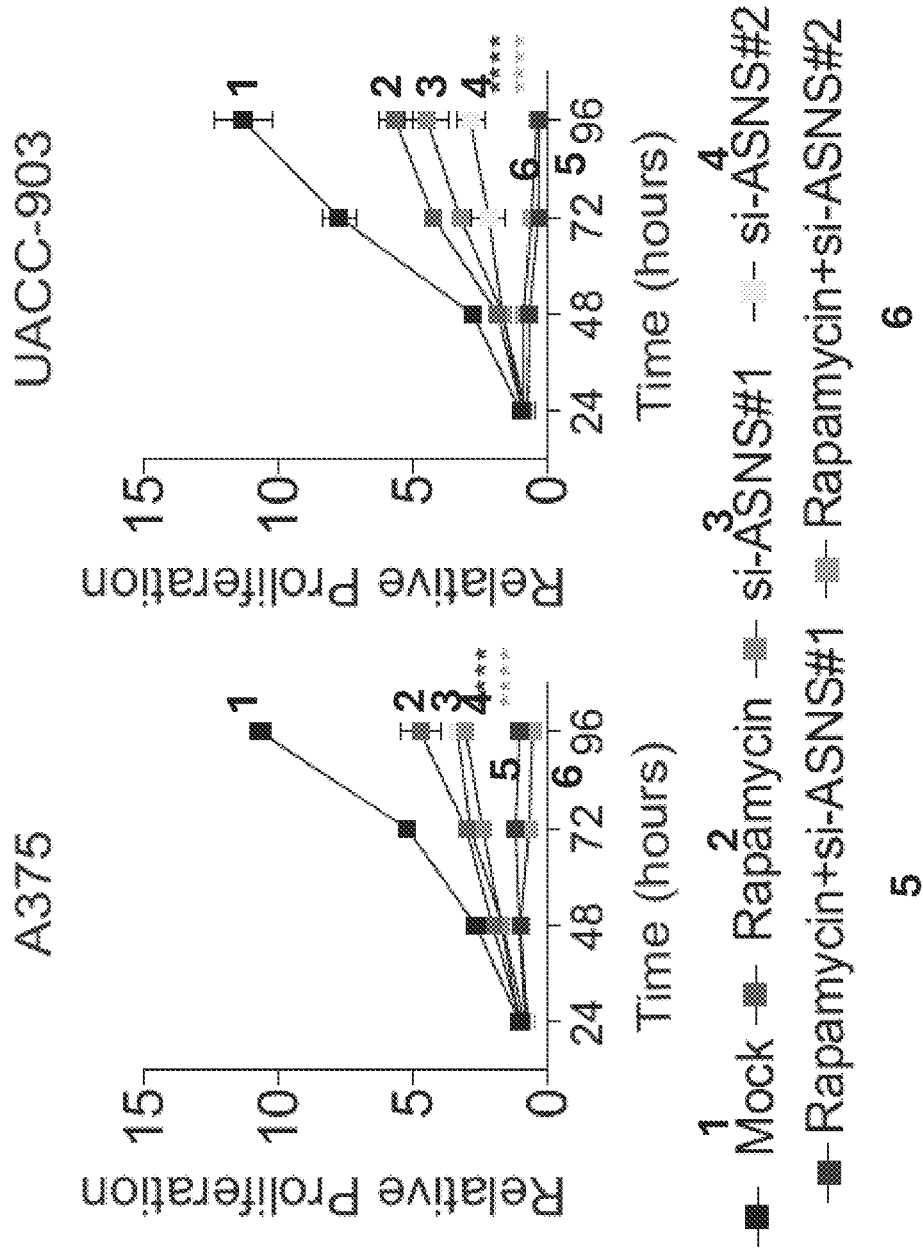
(FIG. 7I) Proliferation of melanoma lines over indicated times following treatment with si-ASNS #1 or #2, rapamycin, or a combination of respective si-ASNSs and rapamycin.
Figure 7J:
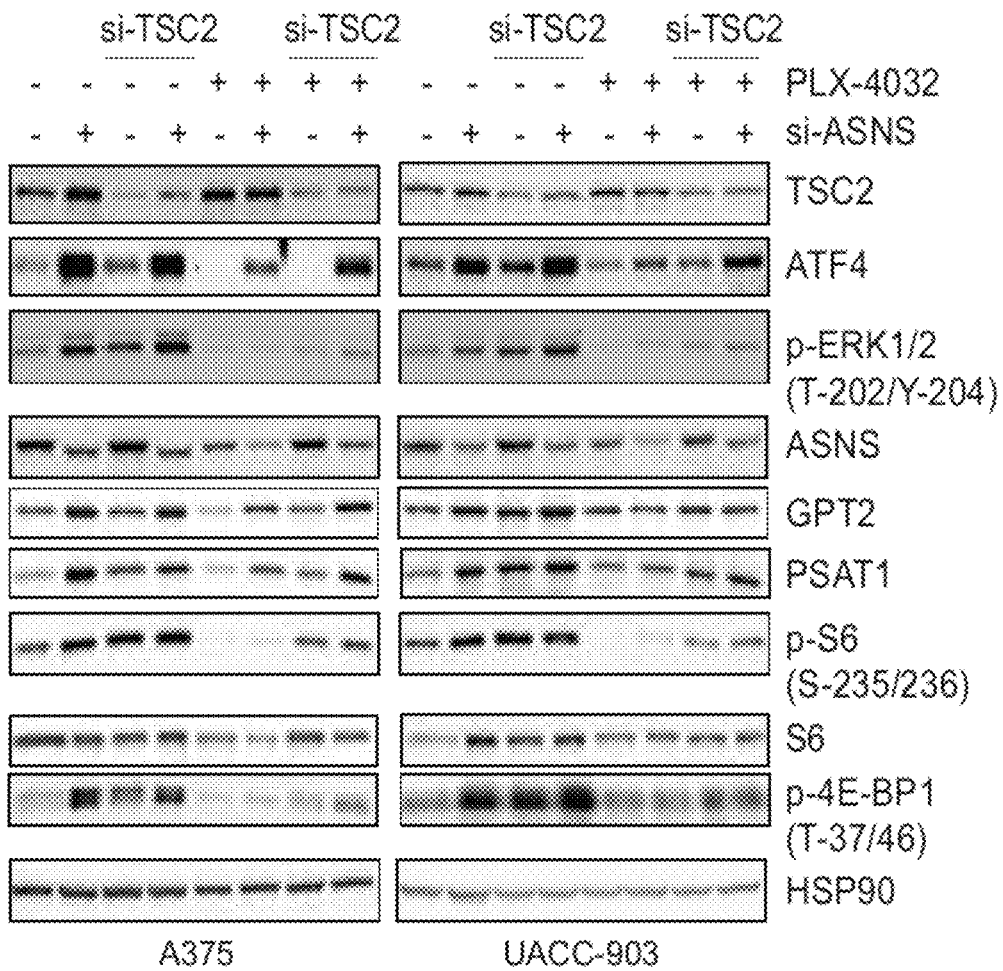
(FIG. 7J) Immunoblotting of indicated proteins in A375 and UACC-903 cells 72 hr after treatment with si-ASNS, si-TSC2, PLX-4032, or the indicated combinations.
Figure 7K:
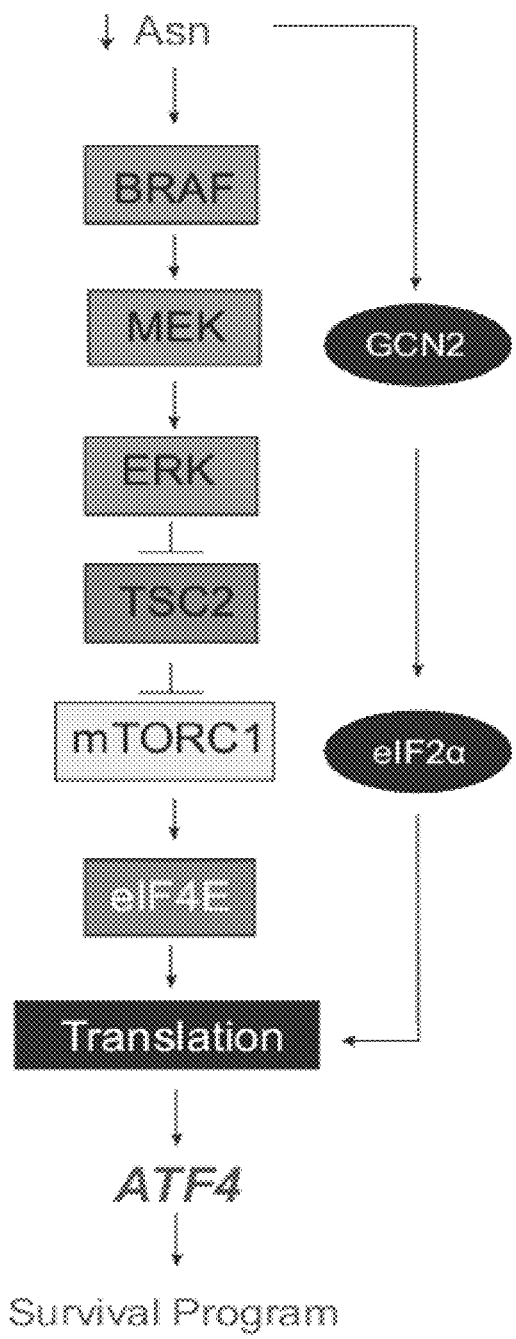
(FIG. 7K) Scheme depicting MAPK regulation of mTORC1 activity and consequent ATF4 translation. Data are presented as the mean±SEM. Statistical significance (**p<0.0001; *p<0.001; **p<0.01; *p<0.05; ns, not significant) was calculated using unpaired t-test except for (FIG. 7I), where two-way Anova was used. In (FIG. 7H), red stars show the statistical comparison between mock (set to 1.0) and si-ASNS-treated cells. In (FIG. 7I), black and orange stars correspond to the comparison between si-ASNS #1 and si-ASNS #1+rapamycin and si-ASNS #2 and si-ASNS #2+rapamycin respectively.
Figure 8A:
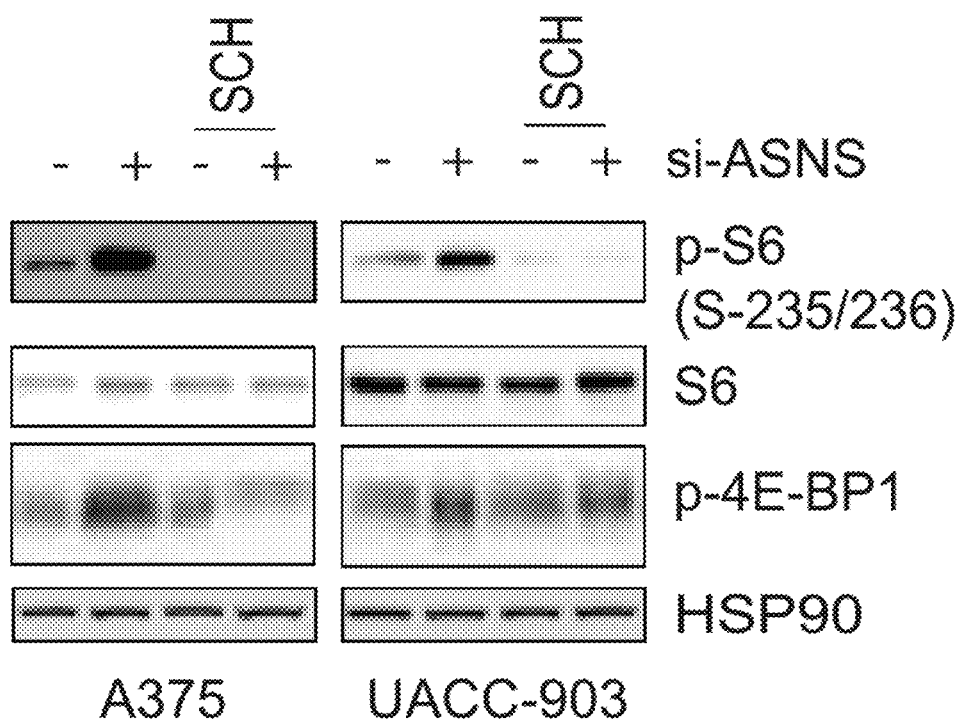
(FIG. 8A) Immunoblotting of phosphorylated and total S6 protein and phosphorylated 4E-BP1 in melanoma cells 72 hr after treatment with si-ASNS, SCH-772984, or both.
Figure 8B:
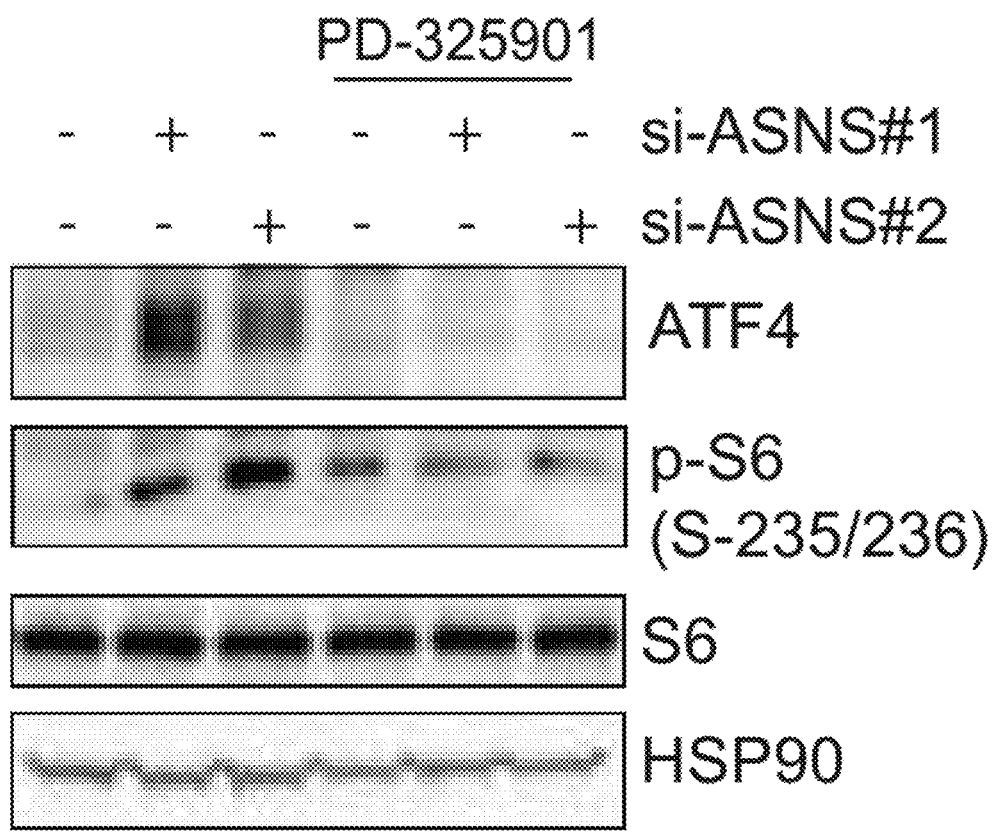
(FIG. 8B) Immunoblotting of ATF4 and phosphorylated and total S6 protein in Mia-Paca-2 cells 72 hr after treatment with si-ASNS #1 or #2, PD-325901, or a combination of respective si-ASNSs and PD-325901.
Figure 8C:
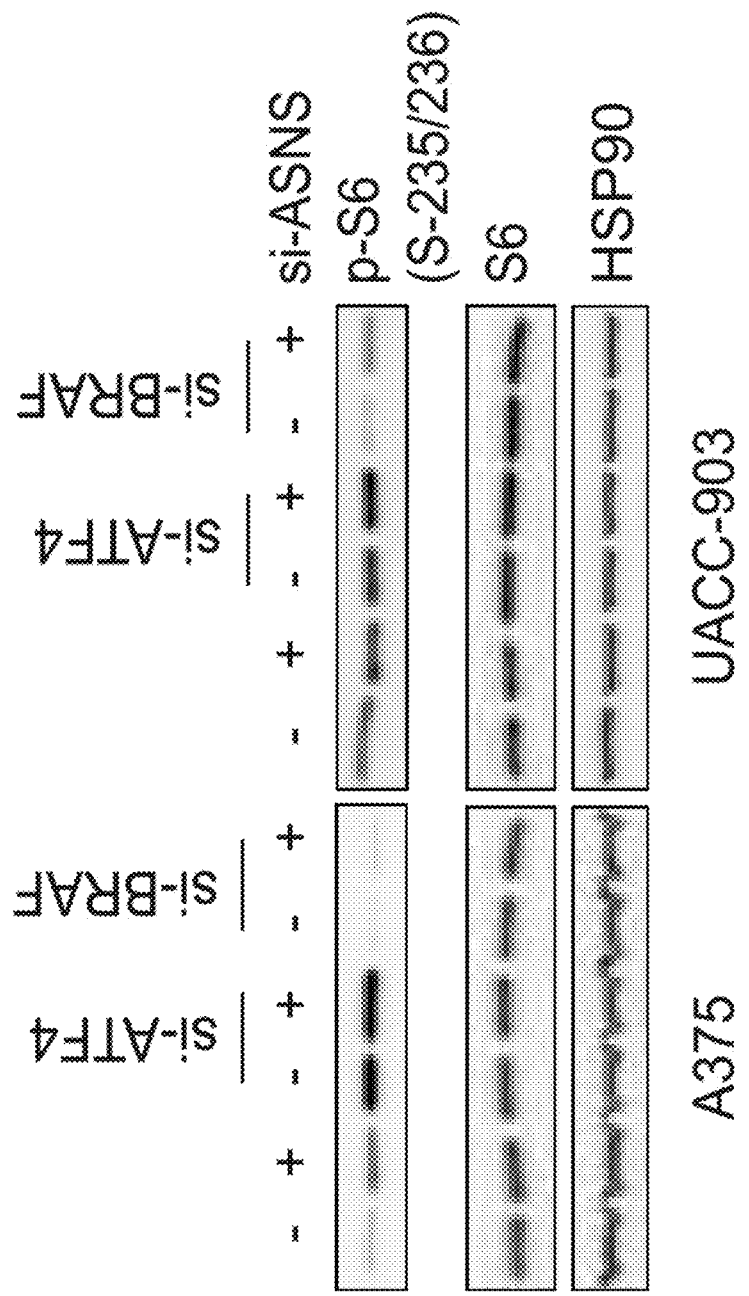
(FIG. 8C) Immunoblotting of phosphorylated and total S6 protein in melanoma lines 72 hr after treatment with si-ASNS, si-ATF4, si-BRAF, or indicated combinations.
Figure 8D:
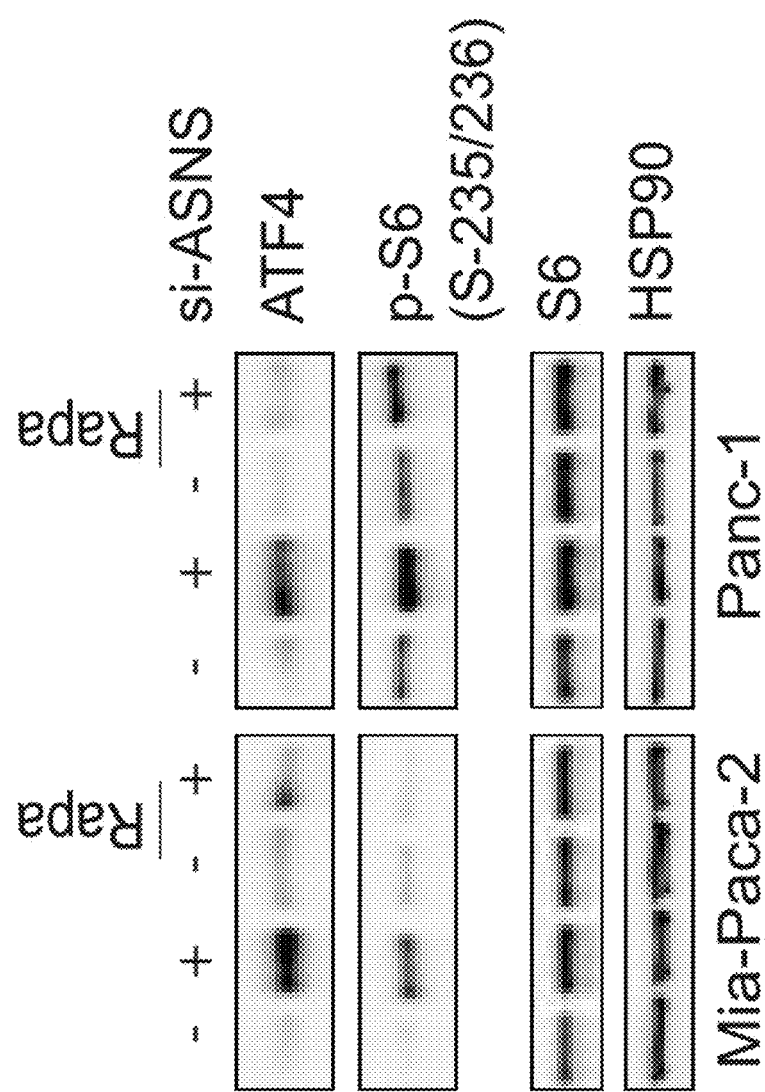
(FIG. 8D) Immunoblotting of ATF4 and phosphorylated and total S6 protein in pancreatic cancer lines 72 hr after treatment with si-ASNS, rapamycin, or both.
Figure 8E:
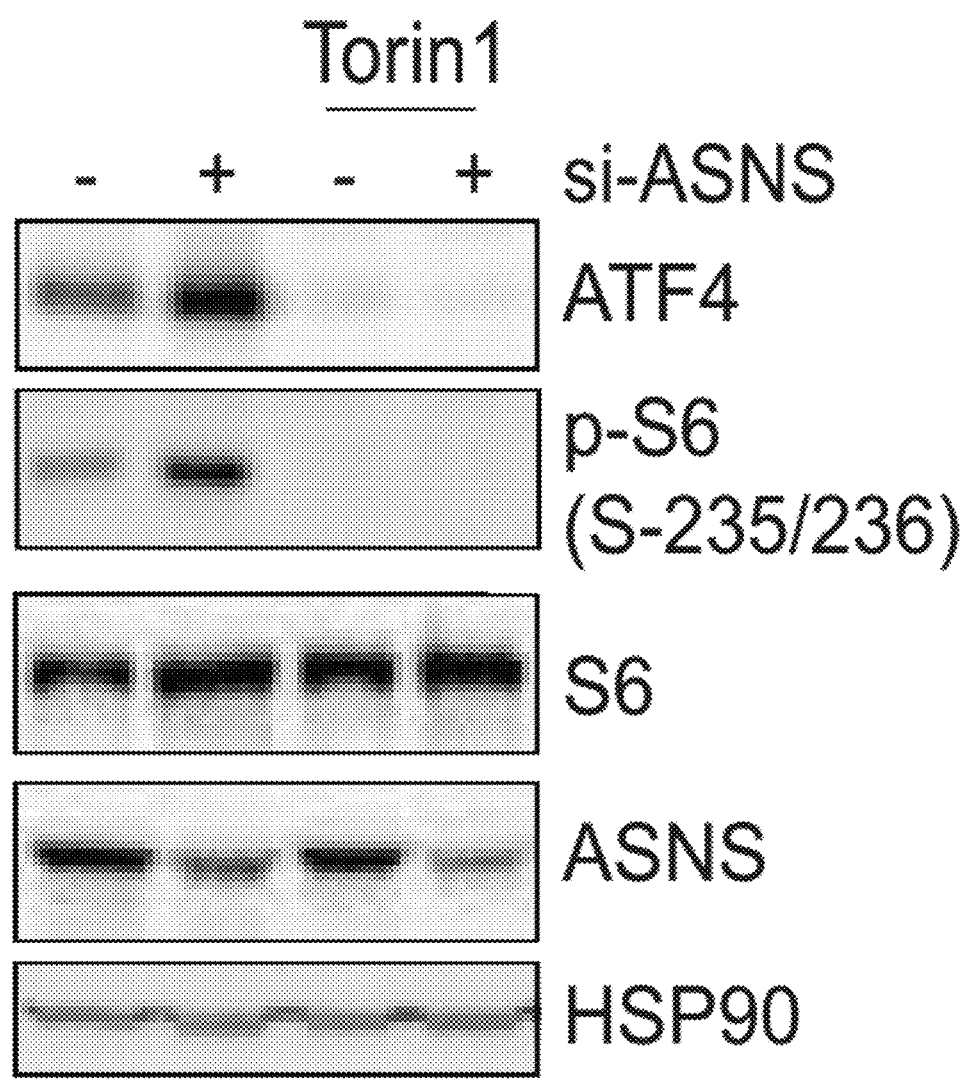
(FIG. 8E) Immunoblotting of ATF4, ASNS, and phosphorylated and total S6 protein in Mia-Paca-2 cells 72 hr after treatment with si-ASNS, torin 1, or both.
Figure 8F:
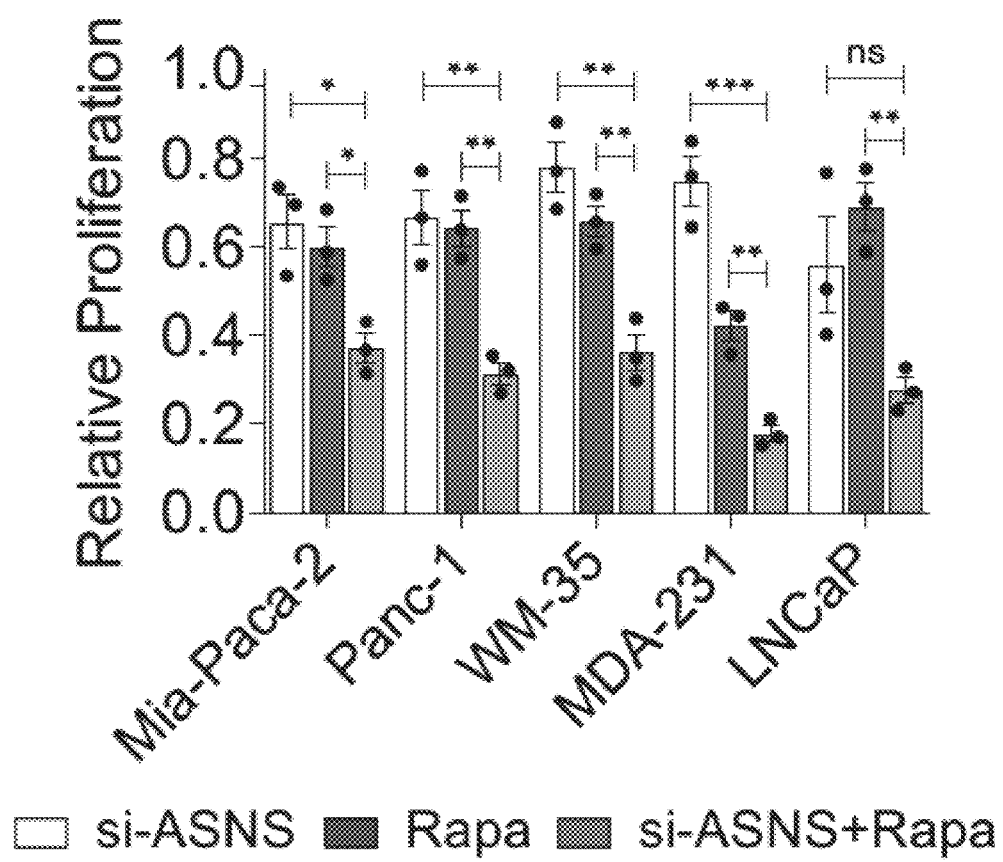
(FIG. 8F) Proliferation of cancer lines measured 72 hr after treatment with si-ASNS, rapamycin, or both. Values are shown relative to mock (NT-siRNA and DMSO)-treated cells. Data are presented as the mean±SEM. Statistical significance (*$p<0.001$; $p<0.01$; *$p<0.05$; ns, not significant) was calculated using unpaired t-test.

Polysome profiling provides a real-time snapshot of mRNAs bound to ribosomes undergoing active translation. To confirm that the modulation of ATF4 expression by ASNS depletion and/or MAPK inhibition occurs at the level of protein synthesis, efficiency of ATF4 mRNA translation was monitored using polysome profiling in A375 cells treated with either si-ASNS, a BRAF inhibitor (PLX-4032), or combination thereof. In comparison to mock-treated cells, ASNS depletion increased ATF4 mRNA translation as illustrated by the shift of ATF4 mRNA from subpolysomal (fractions 6-8) to heavy polysome (fractions 12,16) fractions, while BRAF inhibition caused the opposite effect (FIG. 7H). Importantly, BRAF inhibition attenuated increase in translational efficiency of ATF4 mRNA caused by ASNS depletion as evidenced by decreased ATF4 mRNA levels in the heavy polysome fractions and concomitant increase in sub-polysomal fractions as compared to ASNS depletion alone (FIG. 7H). These data suggest that MAPK-mTORC1-eIF4E axis mediates increase in ATF4 levels, which allows adaptation of cancer cells to asparagine-restriction. Indeed, mTORC1 inhibition enhanced anti-proliferative activity of ASNS knockdown in various cancer lines (FIGS. 7I and 8F). Lastly, uncoupling of mTORC1 activity from MAPK signaling through RNAi-mediated suppression of TSC2 partially restored mTORC1 activity despite BRAF inhibition (FIG. 7J). This in turn partly rescued induction of ATF4 and its target genes (PSAT1 and GPT2) seen upon ASNS suppression (FIG. 7J). Overall, these data demonstrate a requirement for MAPK-mTORC1-eIF4E signaling in the control of ATF4 translation and suggest a potential role for the cap-dependent translation initiation machinery in this process (FIG. 7K).

Figure 9A:
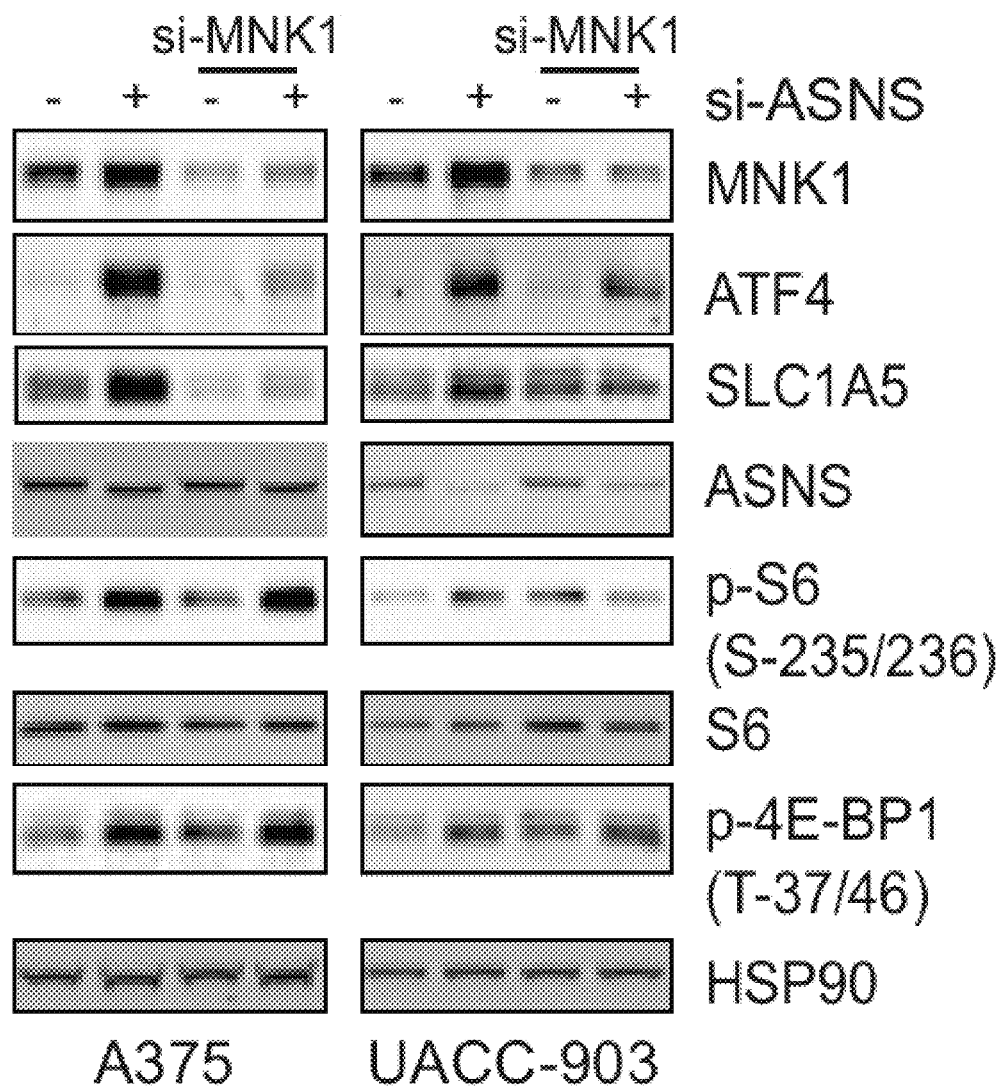
(FIG. 9A) Immunoblotting of MNK1, ATF4, SLC1A5, ASNS, and phosphorylated and total S6 and 4E-BP1 proteins in melanoma lines 72 hr after treatment with si-ASNS, si-MNK1, or both.
Figure 9B:
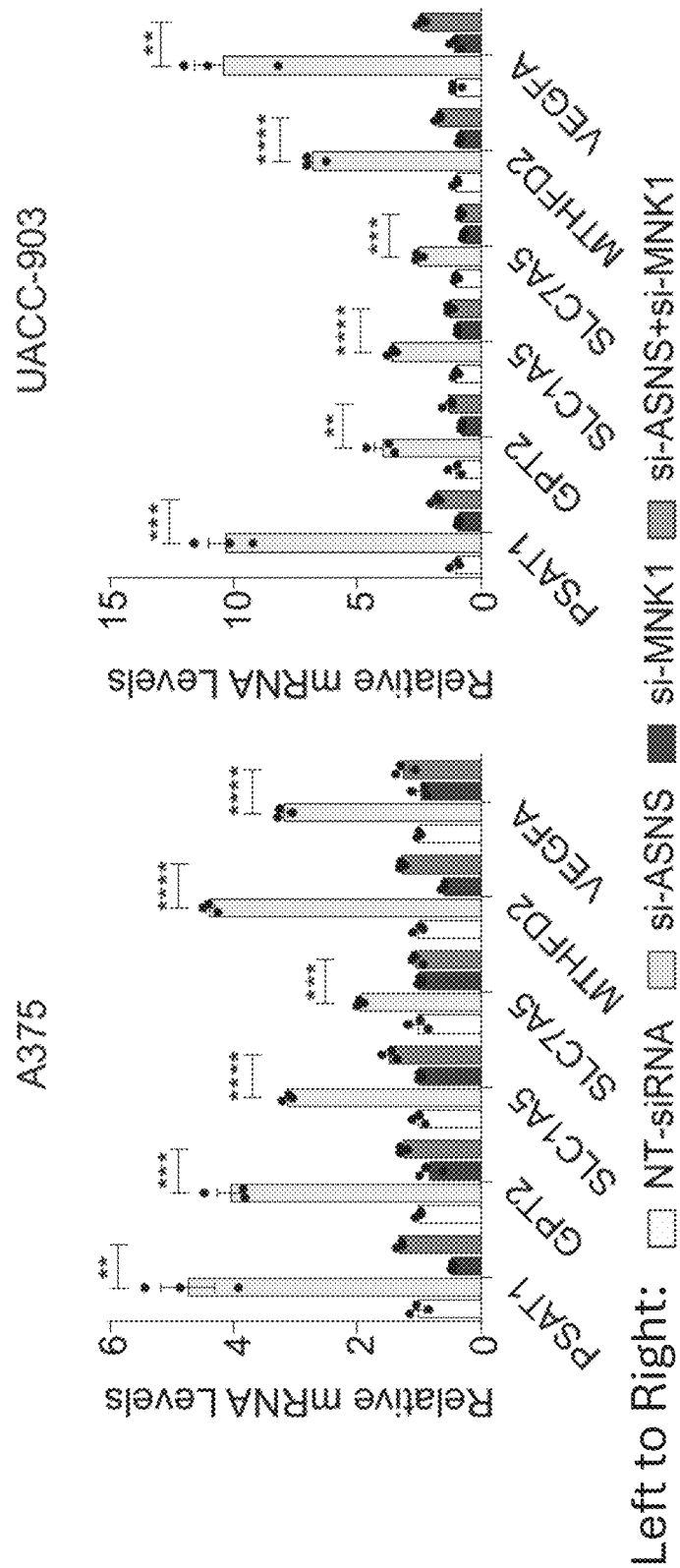
(FIG. 9B) qRT-PCR analysis of transcripts encoding ATF4 targets in melanoma lines 48 hr after treatment with si-ASNS, si-MNK1, or both.
Figure 9C:
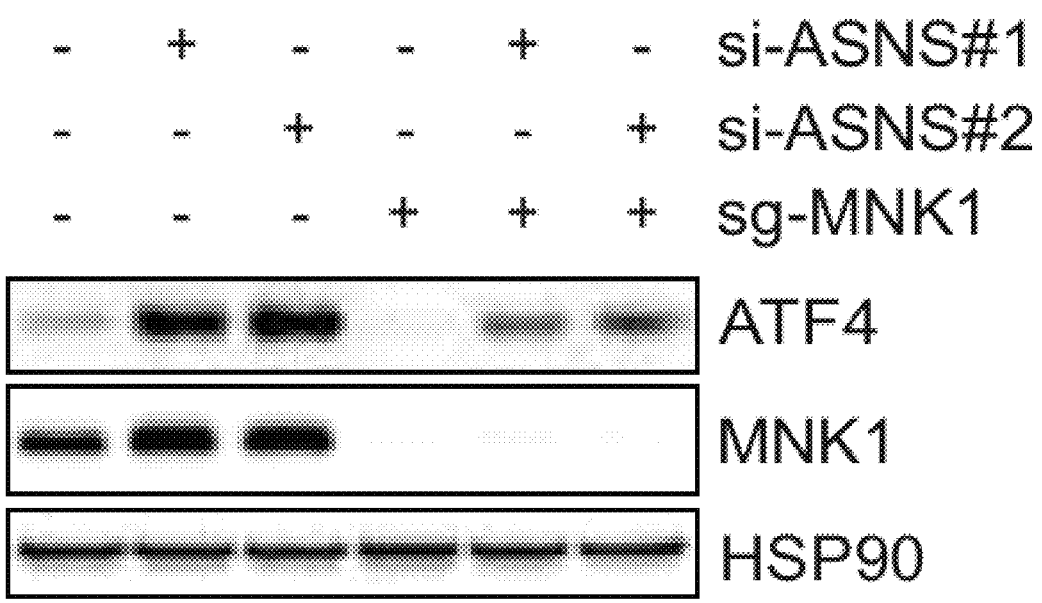
(FIG. 9C) Immunoblotting of ATF4 and MNK1 in A375 cells stably transduced with mock (Cas9 alone (−)) or Cas9 and single guide RNA (sgRNA) targeting MNK1 (sgMNK1), and treated with si-ASNS #1 or #2 for 72 hr.
Figure 9D:
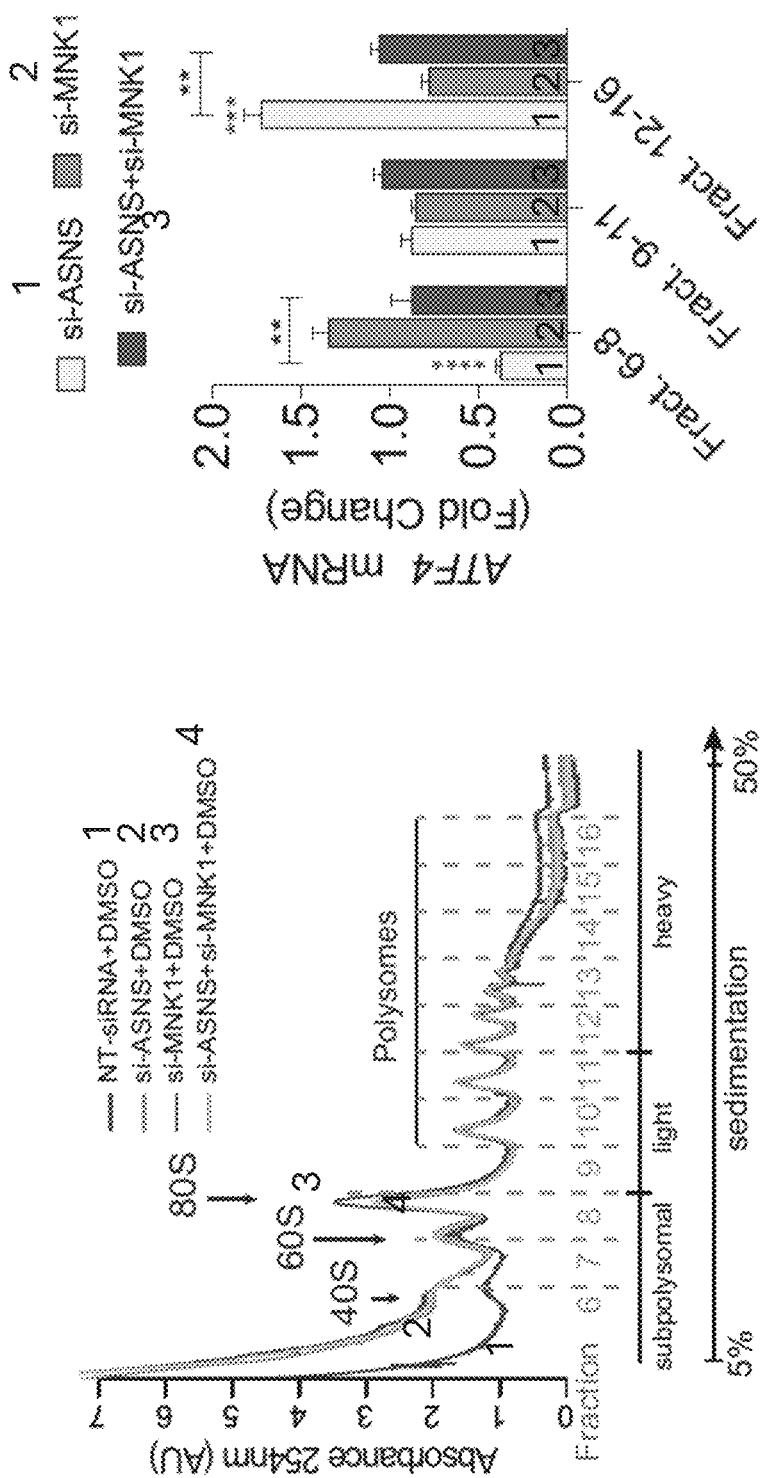
(FIG. 9D) Absorbance profiles at 254 nm of A375 cells treated with si-ASNS, si-MNK1, or both for 48 hr (left), and corresponding qRT-PCR analysis of ATF4 mRNA levels in subpolysomal, light, and heavy polysomal fractions (right). Levels of mRNA shown as fold change in comparison to mock (NT-siRNA+DMSO).
Figure 9E:
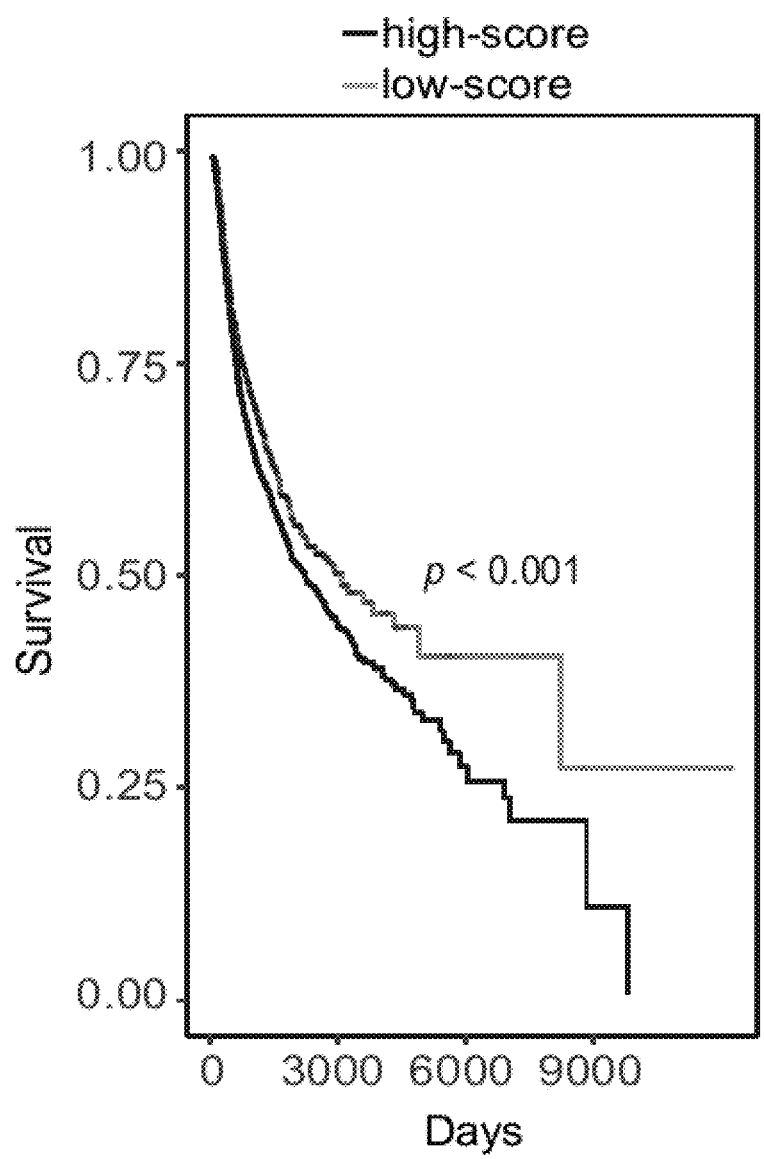
(FIG. 9E) The Kaplan-Meier plot shows the patients with co-inactivation of ASNS and MNK1 exhibit better prognosis (grey) compared to the rest of the patients (black; logrank $P<0.001$, AUC=0.13) in pan-cancer analysis. A gene was denoted to be inactive if its expression determined by RNAseq data is below bottom tertile in each cancer type.
Figure 10A:
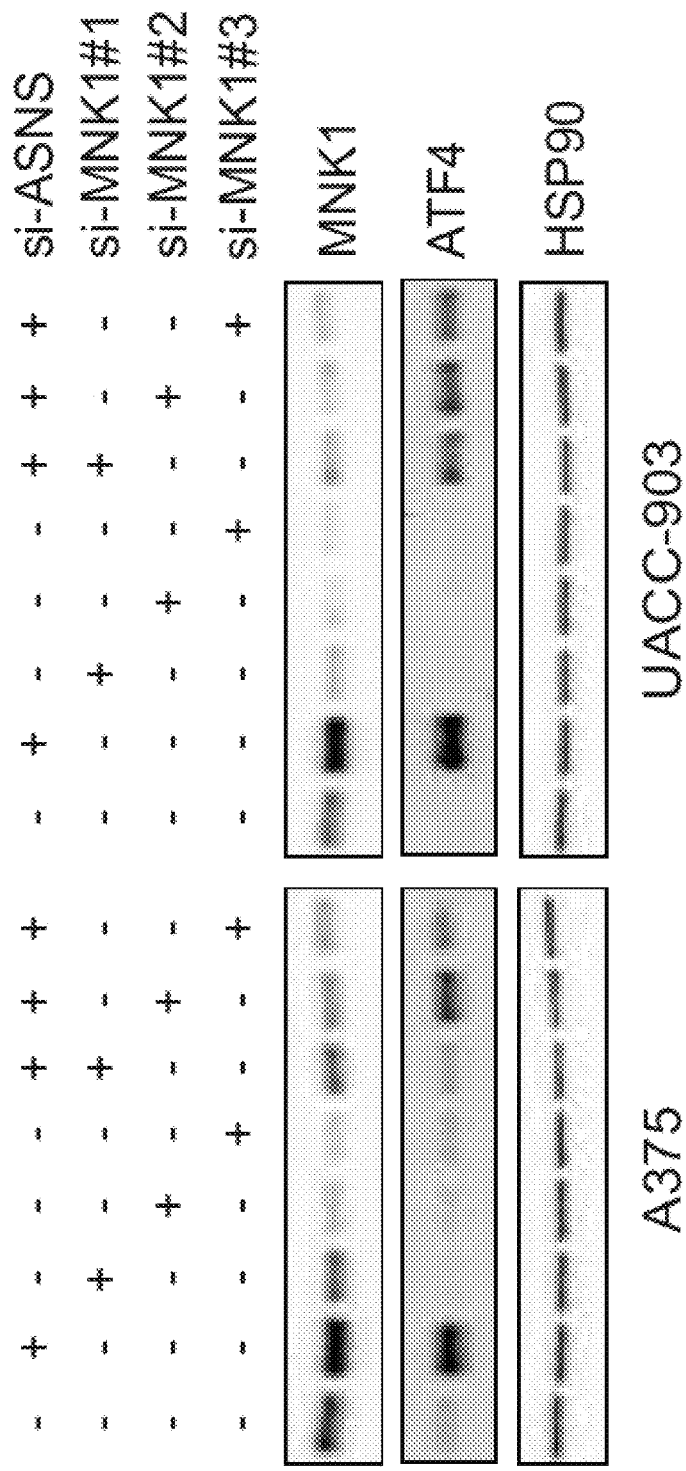
(FIG. 10A) Immunoblotting of MNK1 and ATF4 in melanoma lines 72 hr after treatment with si-ASNS, si-MNK1 #1, #2 or #3, or indicated combinations of si-ASNS with si-MNK1 #1-#3.
Figure 10B:
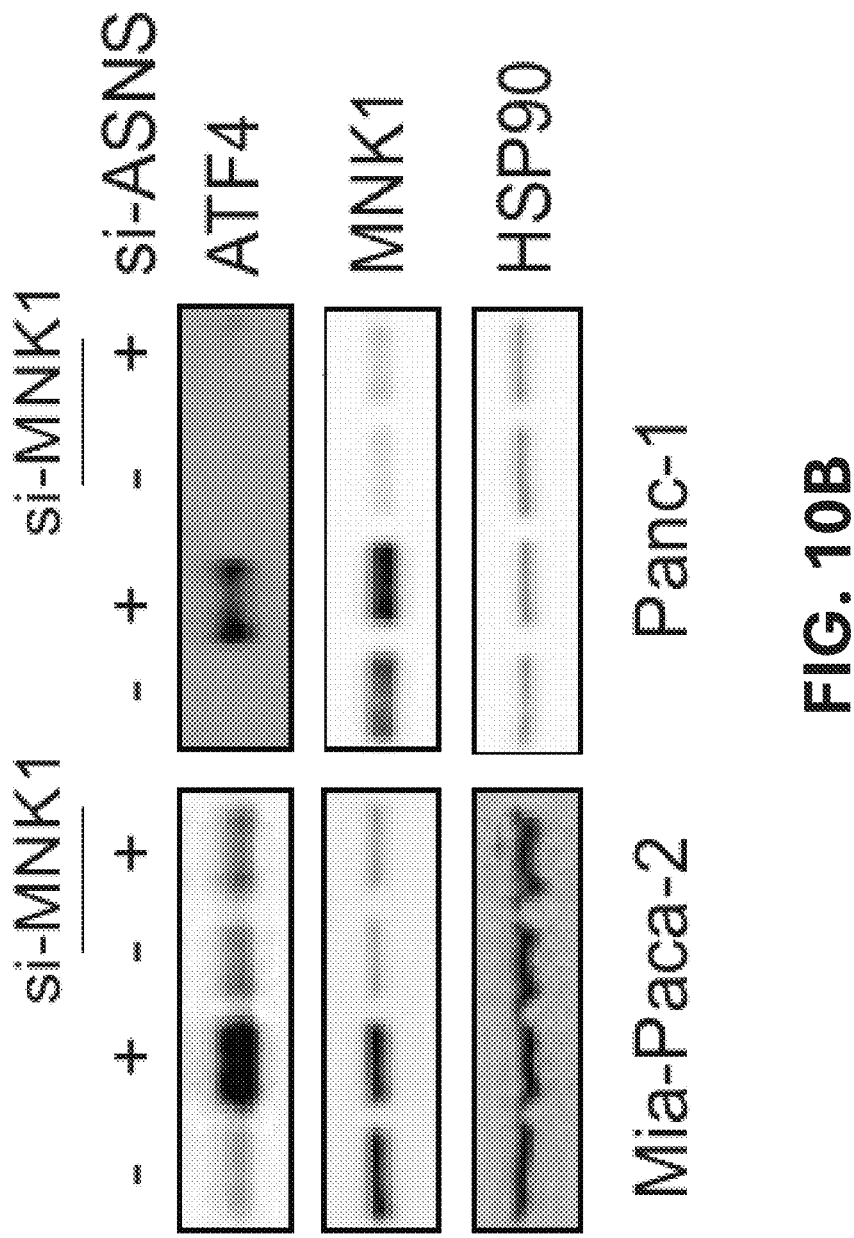
(FIG. 10B) Immunoblotting of MNK1 and ATF4 in Mia-Paca-2, and Panc-1 cells 72 hr after treatment with si-ASNS, si-MNK1, or both.
Figure 10C:
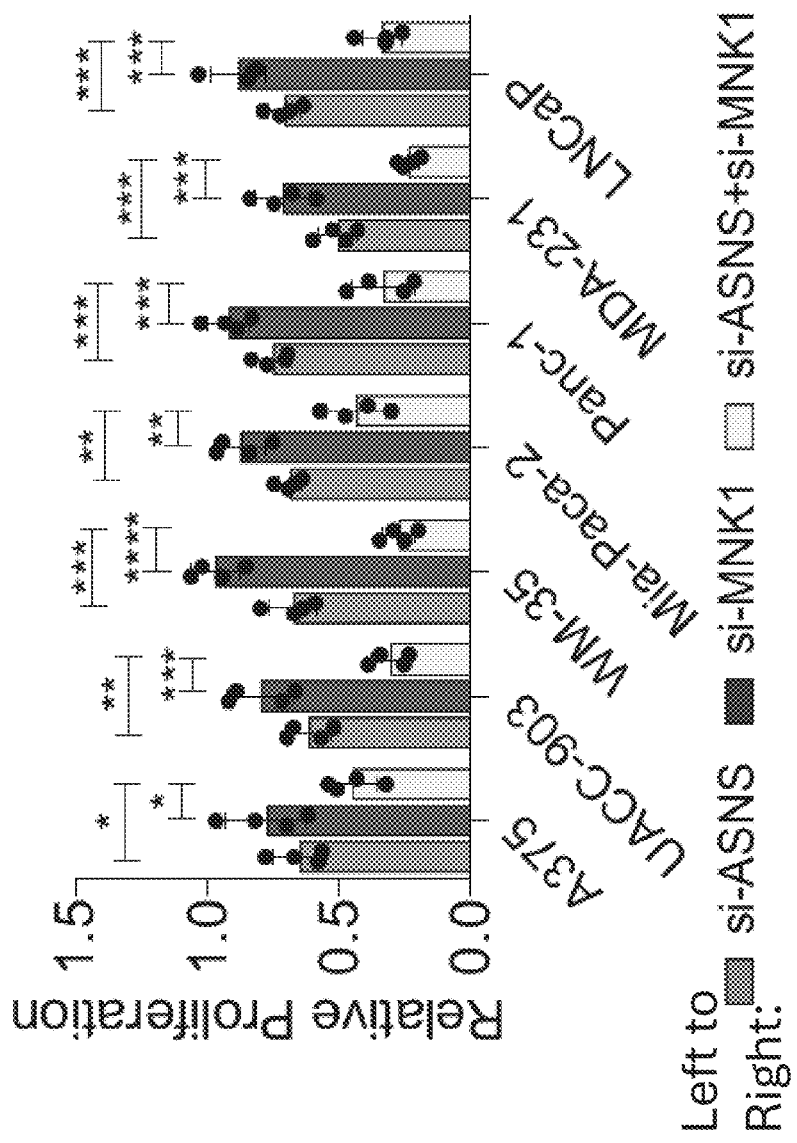
(FIG. 10C) Proliferation of cancer lines 72 hr after treatment with si-ASNS, si-MNK1, or both relative to NT-siRNA treated cells.

MNK1 is implicated in the regulation of cap-dependent translation initiation by directly phosphorylating Ser-209 (in mammals) on eIF4E; (Bramham et al., Trends Biochem Sci 41, 847-858(2016)), which is required for its oncogenic activity (Furic et al., Proc Natl Acad Sci USA 107, 14134-14139 (2010)). siRNA-mediated MNK1 knockdown in melanoma lines compromised ATF4 induction and almost completely rescued ATF4-mediated transcriptional changes associated with ASNS suppression (FIGS. 9A, 9B, and 10A). Inactivation of MNK1 by CRISPR-Cas9-mediated gene editing in A375 cells further enabled assessment of its possible role in ATF4 induction following ASNS knockdown. si-ASNS treatment of A375 cells in which MNK1 was inactivated showed diminished ATF4 induction compared to cells that retained MNK1 expression (FIG. 9C). Next, polysome profiling of A375 cells depleted of ASNS and MNK1 showed a decrease of ATF4 mRNA in heavy polysome fractions, with a concomitant increase in sub-polysomal fractions relative to ASNS only depleted cells (FIG. 9D). Together, these data suggest that the translational upregulation of ATF4 caused by ASNS depletion is MNK1- dependent. Although MNK1 was implicated in positive regulation of mTORC1 activity (Brown and Gromeier, Cell Rep 18, 1444-1457(2017)), MNK1 knockdown in melanoma cells did not alter si-ASNS-dependent increases in mTORC1 activity (FIG. 9A), suggesting that MNK1 regulation of ATF4 occurs independently of changes in mTORC1 activity. As in melanoma cells, MNK1 knockdown in Mia-Paca-2 and Panc-1 pancreatic lines blocked ATF4 induction following ASNS knockdown, suggesting a general requirement for MNK1 in ATF4 translation upon asparagine restriction (FIG. 10B). Functionally, MNK1 knockdown potentiated the anti-proliferative effects of ASNS knockdown (FIG. 10C). Notably, pan-tumor analysis showed that concomitant low expression of ASNS and MNK1 is associated with poorer patient survival, substantiating the clinical relevance of ASNS and MNK1 synthetic lethal interaction (FIG. 9E).

Figure 9F:
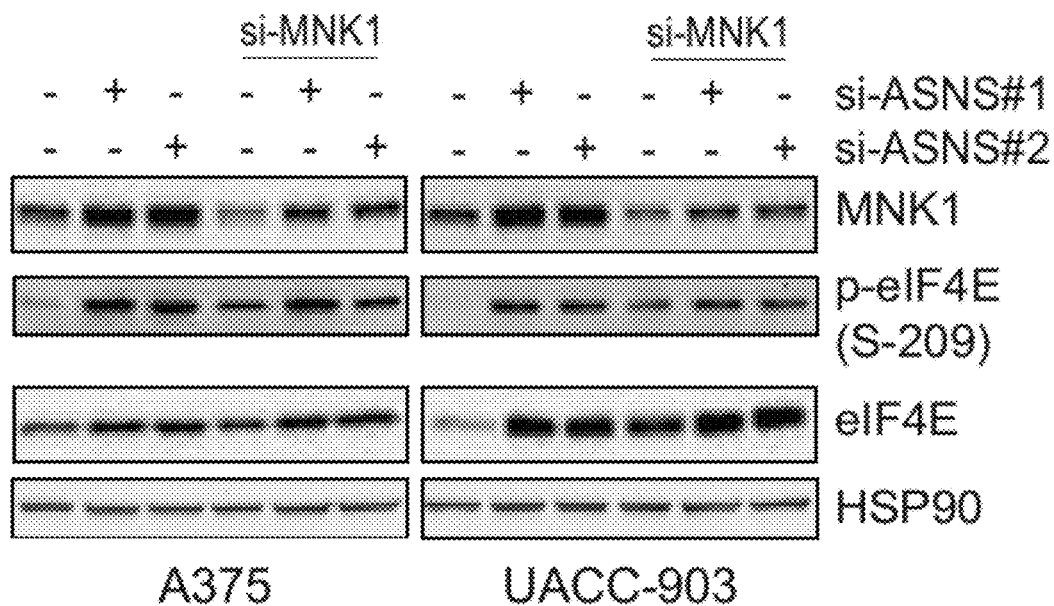
(FIG. 9F) Immunoblotting of MNK1 and phosphorylated and total eIF4E in melanoma lines 72 hr after treatment with si-ASNS #1 or #2, si-MNK1, or a combination of si-ASNS #1 or #2 with si-MNK1.
Figure 9G:
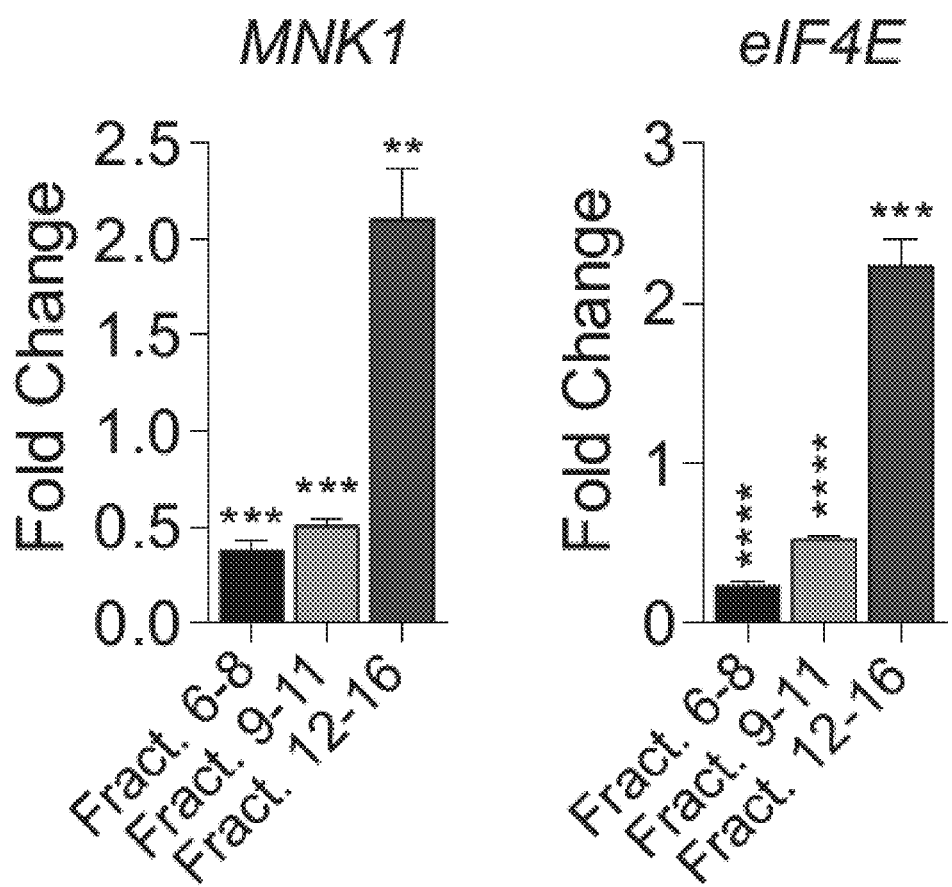
(FIG. 9G) qRT-PCR analysis of MNK1 and eIF4E mRNA levels in subpolysomal, light, and heavy polysomal fractions of A375 cells treated with si-ASNS relative to mock treatment.
Figure 10D:
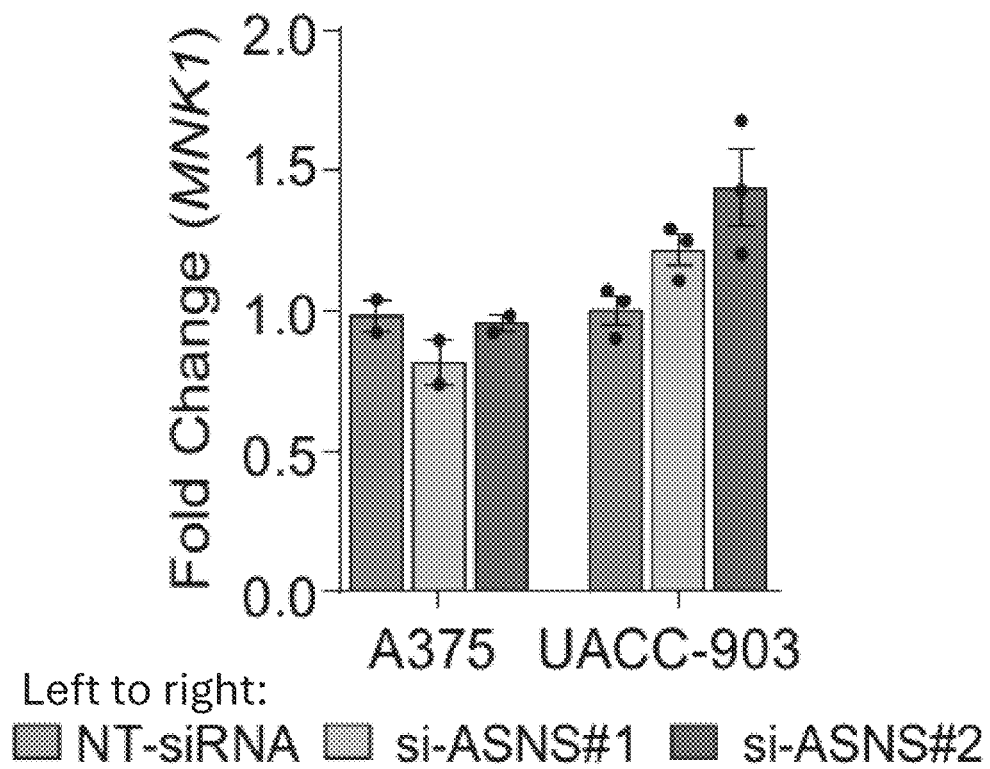
(FIG. 10D) qRT-PCR analysis of MNK1 transcripts in melanoma lines 48 hr after treatment with indicated si-ASNS.
Figure 10E:
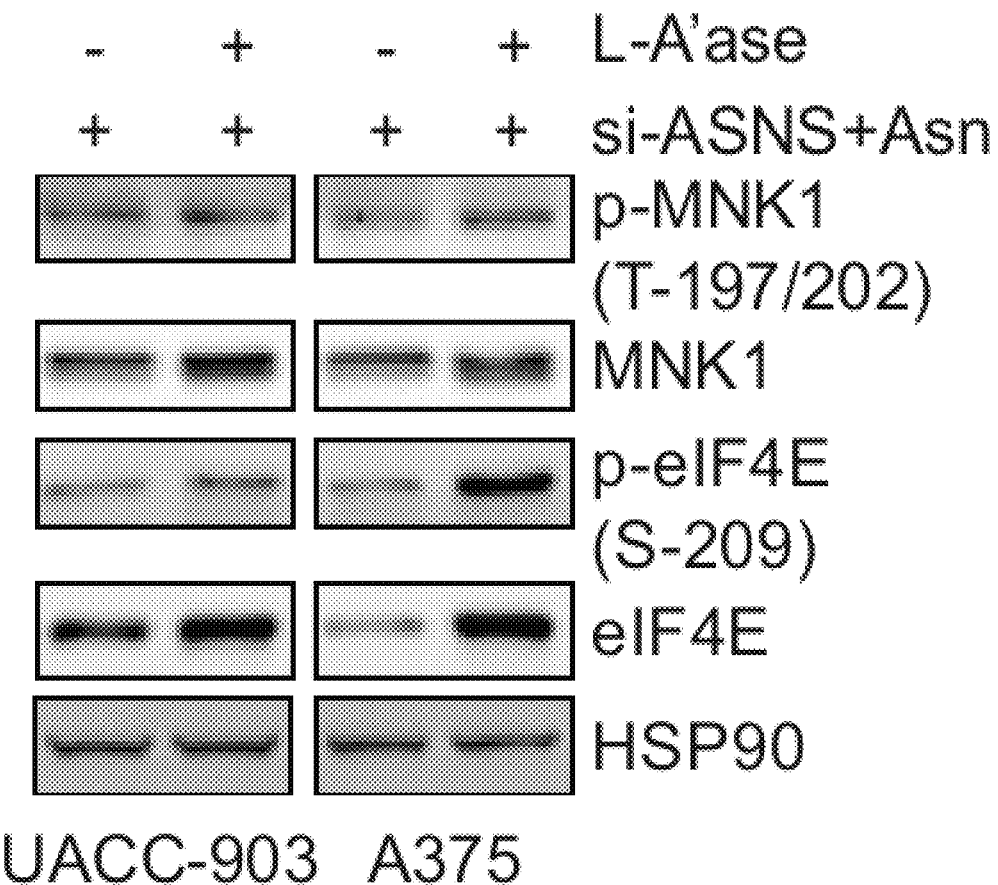
(FIG. 10E) Immunoblotting of phospho and total MNK1 and eIF4E proteins in melanoma lines after 72 hr treatment with si-ASNS and L-asparagine (0.3 mM), with or without L-A'ase.

Activation of MAPK signaling was reported to promote MNK1 phosphorylation (Waskiewicz et al., EMBO J 16, 1909-1920 (1997). Notably, ASNS knockdown in melanoma cells, which enhances MAPK signaling (FIG. 5), also increased MNK1 protein, without impacting corresponding transcript levels (FIGS. 9F and 10D). Similarly, L-A'ase treatment of ASNS knocked-down melanoma cells, that were cultured in asparagine-containing medium, increased levels of phosphorylated and total MNK1 protein (FIG. 10E), suggesting that MAPK/mTORC1 activity may increase MNK1 translation. Indeed, ASNS suppression in A375 cells increased MNK1 mRNA distribution in heavy polysomal fractions, while depleting its levels in subpolysomal and light polysomal fractions (FIG. 9G).

Figure 9H:
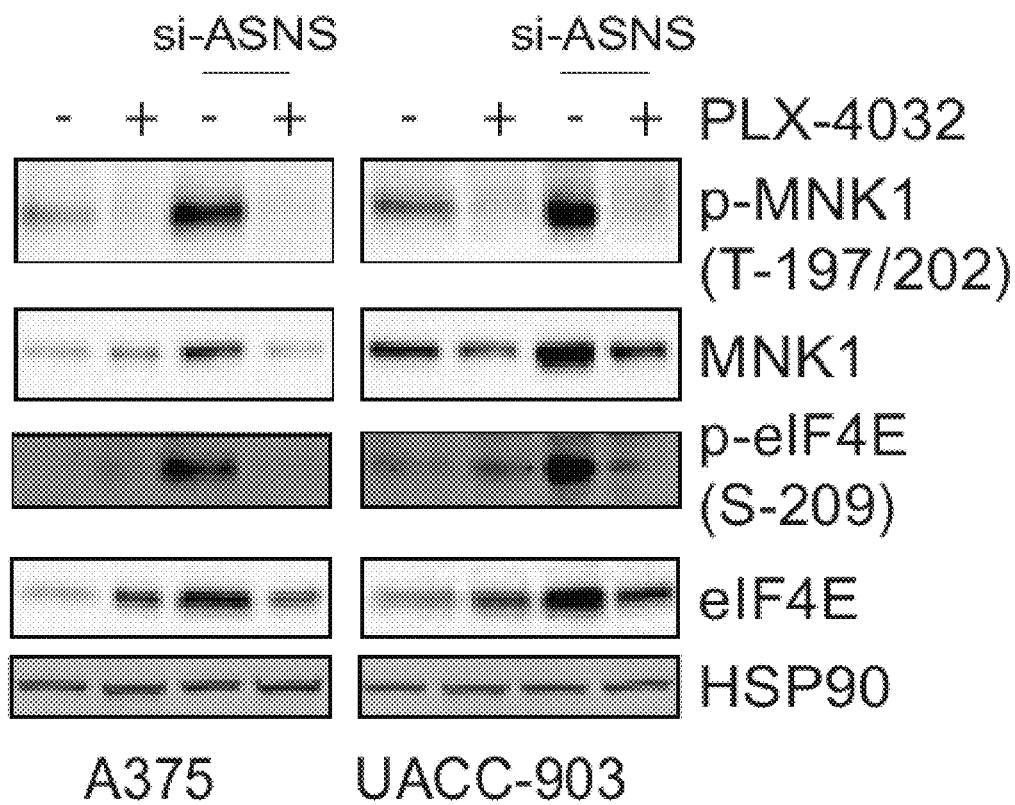
(FIG. 9H) Immunoblotting of phospho and total MNK1 and eIF4E proteins in melanoma lines treated 72 hr with si-ASNS, PLX-4032, or both.
Figure 9I:
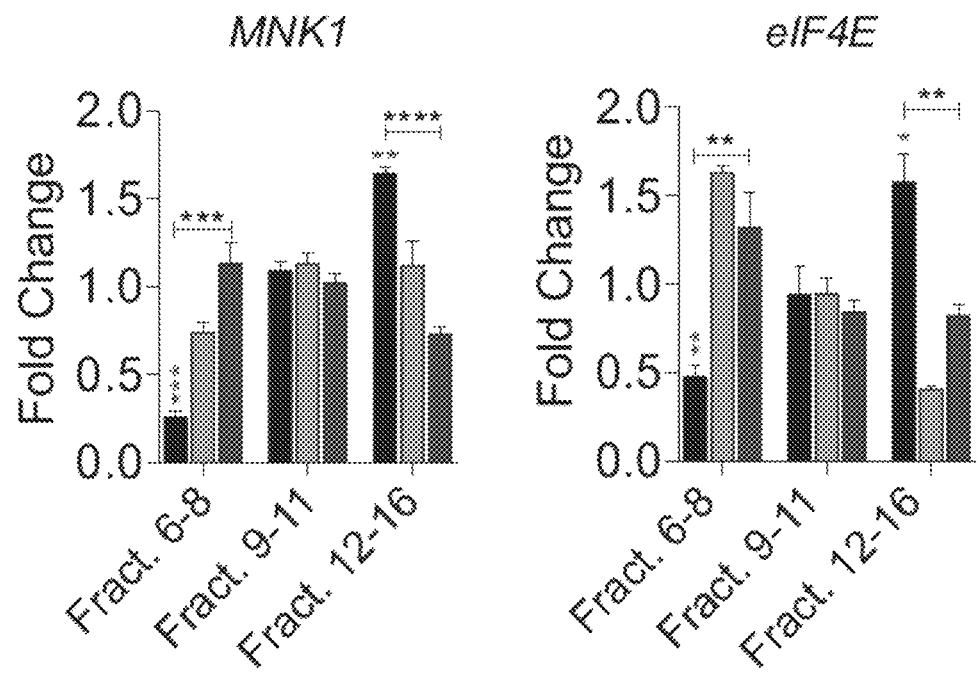
(FIG. 9I) qRT-PCR analysis of MNK1 and eIF4E mRNA levels in subpolysomal, light, and heavy polysomal fractions of A375 cells treated with si-ASNS, PLX-4032, or both relative to mock treatment.
Figure 9J:
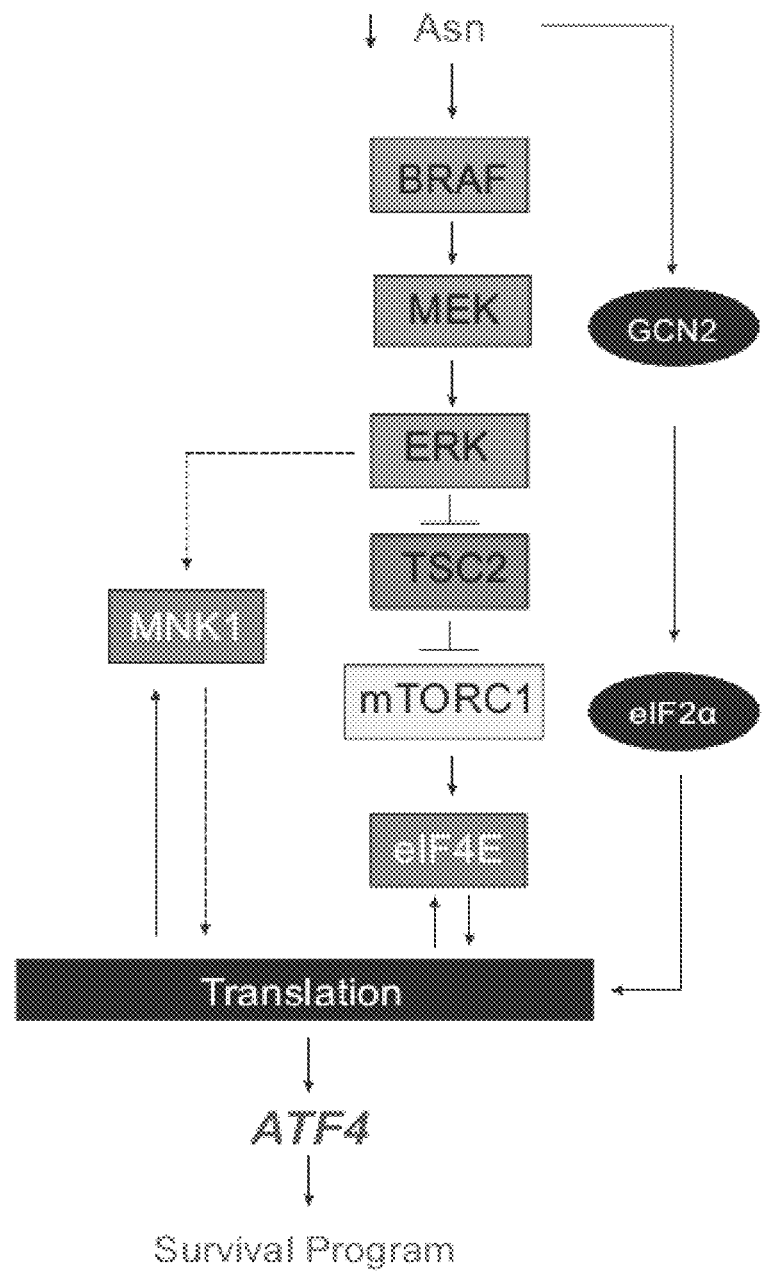
(FIG. 9J) Model showing regulation of ATF4 and associated survival mechanisms in asparagine-restricted cells. Data are presented as the mean±SEM. Statistical significance (**$p<0.0001$; *$p<0.001$; **$p<0.01$; *$p<0.05$; ns, not significant) was calculated using unpaired t-test. In (FIG. 9D and FIG. 9I), red stars show the statistical comparison between mock (set to 1.0) and si-ASNS-treated cells.
Figure 10F:
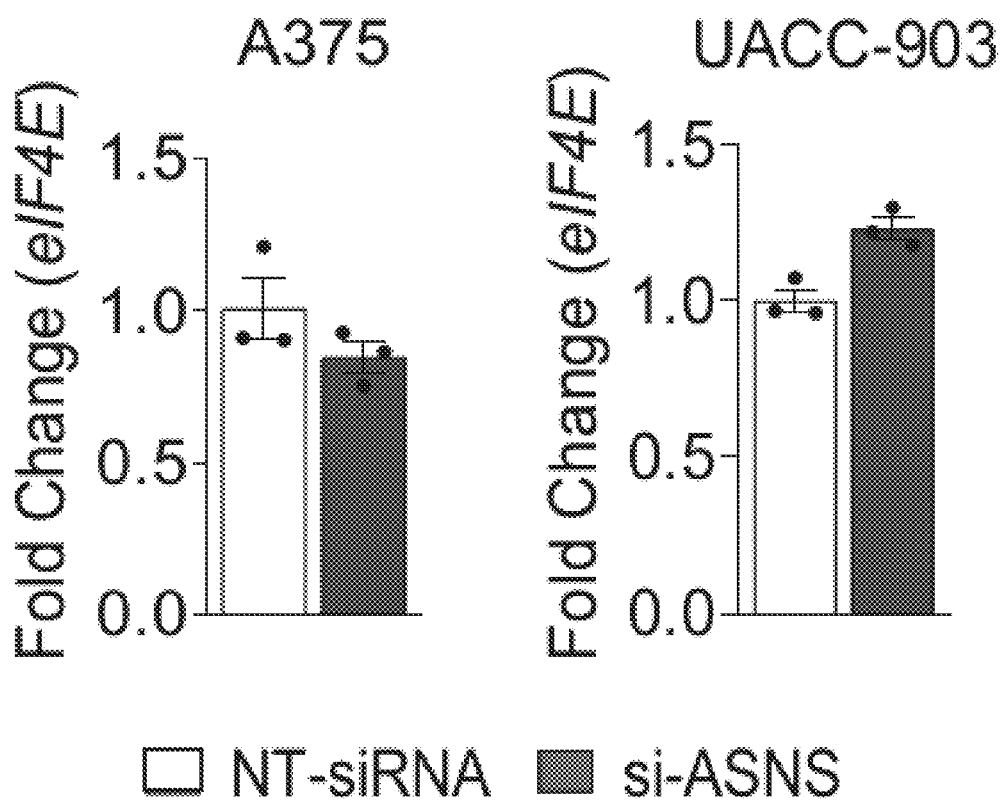
(FIG. 10F) qRT-PCR analysis of eIF4E transcripts in melanoma lines 48 hr after treatment with si-ASNS.
Figure 10H:
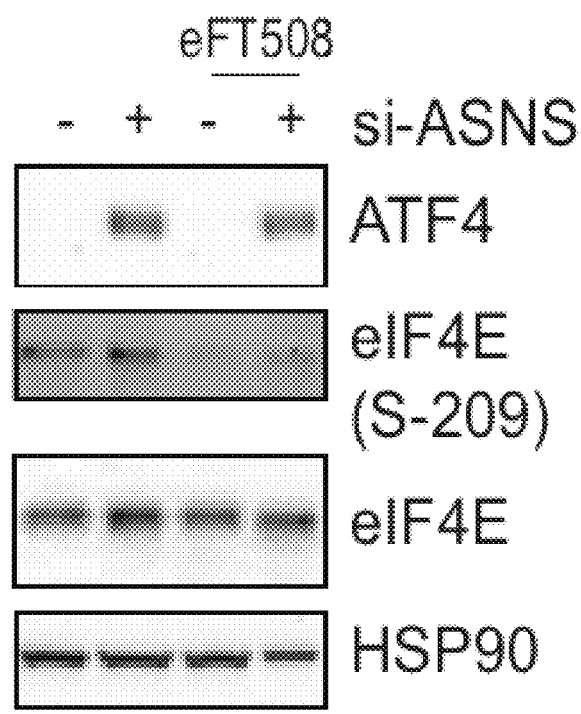
(FIG. 10H) Immunoblotting of ATF4 and phospho-(S209) and total eIF4E protein in UACC-903 cells treated with si-ASNS, eFT508 (100 nM), or both for 72 hr.
Figure 10I:
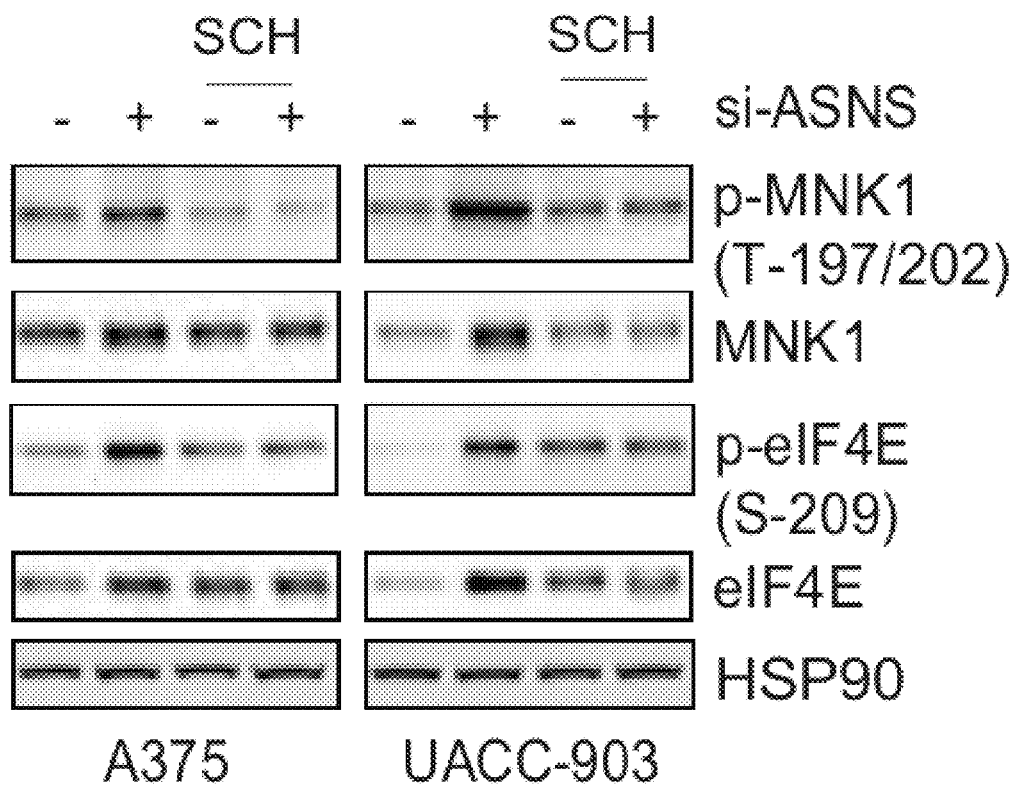
(FIG. 10I and FIG. 10J) Immunoblotting of phospho and total MNK1 and eIF4E proteins in melanoma lines treated 72 hr with si-ASNS, SCH-772984, or both (FIG. 10I), or si-ASNS, rapamycin, or both (FIG. 10J). Data are presented as the mean±SEM. Statistical significance (**$p<0.0001$; *$p<0.001$; **$p<0.01$; *$p<0.05$) was calculated using unpaired t-test.
Figure 10J:
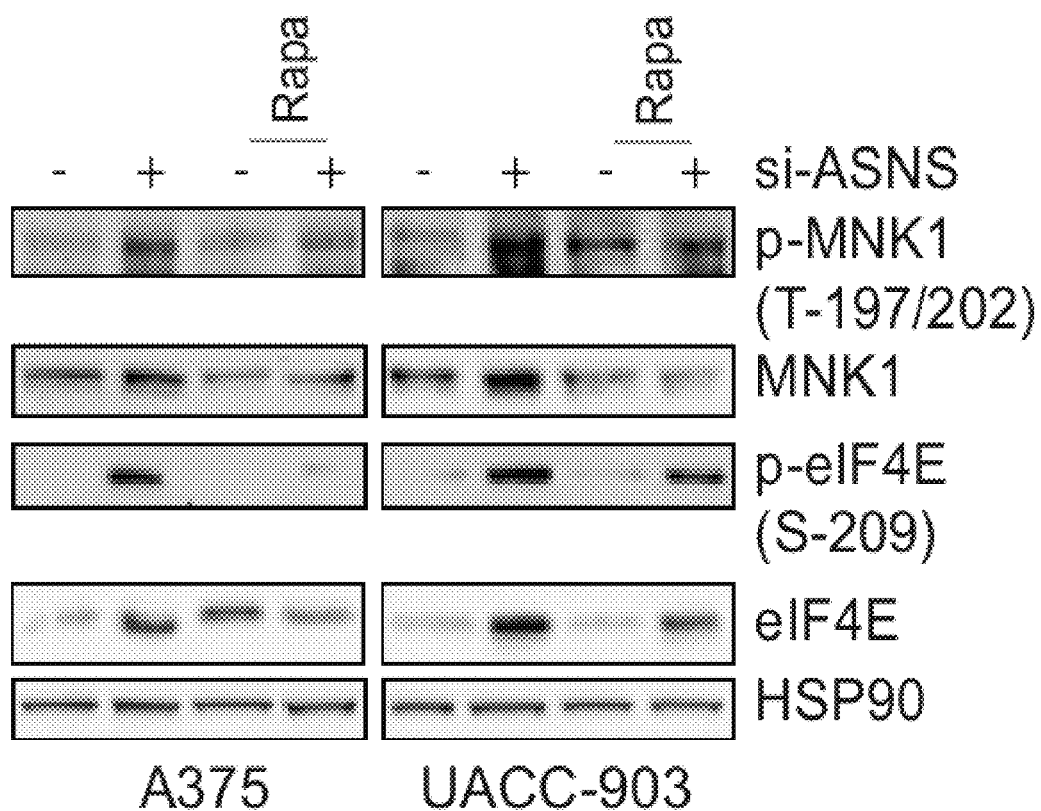

Phosphorylation of eIF4E Ser-209 has been associated with MNK1-mediated translational regulation (Furic et al., 2010). ASNS knockdown in melanoma cells increased phospho-(S209)-eIF4E and total eIF4E protein, but not the corresponding transcript levels (FIGS. 9F and 10F), pointing to enhanced translation of eIF4e in response to ASNS suppression. Indeed, polysome profiling of A375 cells treated with si-ASNS showed enrichment of eIF4E mRNA in heavier polysomal fractions, with a commensurate decrease in subpolysomal and light fractions, reflecting enhanced translation (FIG. 9G). These changes were not part of a general translation induction, given that there was no change in the polysomal distribution of histone H3A mRNA and a decrease in the levels of E-cadherin (CDH1) mRNA in heavy polysomal fractions (FIG. 10G). Notably, while blocking ATF4 induction, MNK1 knockdown in melanoma cells did not suppress eIF4E Ser-209 phosphorylation, suggesting that this phosphorylation is not required for ATF4 induction (FIG. 9F). Furthermore, treatment of A375 cells with the MNK1 inhibitor eFT508, to inhibit phospho-(Ser-209)-eIF4E levels, did not antagonize ATF4 induction in response to ASNS suppression (FIG. 10H). This finding implies that MNK1 regulation of ATF4 translation may be independent of its kinase activity. Lastly, inhibition of BRAF, ERK, or mTORC1 in melanoma cells blocked the increase in levels of phosphorylated and total MNK1 and eIF4E protein levels seen following ASNS suppression (FIGS. 9H, 10I, and 10J). And, enrichment of MNK1 and eIF4E mRNAs in heavy polysomal fractions and decreased distribution in subpolysomal and light fractions in response to ASNS suppression (FIG. 9G) was significantly alleviated upon BRAF inhibition (FIG. 9I). These observations suggest that MAPK signaling modulates the translation machinery not only through post-translational activation of mTORC1 but also through upregulation of MNK1 and eIF4E, key translation initiation machinery components. Altogether, these data implicate the ERK-mTORC1/MNK1-eIF4E pathway in translational regulation underlying the ATF4-mediated survival response following asparagine limitation (FIG. 9J).

Figures 11A, 11B:
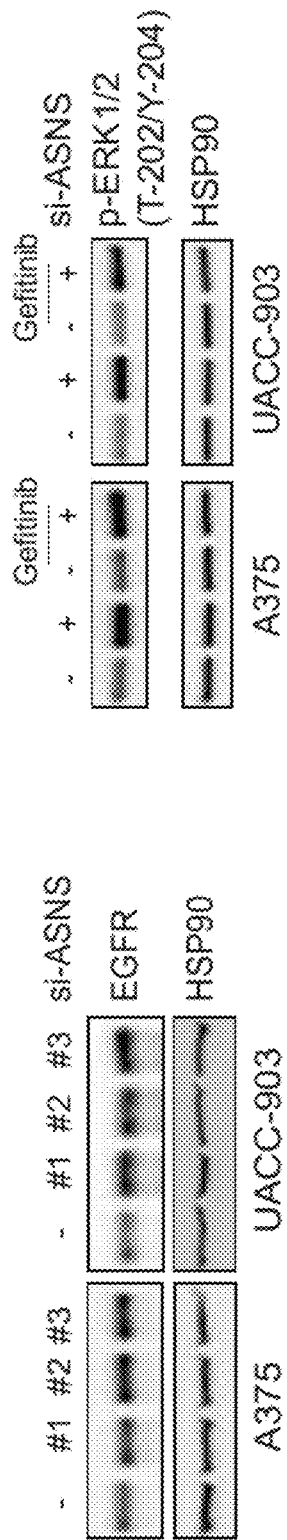
(FIG. 11A) Immunoblotting for EGFR in melanoma cell lines 72 hr after treatment with indicated si-ASNS.
(FIG. 11B) Immunoblotting for phospho-ERK1/2 in melanoma lines treated 72 hr with si-ASNS, EGFR inhibitor (Gefitinib; 1 μM), or both.
Figure 11C:
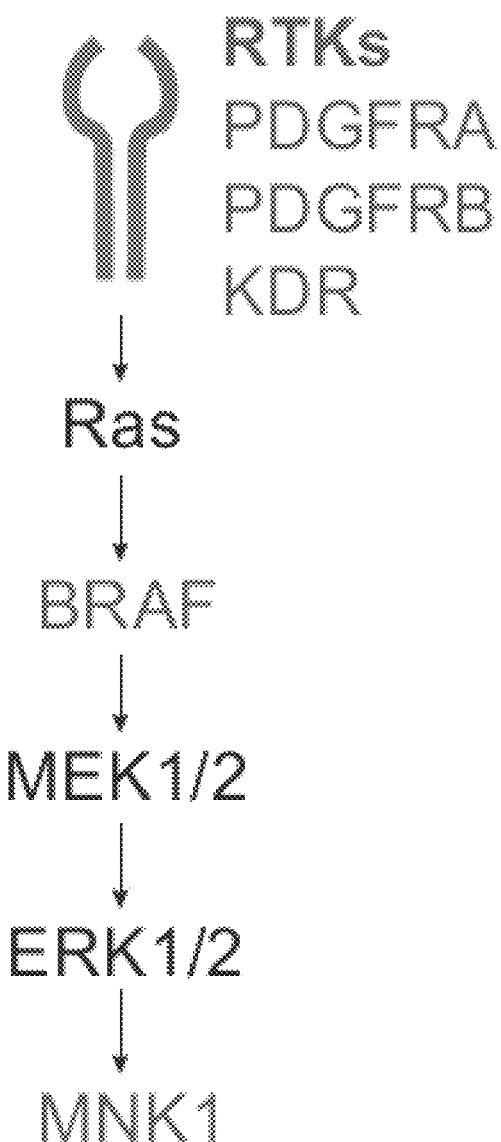
(FIG. 11C) Schematic showing identified ASNS synthetic lethal partners and their position relative to the MAPK signaling pathway.
Figure 11D:
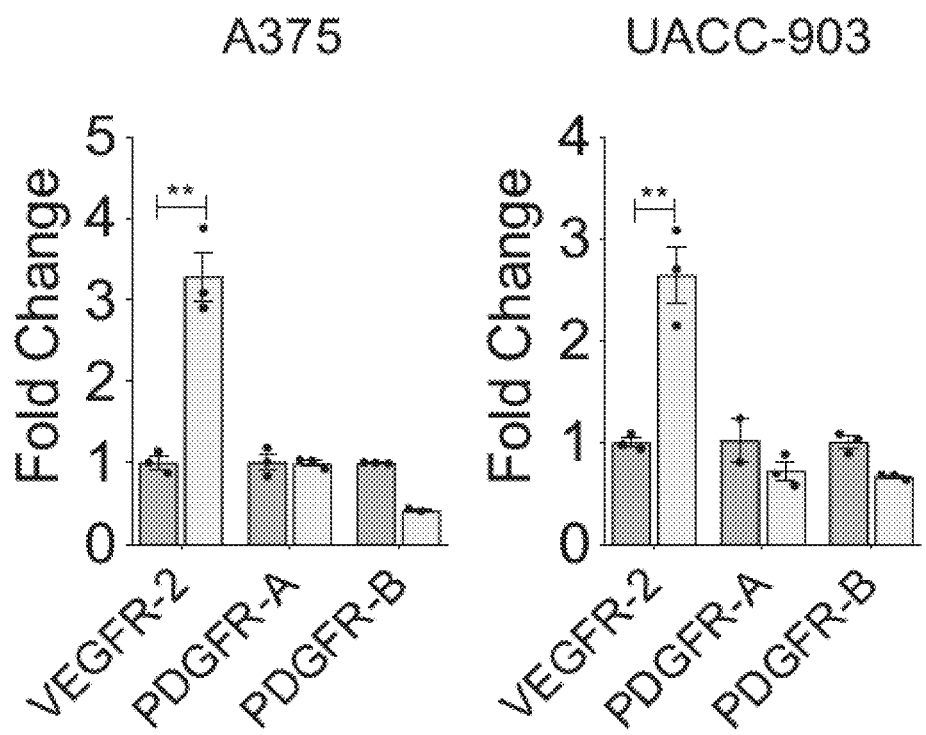
(FIG. 11D) qRT-PCR analysis of transcripts encoding indicated RTKs in melanoma lines 48 hr after treatment with si-ASNS.
Figure 11E:
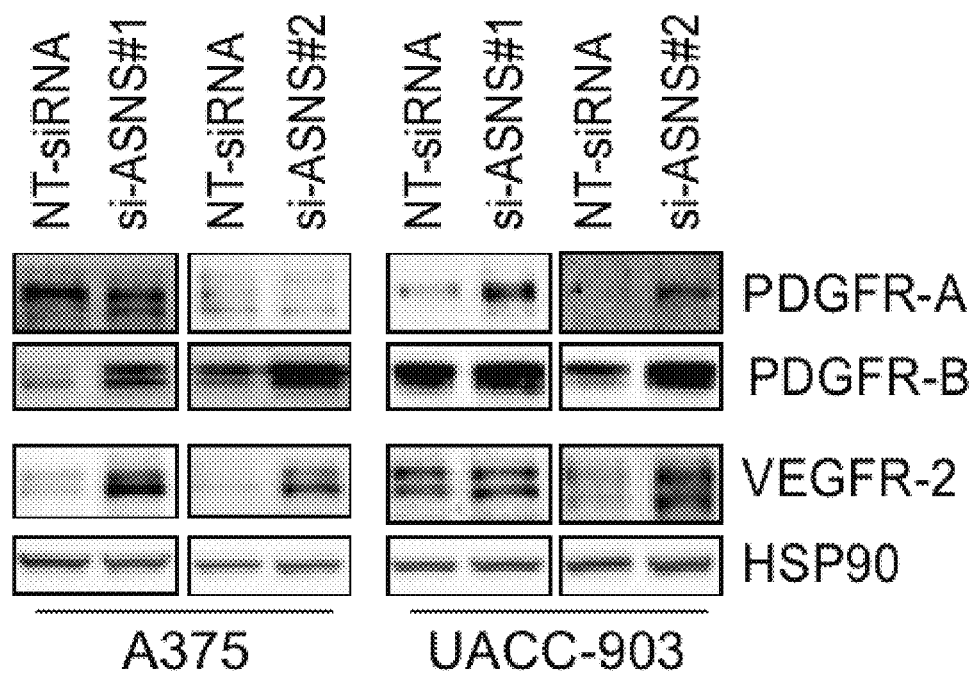
(FIG. 11E) Immunoblotting for VEGFR-2, PDGFR-A, and PDGFR-B in melanoma lines 72 hr after treatment with indicated si-ASNS.
Figure 11F:
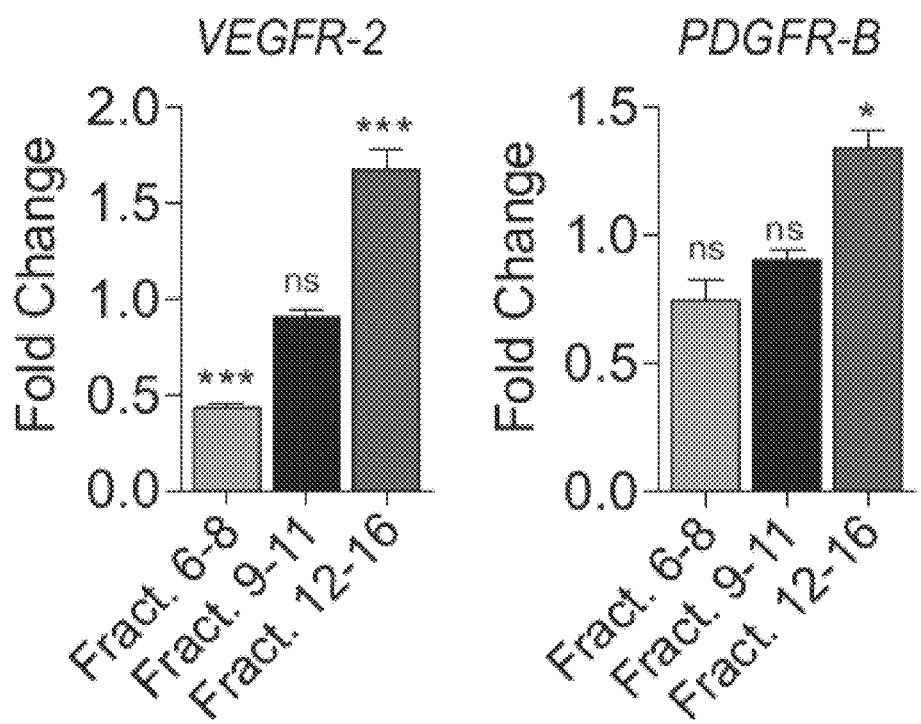
(FIG. 11F) qRT-PCR analysis of VEGFR-2 and PDGFR-B mRNA levels in subpolysomal, light, and heavy polysomal fractions of A375 cells treated with si-ASNS relative to mock treatment.

Example 5. Enhanced MAPK Pathway Activity Following Asparagine Limitation is Receptor Tyrosine Kinase Signaling Dependent Notably, si-ASNS treatment of melanoma cells did not alter EGFR mRNA expression but increased EGFR protein levels independent of mTORC1, eIF4E or MNK1 activity, pointing to cap-independent translational induction (FIGS. 11A and 12A-D; (Webb et al., Oncogenesis 4, e134 (2015)). Interestingly, however, treatment of melanoma cells with the EGFR inhibitor gefitinib did not alter ERK1/2 activation under ASNS knockdown conditions (FIG. 11B), suggesting that either a different mechanism(s) compensates for EGFR inhibition, or that EGFR is dispensable for MAPK activation under limiting asparagine conditions. RTKs are upstream of MAPK signaling, and analysis herein predicted 3 RTKs (VEGFR-2, PDGFR-A, and PDGFR-B), whose transcripts contain uORFs (Wethmar et al., Oncogene 35, 1736-1742 (2016)), as synthetic lethal partners of ASNS (FIG. 11C). Possible changes in the expression of select RTKs following ASNS knockdown were monitored, noting that RTKs can be activated without increase in their expression, and VEGFA (VEGFR-2 ligand) was induced upon asparagine limitation (FIG. 1). While VEGFR-2 transcript levels increased in melanoma cells following ASNS knockdown, PDGFR-A and PDGFR-B transcript levels did not (FIGS. 11D and 12E). Notably, ASNS knockdown in both A375 and UACC-903 cells showed increased levels of VEGFR-2 and PDGFR-B, while PDGFR-A was only induced in UACC-903 cells (FIG. 11E). Polysome profiling of ASNS knocked-down A375 cells showed enrichment of VEGFR-2 and PDGFR-B mRNA in heavy polysomal fractions, and a decrease in subpolysomal and light fractions, suggestive of enhanced translation (FIG. 11F).

Figure 11G:
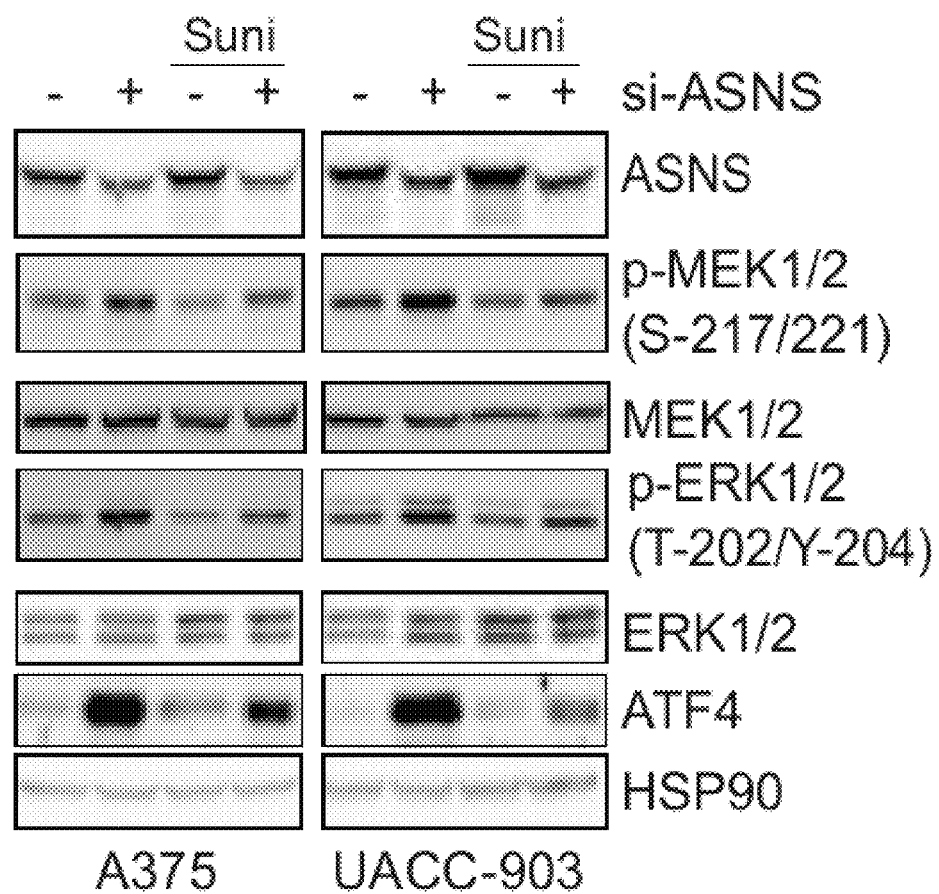
(FIG. 11G) Immunoblotting for ASNS, ATF4, and phospho and total MEK1/2 and ERK1/2 proteins in melanoma lines 72 hr after treatment with si-ASNS, Sunitinib (Suni; 500 nM), or both.
Figure 11H:
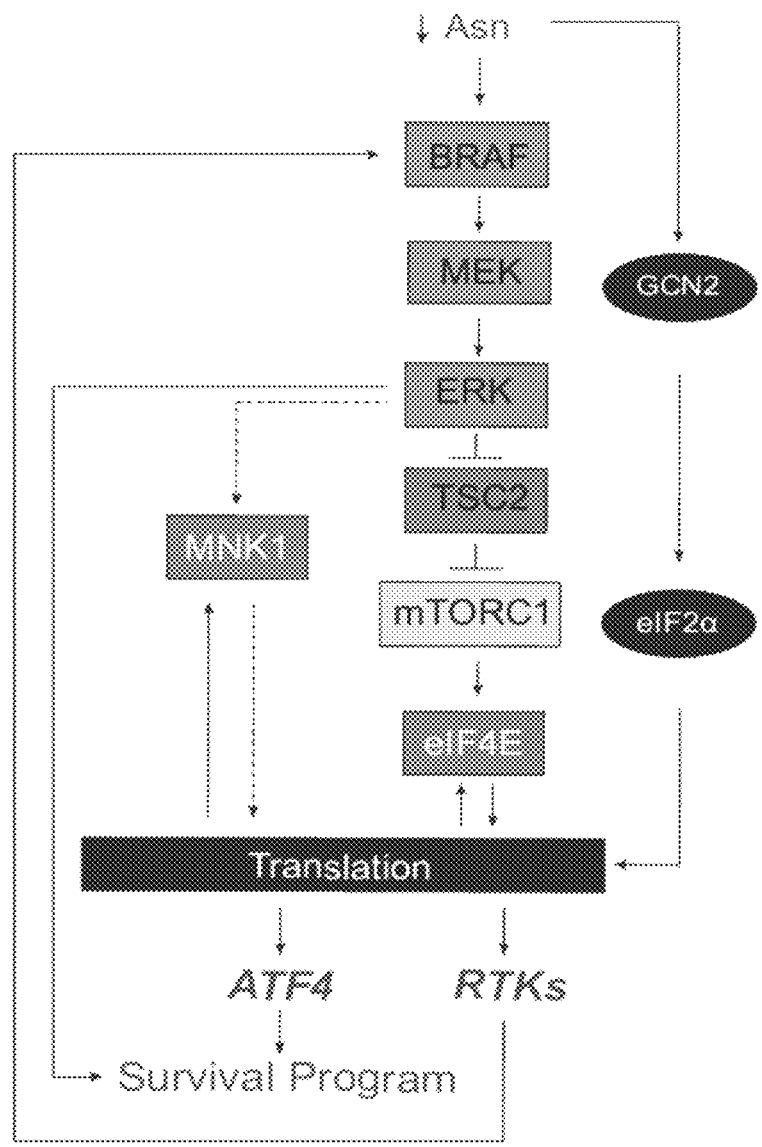
(FIG. 11H) Model depicting cellular survival program orchestrated by translational reprogramming following suppression of asparagine levels. Enhanced GCN2-eIF2a signaling promotes translational reprogramming, upregulating the expression of ATF4 and the components of the translation initiation machinery MNK1 and eIF4E, which are crucial for ATF4 translational induction. Altered translation also upregulates the expression of RTKs, and RTK-MAPK-mTORC1/MNK1 pathways impinge upon the translational initiation machinery to induce ATF4 translation, thus promoting a feed-forward loop to amplify survival signaling. Data are presented as the mean±SEM. Statistical significance (*$p<0.001$; $p<0.01$; *$p<0.05$; ns, not significant) was calculated using unpaired t-test.

To determine whether enhanced RTK signaling was required for MAPK pathway activation, the effect of sunitinib was tested. Sunitinib antagonized enhanced phosphorylation of both MEK1/2 and ERK1/2 following ASNS knockdown in melanoma cells, supporting the notion that RTK signaling modulates MAPK signaling in response to asparagine limitation (FIG. 11G). Consistent with the requirement of MAPK signaling for ATF4 induction, sunitinib treatment overcame ATF4 upregulation in ASNS-depleted cells (FIG. 11G). These studies identify RTK activity as an upstream regulator of MAPK and the ensuing ATF4 induction following ASNS suppression (FIG. 11H).

Figure 13A:
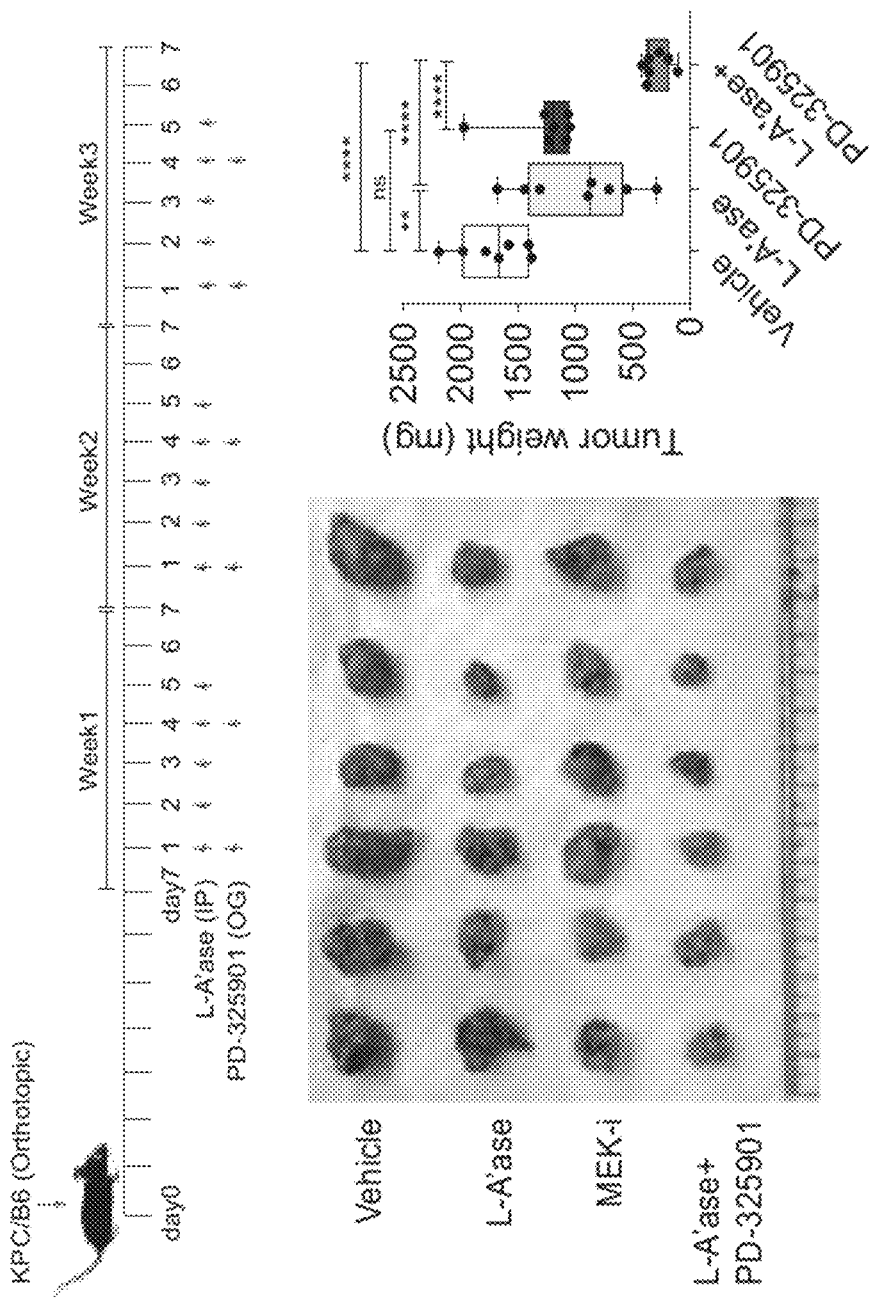
(FIG. 13A) Schematic showing the drug treatment regimen. Size (left) and weight (right) of KRASLSLG12D/+; p53R172H/+; PDXCretg/+(KPC/B6) pancreatic tumors. Mice treated as indicated with vehicle, L-A'ase, PD-325901, or a combination of L-A'ase and PD-325901 (n=8 per group). IP, intraperitoneal; OG, oral gavage. Statistical analysis: Welch's t-test (two-tailed).
Figure 13B:
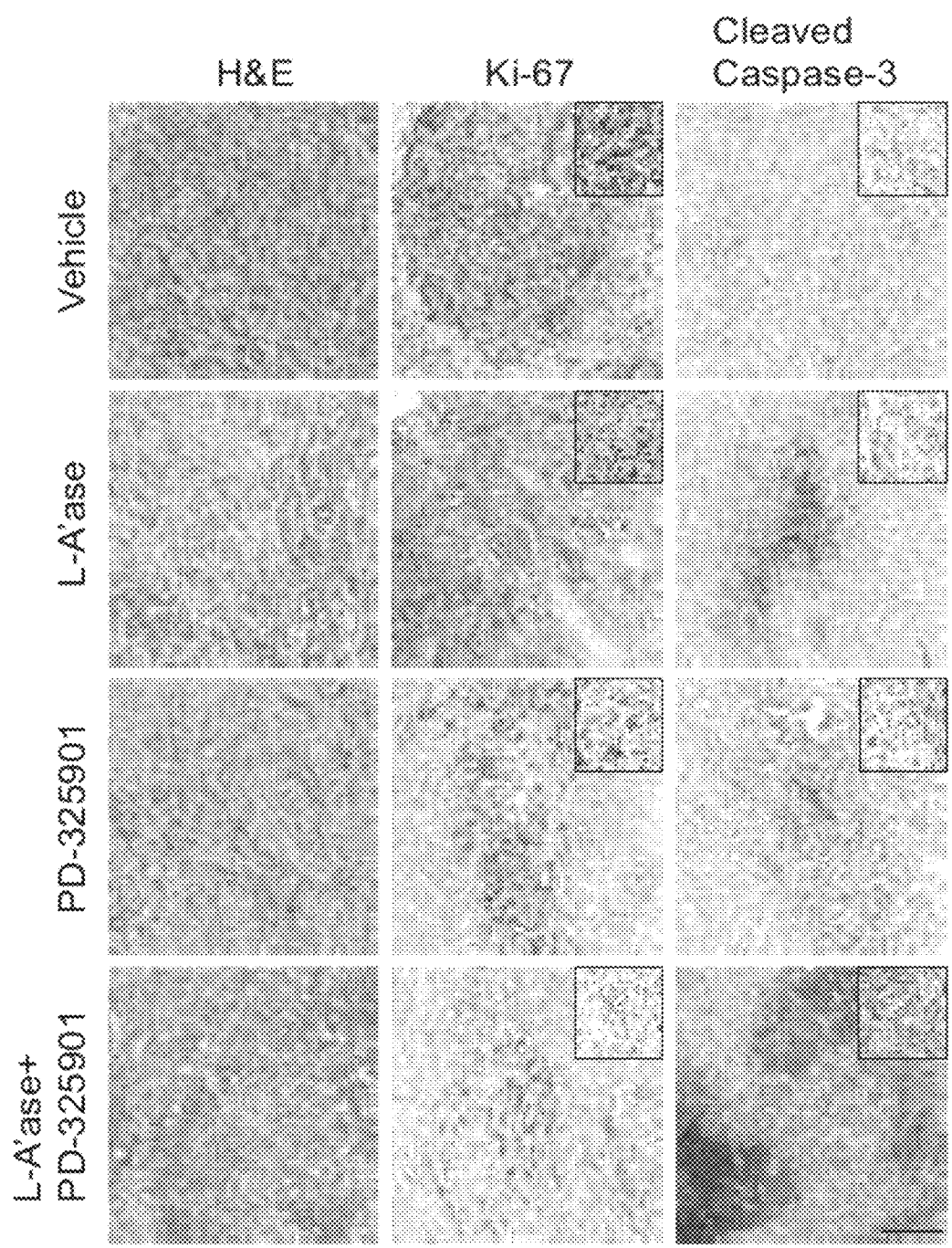
(FIG. 13B-D) Representative images of H&E, Ki-67, and cleaved caspase-3 staining from each treatment group in panel A (FIG. 13B). Quantification of Ki-67 (FIG. 13C; n=16, each 16 fields) and cleaved caspase-3 (FIG. 13D) (n=10, each 10 fields). Scale bars, 300 μm.
Figures 13C, 13D:
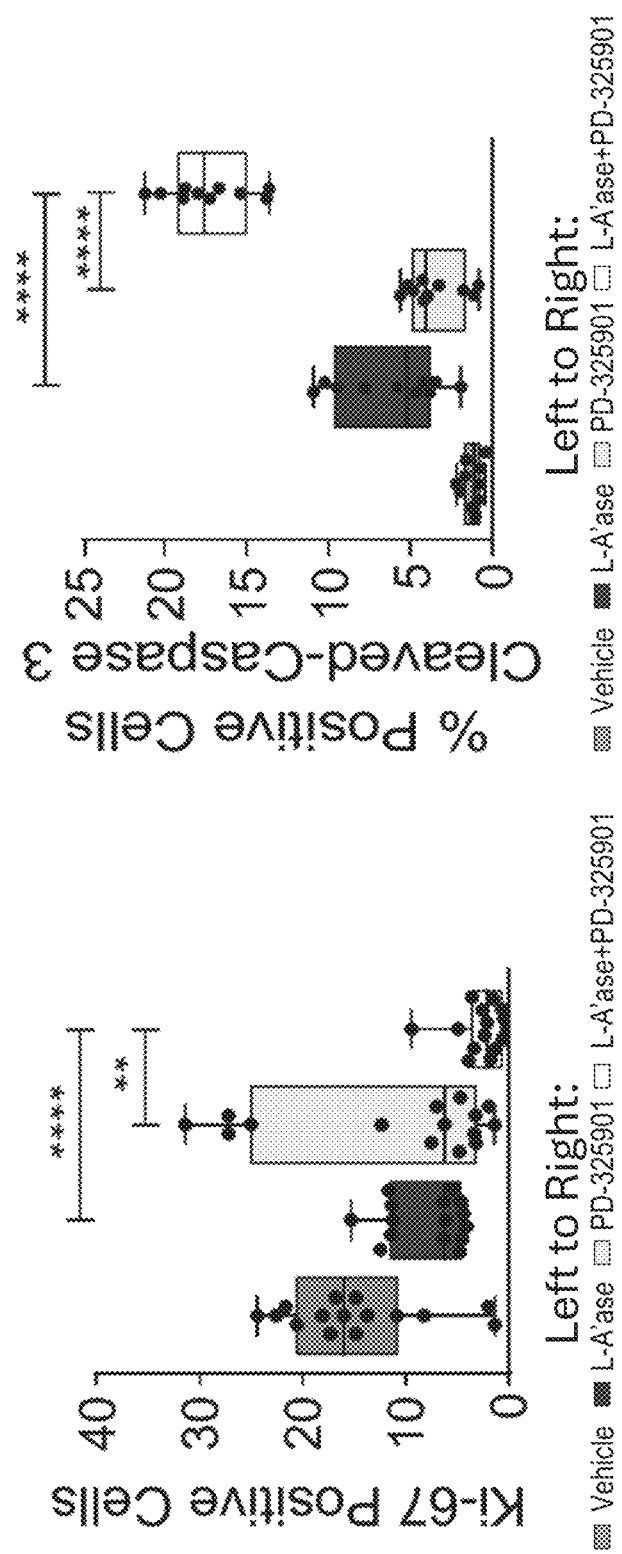
Figure 13E:
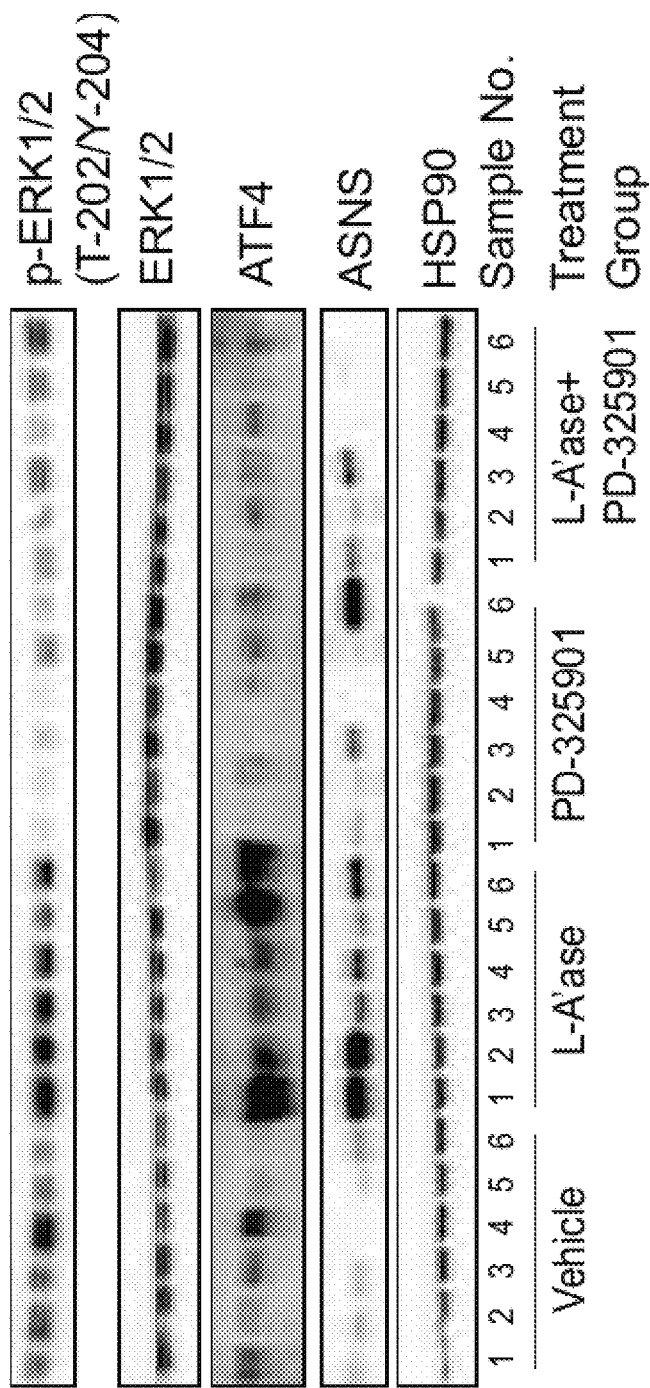
(FIG. 13E) Immunoblotting of resected pancreatic tumors (6 per group) for ATF4, ASNS, and phosphorylated and total ERK1/2 proteins.
Figure 13F:
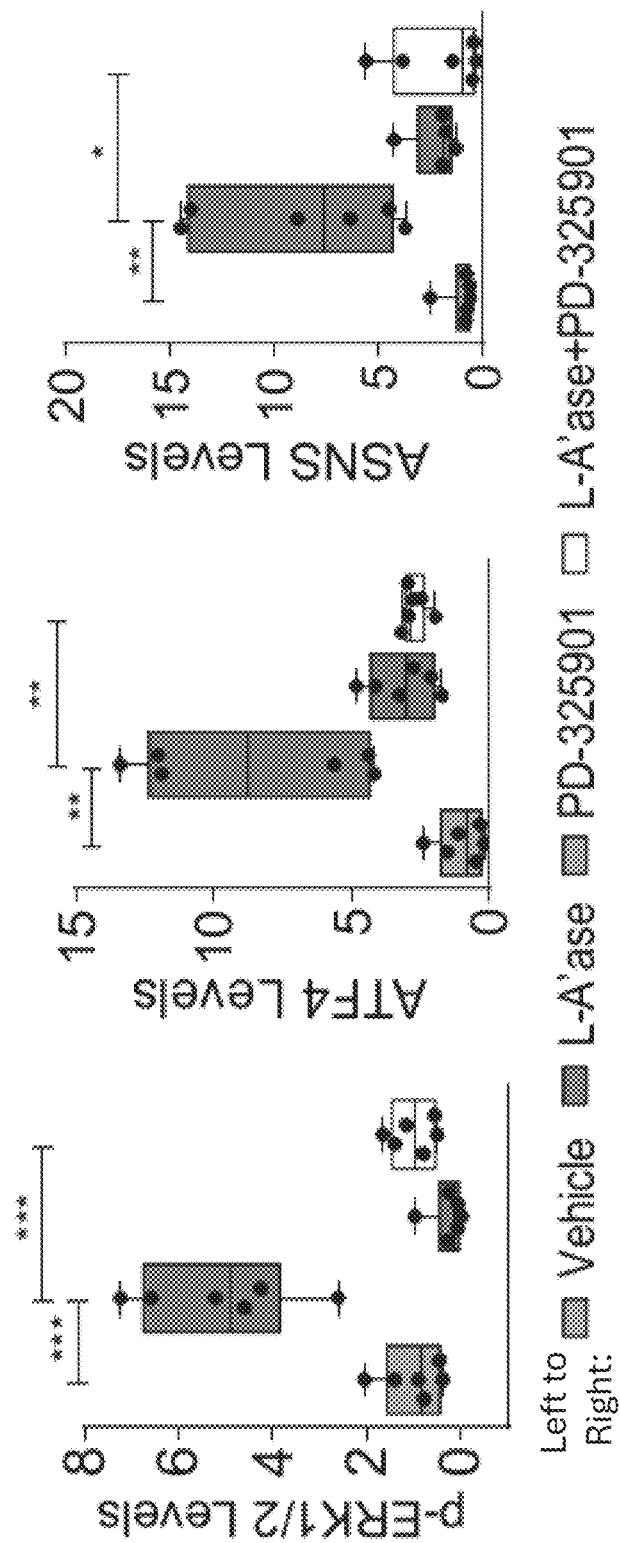
(FIG. 13F) Quantification of ATF4, ASNS, and phosphorylated ERK1/2 levels in (FIG. 13D).
Figure 13G:
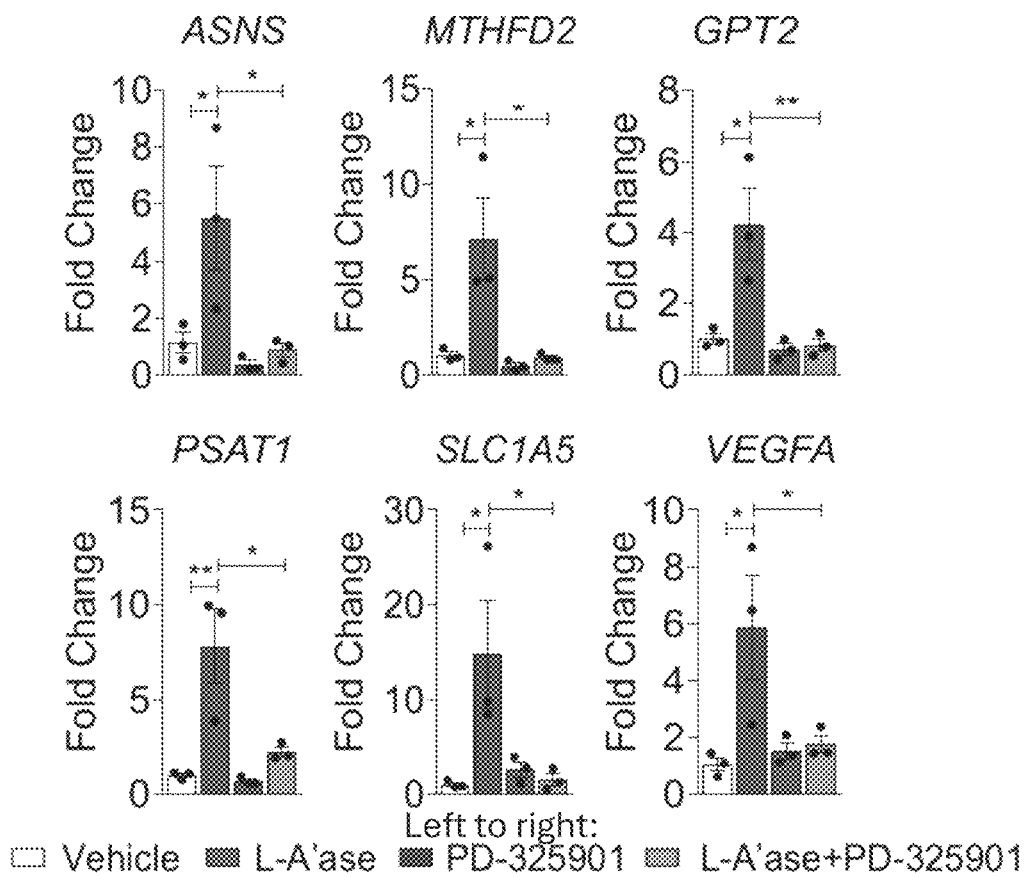
(FIG. 13G) qRT-PCR analysis of transcripts encoding ATF4 targets in resected pancreatic tumors (3 per group).
Figure 14A:
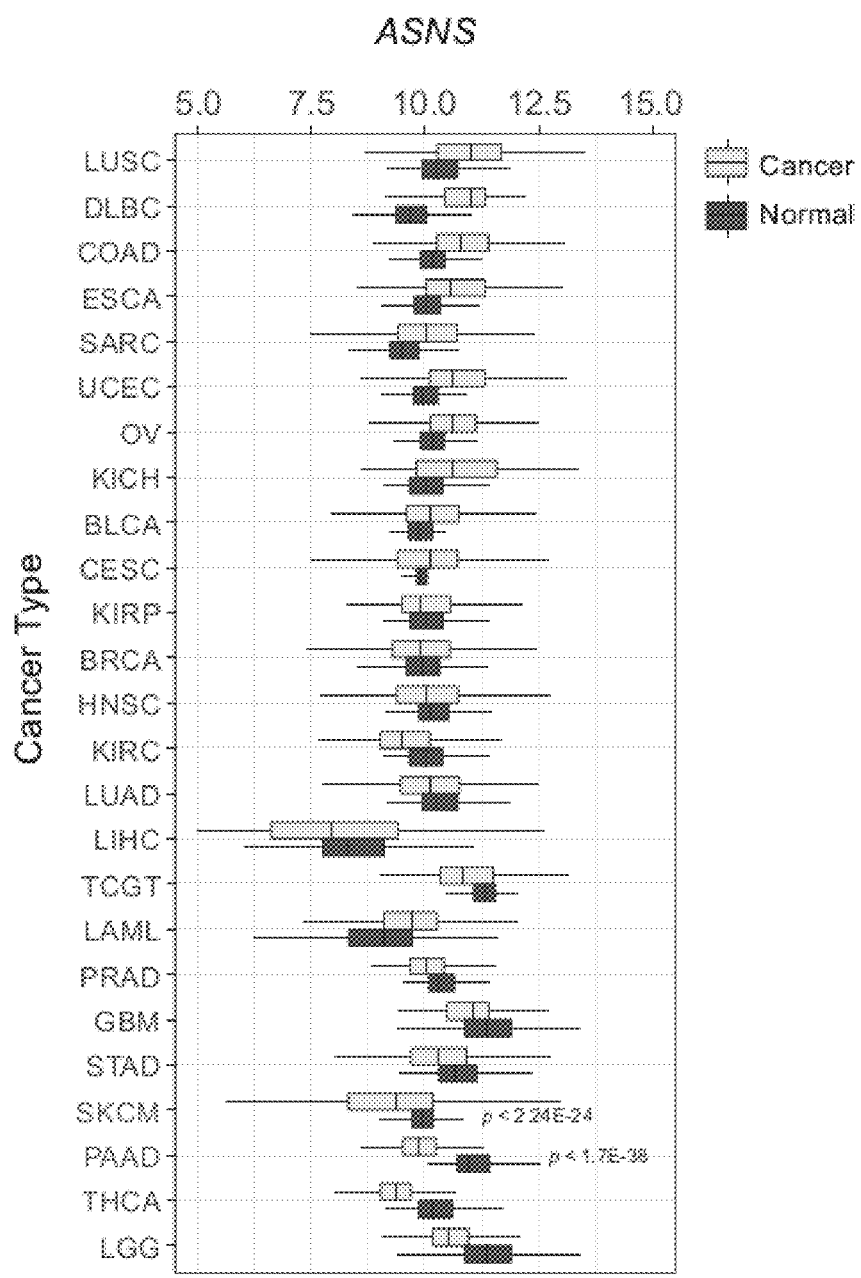
(FIG. 14A) Comparison of ASNS expression in cancer vs. healthy tissue samples from TCGA dataset using Wilcoxon rank sum test. Statistical significance shown for skin cutaneous melanoma (SKCM) and pancreatic adenocarcinoma (PAAD).
Figure 14B:
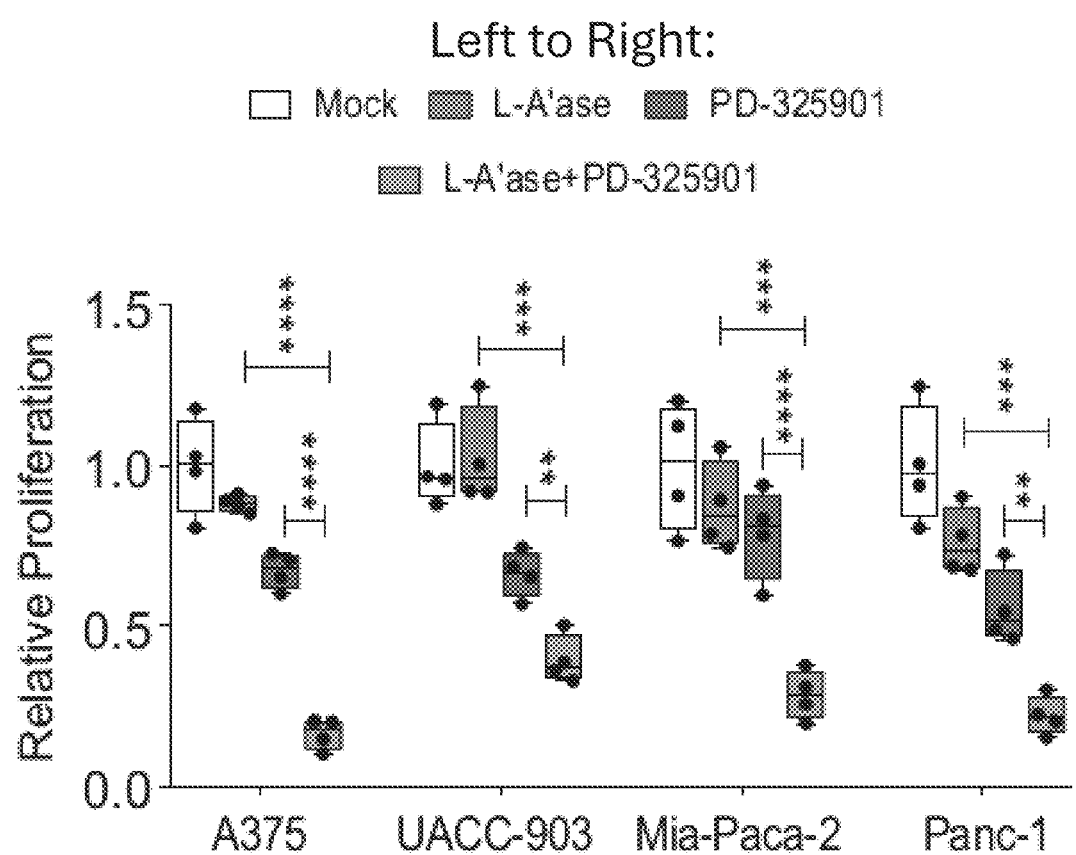
(FIG. 14B) Proliferation of melanoma and pancreatic cancer lines as measured 72 hr after treatment with L-A'ase, PD-325901, or both relative to mock-treated cells. All lines were grown in L-asparagine-supplemented DMEM. Data are presented as the mean±SEM. Statistical significance (**$p<0.0001$; *$p<0.001$; **$p<0.01$) was calculated using unpaired t-test in (B).

Example 6. Combined Asparagine Restriction and MAPK Signaling Inhibition Suppresses Melanoma and Pancreatic Tumor Growth In Vivo ALL and pancreatic tumors exhibit low or undetectable ASNS expression (Bachet et al., Pancreas 44, 1141-1147 (2015); Stams et al., Blood 105, 4223-4225 (2005)), marking both as potential candidates for L-A'ase therapy. Expression of ASNS in cancer vs. healthy tissue samples were compared in different cancer types. Indeed, ASNS was found to be significantly down-regulated in multiple cancer types compared to the corresponding healthy tissues, including melanoma (Wilcoxon rank sum $P<2.2E-24$) and pancreatic cancer ($P<1.7E-38$) (Figure S7A). However, given that cancer cells, including pancreatic cancer and melanoma, activate the GCN2-ATF4 axis (FIG. 1), ASNS upregulation may reduce the efficacy of L-A'ase (Aslanian et al., 2001). The data disclosed herein demonstrating that concomitant MAPK inhibition may render tumor cells incapable of upregulating ATF4 and its transcriptional target ASNS, provided the opportunity to assess the growth inhibitory effects of L-A'ase. Combined treatment with MEK-i and L-A'ase of melanoma and pancreatic cancer lines grown in medium supplemented with L-asparagine, exhibited a markedly greater decrease in proliferation compared to either treatment alone (FIG. 14B). To evaluate the effectiveness of this combination in vivo, the effect of combined L-A'ase and MEK-i treatment on the growth of KRASLSLG12D/+; p53R172H/+; PDXCretg/+(KPC/B6) pancreatic cells in an orthotopic tumor model was determined. While L-A'ase treatment alone showed significant inhibition of tumor growth, MEK-i treatment alone did not (FIG. 7A). Importantly, combined L-A'ase and MEK-i treatment achieved significantly greater tumor growth suppression in comparison to either treatment alone (FIG. 7A). This combination also showed markedly greater suppression in tumor cell proliferation as compared to either treatment alone (FIGS. 13B and 13C). Notably, although MEK-i treatment alone did not result in a significant increase in apoptosis, it greatly augmented the ability of L-A'ase to promote apoptotic cell death (FIGS. 13B and 13D). Molecular analysis of the resected tumors from the L-A'ase treatment group showed upregulation of ATF4 and ASNS protein levels, together with increased phosphorylation of ERK1/2 in comparison to the vehicle treatment group (FIGS. 13E and 13F). Increased ATF4 protein levels in L-A'ase treated tumors also correlated with enhanced transcript levels of ASNS and other ATF4 target genes, compared with vehicle treated animals (FIG. 13G). Importantly, in agreement with in vitro studies (FIGS. 5 and 6), MEK inhibition overcame the increase in ERK1/2 phosphorylation and abolished the increase in ATF4 and the associated target gene expression following L-A'ase treatment in vivo (FIGS. 13E, 13F, and 13G).

Figure 13H:
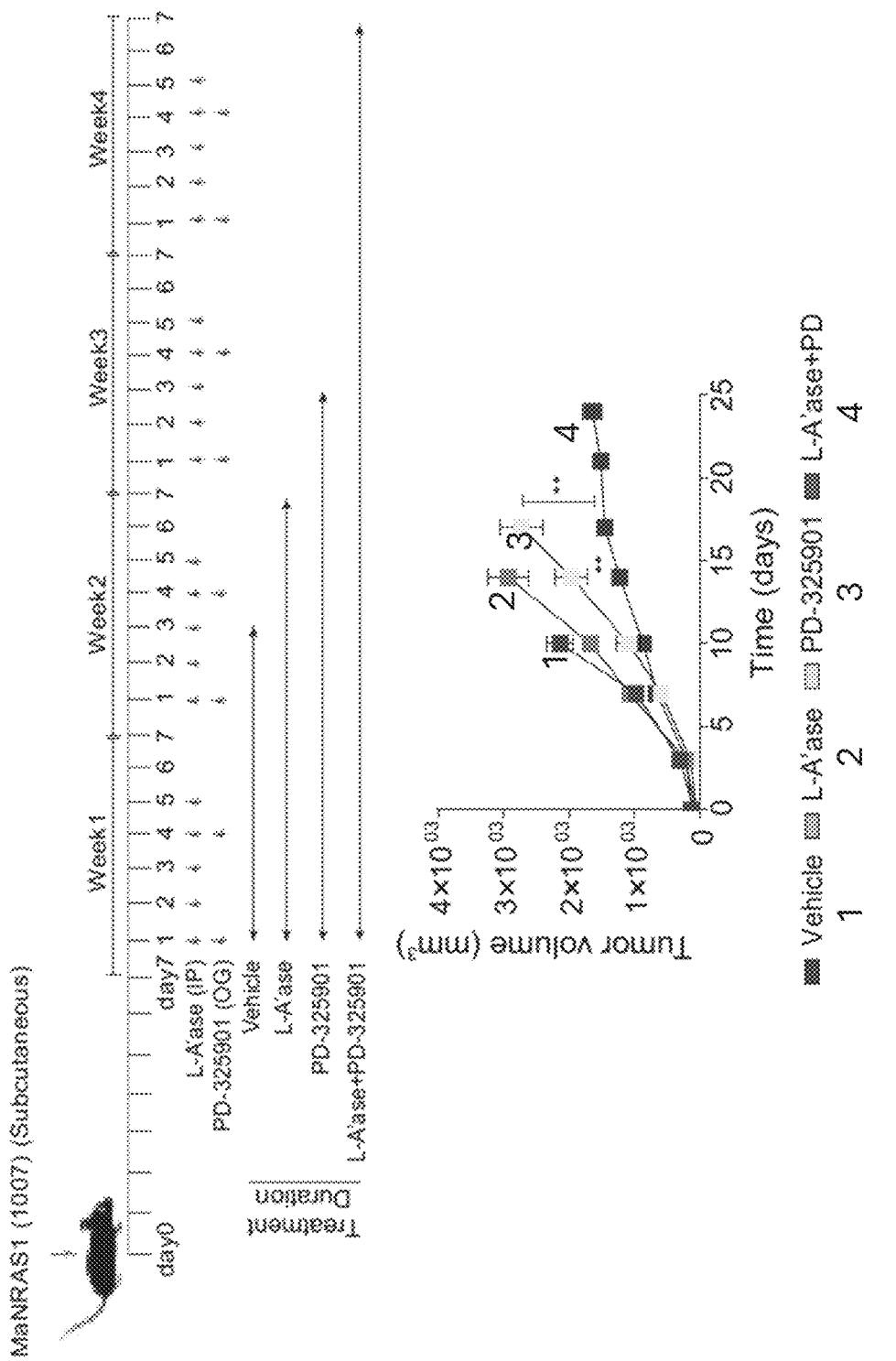
(FIG. 13H) Schematic showing the drug treatment regimen. Volume of tumors from C57BL/6 mice injected subcutaneously with MaNRAS1 (1007) mouse melanoma cells and treated with L-A'ase, PD-325901, or both for indicated times (n=6-7 per group). Statistical analysis: Welch's t-test (two-tailed).
Figure 13I:
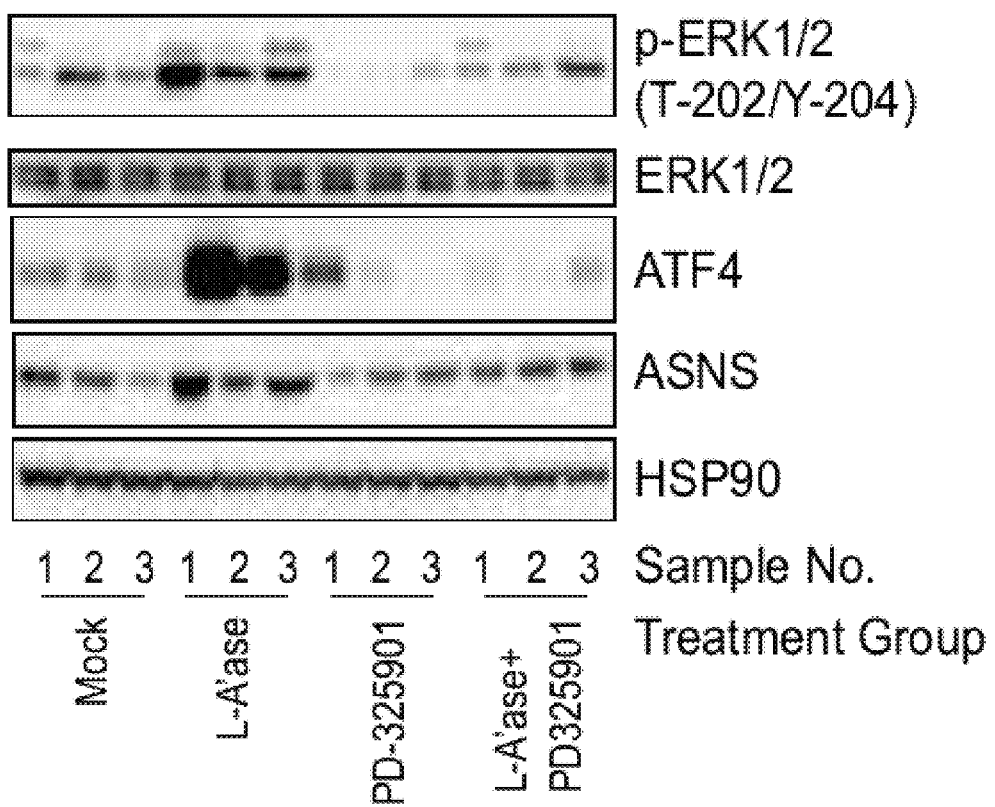
(FIG. 13I) Immunoblotting of resected melanoma tumors (3 per group) for ATF4, ASNS, and phosphorylated and total ERK1/2 proteins. Note—lysates from tumors harvested at different timepoints, as indicated in the drug treatment schematic in (FIG. 13H).
Figure 13J:
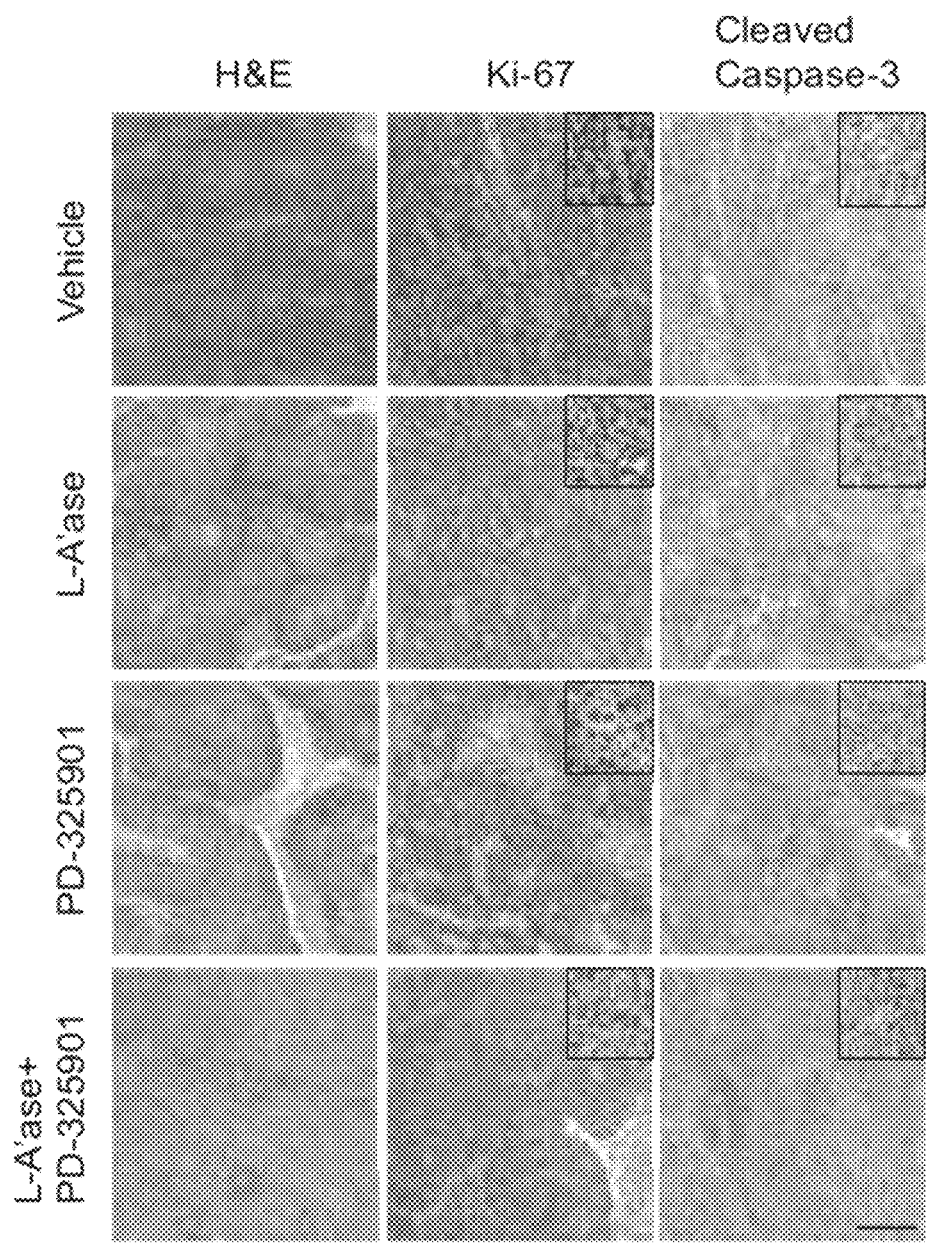
(FIG. 13J-L) Representative images of H&E, Ki-67, and cleaved caspase-3 staining from each treatment group in panel H (FIG. 13J). Quantification of Ki-67 (FIG. 13K; n=6, each 6 fields) and cleaved caspase-3 (FIG. 13L) (n=6, each 6 fields). Scale bars, 300 μm.
Figures 13K, 13L:
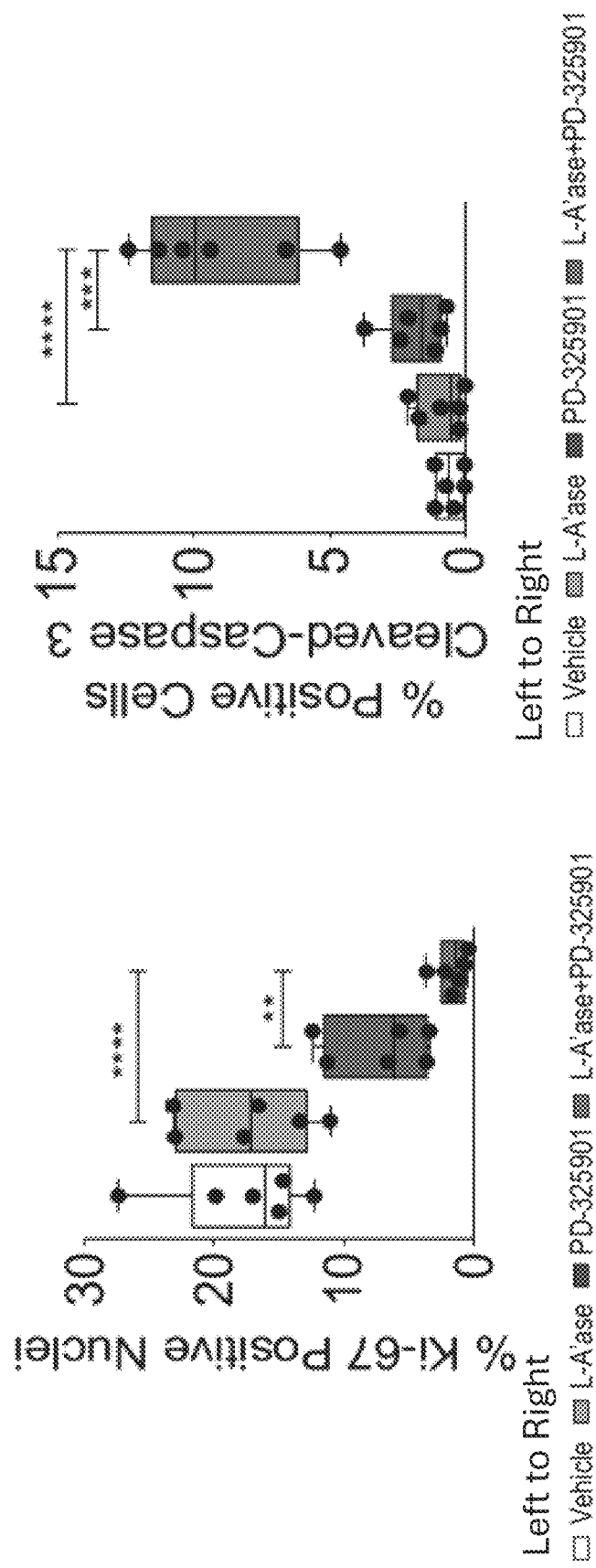

While melanomas harboring activating BRAF mutations exhibit a robust response to BRAF specific inhibitors, NRAS mutant melanomas are refractory. Thus, the efficacy of the L-A'ase and MEK-i combination was assessed in a NRAS mutant melanoma cell line MaNRAS1 (1007) (Dorard et al., Nat Commun 8, 15262 (2017), using an immune competent mouse model. Notably, tumors in vehicle-treated group grew rapidly, attaining an average volume>2.0 cm3 within 10 days of implantation. L-A'ase treatment alone did not significantly suppress tumor growth, while MEK-i treatment had only modest anti-tumor activity (FIG. 13H). Remarkably, combined L-A'ase and MEK-i treatment resulted in tumor growth suppression that was significantly greater than either treatment alone (FIG. 13H). Molecular analysis of resected tumors confirmed induction of phosphorylated ERK1/2, ATF4, and of ASNS protein levels in response to L-A'ase treatment, and a significant reversal of these changes upon concomitant MEK-i treatment (FIG. 13I). Immunohistological analyses of tumor tissues revealed diminished proliferation in the combination group (L'A-ase+ MEK-i) in comparison to L-A'ase or MEK-i treatment groups (FIGS. 13J and 13K). Combination treatment also exhibited increased apoptosis in comparison to L-A'ase or MEK-i treatments alone (FIGS. 13J and 13L).

Figures 13M, 13N, 13O:
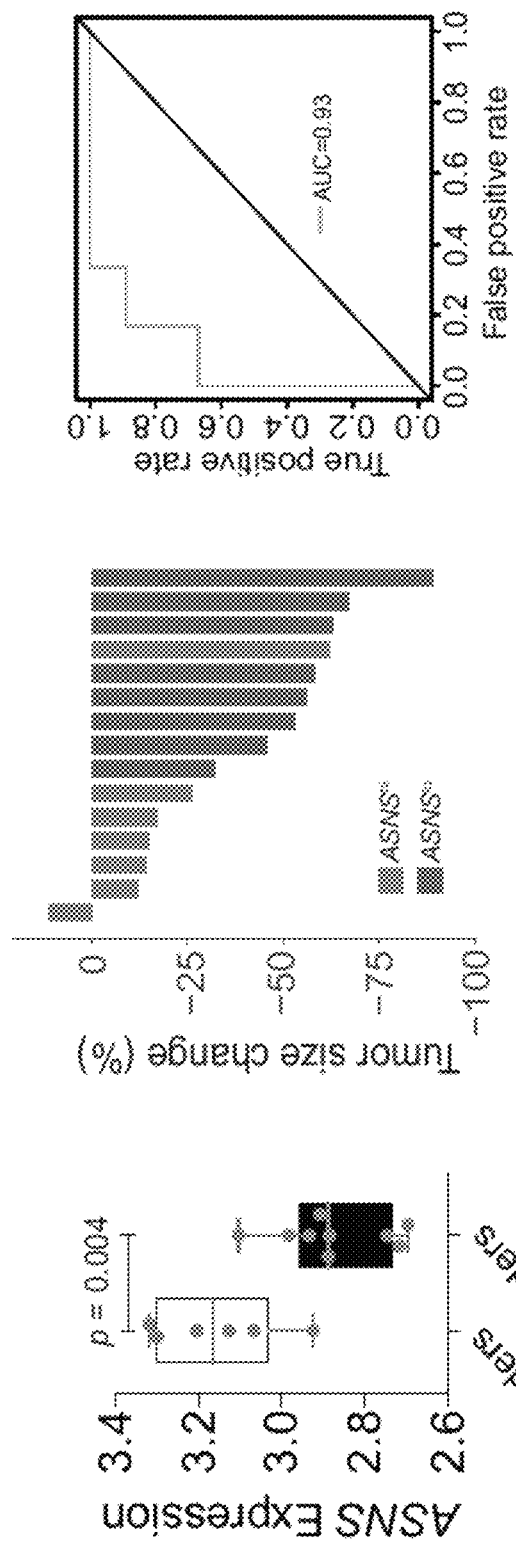
(FIG. 13M) Relative ASNS expression in melanoma patients treated with a BRAF inhibitor or a combination of a BRAF and MEK inhibitor (Wilcoxon $p<0.004$).
(FIG. 13N) Waterfall plot showing change in tumor size in melanoma patients treated with a BRAF inhibitor or a combination of a BRAF and MEK inhibitor.
(FIG. 13O) Receiver-operating characteristics (ROC) analysis showing ASNS expression highly predictive of response to MAPK signaling inhibitors (AUC=0.93). Data are presented as the mean±SEM. Statistical significance (**$p<0.0001$; *$p<0.001$; **$p<0.01$; *$p<0.05$; ns, not significant) was calculated using unpaired t-test, unless specified. For MAPK pathway inhibitor treatments in (FIG. 13M-O), see below.

Analysis of pre-treatment RNA-Seq data from 15 melanoma patients who were treated with BRAF-i or a combination of BRAF-i and MEK-i showed significantly lower ASNS expression in responders (>30% reduction in tumor size) vs. non-responders (<30% reduction in tumor size) (Kakavand et al., Trends Endocrinol Metab 20, 436-443 (2017); FIGS. 13M and 13N). Furthermore, ASNS was amongst the top 7 genes, whose expression was the strongest predictor of response to MAPK signaling inhibitors, and Receiver-Operating Characteristics (ROC) analysis showed ASNS expression itself as highly predictive of response to MAPK inhibition therapy (AUC=0.93; FIG. 13O). Collectively, these data establish MAPK signaling as a synthetic vulnerability of asparagine restricted tumors and demonstrate the efficacy of combined L-A'ase and MEK-i in suppressing PDAC and melanoma tumor growth in vivo.

The examples and embodiments described herein are for illustrative purposes only and various modifications or changes suggested to persons skilled in the art are to be included within the spirit and purview of this application and scope of the appended claims.

What is claimed is:

1. A method of suppressing tumor proliferation, comprising:
   (i) contacting a tumor cell with an asparagine restriction agent,
      wherein the asparagine restriction agent is an asparaginase or a polynucleotide encoding the asparaginase; and
   (ii) contacting the tumor cell with a first inhibitory agent,
      wherein the first inhibitory agent inhibits the expression or activity of a first synthetic lethal (SL) partner of asparagine synthetase (ASNS), and the first SL partner of ASNS is selected from the group consisting of MEK1 and MEK2; and
      wherein the first inhibitory agent is a small molecule MEK1 or MEK2 inhibitor selected from the group consisting of trametinib, selumetinib, and PD-325901 (mirdametinib).

2. The method of claim 1, wherein the asparagine restriction agent is an asparaginase.

3. The method of claim 2, wherein the asparaginase is L-asparaginase.

4. The method of claim 1, wherein the first SL partner of ASNS is MEK1, and the first inhibitory agent is selumetinib.

5. The method of claim 4, further comprising:
   (iii) contacting the tumor cell with a second inhibitory agent,
      wherein the second inhibitory agent inhibits the expression or activity of a second SL partner of ASNS, and the second SL partner of ASNS is selected from the group consisting of eIF2a, Ras, BRAF, CRAF, PLK1, ERK1, ERK2, MNK1, PDGFRA, PDGFRB, VEGFR-2, and ATF4.

6. The method of claim 5, wherein the second SL partner of ASNS is selected from the group consisting of BRAF, CRAF, ERK1, ERK2, and MNK1.

7. The method of claim 5, wherein the second SL partner of ASNS is BRAF.

8. The method of claim 5, wherein the second inhibitory agent is a small molecule selected from the group consisting of gefitinib, sunitinib, dabrafenib, vemurafenib, sorafenib, and Torin 1.

9. The method of claim 8, wherein the small molecule is vemurafenib.

10. The method of claim 5, wherein the second inhibitory agent is:
    (i) a siRNA, wherein the siRNA hybridizes with an mRNA that encodes the second SL partner of ASNS;
    (ii) a CRISPR-Cas9 complex comprising a Cas9 protein and a guide RNA,
       wherein the guide RNA hybridizes with the nucleic acid sequence encoding the second SL partner of ASNS; or
    (iii) a TALEN that recognizes the nucleic acid sequence encoding the second SL partner of ASNS.

11. The method of claim 1, wherein the tumor cell is a melanoma cell or a pancreatic cancer cell.

* * * * *

SEQUENCE LISTING

<160> NUMBER OF SEQ ID NOS: 63

<210> SEQ ID NO 1
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 1

His His His His His His
1               5

<210> SEQ ID NO 2
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 2
cagcctttcg ctcatactct a                                              21

<210> SEQ ID NO 3
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 3
gtaaacccac atcctccatc tc                                             22

<210> SEQ ID NO 4
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 4
cgatggactc ctgaccataa tc                                             22

<210> SEQ ID NO 5
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 5
gtgtctgcct ttcttgtctc t                                              21

<210> SEQ ID NO 6
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 6
gttcgtgctt cagtaggtat gt                                             22

<210> SEQ ID NO 7
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 7
ggtggcagag acaagtaata gg                                             22

<210> SEQ ID NO 8
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 8
agaaactccc aactgtcctt ac                                             22

<210> SEQ ID NO 9
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 9
cctcctagac tagctgacct tat                                         23

<210> SEQ ID NO 10
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 10
gctgtagtaa ttccagcgag ag                                          22

<210> SEQ ID NO 11
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 11
gagtcgtagt cgaggtcata gt                                          22

<210> SEQ ID NO 12
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 12
gtatgagccc agagtcctat ct                                          22

<210> SEQ ID NO 13
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 13
cacattgacg ctcctgacta tc                                          22

<210> SEQ ID NO 14
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 14
caggaaggtg tgctgactat g                                           21

<210> SEQ ID NO 15
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 15
cccatgacgt agatgctgaa a                                              21

<210> SEQ ID NO 16
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 16
tgtcgccact tggtcataat c                                              21

<210> SEQ ID NO 17
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 17
ggaggccatt tctacaccat ac                                             22

<210> SEQ ID NO 18
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 18
gtcgcggaga gtttgagtat tt                                             22

<210> SEQ ID NO 19
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 19
ggtggcagag cgaacaataa                                                20

<210> SEQ ID NO 20
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 20
gaggacgcgg tgtcagaaat                                                20

```
<210> SEQ ID NO 21
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 21
ggttgctctg ctatgagtct ct                                              22

<210> SEQ ID NO 22
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 22
agggcagaat catcacgaag t                                               21

<210> SEQ ID NO 23
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 23
agggtctcga ttggatggca                                                 20

<210> SEQ ID NO 24
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 24
tggcagtacc ccatgtctga a                                               21

<210> SEQ ID NO 25
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 25
ccaagaccgt cacaaaaagg c                                               21

<210> SEQ ID NO 26
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 26
agcaccttcg ttctgacctg                                                 20

<210> SEQ ID NO 27
```

```
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 27
tattctcccg tgtctagccc a                                            21

<210> SEQ ID NO 28
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 28
ggcccaataa tcagagtggc a                                            21

<210> SEQ ID NO 29
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 29
ccagtgtcat ttccgatcac ttt                                          23

<210> SEQ ID NO 30
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 30
aggcacgagt aacaagctca c                                            21

<210> SEQ ID NO 31
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 31
atgaggacat aaccagccac c                                            21

<210> SEQ ID NO 32
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 32
agatgggcag tagcgaacc                                               19

<210> SEQ ID NO 33
<211> LENGTH: 21
```

```
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 33
agcaattcag aggtcagctt g                                              21

<210> SEQ ID NO 34
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 34
ggacttctgg gcgctataca g                                              21

<210> SEQ ID NO 35
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 35
cttgaagagg gcgtagtcac a                                              21

<210> SEQ ID NO 36
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 36
ctgcgacttc tctaatgtct gc                                             22

<210> SEQ ID NO 37
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 37
ctcgccaacc aggatcaca                                                 19

<210> SEQ ID NO 38
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 38
gctgcgaagt ggaaaccatc                                                20

<210> SEQ ID NO 39
<211> LENGTH: 22
<212> TYPE: DNA
```

```
<213> ORGANISM: Artificial Sequence
<220> FEATURE:
<223> OTHER INFORMATION: Description of Artificial Sequence: Synthetic
      primer

<400> SEQUENCE: 39
cctccttctg cacacatttg aa                                              22

<210> SEQ ID NO 40
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 40
caggcggaga ctgacaaact g                                               21

<210> SEQ ID NO 41
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 41
tccttccggg attttgcaga t                                               21

<210> SEQ ID NO 42
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 42
tgtaccgcta tggttacact cg                                              22

<210> SEQ ID NO 43
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 43
ggcagggaca gttgcttct                                                  19

<210> SEQ ID NO 44
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 44
actgctcgga agtctactgg t                                               21

<210> SEQ ID NO 45
<211> LENGTH: 22
<212> TYPE: DNA
<213> ORGANISM: Artificial Sequence
```

```
<220> FEATURE:
<223> OTHER INFORMATION: Description of Artificial Sequence: Synthetic
      primer

<400> SEQUENCE: 45
gcgctggaaa ggtagtttac ga                                            22

<210> SEQ ID NO 46
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 46
cgagagctac acgttcacgg                                               20

<210> SEQ ID NO 47
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 47
gggtgtcgag ggaaaaatag g                                             21

<210> SEQ ID NO 48
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 48
catgtacgtt gctatccagg c                                             21

<210> SEQ ID NO 49
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 49
ctccttaatg tcacgcacga t                                             21

<210> SEQ ID NO 50
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 50
cagtggagcg ccagaataga a                                             21

<210> SEQ ID NO 51
<211> LENGTH: 19
<212> TYPE: DNA
<213> ORGANISM: Artificial Sequence
<220> FEATURE:
```

```
<223> OTHER INFORMATION: Description of Artificial Sequence: Synthetic
      primer

<400> SEQUENCE: 51
cctgtgcccc ttcaaggag                                                19

<210> SEQ ID NO 52
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 52
cagccacggt caacaactc                                                19

<210> SEQ ID NO 53
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 53
cttctttacg gatagcaacc gag                                           23

<210> SEQ ID NO 54
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 54
ttccgtgcag tgtctgagtg                                               20

<210> SEQ ID NO 55
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 55
gcagcagttg gtgtatccat tg                                            22

<210> SEQ ID NO 56
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 56
agtgcgaaat gaagccgttg                                               20

<210> SEQ ID NO 57
<211> LENGTH: 19
<212> TYPE: DNA
<213> ORGANISM: Artificial Sequence
<220> FEATURE:
<223> OTHER INFORMATION: Description of Artificial Sequence: Synthetic
```

```
                                  primer

<400> SEQUENCE: 57
gactggcggg attgtcacc                                                   19

<210> SEQ ID NO 58
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 58
catcaacgac tctgttgtag acc                                              23

<210> SEQ ID NO 59
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 59
ctggatacag gattgcggta ttt                                              23

<210> SEQ ID NO 60
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 60
gcacatagag agaatgagct tcc                                              23

<210> SEQ ID NO 61
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 61
ctccgctctg aacaaggct                                                   19

<210> SEQ ID NO 62
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 62
gtgacgttga catccgtaaa ga                                               22

<210> SEQ ID NO 63
<211> LENGTH: 19
<212> TYPE: DNA
<213> ORGANISM: Artificial Sequence
<220> FEATURE:
<223> OTHER INFORMATION: Description of Artificial Sequence: Synthetic
      primer
```

```
<400> SEQUENCE: 63
gccggactca tcgtactcc                                                          19
```